Nov. 8, 1955 W. A. MALTHANER ET AL 2,723,311

COMMON CONTROL TELEPHONE SYSTEMS

Filed March 5, 1953 77 Sheets-Sheet 1

INVENTORS W. A. MALTHANER
H. E. VAUGHAN
BY James W. Falk
ATTORNEY

INVENTORS W. A. MALTHANER
H. E. VAUGHAN
BY [signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 3

INVENTORS W. A. MALTHANER
H. E. VAUGHAN

BY [signature]

ATTORNEY

Nov. 8, 1955 W. A. MALTHANER ET AL 2,723,311

COMMON CONTROL TELEPHONE SYSTEMS

Filed March 5, 1953 77 Sheets-Sheet 4

INVENTORS W. A. MALTHANER
H. E. VAUGHAN
BY [signature]
ATTORNEY

COMMON CONTROL TELEPHONE SYSTEMS

Filed March 5, 1953 77 Sheets-Sheet 5

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 9

INVENTORS W. A. MALTHANER
H. E. VAUGHAN

BY [signature]

ATTORNEY

Nov. 8, 1955 W. A. MALTHANER ET AL 2,723,311

COMMON CONTROL TELEPHONE SYSTEMS

Filed March 5, 1953 77 Sheets-Sheet 10

INVENTORS W. A. MALTHANER H. E. VAUGHAN

BY [signature] ATTORNEY

Nov. 8, 1955 W. A. MALTHANER ET AL 2,723,311

COMMON CONTROL TELEPHONE SYSTEMS

Filed March 5, 1953 77 Sheets-Sheet 11

INVENTORS W. A. MALTHANER
H. E. VAUGHAN

BY [signature]

ATTORNEY

INVENTORS W. A. MALTHANER
H. E. VAUGHAN
BY James W. Falk
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 15

INVENTORS W. A. MALTHANER
H. E. VAUGHAN
BY
[signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 16

INVENTORS W. A. MALTHANER
H. E. VAUGHAN
BY [signature]
ATTORNEY

INVENTORS W. A. MALTHANER
H. E. VAUGHAN
BY
Johnson D. Falk
ATTORNEY

INVENTORS W. A. MALTHANER
H. E. VAUGHAN
BY
ATTORNEY

Nov. 8, 1955 W. A. MALTHANER ET AL 2,723,311

COMMON CONTROL TELEPHONE SYSTEMS

Filed March 5, 1953 77 Sheets-Sheet 19

INVENTORS W. A. MALTHANER
H. E. VAUGHAN
BY [signature]
ATTORNEY

INVENTORS W. A. MALTHANER
H. E. VAUGHAN
BY
ATTORNEY

INVENTORS W. A. MALTHANER
H. E. VAUGHAN
BY

ATTORNEY

INVENTORS W. A. MALTHANER
H. E. VAUGHAN
BY
[signature]
ATTORNEY

INVENTORS W. A. MALTHANER
H. E. VAUGHAN
BY [signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 24

INVENTORS W. A. MALTHANER
H. E. VAUGHAN

BY [signature]

ATTORNEY

INVENTORS W. A. MALTHANER
H. E. VAUGHAN
BY
ATTORNEY

INVENTORS W. A. MALTHANER
H. E. VAUGHAN
BY [signature]
ATTORNEY

INVENTORS W. A. MALTHANER H. E. VAUGHAN
BY
[signature]
ATTORNEY

INVENTORS W. A. MALTHANER
H. E. VAUGHAN
BY
ATTORNEY

INVENTORS W. A. MALTHANER
H. E. VAUGHAN
BY
[signature]
ATTORNEY

INVENTORS W. A. MALTHANER
H. E. VAUGHAN
BY [signature]
ATTORNEY

INVENTORS W. A. MALTHANER
H. E. VAUGHAN
BY
ATTORNEY

Nov. 8, 1955 W. A. MALTHANER ET AL 2,723,311

COMMON CONTROL TELEPHONE SYSTEMS

Filed March 5, 1953 77 Sheets-Sheet 32

INVENTORS W. A. MALTHANER
H. E. VAUGHAN
BY
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY
ATTORNEY

INVENTORS W. A. MALTHANER
H. E. VAUGHAN
BY
ATTORNEY

INVENTORS W. A. MALTHANER
H. E. VAUGHAN
BY
ATTORNEY

INVENTORS W. A. MALTHANER
H. E. VAUGHAN
BY
ATTORNEY

INVENTORS W. A. MALTHANER
H. E. VAUGHAN
BY
[signature]
ATTORNEY

INVENTORS W. A. MALTHANER
H. E. VAUGHAN
BY
[signature]
ATTORNEY

INVENTORS W. A. MALTHANER
H. E. VAUGHAN
BY
[signature]
ATTORNEY

INVENTORS W. A. MALTHANER
H. E. VAUGHAN
BY [signature]
ATTORNEY

INVENTORS W. A. MALTHANER
H. E. VAUGHAN
BY James W. Falk
ATTORNEY

INVENTORS W. A. MALTHANER
H. E. VAUGHAN
BY [signature]
ATTORNEY

INVENTORS W. A. MALTHANER
H. E. VAUGHAN
BY
[signature]
ATTORNEY

SIGNALLING DISPATCHER-I

INVENTORS W. A. MALTHANER
H. E. VAUGHAN
BY [signature]
ATTORNEY

INVENTORS W. A. MALTHANER
H. E. VAUGHAN
BY James W. Falk
ATTORNEY

INVENTORS W. A. MALTHANER
H. E. VAUGHAN
BY James W. Falk
ATTORNEY

Nov. 8, 1955 W. A. MALTHANER ET AL 2,723,311

COMMON CONTROL TELEPHONE SYSTEMS

Filed March 5, 1953 77 Sheets-Sheet 49

INVENTORS W. A. MALTHANER
H. E. VAUGHAN

BY [signature]

ATTORNEY

INVENTORS W. A. MALTHANER
H. E. VAUGHAN
BY James W. Falk
ATTORNEY

INVENTORS W. A. MALTHANER
H. E. VAUGHAN
BY James W. Falk
ATTORNEY

INVENTORS W. A. MALTHANER
H. E. VAUGHAN
BY [signature]
ATTORNEY

INVENTORS W. A. MALTHANER
H. E. VAUGHAN
BY
James W. Falk
ATTORNEY

COMMON CONTROL TELEPHONE SYSTEMS

Filed March 5, 1953

INVENTORS W. A. MALTHANER
H. E. VAUGHAN
BY Jameson. Falk
ATTORNEY

INVENTORS W. A. MALTHANER
H. E. VAUGHAN
BY
ATTORNEY

INVENTORS W. A. MALTHANER
H. E. VAUGHAN
BY
[signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 57

INVENTORS W. A. MALTHANER
H. E. VAUGHAN
BY [signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 58

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY
[signature]
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY.

INVENTORS W. A. MALTHANER
H. E. VAUGHAN
BY James W. Falk
ATTORNEY

INVENTORS W. A. MALTHANER
H. E. VAUGHAN
BY [signature]
ATTORNEY

INVENTORS W. A. MALTHANER
H. E. VAUGHAN
BY
ATTORNEY

INVENTORS W. A. MALTHANER
H. E. VAUGHAN
BY [signature]
ATTORNEY

Nov. 8, 1955 W. A. MALTHANER ET AL 2,723,311

COMMON CONTROL TELEPHONE SYSTEMS

Filed March 5, 1953 77 Sheets-Sheet 70

INVENTORS W. A. MALTHANER
H. E. VAUGHAN
BY James W. Falk
ATTORNEY

INVENTORS W. A. MALTHANER
H. E. VAUGHAN
BY [signature]
ATTORNEY

INVENTORS W. A. MALTHANER
H. E. VAUGHAN

BY [signature]

ATTORNEY

INVENTORS W. A. MALTHANER
H. E. VAUGHAN
BY [signature]
ATTORNEY

INVENTORS W. A. MALTHANER
H. E. VAUGHAN
BY
ATTORNEY

INVENTORS W. A. MALTHANER
H. E. VAUGHAN
BY
ATTORNEY

INVENTORS W. A. MALTHANER
H. E. VAUGHAN
BY [signature]
ATTORNEY

INVENTORS W. A. MALTHANER
H. E. VAUGHAN
BY [signature]
ATTORNEY

United States Patent Office 2,723,311

Patented Nov. 8, 1955

2,723,311

COMMON CONTROL TELEPHONE SYSTEMS

William A. Malthaner, New Providence, and Henry E. Vaughan, Chatham, N. J., assignors to Bell Telephone Laboratories, Incorporated, New York, N. Y., a corporation of New York Application March 5, 1953, Serial No. 340,471

62 Claims. (Cl. 179—16)

The invention relates to common control telephone systems and more particularly to such systems wherein serially available groups of memory elements are employed for the registering and guidance of control information.

In dial telephone switching systems, there are basically two fundamentally different arrangements for controlling the operations of the switches that connect subscribers to trunks and to each other. In one arrangement, the switch at each successive stage is directly responsive to the digit that is being dialed by a subscriber. Systems using this method of operation are called direct dial control systems, an example being that commonly known as the step-by-step system. In another arrangement the dialed information is stored for a short time by centralized control equipment before being used in controlling the switching operations. Systems using the second arrangement are known as common control systems, examples of which are those known in the prior art as rotary, panel, and cross-bar systems. These two arrangements have different economic fields of use, the direct dial control being generally better suited for the smaller telephone exchanges and the common control systems for the larger exchanges, especially those in metropolitan areas.

Application of the theory of probability to the switching system problem shows that the traffic handling efficiency of a system is improved if the switches to which subscriber lines or trunks connect serve such lines or trunks in large groups not necessarily subdividable on a decimal basis. To enable systems to operate with large access switches digit storage is required and to permit non-decimal selections a feature known as translation must be provided. Translation is an arrangement which permits conversion of information received from another telephone office or subscriber from the form in which it is received, for example as decimal dial pulses, to non-decimal forms for switch control and other purposes. Each subscriber in an exchange is identified to the other subscribers by the office code of that exchange and by a line directory number; thus, the subscriber whose listed telephone number is MAin 3-1000 has the line directory number 1000 in the MAin 3 exchange. His line is also assigned in that exchange a particular appearance on a set of terminals of the switching equipment so that his line may be connected through the switching network to any of the trunks emanating from that exchange. Each subscriber line is therefore given a line equipment number in the particular exchange which may be arbitrarily associated with a line directory number. These equipment numbers usually designate a location in terms of frame, switch and vertical subdivisions of the equipment. The switches are arranged in groups on frames or racks each switch having a number of vertical inlets or outlets. A particular line or trunk is then identified by the number of the frame it occupies, the number of the switch on that frame and the vertical column of the switch itself. Each trunk in an exchange is similarly identified by a trunk equipment number usually in terms of frame, switch and vertical. Where there are several trunks to the same terminating exchange each will have its own equipment number but will share the common office code of the terminating exchange. Translation in common control systems is provided therefore between an office code and trunk equipment numbers and between a line directory number and a line equipment number.

When the translation is made changeable by some means such as cross-connections, it is the basis of much of the flexibility of common control systems. Changeable translation removes the limitation that trunks of a given office designation or a line of a given directory number must be located in a certain position in the switches such as would be definitely specified by a fixed translation of these numbers. More economical arrays of switches are also possible because the switching plan can conform to traffic requirements without regard to published numbering; thus two successive line directory numbers assigned to a single busy subscriber can be located in different switching groups in the office.

Systems employing translation require the storage of digits, digit storage also being used to accumulate sufficient information to direct the operation of the system. It is the requirements of translation and digit storage for the efficient use of large access switches that have lead to arrangements which provide these features in common circuits.

Further advantages result from the provision of information storage and translation. One advantage is the ability to receive and transmit over the trunk circuits signals of types other than those generated by the usual subscriber dial, selecting the type of signaling on the basis of the kinds of switching equipment used in the connecting offices and the current state of the signaling art. Another advantage in a modern telephone system is the advantageous accumulation and retention of all the information required for automatic message accounting. Furthermore, in a common control system safeguards against false operation or misinformation can be designed and built into the system by automatic checking of the equipment and use of control information in a checkably coded form.

As pointed out above, the common control systems receive the dial pulse information, register, and then translate it. This information is received first by a register circuit of some type, and the register circuit cooperates with the other circuits to ascertain the location of idle trunks to the called subscriber's office and possible routes through the switching network to these trunks and also to control the selection and use of one such path to this office. In the called office, the transmitted information is similarly first received from the incoming trunk by a register circuit which initiates the operation of other circuits to locate and test the called line and the switching paths to it and establish a connection over one of these paths.

The control circuits required in both the sending and receiving offices must be provided in sufficient number to handle the expected traffic. The number required is directly related to the speed of operation of both the control circuits themselves and the equipment controlled since the shorter the holding time of a circuit, i. e., the length of time a circuit takes to complete its functions for one call, the more calls such a circuit can complete in a given time. Considerable economies can therefore be realized by increasing the rapidity of operation of the various control circuits in a telephone system.

Economies can also be realized by utilizing circuits and equipments having considerable memory at a very low cost per unit information remembered. Such is particularly true of magnetic drums wherein the unit of memory storage is a small area on the surface of the drum, a single drum providing for example 100,000 or more such memory areas. Lines and trunks are assigned to positions on the drum, each position being made available in succession during the rotation of the drum for the storing of information or the utilization of information priorly stored.

It is a general object of this invention to provide an improved common control automatic telephone system.

Further it is an object of this invention to enable a common control telephone system to register and utilize information for the setting up of calls, both outgoing and incoming, in a rapid manner whereby considerable economies in circuit elements and circuits required can be attained.

It is another object of this invention to provide an improved common control telephone system capable of operating with present subscriber telephones and with older types of telephone exchanges without extensive modification.

It is a still further object of this invention to provide a telephone system in which all information pertaining to a call is registered and checked before the switching network itself is alerted.

These and other objects of this invention are attained in one specific illustrative embodiment wherein the conversational path from a subscriber in the called office is established through a common control type of switching network to the desired terminating office and in the terminating office a similar connection is established from the incoming trunk through a similar switching network to the called subscriber.

Each subscriber line is assigned a slot on the surface of a rotating drum and information regarding the state of his line at any instant is available in this slot; each slot comprises a group of memory elements or cells assigned a particular line. Permanent information giving the line equipment number and the line directory number is present in this slot on the drum so that translation can readily be made by finding the proper slot, utilizing either number as an address, and reading off the other number. Information regarding the class of service that the subscriber is entitled to is also permanently placed in this slot. Each slot is defined by a scanner which scans all the lines in succession, once for each revolution of the magnetic drum. Temporary information is then written in the slot to be utilized by the system in guiding the call through the office. This temporary information includes data of line busy or idle conditions, digits dialed by a subscriber, and marks indicating the progress of the call through the office.

Similarly each trunk from the office is scanned and is permanently assigned a slot on a magnetic drum, in which slot is written the permanent information as to the trunk equipment number and the type of trunk. Temporary information recording the condition of the trunk and a called office code are written in this slot, translation being thus made between the permanent trunk equipment number written in the slot and the called office code.

When a subscriber dials, the first three digits, which comprise the called office code, are accumulated on the line drum and then used to select and assign to this line a slot on the trunk drum associated with an idle trunk to the destination designated by these digits. Assignment of the trunk drum slot to the line is attained by writing therein the equipment number of the calling line. The outgoing trunk that will be utilized for this call is thus designated before the subscriber has completed dialing the directory number of the called party in the terminating office. The dialed digits of the directory number are then accumulated in the line slot on the line drum and dispatched to storage on the assigned slot of the out-trunk. As soon as the complete dialed number is stored on the out-trunk drum, the line equipment numbers of the calling line and the trunk equipment number of the assigned out-trunk are dispatched from the trunk drum to the control circuits of the switching network and are used to establish a corresponding path through the network.

When this network path has been set up, interoffice signaling equipment seized from the out-trunk drum slot is connected to the out-trunk. In response to a signal detected by the trunk scanner associated with the in-trunk drum in the terminating office, signal receiving equipment is similarly connected to the in-trunk. The called line directory number is then transmitted over the interoffice trunk to the terminating office and recorded on the trunk slot assigned to the in-trunk on the trunk drum in the terminating office. Translation between the transmitted line directory number and the line equipment number of the called line is obtained by consulting the line drum in the terminating office. The line equipment number thus found is written in the in-trunk drum slot, and this line equipment number and the equipment number of the in-trunk are dispatched to the switching network control circuits which establish a connection through the switching network to the called subscriber line.

In the operation of a system in accordance with this invention, a specific embodiment of which was just briefly and functionally described, very high speed of registration of information on the drums is attainable. Thus each drum slot may be available for the storage or removal of information once every revolution of the drum, which may be of the order of 17 milliseconds, the period within which storage or removal of information occurs being of the order of 16 microseconds. Since some switching or signaling circuits employable in the combination of our invention may not dispose of an order within a matter of microseconds, temporary registers are provided to retain information read from a drum until it has been acted upon. Further the circuit to which this information is being directed may not be available, being busy on a prior call, and thus the information must be retained until access to that equipment can be obtained.

Information to be recorded on a drum must be placed in a designated slot or in a slot in a designated group. Since in general the designated slot will not be in the writing position at the time that the information to be written becomes available, temporary registers are provided.

On some of the orders dispatched from a drum a record of the results of the order, after it has been acted upon, must be returned to the drum slot which dispatched the order. In such cases, additional temporary registers are required to identify the drum slot from which the order was placed.

As pointed out above, information is directed to the proper slot on a drum by using information already present on that drum, either permanent or temporary, as an address. In accordance with one aspect of this invention, when information of any type is to be written on a drum it is accompanied to the drum by this address which is stored in a temporary register, such as register toggles, where it can check in succession the information present in each slot on the drum as the drum rotates. When a match is found between the address stored in the temporary register and the address present in the slot, the circuit is advised that the proper slot has been found for the writing of the information required to advance that call through the office.

One particular type of information that is continually being written and erased in a drum slot comprises a number of marks employed, in accordance with another aspect of this invention, to identify the progress of the call through the office and subsequently referred to in the description of one illustrative embodiment of our invention as call progress marks. Information is assembled on a drum slot until a state has been reached sufficient for the completion of some operation, such as establishment of a switching path or signaling to a distant office. Each time that it is necessary to dispatch information from a drum to complete some operation a signal from the drum records acts as the dispatching order. Such a dispatching situation arises after a particular sequence of information assembly on the drum slot, which has been noted by the writing of a call progress mark.

Each time data is taken from a drum it is advantageously checked under control of a call progress mark. If the data is incorrect, as determined by a check circuit, the call progress mark is not removed thereby facilitating maintenance as, by means of the call progress mark, the exact point in the system at which an error was detached can be readily ascertained. In such a case a trouble mark will be written on the drum, which mark can be utilized to alert a trouble indicator.

An indication of the rapidity of response attainable by a telephone system in accordance with our invention can be ascertained from the fact that the elapsed time for the completion of a call from the dialing of the last digit by a subscriber in a calling office to the ringing of the called subscriber in a terminating office is of the order of four tenth's of a second. Because of this speed, certain control circuits can be utilized by a number of drums so that only one, or a few, need be employed in a full size heavy duty 10,000 line office in accordance with our invention, whereby considerable economies in equipment are attainable. Such a full size heavy duty office would utilize a number of line drums, such as ten, and a smaller number of trunk drums, such as one or two, depending on the volume of traffic.

Each line drum and the dialing assembler circuits therefore may thus be shared by a large number of subscribers, of the order of 1,000, all of whom may be dialing at the same time and all of whose dialed information would be recorded in the slots assigned the individual lines on the line drum. The operation of the dialing assembler on a particular line during one revolution of the drum may therefore take of the order of 8 microseconds, while the average holding time of the other common control circuits is a ½ drum revolution which may be of the order of 8 milliseconds.

A general feature of this invention relates to the establishment of a connection in a telephone system under the control of permanent and temporary information stored as magnetic conditions of spots or cells on memory devices specifically magnetic drums.

It is a feature of this invention to select an idle trunk of a group of trunks extending from a telephone office in accordance with information stored on magnetic drums.

It is another feature of this invention to employ magnetic drums on which are permanently written information identifying each line and trunk emanating from a telephone office and to write temporary information on the drums in slots or places assigned to the line or trunk to which the information is pertinent, for the control of the setting up of connections through the office. It is therefore a feature of this invention to locate the appropriate slot on the drum assigned to the line or trunk to enable each bit of information to be written in the slot to which the information pertains.

It is another feature of this invention that call progress marks be written in slots or groups of memory elements assigned to each line and trunk to enable the switching control circuits to know at any instant the progress of the call through the office. It is a further feature of this invention that these call progress marks control and direct the flow of information through the control circuits for the setting up of the appropriate connections through the office.

It is a still further feature of this invention that each of a group of transmission paths in a telephone switching system be scanned in succession, each transmission path being assigned a group of memory elements by the scanning and the groups of memory elements being serially available for the reading or altering of information therein pertaining to a switching connection being set up in the switching system utilizing the transmission path assigned to the group of memory elements in which the information is registered.

It is a still further feature of this invention that marking voltages be applied to the switching network of the telephone switching system only after all information necessary for the establishment of a particular transmission connection through the switching network has been stored in groups of memory elements individually assigned to the lines and trunks between which the transmission connection is established.

It is another feature of this invention that the incoming trunks in a telephone system be scanned and that signals received be stored on magnetic drums in locations permanently assigned to the particular trunks, control circuits being provided for the receiving, recording, and storing of the information and for subsequently reading and utilizing it to control a switching network in accordance with the calling and supervisory signals received over the incoming trunks. Thus it is a feature of this invention that the information thus stored on magnetic drums be utilized to apply marking voltages to a switching network automatically to select and to establish an idle path through the network.

It is a still further feature of this invention that the dial pulses for the first letter or number of an office code designation be accumulated and written onto a magnetic drum in a first position along the slot assigned to the particular line requesting service, then erased and written in a second position after which further information designating the second office code letter is written in the first position and then in turn erased and written in another position until all the desired office code information has been assembled on the drum slot at which time the information is spilled out to other apparatus.

It is a still further feature of this invention that the dial pulses for each digit of a line directory number be accumulated and written onto a magnetic drum along the slot assigned to the particular line requesting service in the first position previously used for accumulating each digit of the dialed office code with each digit so accumulated spilled out to other apparatus in the interval between the dialing of successive digits.

It is a still further feature of this invention that information pertaining to a call being set up be read from a magnetic drum and temporarily stored in toggle registers while a match is sought with related information present on a subsequent magnetic drum, so that information is placed on drums only in the slots appropriate to the particular line or trunk that the information is pertinent to.

It is a further feature of this invention that synchronizing marks be placed on the magnetic drums for the simultaneous controlling of each operation in the control circuits. Thus it is a feature of this invention that there be synchronous resetting of logic circuits so that the reset can only occur during the time interval when there is no possibility of incoming data.

It is a still further feature of this invention that translation between line directory and line equipment numbers and between office codes and trunk equipment numbers be facilely and rapidly attained by the writing of magnetic conditions on individual areas of the magnetic drums associating each equipment number with its published directory number or code for the duration of such association, these numbers as thus represented being utilized in the establishment of the telephone connections.

It is a still further feature of this invention that translation between an equipment number and a directory number or code be readily changed by altering the magnetically stored record on the drum slot which associates such a pair of numbers. In accordance with this feature, the initial installation or subsequent removal of a particular subscriber from the exchange is facilely accomplished by the writing or erasing on the magnetic drum of the line directory number for that subscriber.

A complete understanding of this invention and of the various features thereof may be gained from consideration of the following detailed description and the accompanying drawing, in which.

Figure 1:
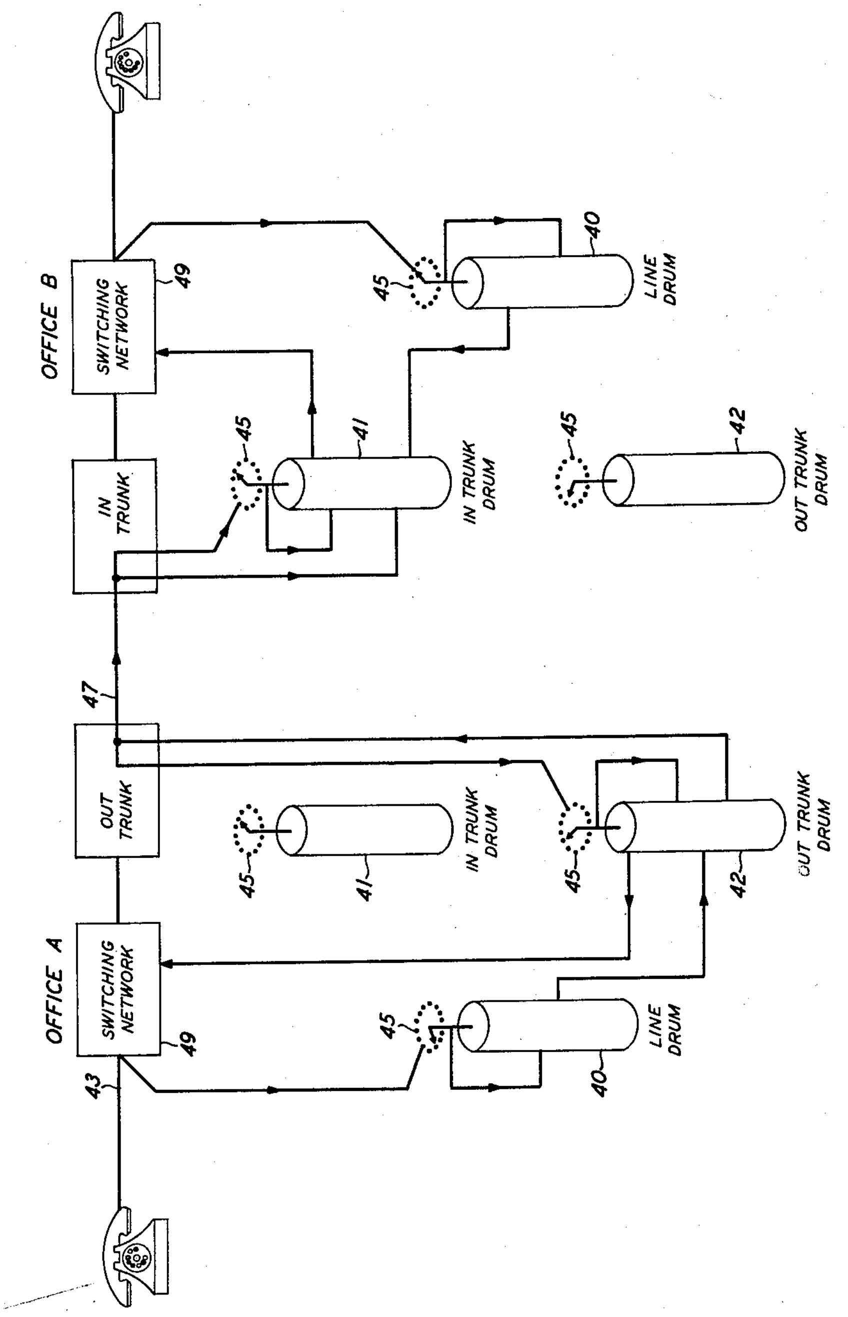
Fig. 1 is a simplified block diagram representation of one illustrative embodiment of this invention.
Figure 2A:
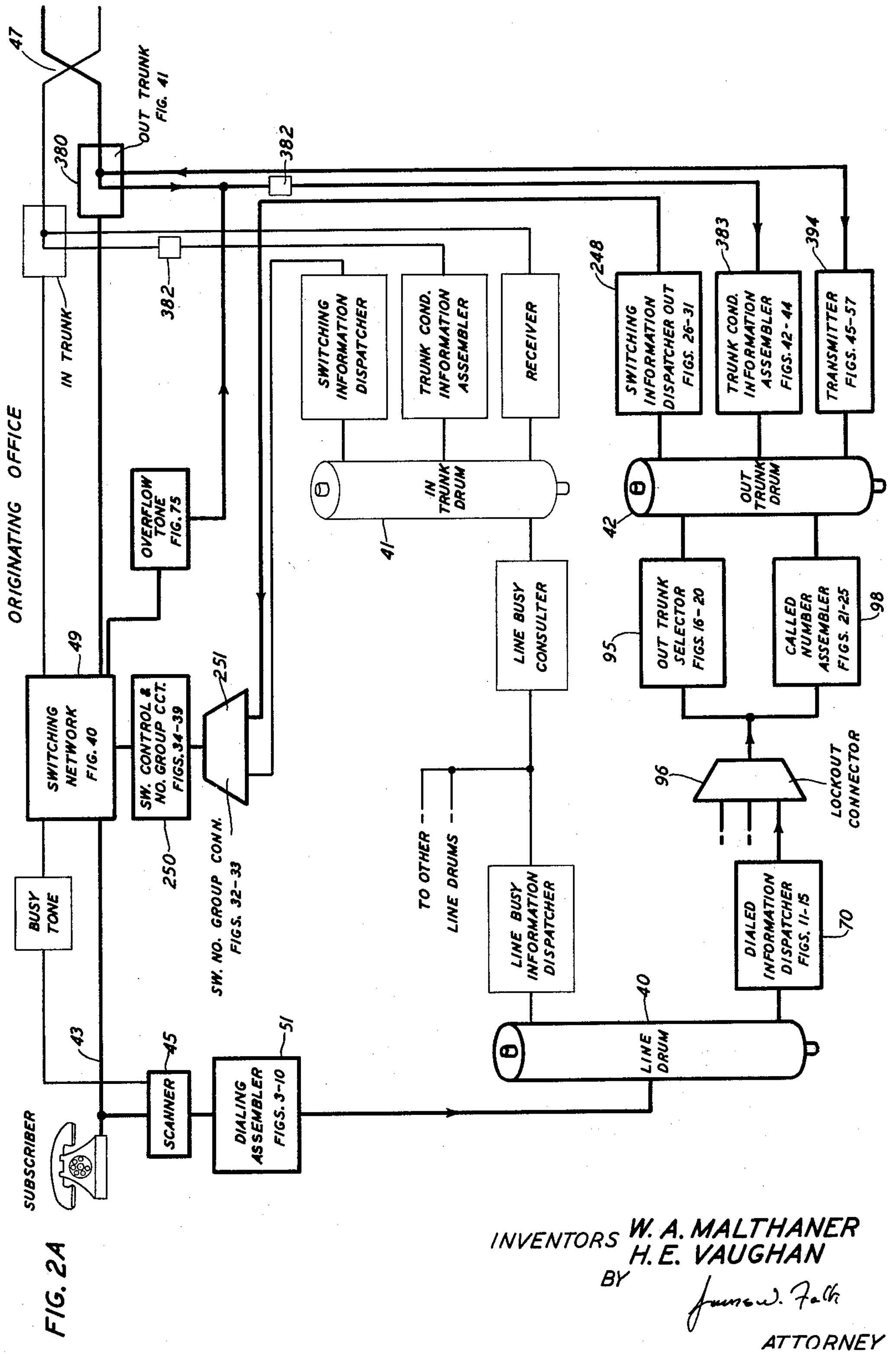
Figs. 2A and 2B are more detailed block diagram schematic representations of the illustrative embodiment of this invention depicted in Fig. 1.
Figure 2B:
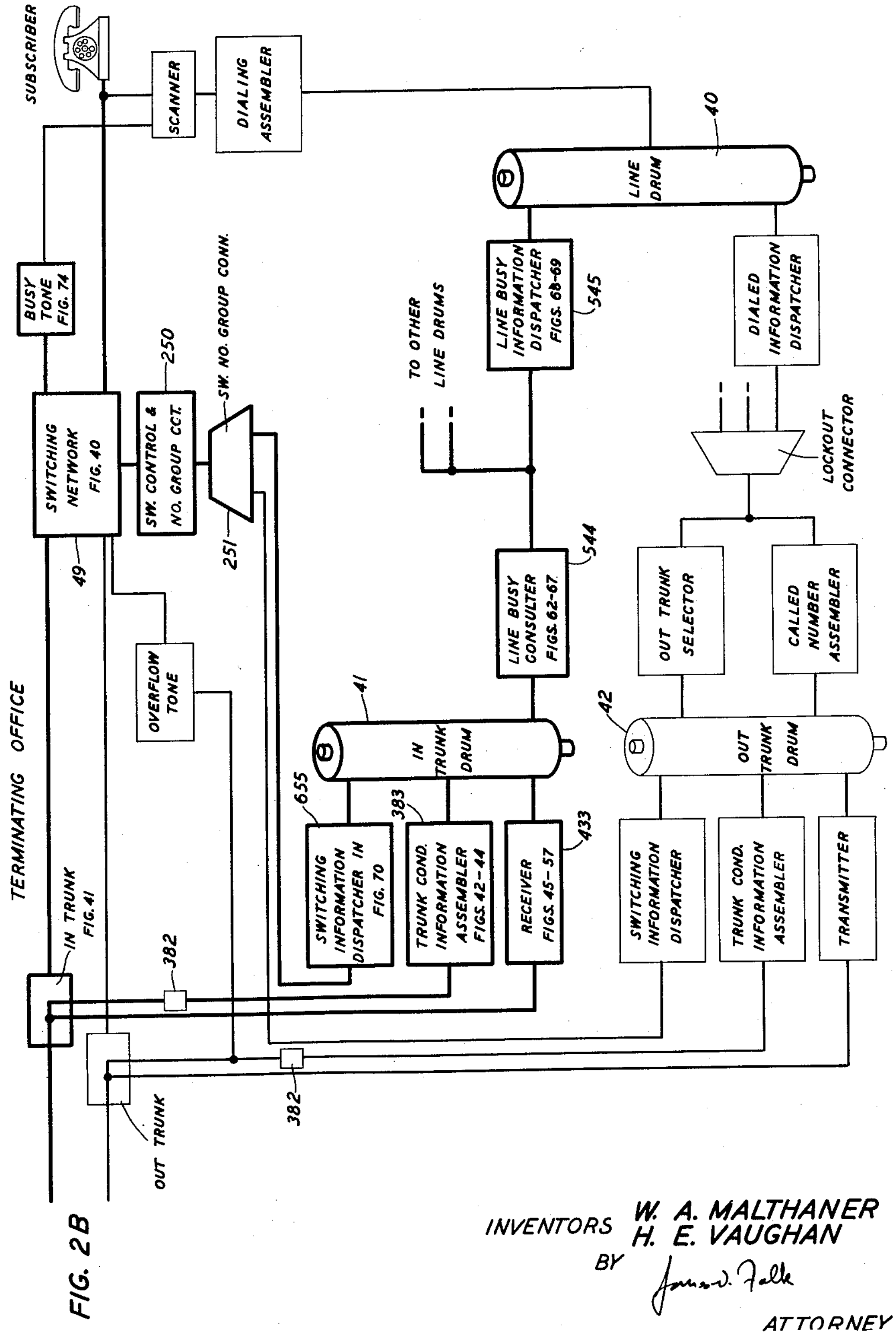
Figure 3:
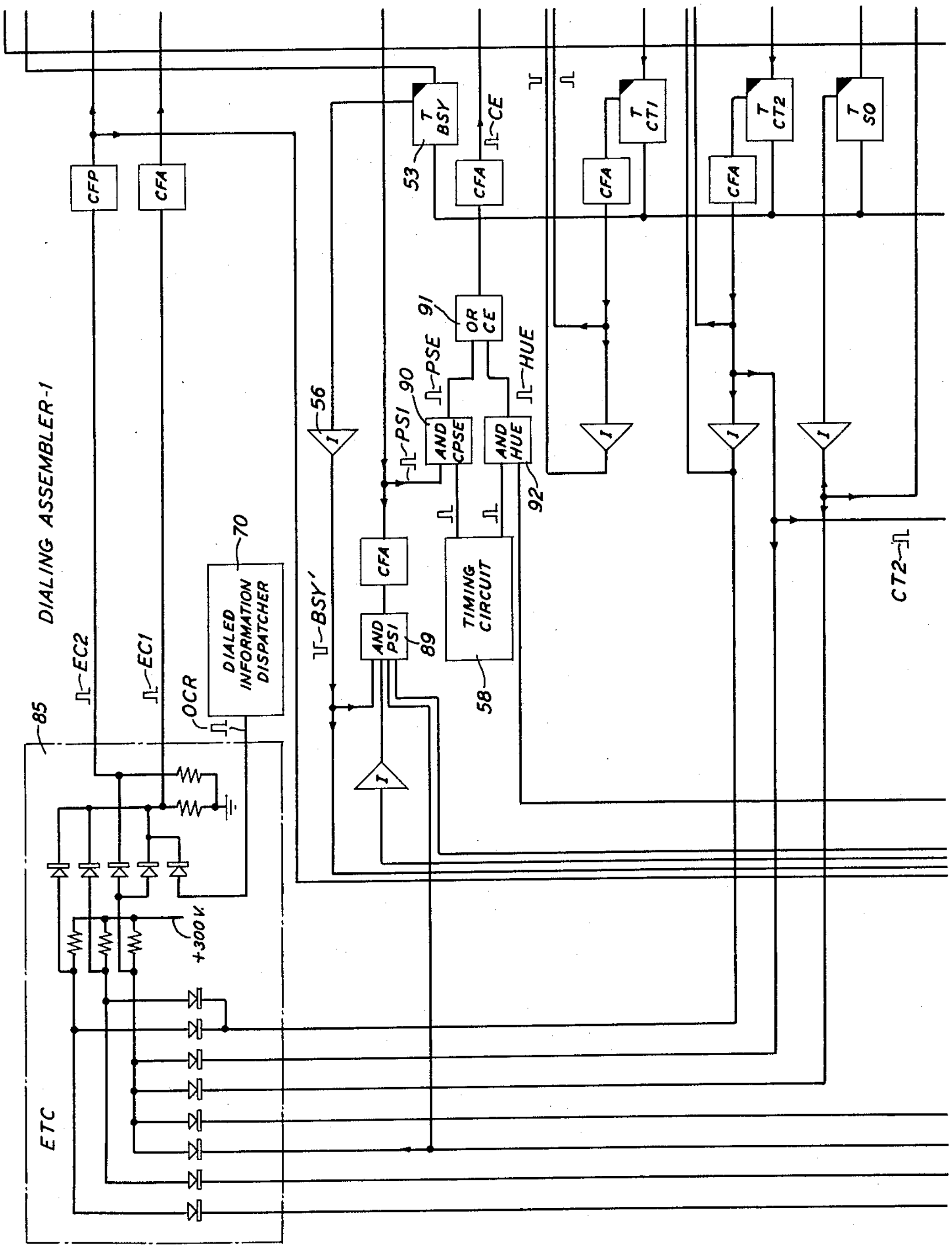
Figure 4:
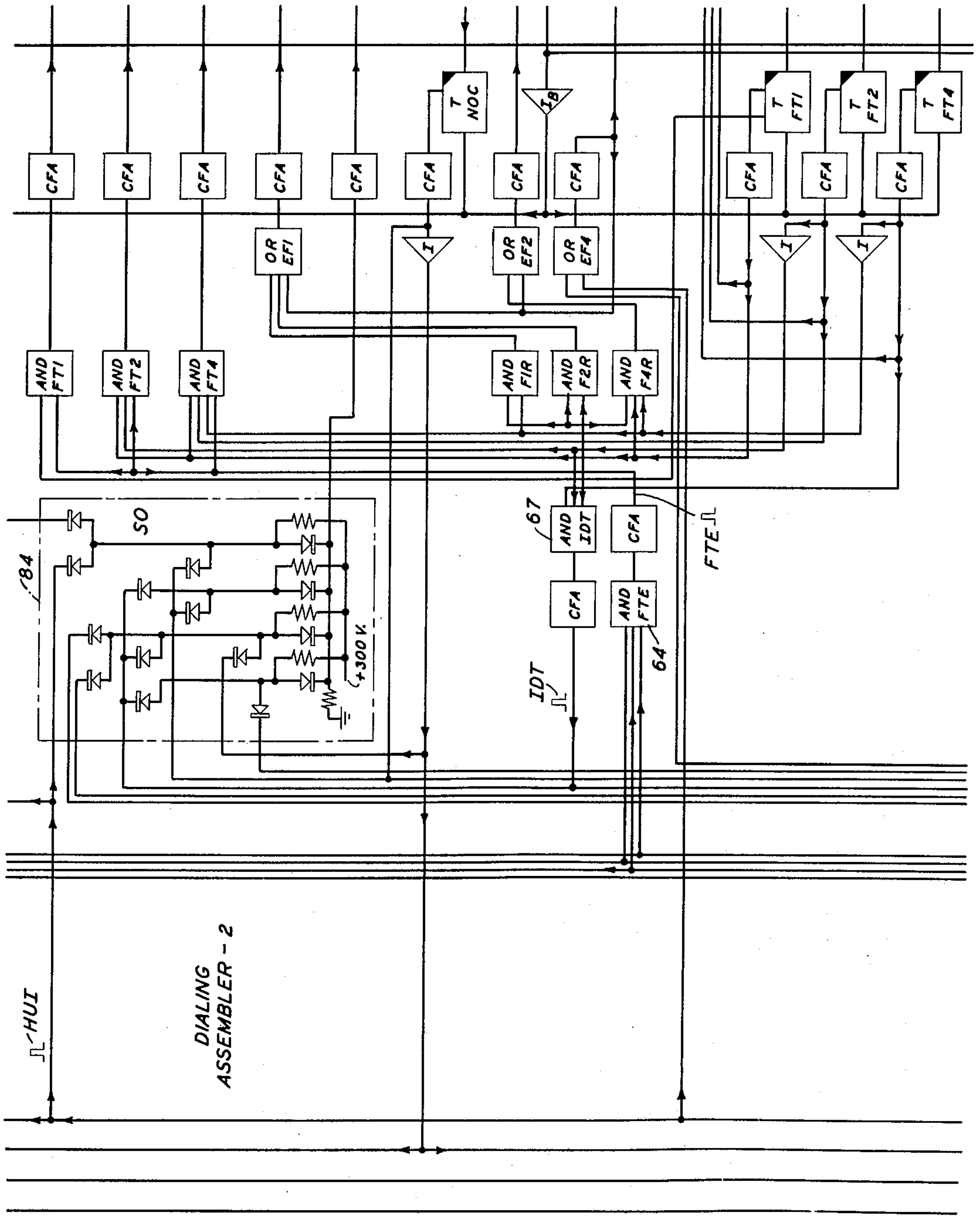
Figure 5:
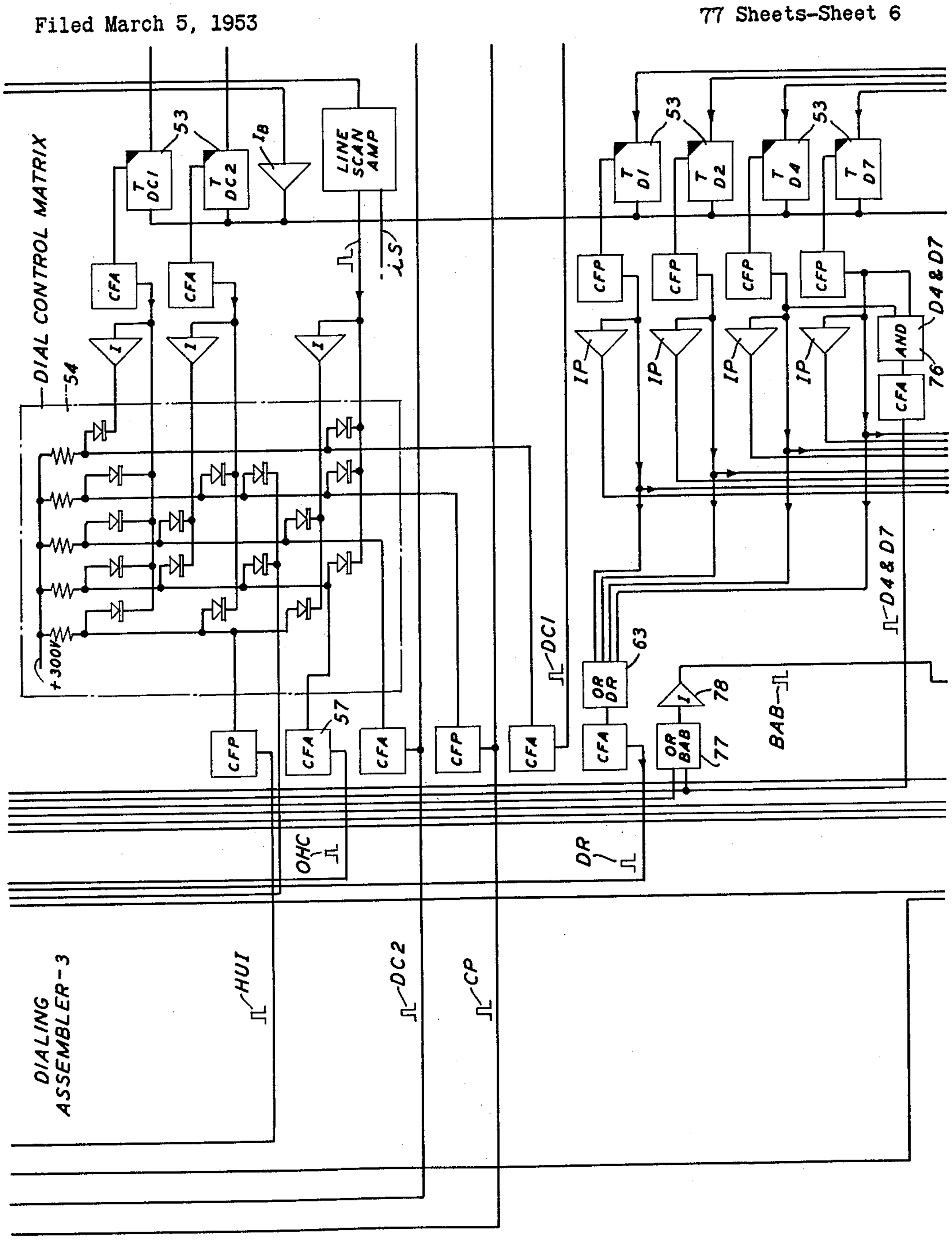
Figure 6:
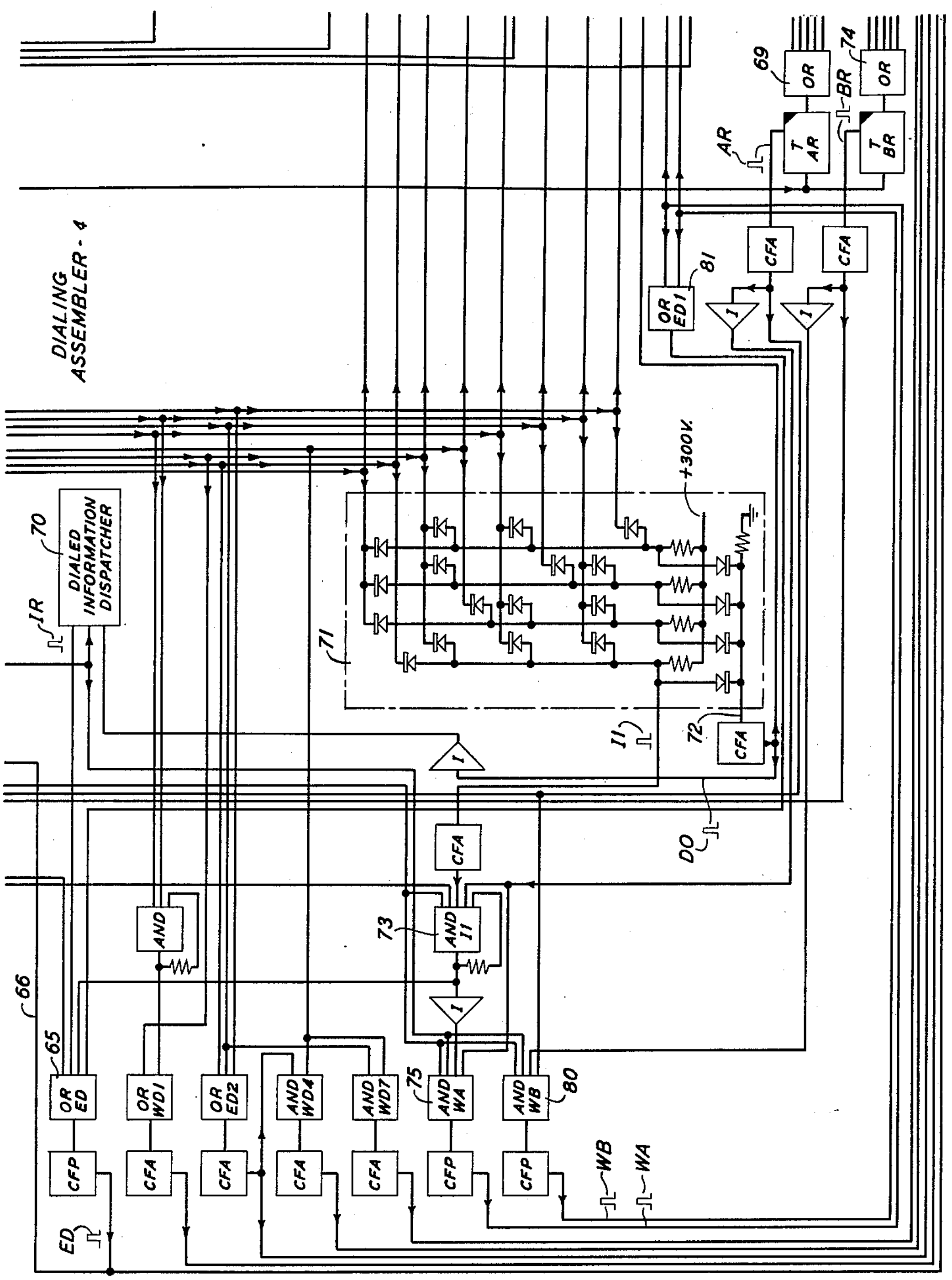
Figure 7:
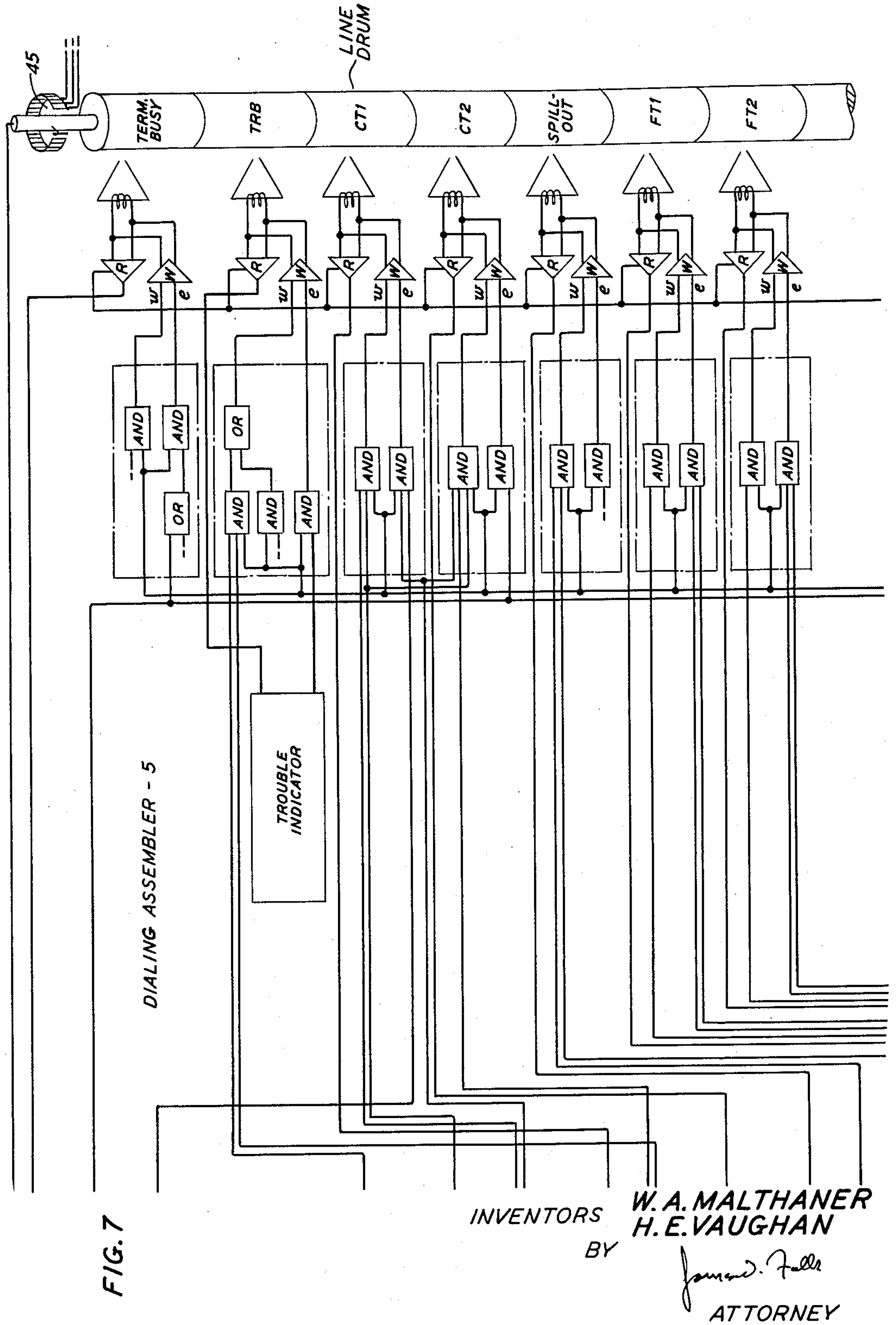
Figure 8:
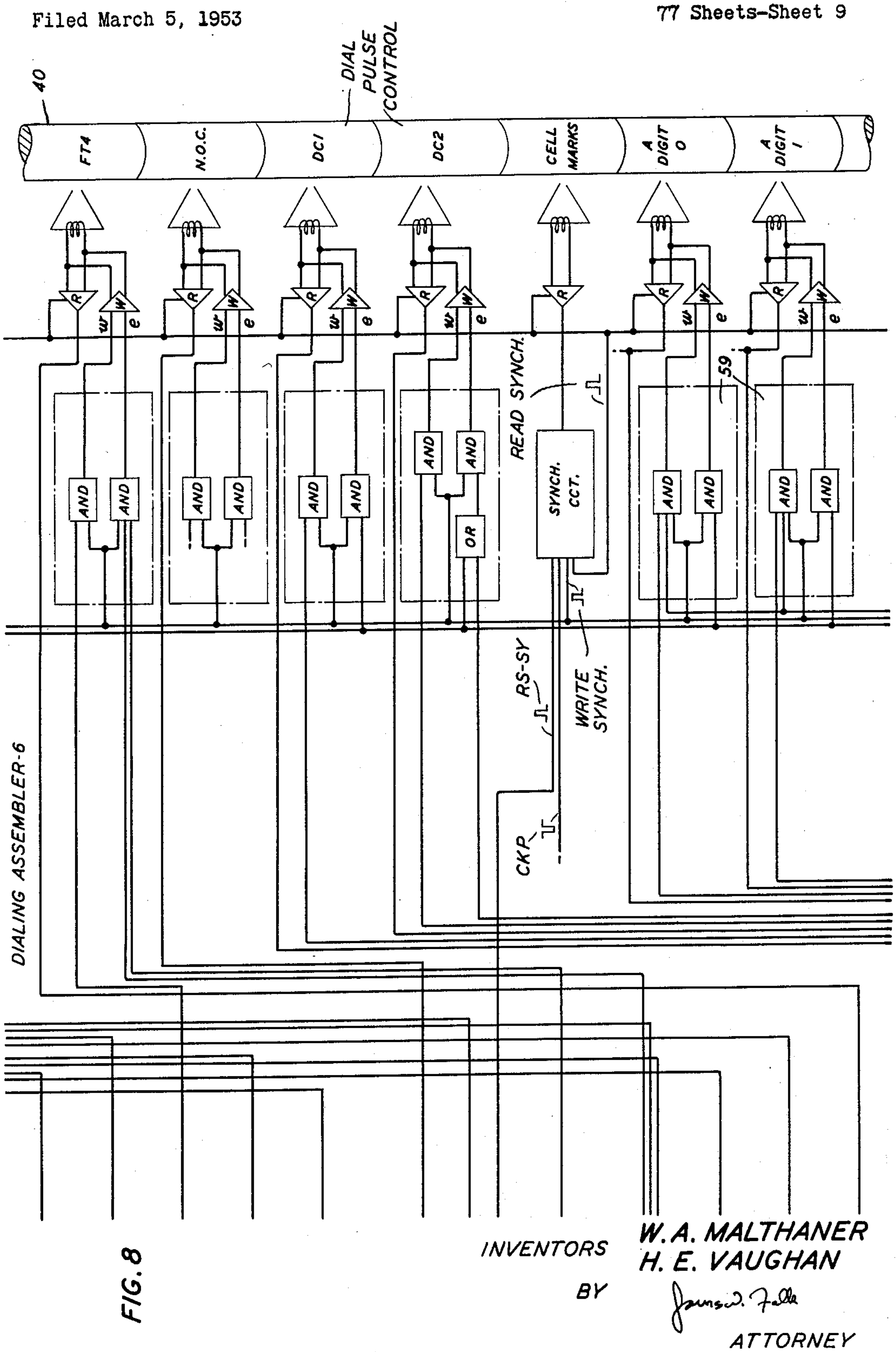
Figure 9:
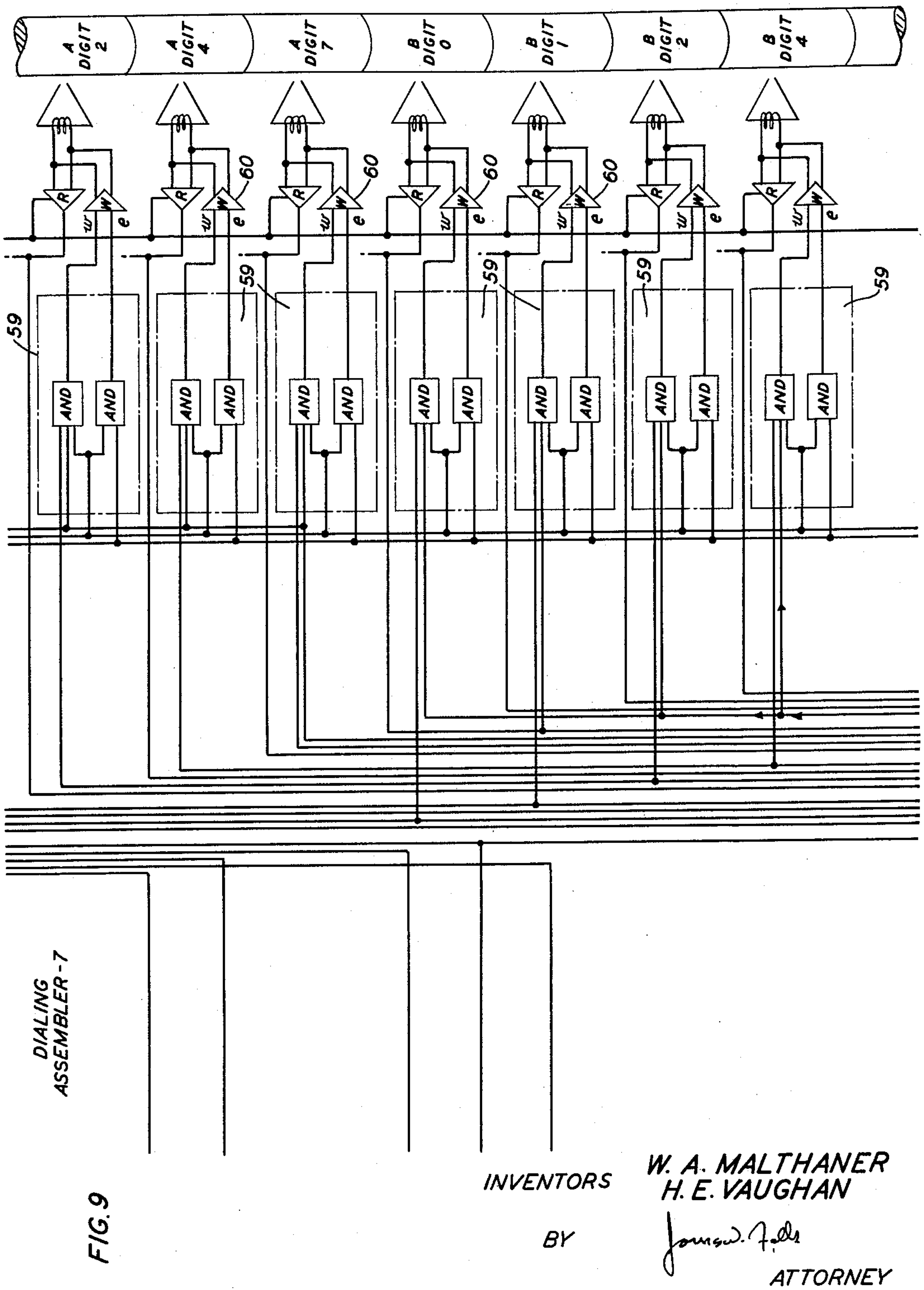
Figure 10:
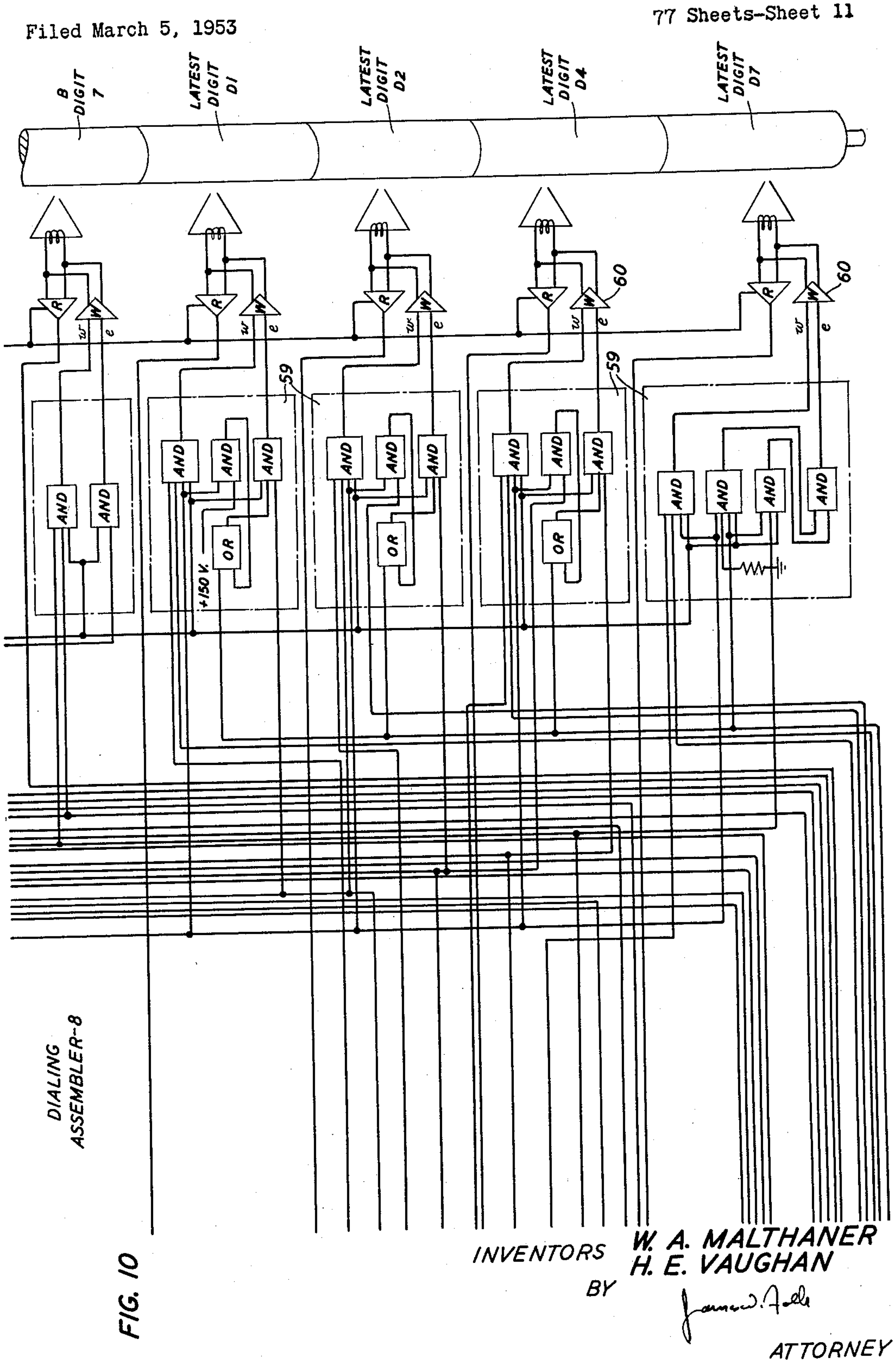
Figure 11:
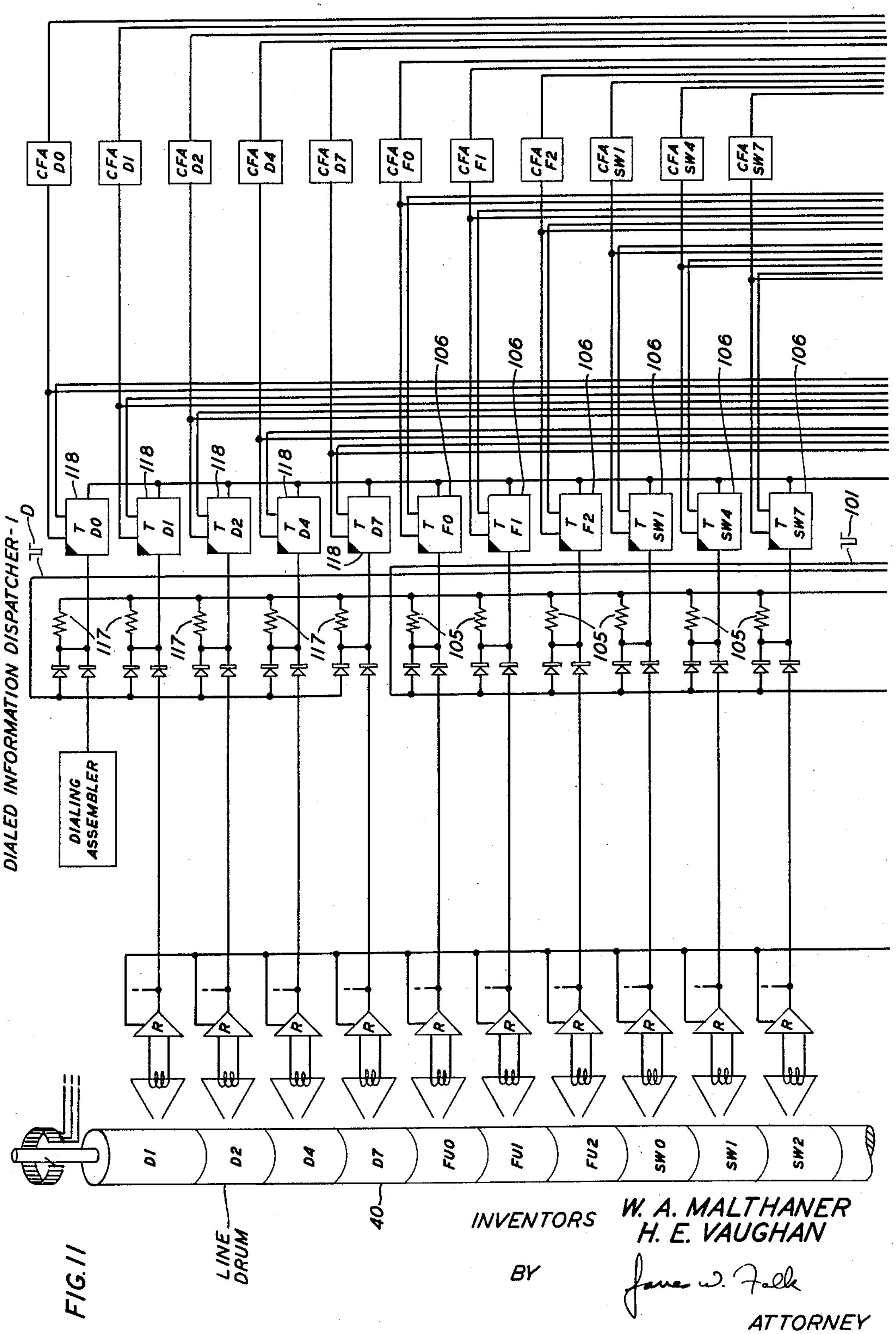
Figure 32:
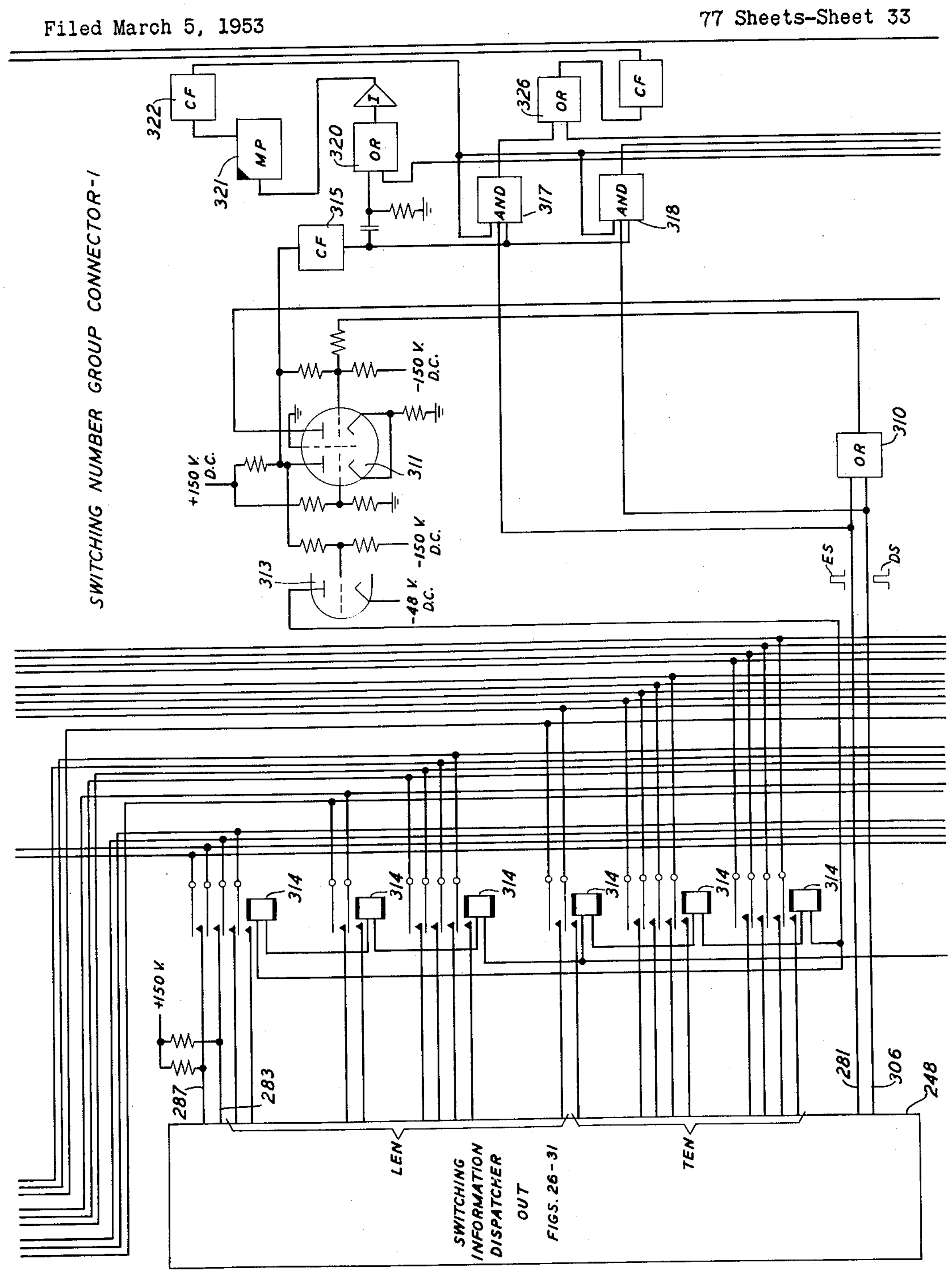
Figure 33:
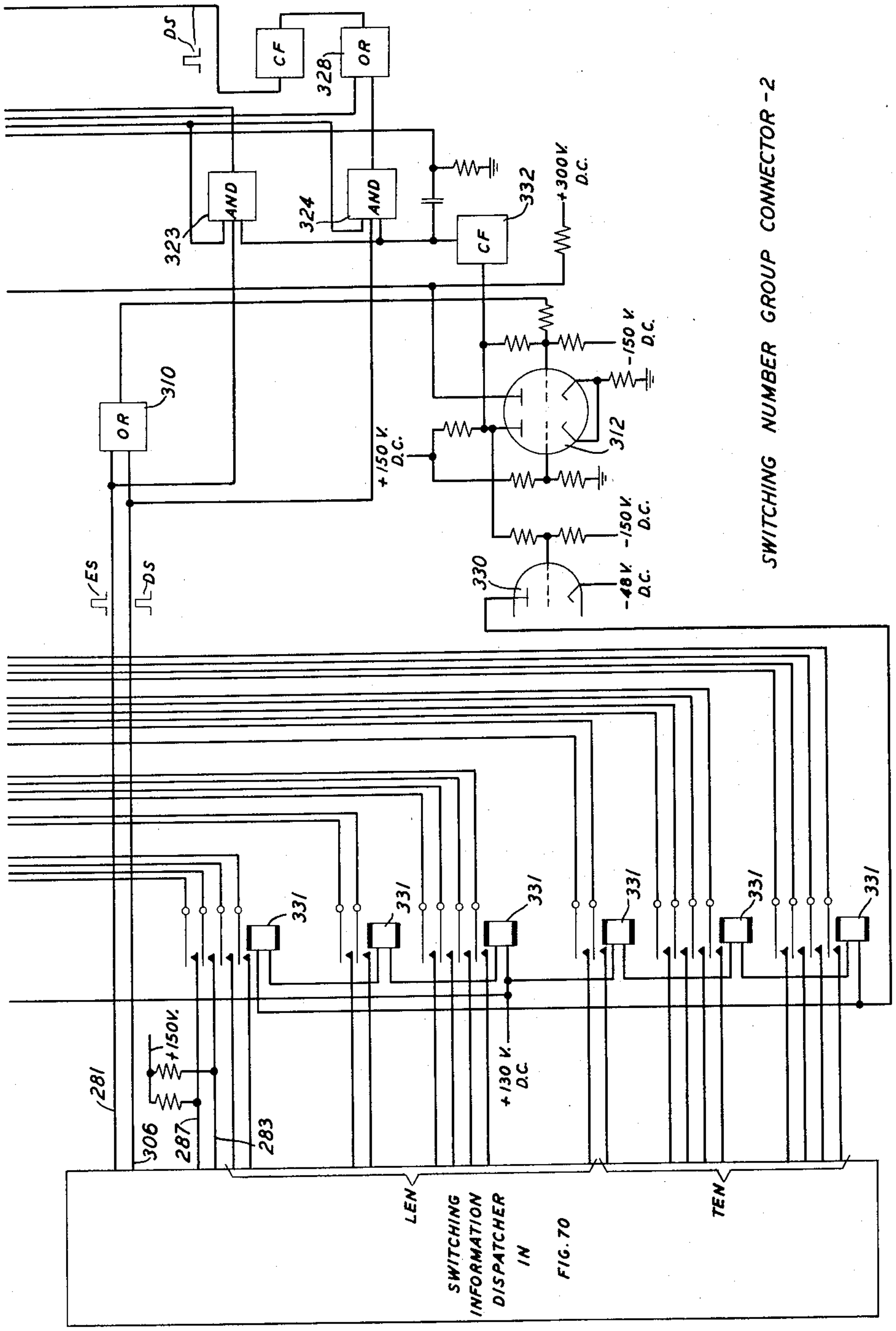
Figure 34:
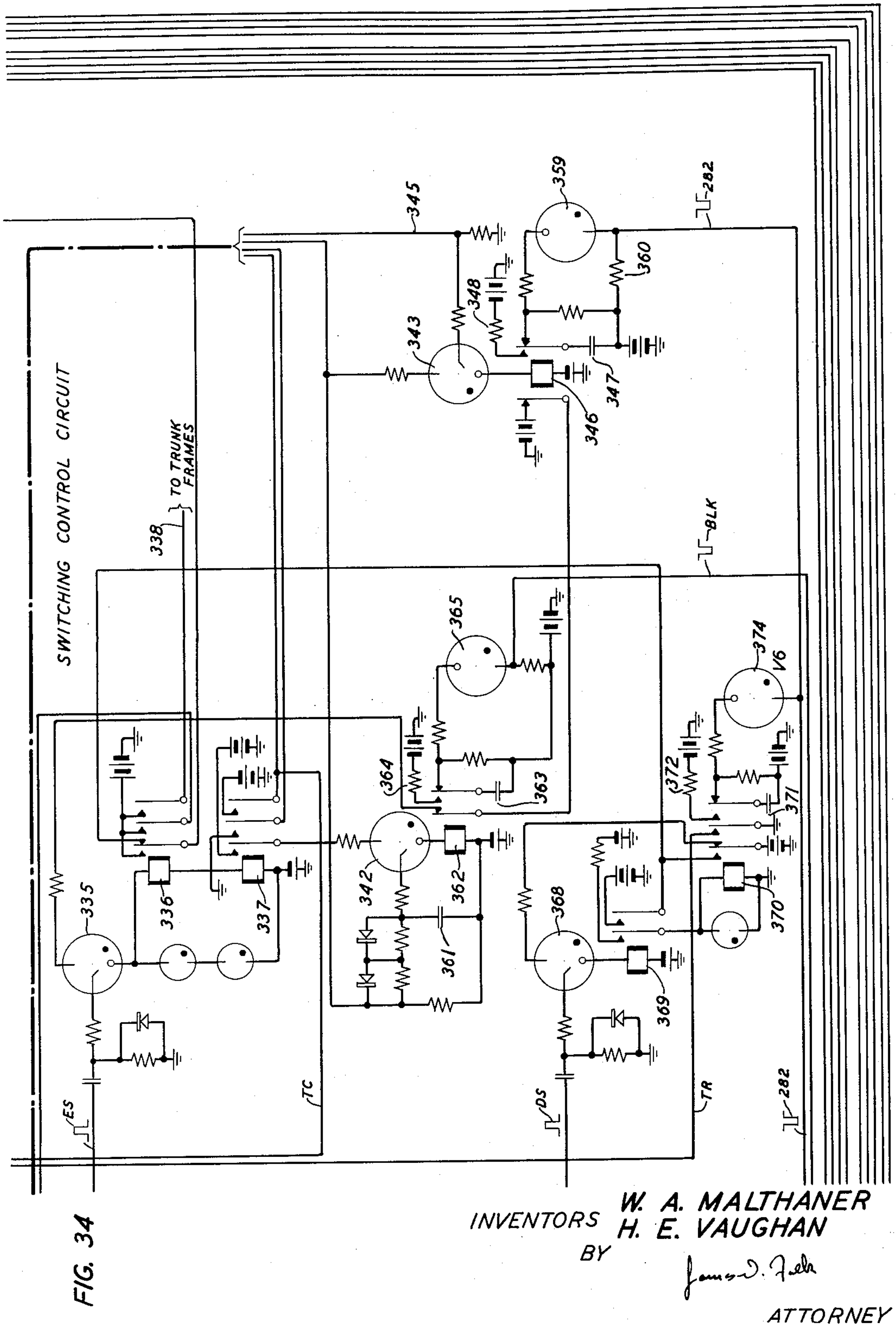
Figure 38:
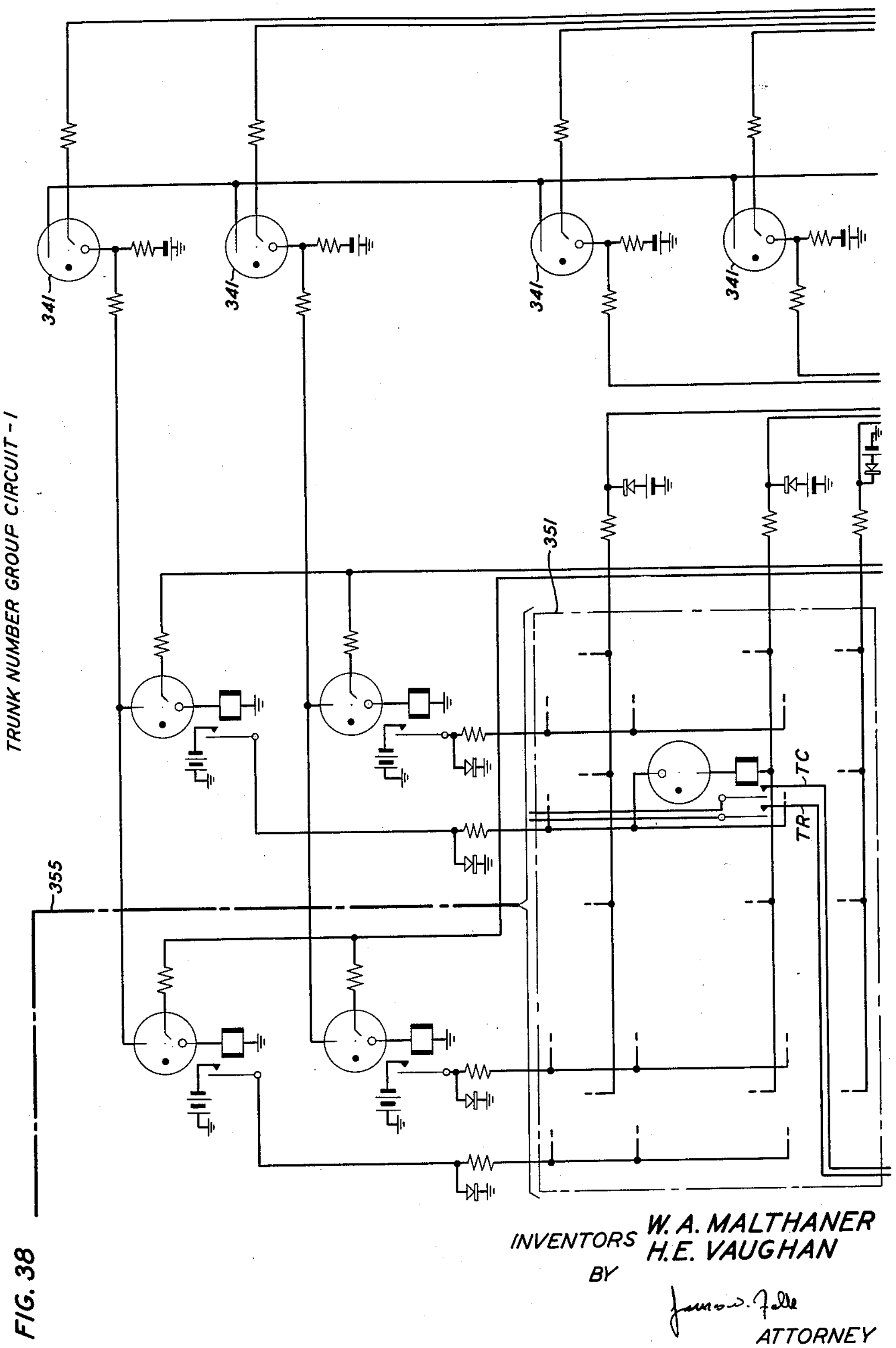
Figure 39:
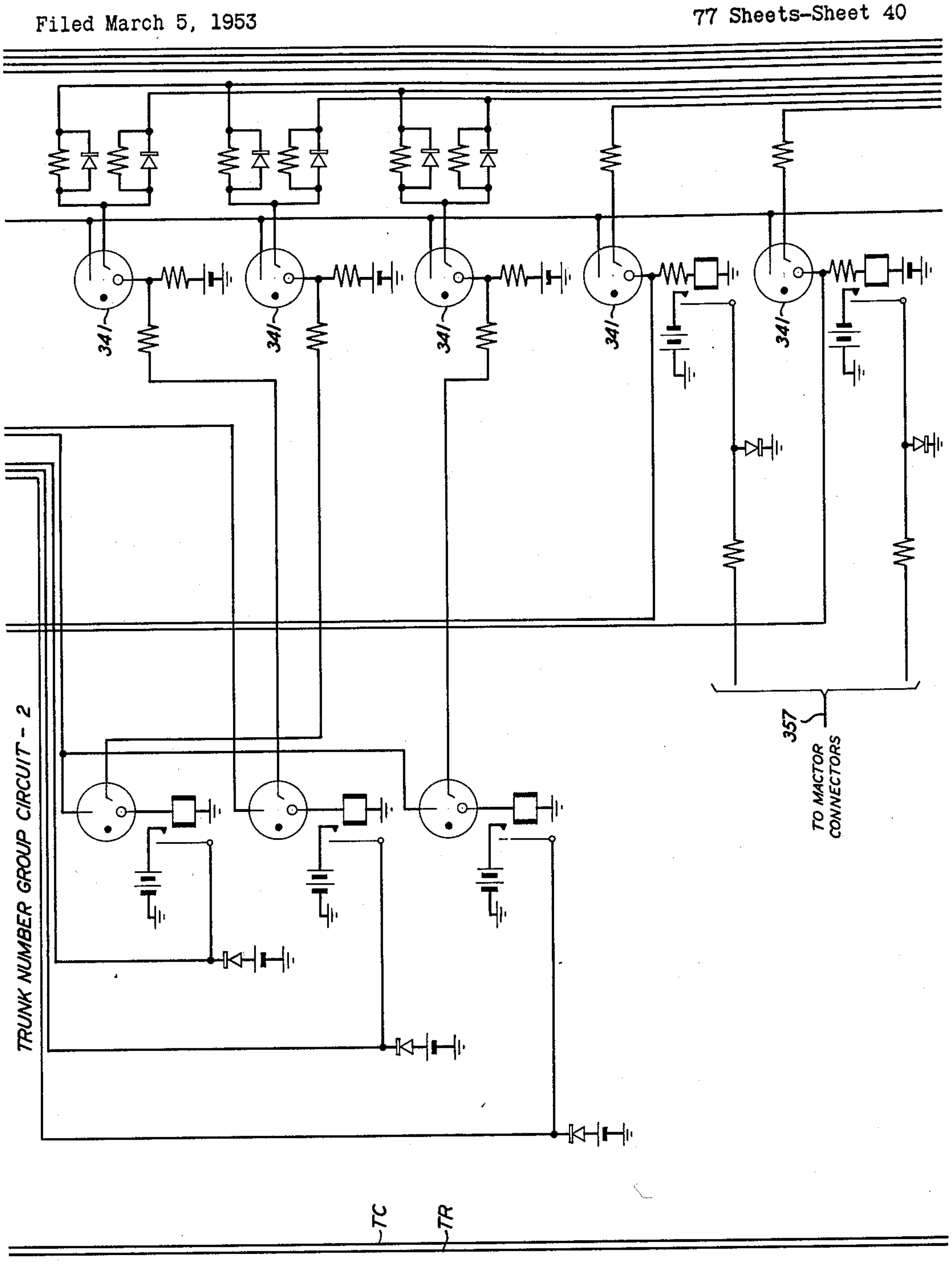
Figure 40:
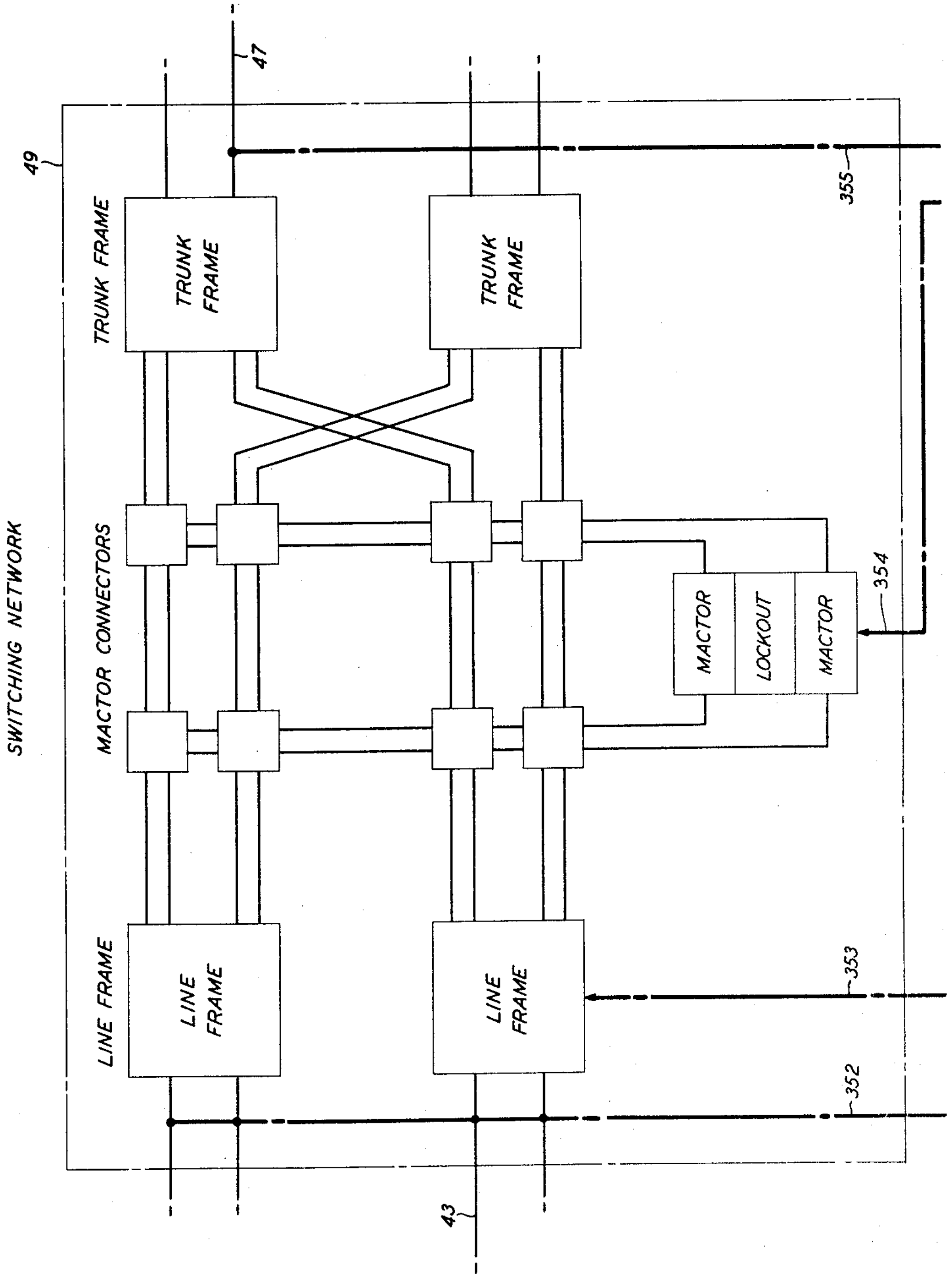
Figure 41:
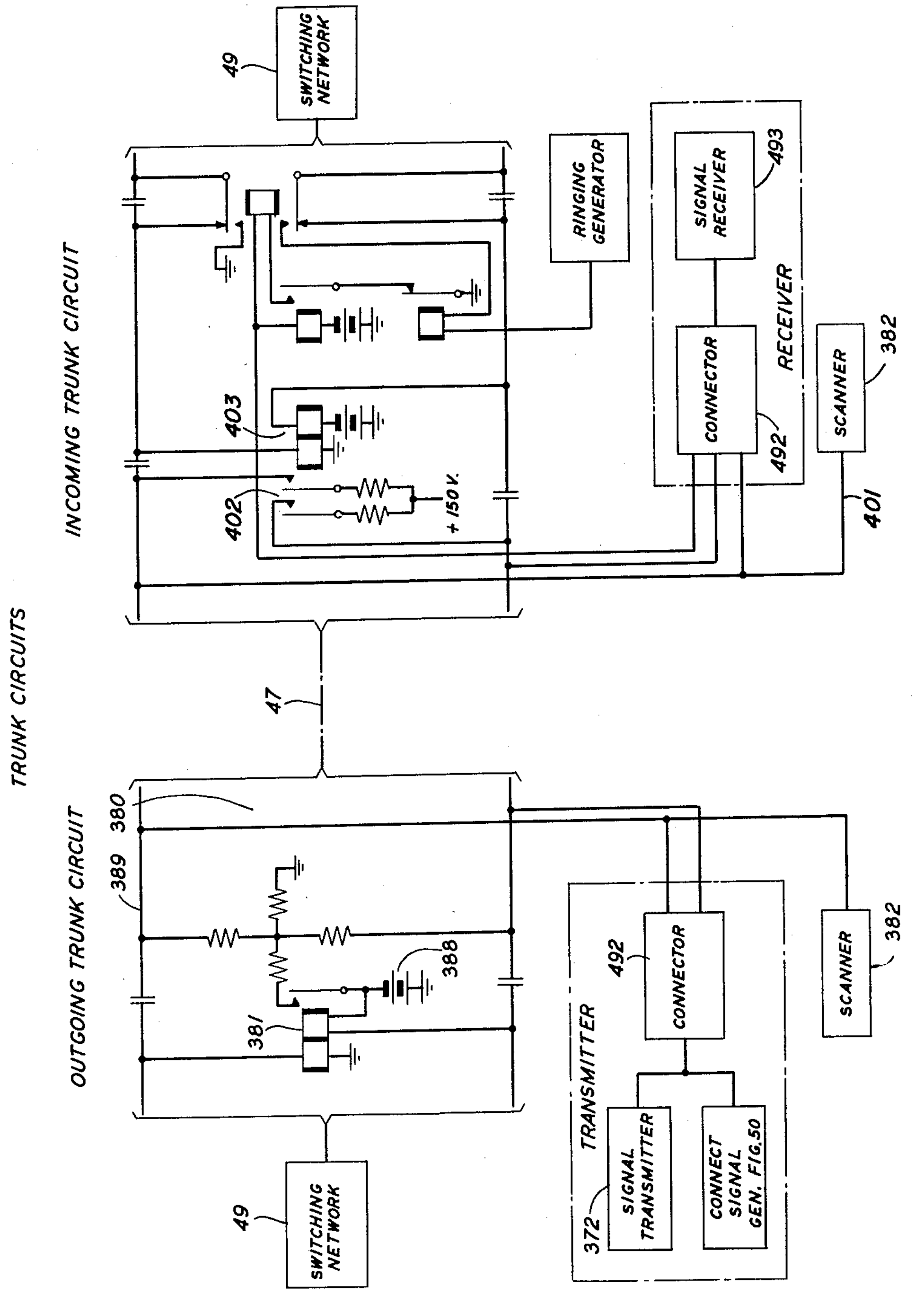
Figure 42:
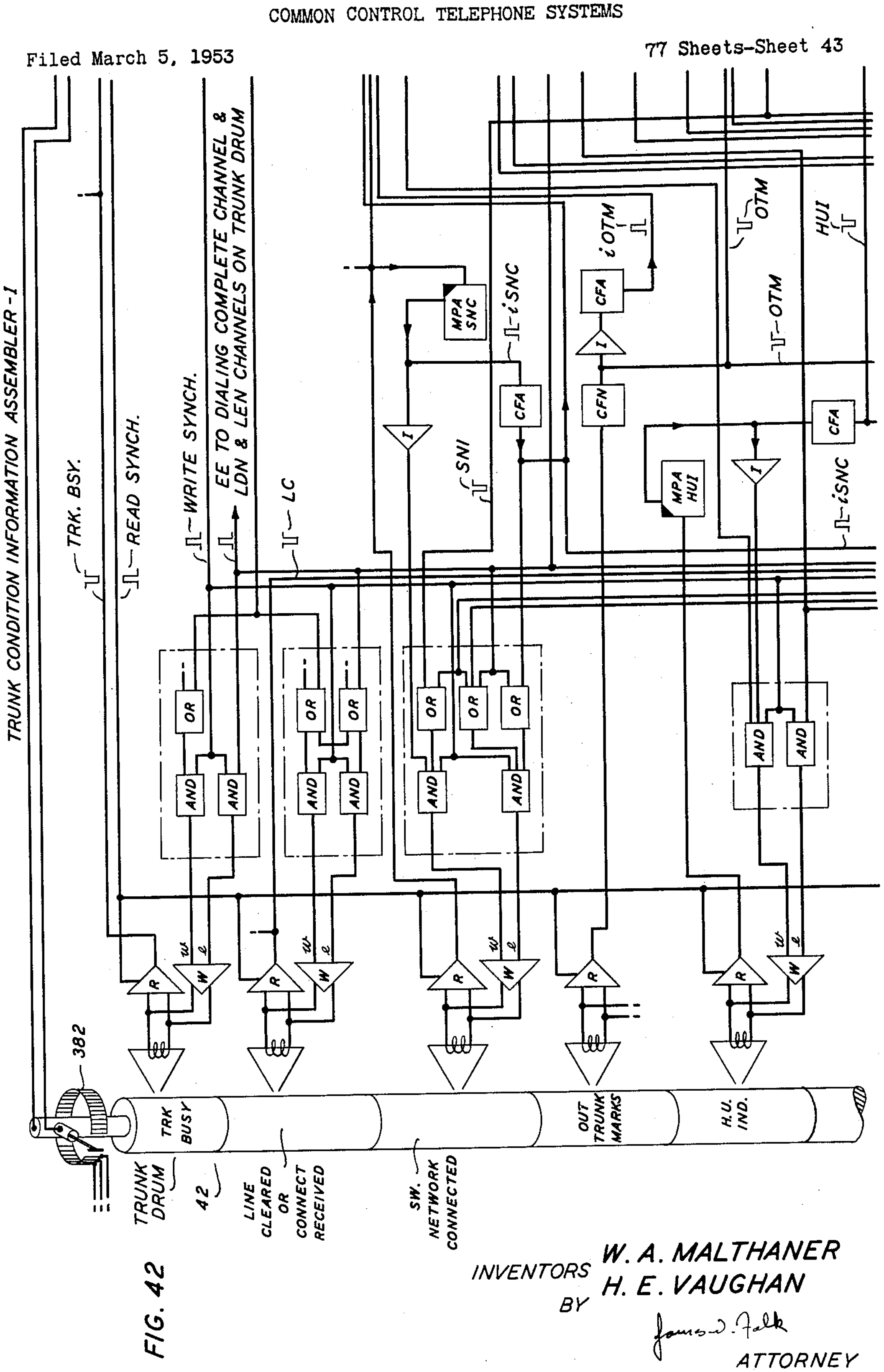
Figure 43:
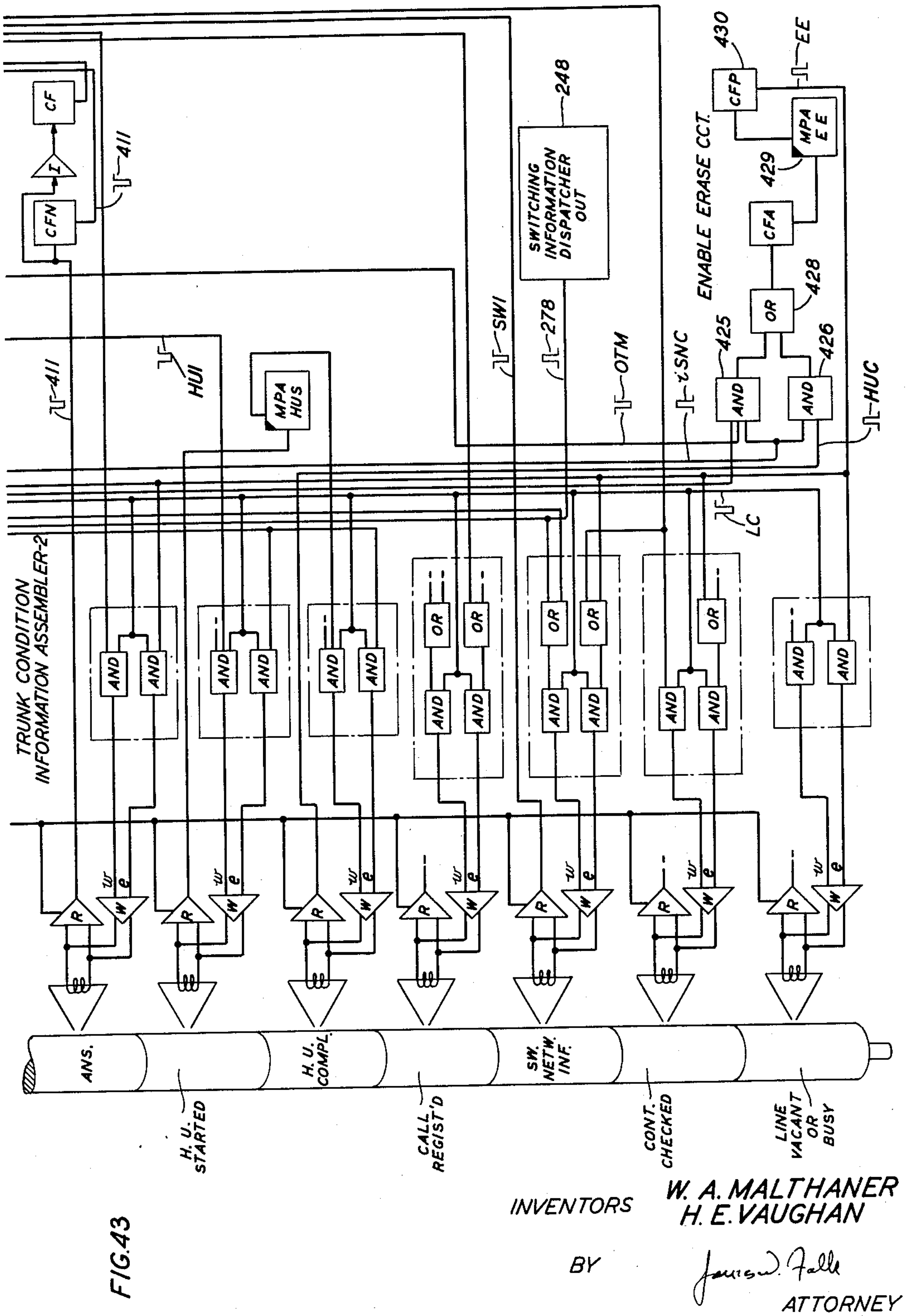
Figure 44:
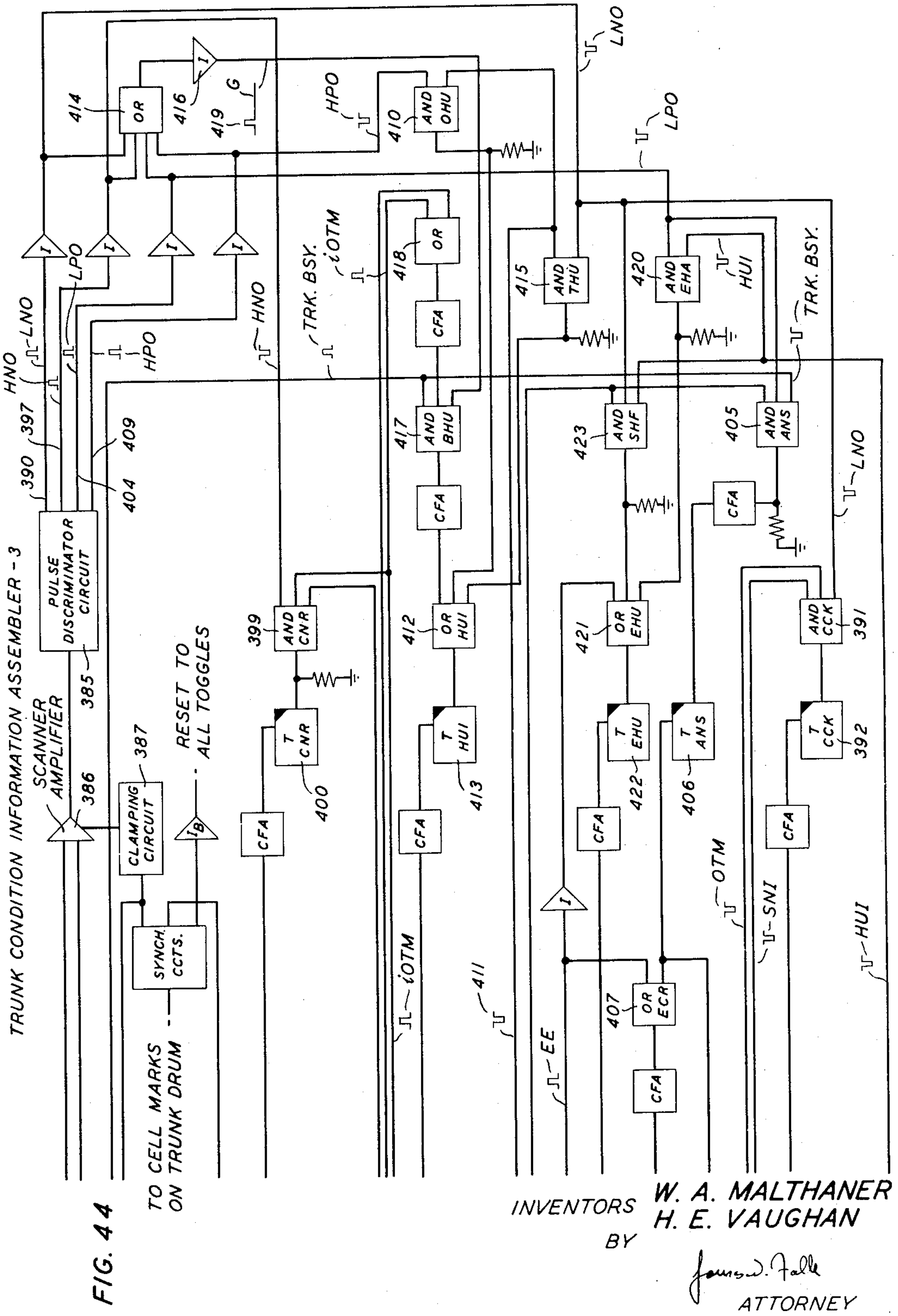
Figure 45:
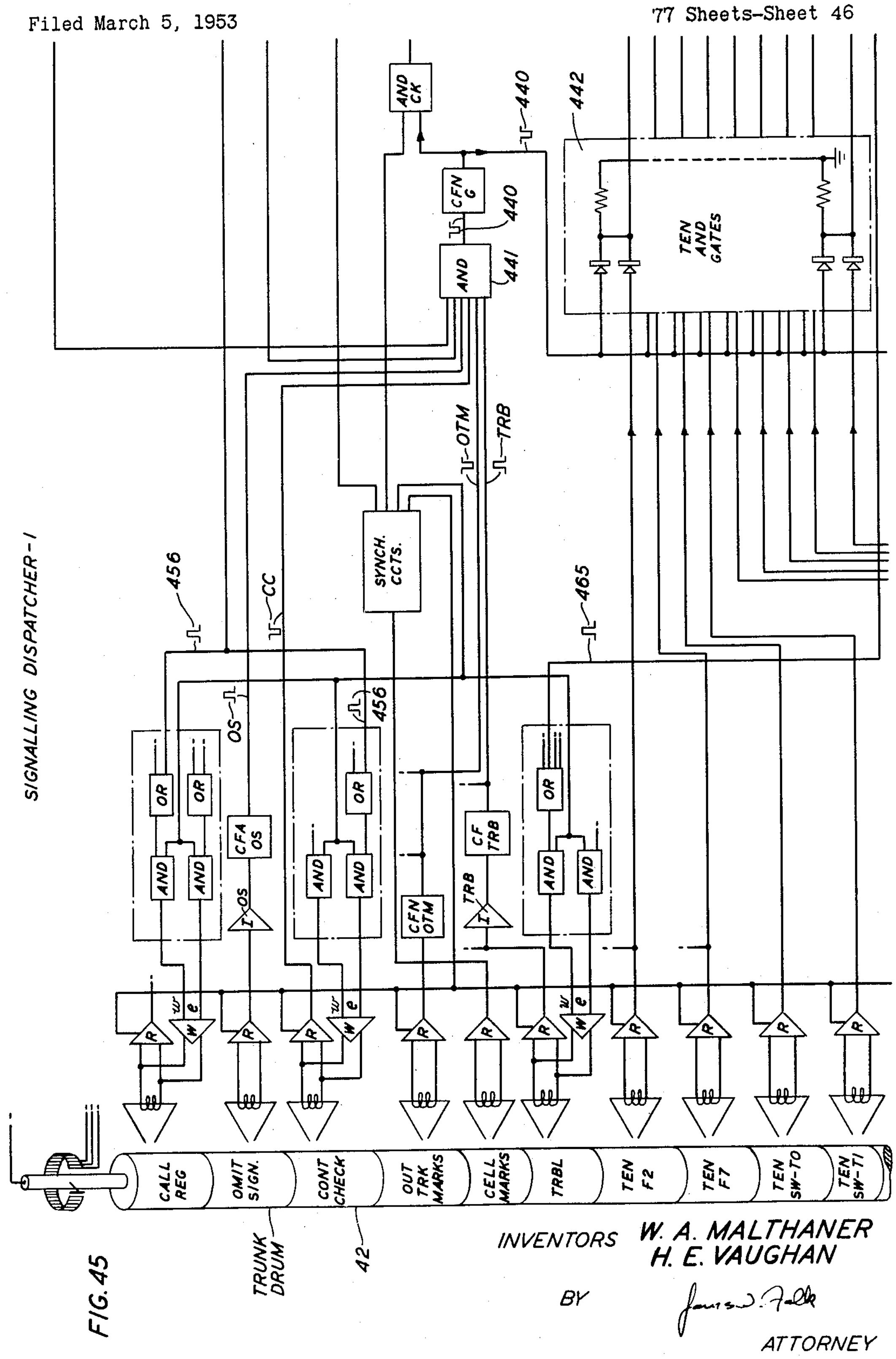
Figure 46:
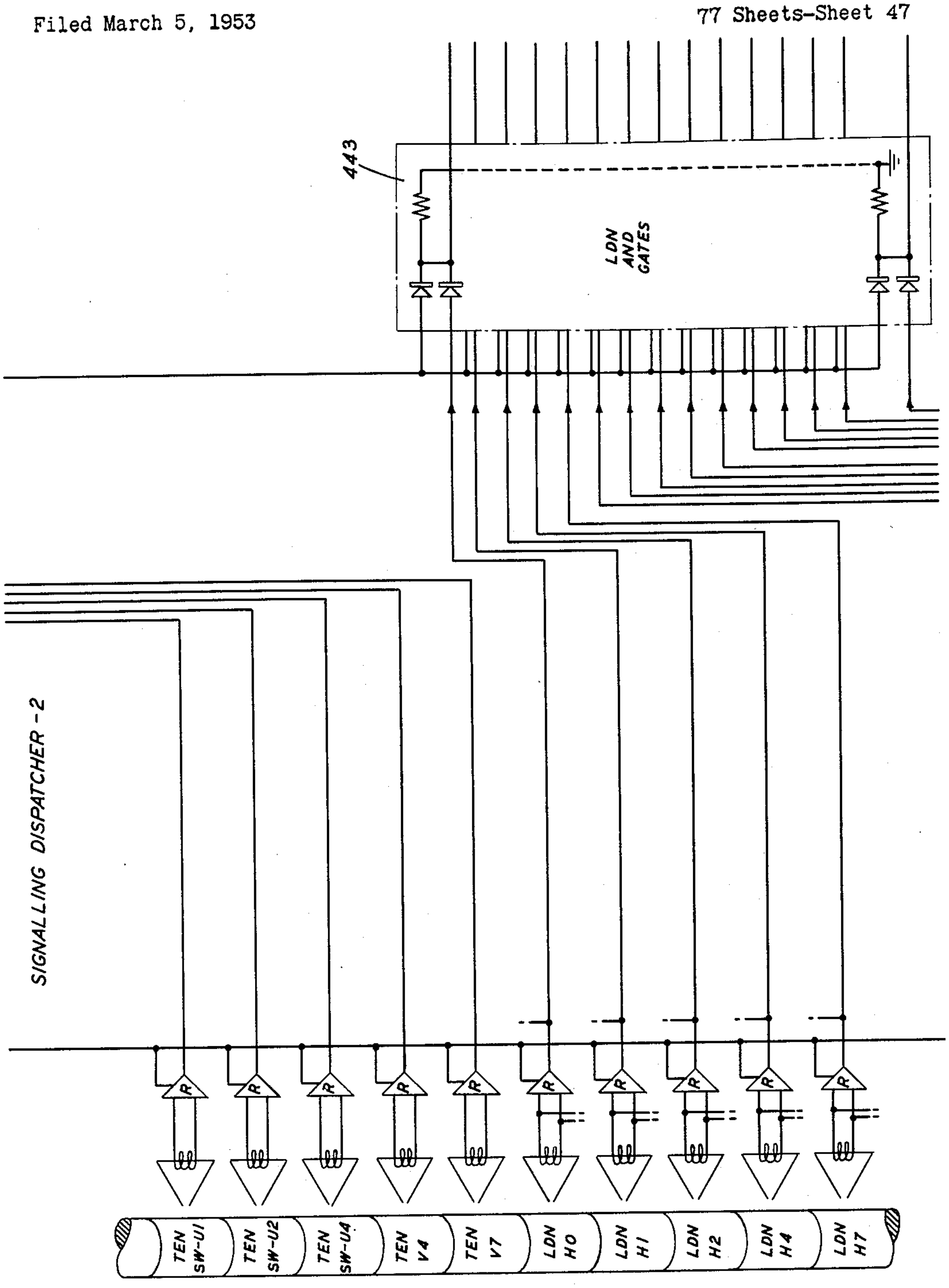
Figure 47:
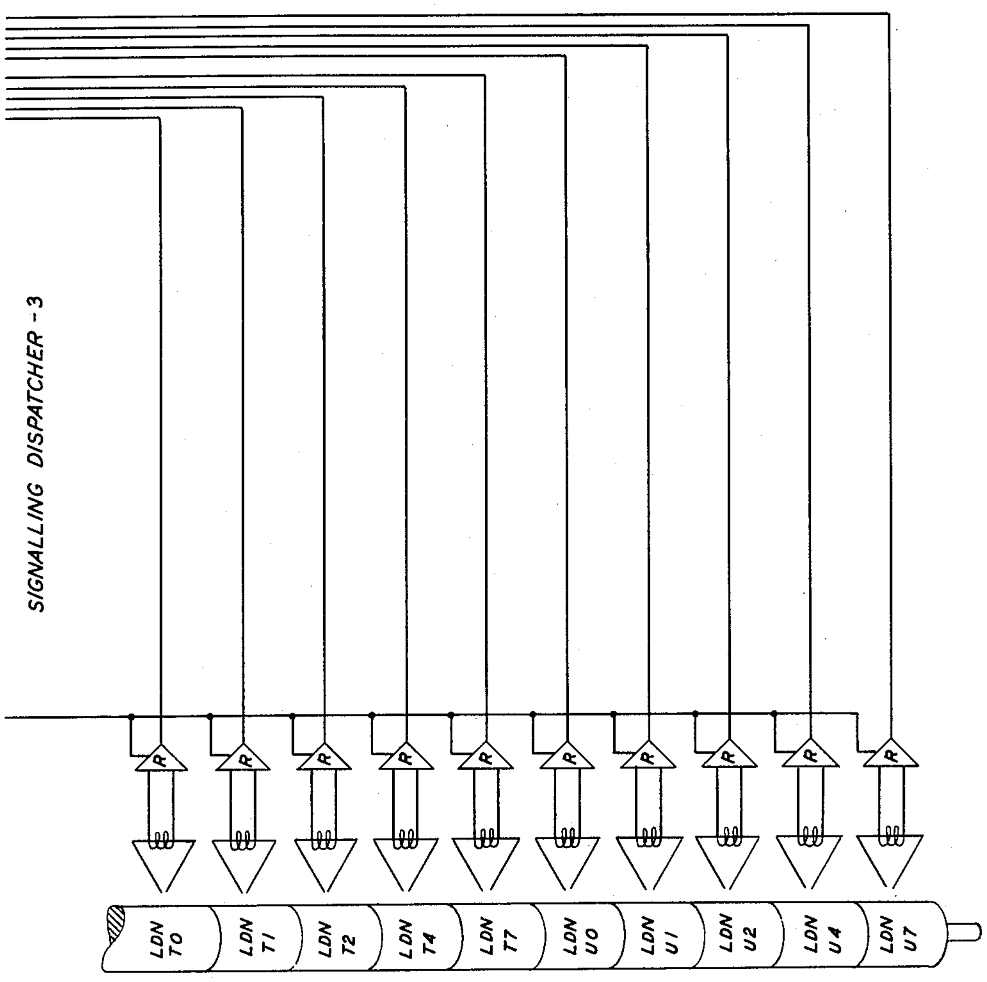
Figure 48:
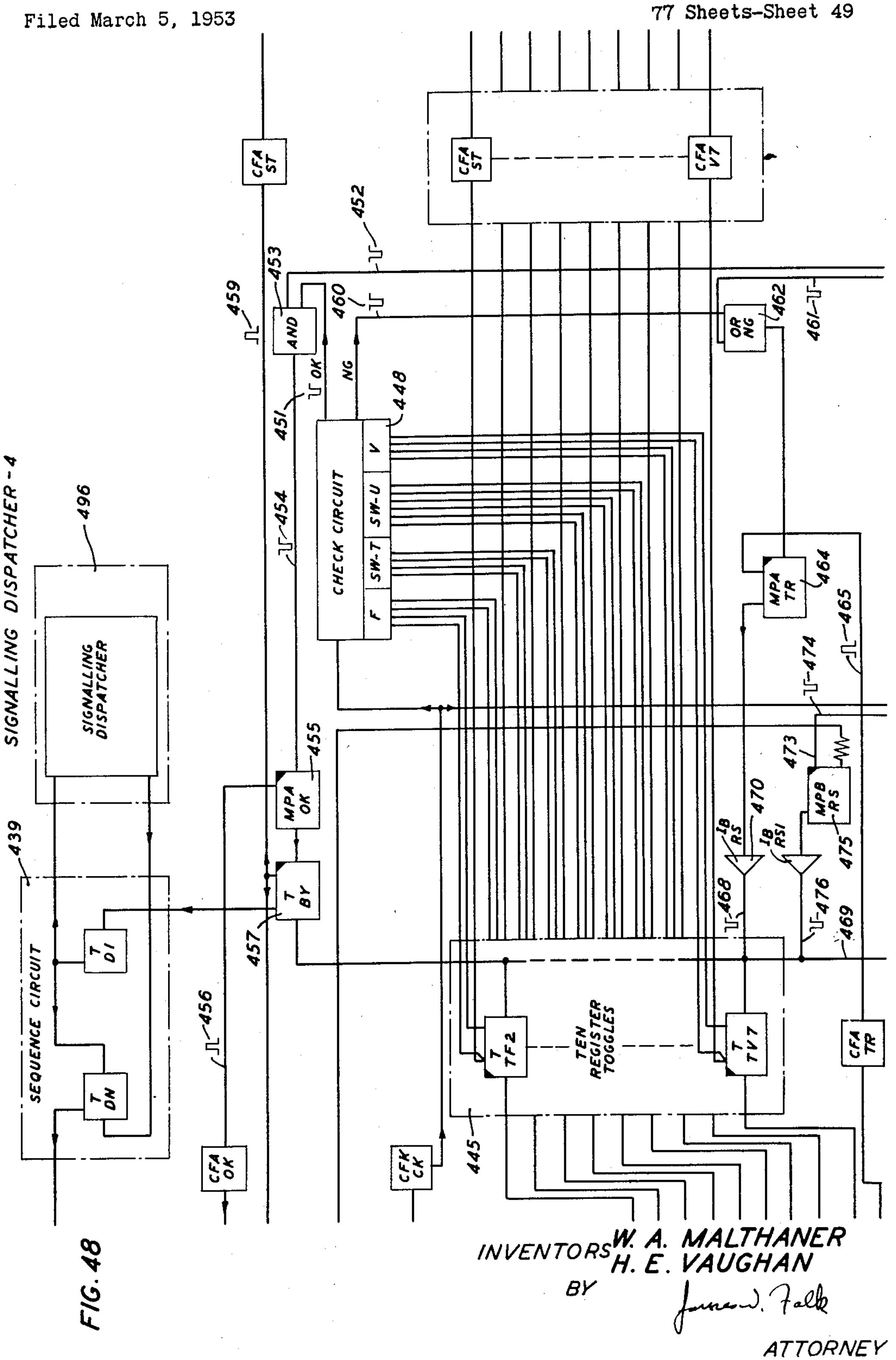
Figure 68:
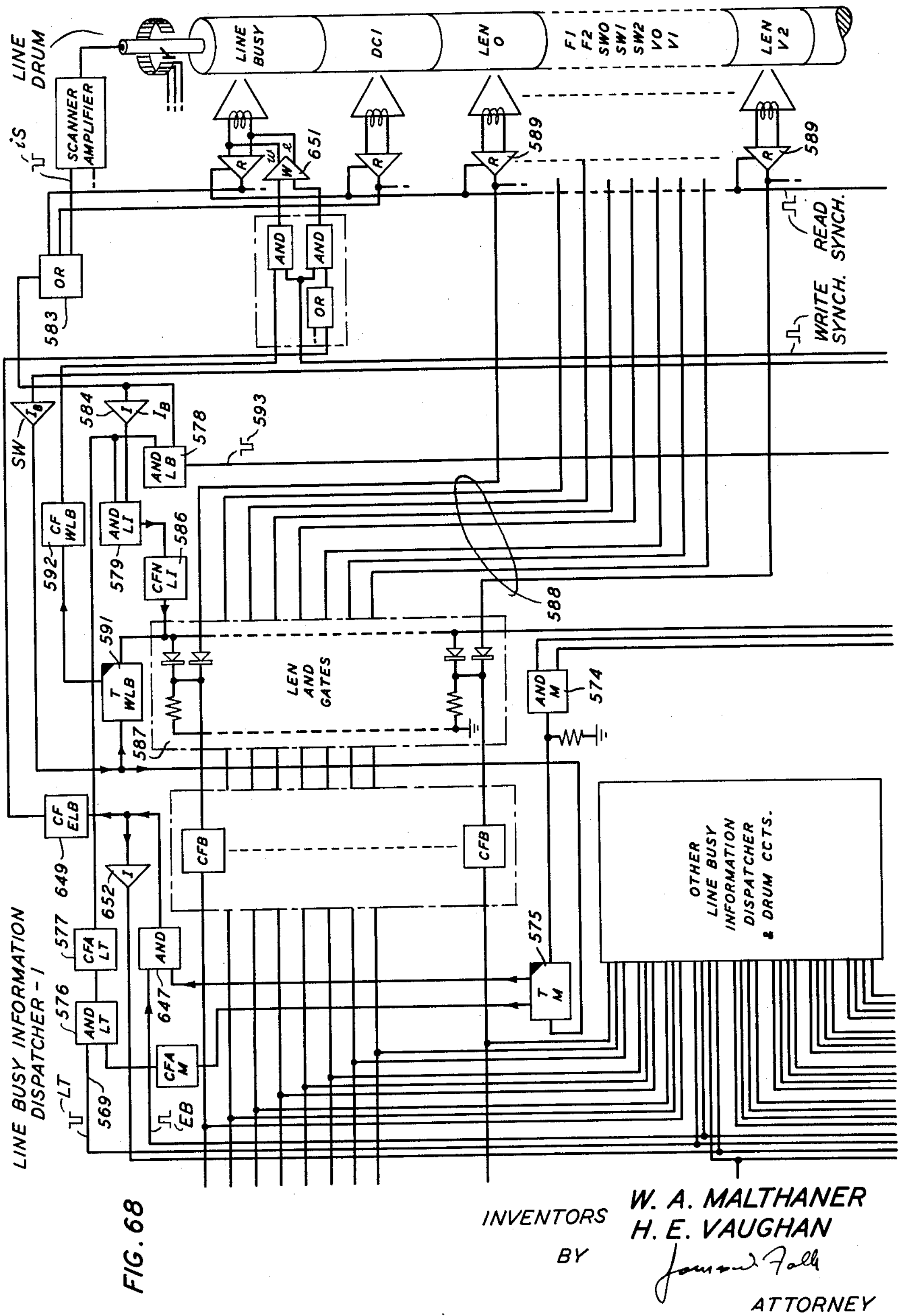
Figure 69:
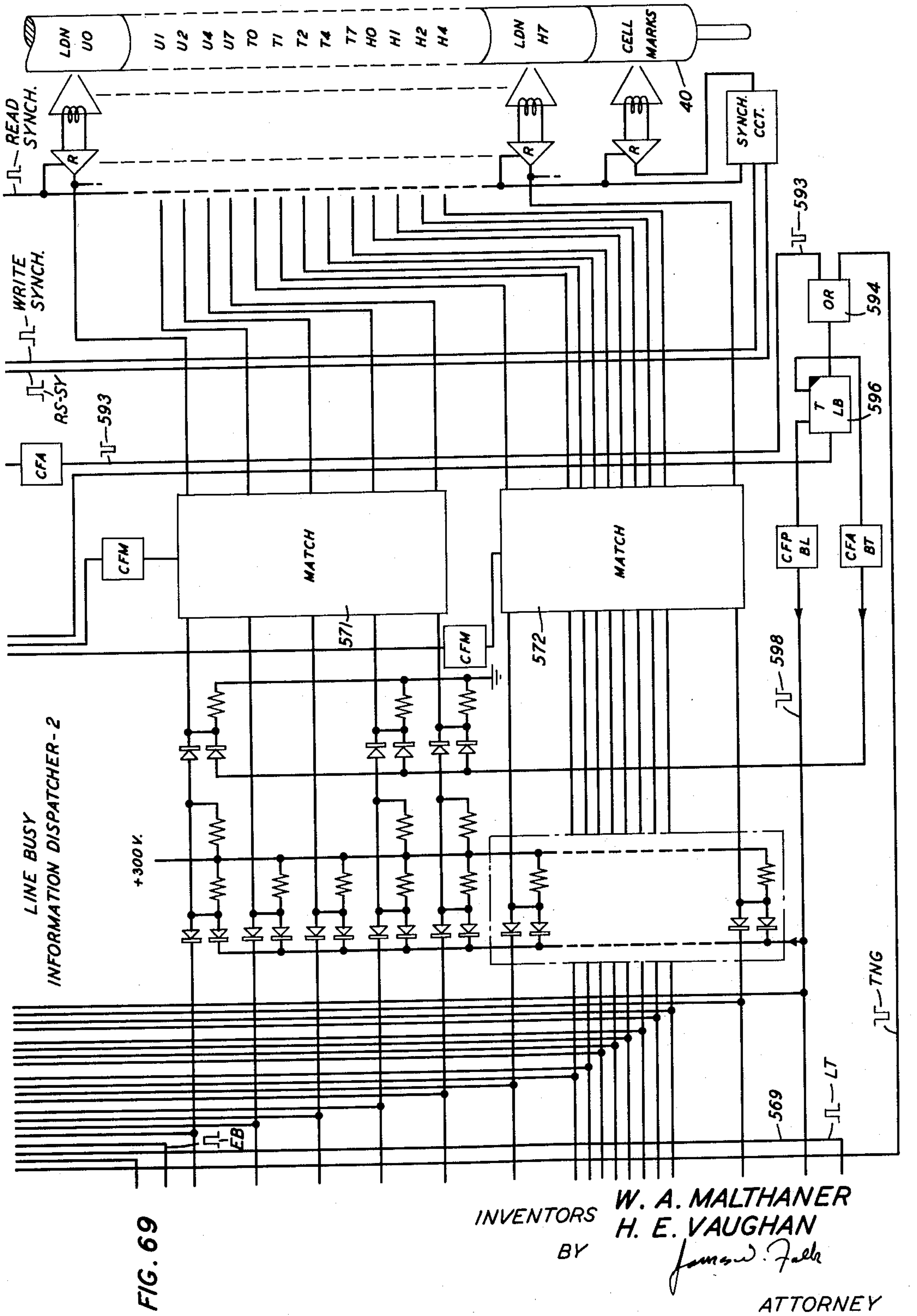
Figure 70:
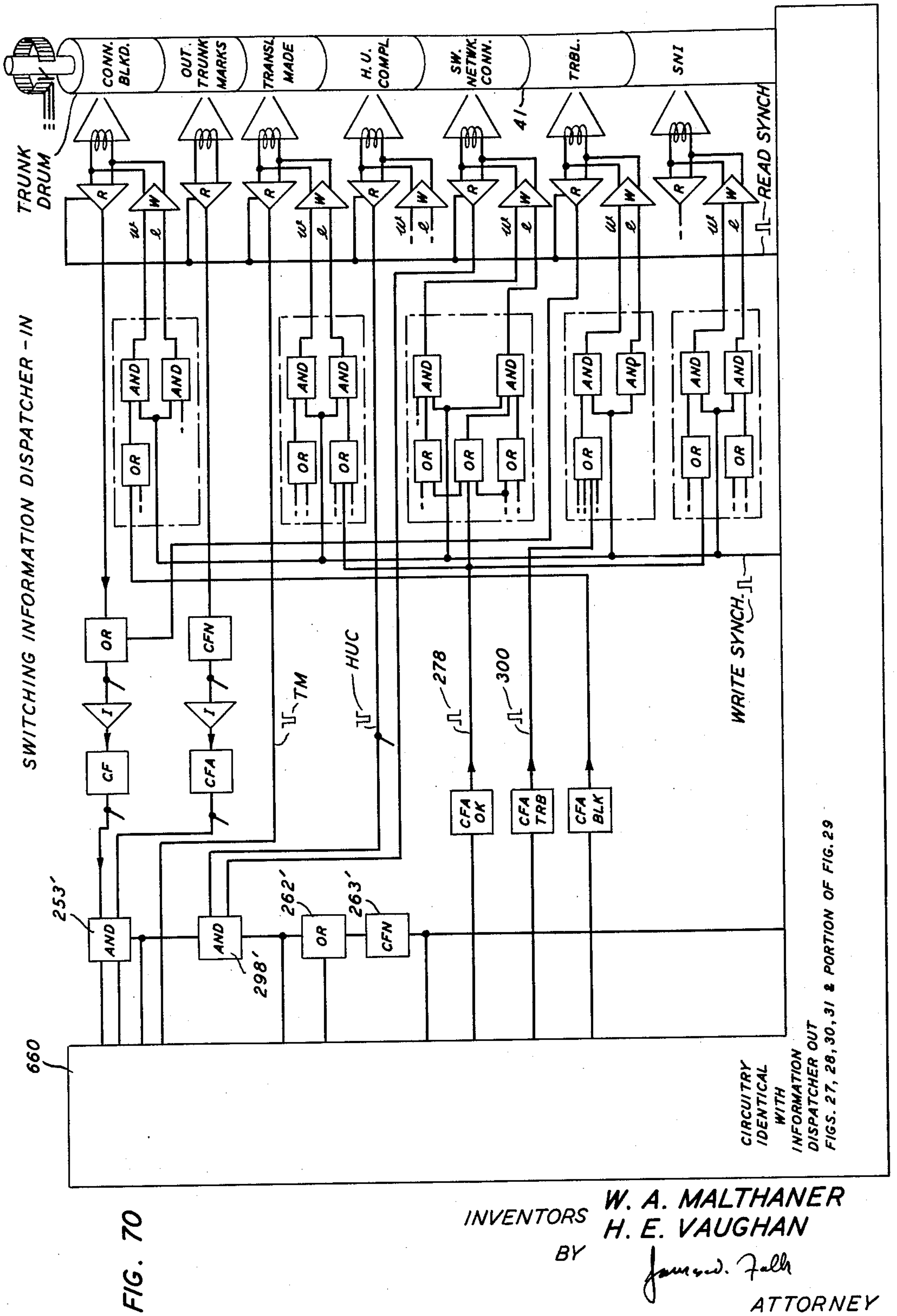
Figure 71:
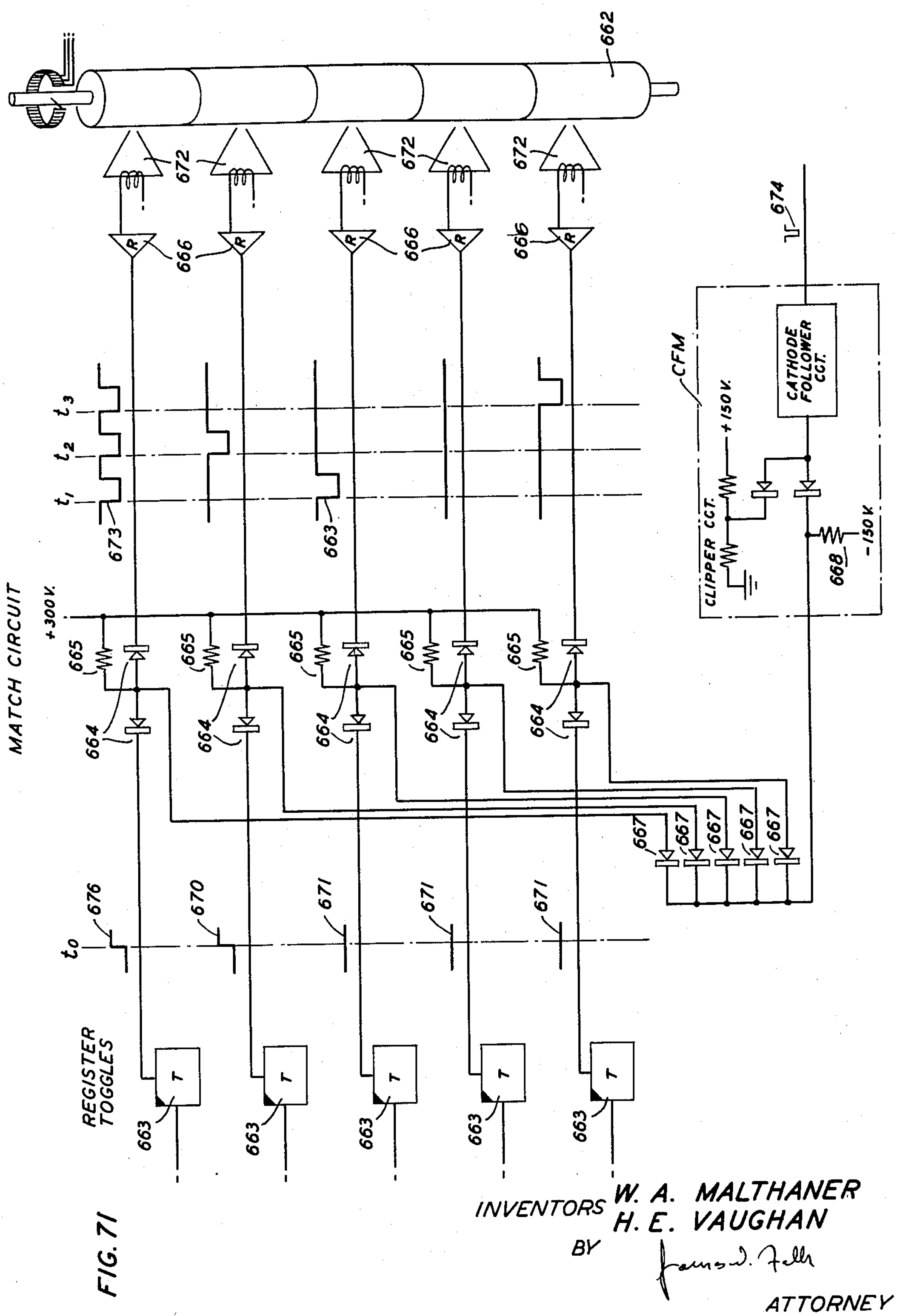
Figures 72, 73:
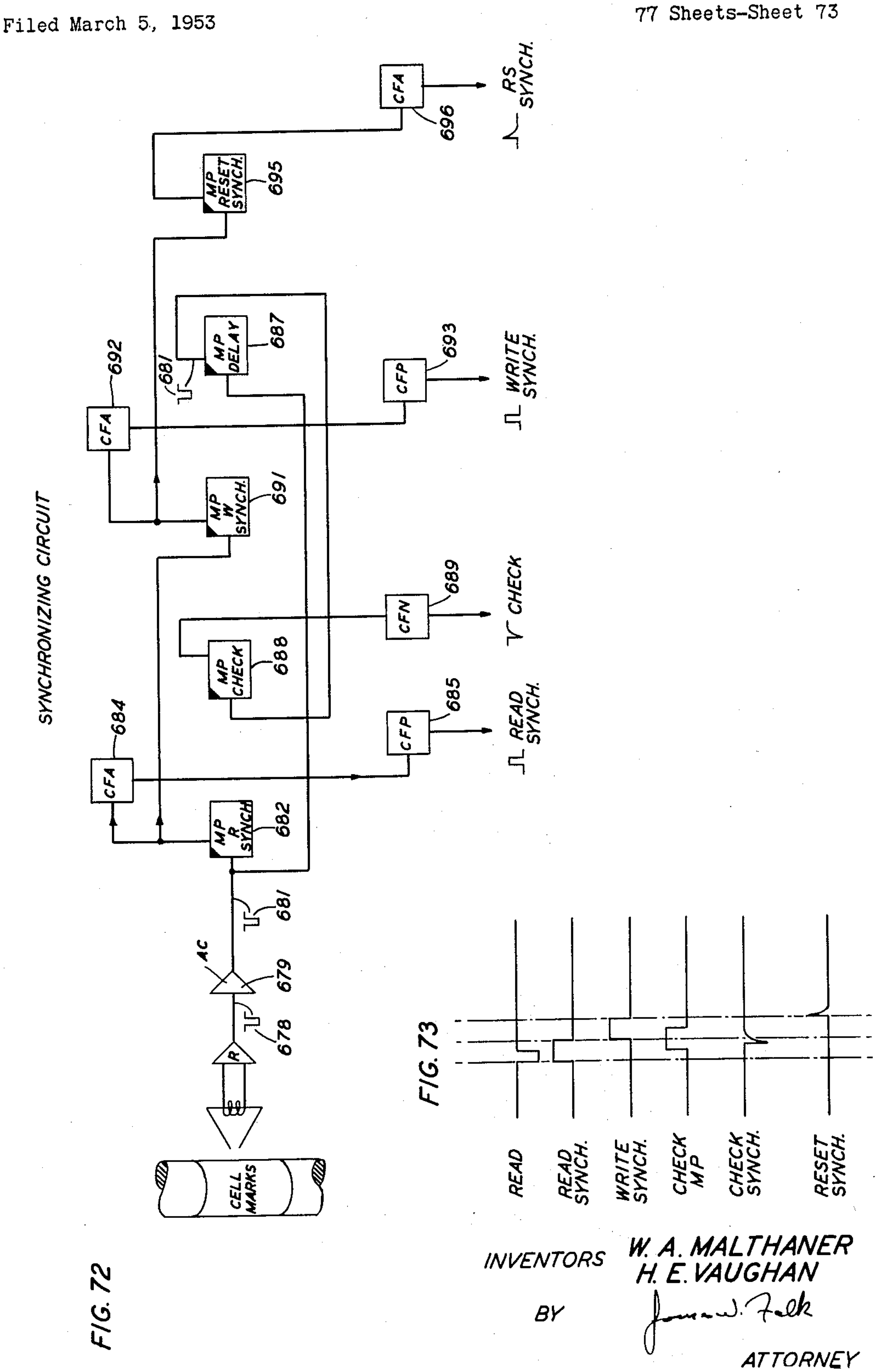
Figure 74:
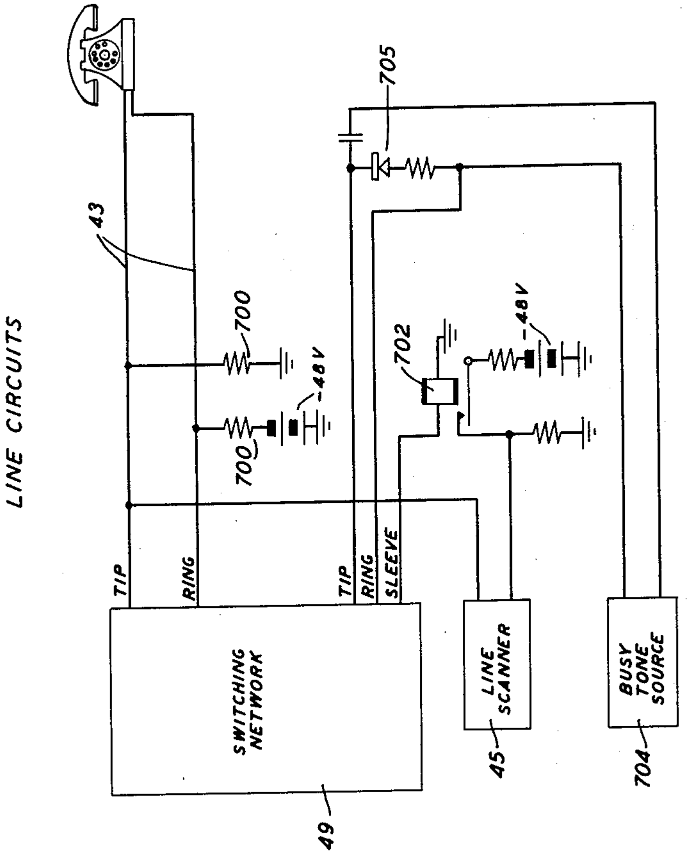
Figure 75:
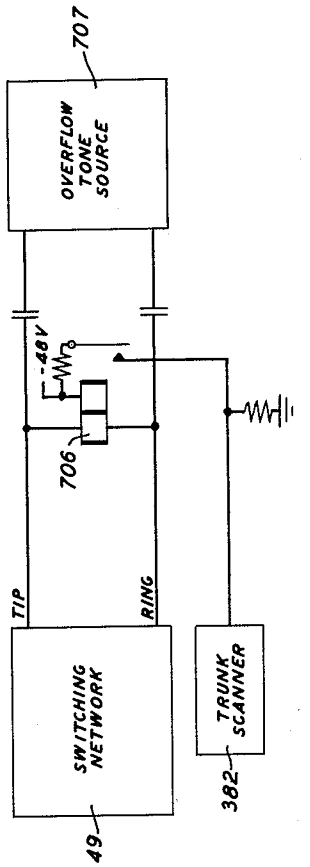
Figure 76:
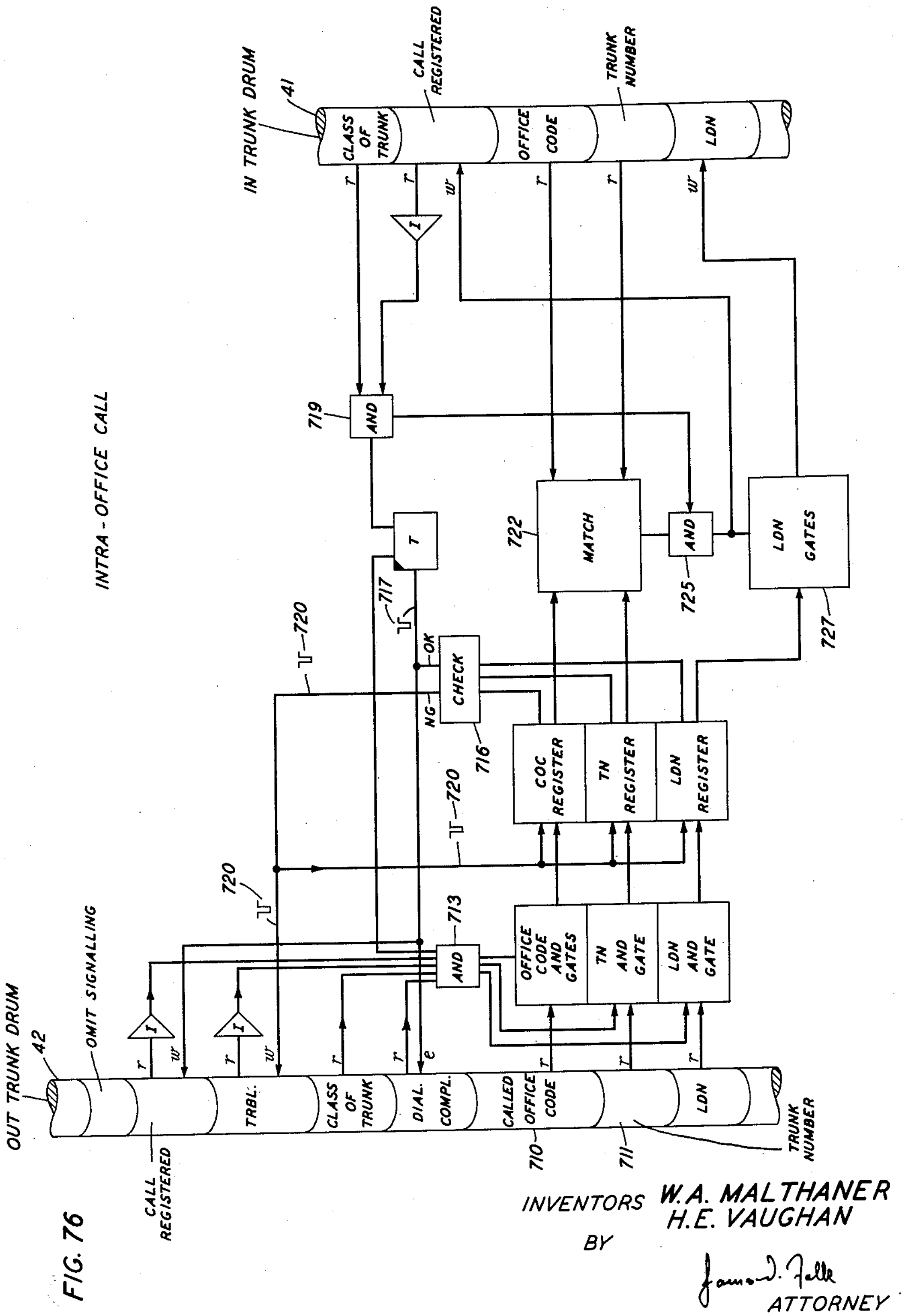
Figure 79:
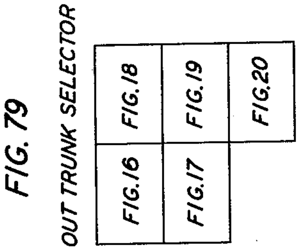
Figure 78:
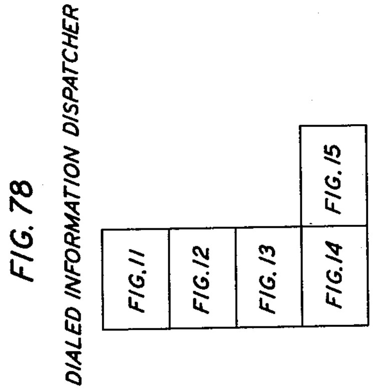
Figure 77:
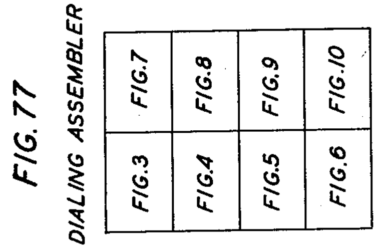
Figure 82:
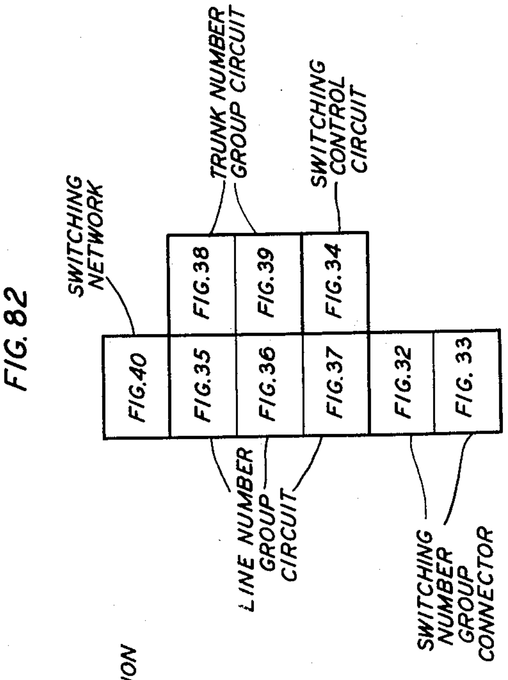
Figure 81:
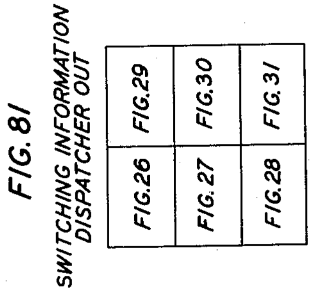
Figure 80:
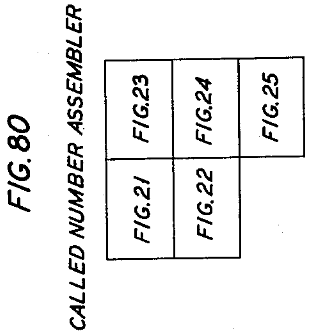
Figure 84:
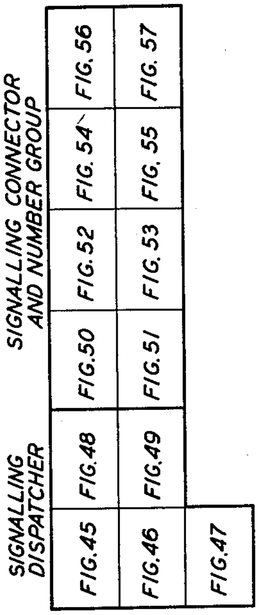
Figure 86:
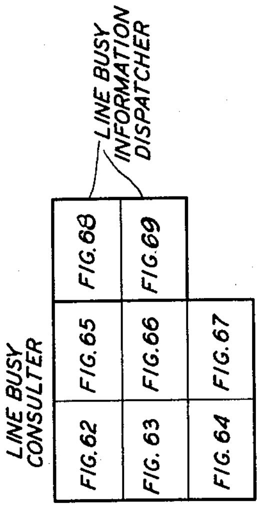
Figure 83:
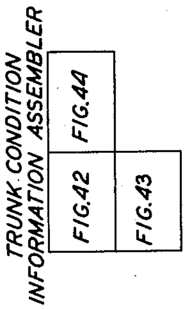
Figure 85:
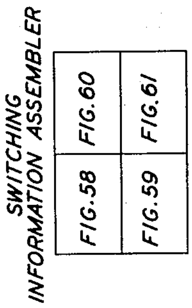

Figs. 3 through 10 are schematic representations of one specific illustrative embodiment of a dialing assembler circuit that may be employed in the embodiment of Figs. 1 and 2, Fig. 77 being the key diagram showing the arrangement of Figs. 3 through 10;

Figs. 11 through 15 are schematic representations of one specific illustrative embodiment of a dialed information dispatcher circuit that may be employed in the embodiment of Figs. 1 and 2, Fig. 78 being the key diagram showing the arrangement of Figs. 11 through 15;

Figs. 16 through 20 are schematic representations of one specific illustrative embodiment of an out-trunk selector circuit that may be employed in the embodiment of Figs. 1 and 2, Fig. 79 being the key diagram showing the arrangement of Figs. 16 through 20;

Figs. 21 through 25 are schematic representations of specific illustrative embodiment of a called number assembler circuit that may be employed in the embodiment of Figs. 1 and 2, Fig. 80 being the key diagram showing the arrangement of Figs. 21 through 25;

Figs. 26 through 31 are schematic representations of a specific illustrative embodiment of a switching information dispatcher out circuit that may be employed in the embodiment of Figs. 1 and 2, Fig. 81 being the key diagram showing the arrangement of Figs. 26 through 31;

Figs. 32 and 33 are schematic representations of a specific illustrative embodiment of a switching number group connector that may be employed in the embodiment of this invention depicted in Figs. 1 and 2;

Fig. 34 is a schematic representation of a specific illustrative embodiment of a switching control circuit that may be employed in the embodiment of this invention depicted in Figs. 1 and 2;

Figs. 35 through 37 and 38 and 39 are schematic representations of specific illustrative embodiments of line and trunk number group circuits, respectively, that may be employed in the embodiment of this invention depicted in Figs. 1 and 2;

Fig. 40 is a simplified block diagram schematic representation of a switching network that may be employed in the embodiment of this invention depicted in Figs. 1 and 2, Fig. 82 being the key diagram showing the arrangement of Figs. 33 through 40;

Fig. 41 is a schematic representation of specific illustrative embodiments of in- and out-trunk circuits that may be employed in the embodiment of this invention depicted in Figs. 1 and 2;

Figs. 42 through 44 are schematic representations of a specific illustrative embodiment of a trunk condition information assembler circuit that may be employed in the embodiment of this invention depicted in Figs. 1 and 2, Fig. 83 being the key diagram showing the arrangement of Figs. 42 through 44;

Figs. 45 through 49 are schematic representations of a specific illustrative embodiment of a signaling dispatcher circuit that may be employed in the embodiment of this invention depicted in Figs. 1 and 2;

Figs. 50 through 57 are schematic representations of a specific illustrative embodiment of a signaling connector and number group circuit that may be employed in the embodiment of this invention depicted in Figs. 1 and 2, Fig. 84 being the key diagram showing the arrangement of Figs. 45 through 57;

Figs. 58 through 61 are schematic representations of a specific illustrative embodiment of a switching information assembler circuit that may be employed in the embodiment of this invention depicted in Figs. 1 and 2, Fig. 85 being the key diagram showing the arrangement of Figs. 58 through 61;

Figs. 62 through 67 are schematic representations of a specific illustrative embodiment of a line busy consulter circuit that may be employed in the embodiment of this invention depicted in Figs. 1 and 2;

Figs. 68 and 69 are schematic representations of a specific illustrative embodiment of a line busy information dispatcher circuit that may be employed in the embodiment of this invention depicted in Figs. 1 and 2, Fig. 86 being the key diagram showing the arrangement of Figs. 62 through 69;

Fig. 70 is a schematic representation of a specific illustrative embodiment of a switching information dispatcher in circuit that may be employed in the embodiments of Figs. 1 and 2;

Fig. 71 is a schematic representation of one specific illustrative embodiment of a match circuit that may be employed in various of the above circuits;

Fig. 72 is a schematic representation of a specific illustrative embodiment of a synchronizing circuit that may be employed in various of the above circuits;

Fig. 73 is a time chart of pulses in the synchronizing circuit depicted in Fig. 72;

Fig. 74 is a schematic representation of specific illustrative embodiments of line circuits that may be employed in the embodiment of Figs. 1 and 2;

Fig. 75 is a schematic representation of a specific illustrative embodiment of an overflow tone trunk that may be employed in the embodiment of Figs. 1 and 2; and Fig. 76 is a simplified block diagram schematic representation of a specific illustrative embodiment of an intraoffice call circuit that may be employed in the embodiment of this invention depicted in Figs. 1 and 2.

*Explanation of circuit components and conventions*

In the detailed description of specific illustrative embodiments of circuits employable in the general combination of this invention, certain circuit components of constructions known in the art have been depicted in block schematic form to simplify both the drawing and the description. These components include cathode followers, toggles, inverters, monopulsers, and logic circuits.

The cathode followers employed are all of types known to the art and are identified on the drawing as CF, CFA, CFP, CFB, CFN, CFM, or CFK. Cathode followers CFA and CFP may be low and high power output circuits respectively, the CFP circuits including a tube such as a 5687 triode having direct current circuit inputs. CFB cathode followers are the same as CFA cathode followers but with alternating current circuit inputs and with a varistor in the output circuit poled to permit passage of negative pulses, so that a number of such output circuits can be connected in parallel. A CFN circuit is a negative cathode follower and may advantageously be of the type described in an application Serial No. 322,991, filed November 28, 1952. CFM circuits are advantageously low power output cathode followers including clipper diodes, such as varistors, in their input circuit and are advantageously employed with the match circuits. CFK circuits may be cathode followers with the cathode returned to a positive bias so that if the cathode follower is cut off completely, a positive bias will appear on the output lead. A CFS cathode follower circuit is one which is normally non-conducting and when rendered conducting allows conduction of a heavy current. It is employed with the cathode connected to a grid of a monopulser tube so that the timing capacitor in the monopulser circuit may be rapidly discharged to reset the monopulser circuit.

The toggles may advantageously be conventional double stability twin-triode vacuum tube stages. In the drawing, one of the upper corners of each toggle circuit is shown shaded; in accordance with a convention employed in the drawing, the shaded corner indicates the plate of the normally conducting triode of the toggle. Further the plate output leads are depicted as emanating only from the top of the block schematics representing toggles while the tripping and resetting signals are applied to the sides of the block schematics.

The inverters employed in the circuit description are of two types, identified on the drawing as I and $I_B$. Inverters I may advantageously be conventional single triode inverters, with direct current coupled inputs. Inverters $I_B$ may advantageously be conventional single triode inverters normally biased to cut-off and with the input alternating current coupled through a capacitance.

The monopulsers are single stability twin-triode circuits in which a negative pulse extinguishes the conduction in the conducting triode and causes conduction to occur in the normally non-conducting triode for some period of time, determined by the constants of the monopulser circuit, after which time the monopulser will automatically reset itself to its normal state. The conventions used for the toggle block schematics are also used for the monopulser schematics wherein the shaded corner indicates the plate of the normally conducting triode of the monopulser with the plate output leads depicted as emanating from the top of the schematic monopulser block and with tripping signals applied to the side of the block. The different kinds of monopulsers employed in the various circuits to be described differ only in the length of time the monopulser is on; these different monopulsers include those designated in the drawing MPA, which remain on about six microseconds; MPB, which remain on about 100 microseconds but which are advantageously reset by a positive pulse after about five slots of the drum have been read; and monopulsers which remain on for periods of one or two revolutions of the drum.

The logic circuits employed include AND and OR circuits, which may comprise diodes, such as vacuum tubes, varistors, or oxide rectifiers, connected together so as to allow passage of a positive or negative potential only when that potential appears on all the input leads to the circuit or when that potential appears on any one input lead, as is known in the art.

The reading and writing amplifiers utilized with the magnetic drums may be of the types described in an application Serial No. 201,156 filed December 16, 1950, by J. H. McGuigan, O. J. Murphy, and N. D. Newby, now Patent 2,700,148, issued January 18, 1955, or an application Serial No. 307,108, filed August 29, 1952, by W. A. Cornell, J. H. McGuigan, and O. J. Murphy. The leads to the writing amplifiers over which control signals for writing and erasing marks are transmitted, which leads are designated the write and erase leads, have been identified on the drawing by the small letters *w* and *e*.

It is to be understood that this invention is not to be considered as limited to particular circuits or particular circuit components employed in the specific illustrative embodiments described or discussed above. The type of circuits employed and the circuit conventions utilized have been described solely to facilitate an understanding of the description and the drawing.

*General description*

Turning now to the drawing, Fig. 1 is a greatly simplified block diagram of one telephone switching system employing two offices in accordance with this invention. Certain broad aspects of this invention can be discussed in connection with this simplified drawing. In office A the equipment blocks used on the originating portion of a call are shown and the information paths necessary to control the set up of the call are indicated. In office B the equipment blocks for the terminating portion of a call are shown in the same manner.

In each office there is a line drum 40, an in-trunk drum 41, and an out-trunk drum 42. Each of these drums advantageously comprises a surface layer of magnetic material on a cylinder having so-called hard magnetic properties. Such properties cause a magnetic condition impressed on the material to be retained until changed by other magnetic fields or forces and are usually associated with relatively high coercive force and appreciable remanence or residual magnetic induction. The structure of such drums is further described, inter alia, in an application Serial No. 183,636, filed October 7, 1950, of C. E. Brooks, C. A. Lovell, J. H. McGuigan, O. J. Murphy and D. B. Parkinson, but this invention is not to be considered as limited to any particular magnetic drum structure. Information regarding the state of each subscriber line 43 is accumulated on the surface of a rotating drum in the form of a code of magnetized spots. This information may be written onto the drums and read therefrom by reading-writing heads and reading and writing amplifiers as disclosed in application Serial No. 201,156, filed December 16, 1950, of J. H. McGuigan, O. J. Murphy and N. D. Newby, now Patent No. 2,700,148, issued January 18, 1955.

The information accumulated may include the temporary data of line busy or idle conditions, the digits dialed by a subscriber, etc., as well as such permanent information as the line directory number, the equipment number for that line in the office, and the class of service for that line.

The basic subdivision of the drum surface on which a single magnetic spot may be recorded is called a cell; each group of cells which passes under a single magnetic reading-writing head as the drum revolves is called a track or channel; and each group of cells along the drum which are simultaneously under the various heads is called a slot, as further described in the above-mentioned Brooks et al. and McGuigan et al. applications. Each slot is assigned to a particular subscriber line and the closures and opens of that line are detected by a line scanner 45, which may be of the capacitive type described in Patent 2,679,551, issued May 25, 1954, application Serial No. 282,374 filed April 15, 1952, and Patent No. 2,675,427, issued April 13, 1954, all of N. D. Newby. This capacitive commutator may have its search head mounted on the same shaft as the magnetic line drum and thus each slot on the surface of the drum is assigned to that line being scanned when that slot is under the reading-writing heads of the drum. In a similar manner each trunk 47 between the offices A and B is scanned by a trunk scanner 45 and has a corresponding slot on the surface of each of the trunk drums 41 and 42.

As closures and openings of a subscriber line 43 are detected by the line scanner 45 and recorded on the magnetic line drum slot for that line, dialed digits are accumulated as a group of magnetic spots on the drum 40 through the use of other magnetic channels as timing circuits, as described further below and in application Serial No. 456,184, filed September 15, 1954, of J. H. McGuigan and O. J. Murphy. The first three digits dialed by a subscriber are accumulated on his line slot, in accordance with one aspect of this invention, and these digits are used to select and assign the line 43 on the outgoing trunk drum 42 a slot corresponding to an idle trunk 47 to the destination designated by these digits; we assume in this discussion that each office A, B, etc., is designated by three digits, such as CHelsea 3, as is common in such systems, and that the subscriber being called by the subscriber in office A is in fact in office B. Assignment of the line on the outgoing trunk to a slot corresponding to an idle trunk consists of recording on the outgoing trunk drum slot the equipment number of the calling line, i. e., the number assigned to that line in the office as opposed to his directory number which would be dialed by someone calling him. After this time slot on the outgoing trunk drum 42 has been assigned, the digit register space on the line drum slot is then cleared, and the following numerical digits of the called line directory number are accumulated on the line drum slot and dispatched one at a time to storage on the assigned slot of the out-trunk drum 42.

As soon as the complete called number is stored on the out-trunk 42, the line equipment number of the calling line and the trunk equipment number of the assigned out-trunk 47 are dispatched from the trunk drum 42 to the control circuits of the switching network 49, which may be of any of several cross-bar, step-by-step, reed diode or other known types, but is advantageously of the reed diode type described in Patent No. 2,668,195, issued February 2, 1954, to S. T. Brewer and in Patent 2,686,837, issued August 17, 1954, to S. T. Brewer and E. Bruce. In response to these signals the control circuits of the switching network establish a corresponding path through the network. When this network path has been set up, interoffice signalling equipment, which has been seized by the marks on the out-trunk drum slot, is connected to the out-trunk 47. This interoffice signalling may advantageously be accomplished on a pulse code modulation basis and the signalling equipment may be of the types described in application Serial No. 158,218, filed April 26, 1950, of W. A. Malthaner and H. E. Vaughan and Patent 2,678,435, issued May 11, 1954, to H. E. Vaughan.

In response to a "connect" signal on the trunk 47 that is detected by the trunk scanner 45 associated with the in-trunk drum 45 in the terminating office B, signal receiving equipment is similarly connected to the in-trunk 47. The called line directory number is then transmitted over the interoffice trunk conductor 47 to the terminating office B and recorded on the trunk slot corresponding to the in-trunk 47 on the in-trunk drum 41. The in-trunk drum then consults the terminating office line drum 40 to obtain the line equipment number of the called line, if idle. After this line equipment number has been recorded on the in-trunk drum slot, the line equipment number and the equipment number of the in-trunk are both dispatched to the switching network control circuit and a corresponding connection extended through the network to the called subscriber.

Ringing is applied to the called line by the in-trunk circuit and is stopped on the answer of the called subscriber.

In addition to the detection of the signalling "connect" signal by the trunk scanner, the scanner is also employed to check continuity of the calling subscriber's loop, to detect answer of the called subscriber, and to detect hang-up by either or both subscribers. One circuit that may be employed to maintain the desired direct current level of the scanner output to enable detection of these signals on the trunk and also to detect these signals is disclosed in Patent 2,691,729, issued October 12, 1954, to W. A. Cornell.

The duration of a hang-up condition is timed by trunk drum circuits and after such a timing interval the release of connections through the switching network are ordered from the trunk drums. One such timing circuit is disclosed in application Serial No. 340,472, filed March 5, 1953 of W. A. Malthaner.

Advantageously in case of vacant office codes dialed or all trunks busy, an overflow or intercept trunk is assigned on the outgoing trunk drum after the subscriber has dialed the digits and an immediate connection is established to the trunk. In case of vacant or busy called line numbers, the line equipment number of a line connected to a proper tone source is furnished to the in-trunk drum slot and the call is established to this tone terminal.

It may be noted that as each subscriber is permanently assigned, through the scanner 45, to a slot on the line drum 40 no delay is necessary after the subscriber picks up his telephone before he can begin dialing. Dial tones or other signals for which a subscriber has to wait in usual prior systems, due to the system requiring time to assign equipment to the subscriber desiring to place a call, are therefore not necessary.

*System description*

Turning now again to the drawing, one specific illustrative embodiment of this invention is shown in a more detailed block diagram schematic in Fig. 2 and will now be described in greater detail. To facilitate an understanding of the operation of the system as a whole, while at the same time describing the operation of the component circuit elements and their cooperation in the combination of the system in accordance with this specific embodiment of this invention, the following description will be of the system as depicted in Fig. 2 and each component circuit will be described as it is met in the operation of the system with reference to the other figures in which various parts of the system are depicted in detail. In this manner, we believe that one can keep before him during this description certain of the broad and general aspects of our invention, as depicted in the specific embodiment illustrated in Fig. 2, while at the same time considering details of one specific illustrative embodiment.

*Accumulation of dialed office code*

When a subscriber desires to place a call, he removes the handset from the telephone cradle and immediately begins to dial in the conventional manner. As discussed above, no dial tone need be provided as one of the segments of the line scanner 45 and a slot on the associated line drum 40 are permanently assigned to each line 43 and always at its disposal. When the subscriber dials, the line closures caused thereby and representing the dialed digits are assembled and stored on certain channels of the line drum 40 by the Dialing Assembler circuit 51. This Dialing Assembler circuit operates with the output of the line scanner and various channels of the line drum 40 to interpret and record the various time sequences of line conditions for all the lines scanned. Functionally this circuit serves to accumulate the digits dialed by subscribers assigned to its line drum and steers these digits to proper storage cells on the drum 40, detects permanent signal and hang-up conditions, recognizes the completion of stages in the dialing sequence which requires action by other control circuits, and records marks on the line drum 40, which shall be referred to as "call progress" marks and which initiate the action by the other control circuits. Registering of dialed digits is also described in application Serial No. 456,184, filed September 15, 1954, of J. H. McGuigan and O. J. Murphy.

Two channels, DC1 and DC2, around the line drum 40 together with the Dialing Assembler circuit 51 provide a record of the scanned condition just previously detected and of a still earlier scanned condition; these channels, as well as other channels and components to be referred to, are best seen in the circuit of Figs. 3–10 which is a detailed representation of one Dialing Assembler circuit and its cooperation in the combination of this specific embodiment of this invention and which is described in detail below. The DC1 and DC2 channels are the dial pulse control channels and the information stored in these channels at any time together with the scanned condition on a line 43 are fed to a Dial Control logic matrix 53. The outputs of this matrix control changes in the dial control channels and also indicate continued line closure, continued line open, and completion of a dial pulse.

Each completed dial pulse of the train of pulses representing a single digit is added to the pulses previously accumulated in four latest digit channels, D1, D2, D4 and D7, of the line drum 40. The interdigital interval, a continued line closure condition following a train of dial pulses, is measured by counting revolutions of the drum 40 in binary code in a group of three timing channels, FT1, FT2 and FT4, assigned to this function. When the interdigital timing channels indicate that an interdigital interval has occurred, the digit value accumulated in the latest digit channels, D1 through D4, must be disposed of before the next train of pulses starts. On initiation of a call the latest digit accumulated represents the first digit of the office code of the party desired by the calling subscriber and it is recorded in a group of A-digit channels and the latest digit recordings in the D-channels are erased. The second digit of an office code is accumulated in the same manner in the latest digit channels and then transferred to a group of B-digit channels after timing of an interdigital interval. The third digit of an office code is accumulated in the latest digit or D-channels and in this case the subsequent timing of an interdigital interval causes the recording of a mark in a control channel of the line drum as an indication that operations are required by another of the control circuits.

By this method of placing each digit first in the D-channels and then to either the A- or B-channels for the first two digits there is now stored on the line drum 40 the designation of the office being called, which office has the code AB—D. In a specific example this code may indicate MAin-3 where, in accordance with standard telephone dials, M is digit 6 and A is digit 2. Thus a digit 6 is stored in the A-channels, a digit 2 in the B- channels, and a digit 3 in the D-channels. If the first digit dialed by the subscriber is 0, indicating that the assistance of an operator is desired, the special control mark indicating that operations by subsequent control circuits are desired is written immediately. Initial dialing of the digit "1" is advantageously disregarded by the dialing assembler circuit 51 in that the D-channels are cleared without further action as this is an erroneous code designation in standard telephone dial systems.

The special control mark written on completion of dialing of the office code is a call progress mark and can be best designated as a Spill Out mark, as the mark advises the control circuits to spill out the information recorded in the A-, B- and D-channels to the subsequent control circuits. In accordance with this invention, the subsequent control circuits are thus alerted before the completion of the dialing by the subscriber and selection and assignment of an outgoing trunk can thus proceed immediately even while the directory number of the party being called is still being dialed.

*Illustrative embodiment of dialing assembler*

One specific illustrative embodiment of a dialing assembler circuit 51 in accordance with this invention and employable in the combination of this invention is depicted in Figs. 3–10, to which reference will now be made for a more detailed description of this circuit. As described above the outputs of the line scanner 45 and of the two dial control channels, DC1 and DC2, are required to correctly recognize and record the significance of a sequence of line-closed and line-open conditions. These pulse outputs, as well as all the other pulse outputs from reading amplifiers, are regenerated at their point of entry into this circuit by electron tube toggle circuits 53 which are reset by synchronizing pulses immediately after each possible writing interval. The function of these toggle circuits 53 is to extend or "remember" what has just been read until any necessary writing actions have been taken. Two polarities of regenerated signal from the scanner 45, and the dial control channels, DC1 and DC2, are connected to the inputs of the dial control diode logic matrix 54, seen on Fig. 5. An additional input to the matrix 54 is the line drum call progress mark BSY through the BSY toggle 53 and inverter 56, seen in Fig. 3. This BSY mark is present when the line is busy with a terminating call. These inputs are combined in various combinations in five logical AND circuits in matrix 54 to produce five outputs. During the idle condition of a line there is no output signal from the scanner and there are no magnetic marks in the DC1 and DC2 cells. On the first drum revolution after a subscriber lifts the handset of his telephone the output of the scanner 45 causes a mark to be written in his DC1 cell as the first output of the dial control matrix 54. On the next revolution of the drum a signal produced by combining the outputs of the scanner and the DC1 and BSY channels in the dial control matrix 54 is generated indicating an off-hook continued OHC condition unless this condition resulted from answering a terminating call. The OHC signal is applied through a cathode-follower circuit 57 and starts the action of a timing circuit 58, seen in Fig. 3, which times for permanent signal condition on the line and for interdigital intervals between trains of dial pulses; the timing circuit 58 may be of the type described in application Serial No. 340,472, filed March 5, 1953, of W. A. Malthaner.

When the subscriber dials a digit, the disappearance of the scanner output during the first dial-open interval is combined with the output from the DC1 channel to produce an output from the dial control matrix 54 which causes the writing of a mark in the DC2 cell. The subsequent dial-closed interval indicating the completion of a dial pulse is detected by the scanner 45. This scanner output is combined with the outputs of the DC1 and DC2 channels to produce a Completed Pulse, CP, output in the dial control matrix 54. This output is disabled on terminated calls by the presence of the BSY mark. The CP output pulse causes the erasure of the mark in the DC2 cell and enables the writing-gates of the latest digit channels, D1 to D7, of the line drum to record the pulse of the dialed digit. The fifth output of the dial control matrix 54 is produced by a continued line-open condition after a line-closed condition. The absence of a signal on the scanner output at a time when there are marks in both the DC1 and DC2 cells produces this Hang-Up Indicated, HUI, output. It is used after a timing cycle to clear the drum of any accumulated call data; one timing circuit to determine whether a hang-up has occurred is described in application Serial No. 340,472, filed March 5, 1953, of W. A. Malthaner.

As mentioned in the preceding paragraph, at the completion of each dial pulse the digit channels D1 to D7 are enabled by the CP output of the dial control matrix 54. On the first such enablement, a mark is written in the D1 cell. On the second enablement, the D1 mark is erased and a mark is written in the D2 cell. On the third enablement, a mark is again written in the D1 cell. This process is continued throughout the train of dial pulses in such a manner that the dialed digit is accumulated in the group of four D1 to D7 cells in a 1 or 2-out-of-4 code. The standard 2-out-of-5 code is used except that the D0 channel is omitted. Which cells are to be written in and which erased depends, of course, upon which cells already have marks in them when a CP enablement occurs. The control of these alterations is partially in the various writing gates 59 associated with each writing amplifier 60 and also in the control logic circuits or gates which determine the presence of conditions for writing and erasing in these channels. The general condition for writing in a last digit assembled or D-cell is the simultaneous occurrence of a completed pulse output, CP, a special prior condition of the D-channels, and nothing priorly written in the particular D-channel in which the information is to be written. Thus D1 is written when there is a completed pulse and nothing in D1 and either nothing in the D2 channel or nothing in both D4 and D7. D2 is written when there is nothing in D2 and something in D1. D4 is written when there is nothing in D4 and something in either D1 or D7 and something in D2. And D7 is written when there is something in D2 and D4 and nothing in D7. Similarly a channel is erased when there is something in the channel to be erased, a complete pulse CP, and a special condition of the channels. Erasure can also occur under control of an erase pulse, ED. The special condition for erasures are: for erasure of D1, something in D1; for reasure of D2, something in D1 or D4 or D7 and something in D2; and for erasure of D4, something in D2 and D4. The D7 channel can only be erased by an ED pulse.

At the end of the train of dial pulses constituting a single digit, the off-hook continued output OHC, of the dial control matrix 54 is present for the several drum revolutions during which the subscriber is preparing to dial the next digit. During this interval a fine timing circuit including fine timing channels FT1, FT2 and FT4 on drum 40 is enabled which counts seven revolutions of the drum as an indication that an interdigital interval has elapsed. If a line-open condition occurs before the completion of this timing cycle the timing circuit is reset. Such a partial timing cycle will occur with slow dials in which a long dial pulse closure may start the timing cycle. The presence of some registration in the D-cells is indicated by the output of the DR gate circuit 63, shown on Fig. 5, which is energized wherever an output is present in any of the D-channels. The simultaneous occurrence of a gate circuit output DR and an OHC pulse on an originating call produces a fine timing enablement pulse FTE at the output of the fine timing enabling gate 64, seen on Fig. 4. The FTE pulse is combined with the voltage conditions indicating the presence or absence of marks in the FT1, FT2 and FT4 fine timing channels of the line drum 40 to control the writing of marks in these channels. In addition, since the FT1, FT2 and FT4 channels are used to count seven revolutions in a binary scale, the off-hook continued condition is combined on each revolution with the present count in these timing channels to erase as required by the binary scale. Erasure of all accumulated timing marks takes place when the dialed digit is removed from the D-channels to other storage. This occurs when a pulse ED from erase D gate 65 appears on the erase D lead 66, seen in Fig. 6, after the completion of the timing cycle. Erasure of all timing marks also takes place immediately upon premature interruption of the timing cycle as indicated by the occurrence of a pulse on the hang-up indicated lead as mentioned above. When seven revolutions of the off-hook continued condition have elapsed, the simultaneous occurrence of a pulse in the FT1, FT2 and FT4 channels produces an interdigit time pulse IDT at the output of the Interdigital Time gate 67 on Fig. 4. This IDT pulse causes the digit accumulated in the D-cells to be recorded in other storage cells A and B along the same line slot, so that the D-cells can be cleared for subsequent dial accumulation, as described above, or causes the writing of the call progress mark Spill Out which initiates action on the call by the Dialed Information Dispatcher circuit 20, as further described below.

The first digit dialed by a subscriber is transferred to a group of A-cells in the line slot with two exceptions, the second digit to a group of B-cells and the third and subsequent digits remain stored in the D-cells until removed to the Dialed Information Dispatcher circuit. In accordance with usual telephone system design an initial digit "1" which may be inadvertently dialed in the removal of the handset from the telephone cradle is discarded. In this circuit any number of initial digit ones are thus absorbed. The other exception to transferring the first digit to the A group of cells occurs when the first digit dialed is zero. Selection of or steering to the A- or B-channels when the dialed digits are transferred from the D-cells to these channels, is under the control of the A-Registered OR gate 69 and the B-Registered OR gate 74, seen on Fig. 6. The A-Registered gate produces an output pulse AR whenever there is a registration in any of the A-cells of a slot, and the B-Registered gate whenever there is a registration in any of the B-cells. Furthermore, when a dialed digit is recorded in A- or B-cells, the storage code is amended to provide a true 2-out-of-5 code by recording a mark in the A0 or B0 cell as necessary.

This translation to provide a true 2-out-of-5 code is accomplished by a D-zero diode matrix 71. The read outputs of the D-channels are connected to this matrix 71 and a pulse I1 appears on the one output lead if there is a mark recorded in only the D1 cell. In addition, another output 72 of the matrix is energized if there is a mark in one and only one of the four D1 to D7 cells. The detected one output of the D0 matrix is connected to an initial 1 gate 73. An output pulse is produced by the initial 1 gate 73 only if a dialed one is detected at the time of an interdigit time pulse, and no recording is present in the A-cells and no recording is present in the Not-Office Code call progress cell.

A master enabling pulse WA is transmitted to all the A writing gates from a write A gate 75 upon the occurrence of an IDT pulse provided that there is no initial 1 pulse, no registration already in the A cells and neither an NOC call progress mark registered nor the digit "zero" registered in the D-cells. A "zero" registered in the D-cells is detected by the (D4+D7) gate 76 on Fig. 5. The output (D4 and D7) of this gate is connected to block A and B gate 77 so that a BAB output pulse from this gate 77 is generated if either D4 and D7 are registered or an NOC mark is registered. The output of the BAB gate 77 is transmitted in turn to an inverter 78 to produce the required disablement of the write A gate 75. The write A pulse WA is combined with the read output from the D-cells and with the D0 output of the D-zero matrix 71 to cause a repetition in the A-cells of the record in the D-cells with the shift to true 2-out-of-5 code. In a similar manner a master enabling pulse WB is transmitted to all the B writing gates from a write B gate 80, seen in Fig. 6, upon the occurrence of an IDT pulse provided that there is a registration already in the A-cells, no registration in the B-cells and neither an NOC mark registered nor a "zero" registered in the D-cells. The write B pulse WB is combined with the read output from the D-cells and with the D0 output of the D-zero matrix 71 to cause this latest digit to be recorded in the B-cells. Whenever an output pulse is generated by the write A or write B gates 75 and 80, it passes through the erase D1 gate 81 to the erase D gate 65. An output pulse is produced by the erase D gate 65 whenever any of four input pulses are applied, including the write A or write B outputs of the erase D1 gate 81 and the initial one pulse I1. The erase D output pulse ED causes the erasure of the D and FT cells.

The call progress mark which causes seizure of the Dialed Information Dispatcher 70 is Spill-Out, SO. This mark is written under control of the spill-out diode matrix 84, seen in Fig. 4, which produces an output pulse when any of four input combinations occur. If the first digit dialed by a subscriber is "zero," Spill-Out must be written since the call is to be routed to an operator without further dialing. If A-Registered and B-Registered pulses AR and BR are both present, the occurrence of an interdigit time pulse IDT indicates that the last digit of a called office code has been registered and Spill-Out must be written to cause the selection of a trunk to this office. If a Not-Office-Code progress mark is present indicating that a trunk has already been selected for the call, the occurrence of an IDT pulse indicates that a called line number digit has been registered and Spill-Out must be written to cause transfer of this digit to the trunk drum. The occurrence of a read pulse CT2 from the reading amplifier of a coarse timing channel CT2 together with a hang-up indicated pulse, indicates that a timing cycle for hang-up of the calling subscriber has been completed. If a Not-Office-Code progress mark is also present, Spill-Out must be written to cause dismissal and clearing of the trunk previously selected for the call.

As described above, the first three digits dialed by a subscriber are recorded in the A, B and D groups of cells and a spill-out call progress mark is written at this time. These three digits are then registered under control of the spill-out mark in the Dialed Information Dispatcher circuit 70, described below, which writes Not-Office-Code and transmits Office Code Removed, OCR, and Information Removed, IR, pulses to this circuit, these pulses being seen in Figs. 3 and 6, respectively. The IR pulse passes through the erase D gate 65 producing an erase D pulse ED which erases the D and FT groups of cells. The OCR pulse passes through the coarse timing matrix 88 to produce an EC2 pulse. The EC2 pulse not only reinforces the erase D pulse ED, but also erases the A and B register groups of cells and the DC1, DC2 dial control channels. The line drum slot is now prepared for accumulating the dialed digits of the directory number of the called line.

The dialed digits of the called directory number are accumulated in the D cells in the same manner as the digits of the office code. However, after each digit, the occurrence of an IDT pulse with a Not-Office-Code progress mark present causes the spill-out progress mark to be written. The single digit is then registered in the Dialed Information Dispatcher circuit directly from the D-cells. The Dialed Information Dispatcher circuit transmits an IR pulse to this circuit each time it registers such a digit, and the IR pulse again clears the D and FT cells through the erase D gate 65 as previously described.

If the first digit dialed by a subscriber is a zero-operator's code, the digit is not transferred to the A group of cells but remains in the D group and a spill-out progress mark is written in the following interdigital interval as previously described. This information is registered in turn in the Dialed Information Dispatcher 70 in a manner similar to a complete three-digit office code. However, in this case the inverted output of the block A and B gate 77 in this circuit also transmits a pulse to the Dialed Information Dispatcher 70 so that it will function properly and return the office code registered and Information removed pulses as though a three-digit office code has been dialed.

The coarse timing channels CT1 and CT2 on the line drum 40 are utilized in the timing circuit 58 as described in the above-mentioned application Serial No. 340,472, filed March 5, 1953, of W. A. Malthaner for timing permanent signal conditions before the office code has been dialed and for timing a different interval after the hang-up of a called subscriber. If a subscriber removes his handset from the telephone cradle and then does not dial, or if an accidental short-circuit on the subscriber's line simulates such a removal, the OHC output of the Dial Control matrix 54 will be generated repetitively in the subscriber's time slot. This OHC pulse is transmitted through a permanent signal indicated gate 89 as a pulse PSI, provided that the busy, not office code and D-cells on the line drum 40 are all unmarked. The absence of a pulse BSY on the output from the busy cell is required to prevent permanent signal timing on a called line during the conversational period; and in order to prevent timing when a calling subscriber is dialing the office code, the absence of an output from a D-cell is made a condition for the transmission of the OHC pulse. Assuring that there is no output from the Not Office Code progress mark cell prevents timing after the office code has been dialed since this circuit has no subsequent information as to the completion of the dialing. The pulses PSI are combined with a periodically applied voltage in a permanent signal enablement gate 90 to produce an enabling pulse PSE which passes through an OR gate 91 and provides the timing enablement pulse of the above-identified Malthaner application. In a similar manner periodic pulses of exactly one revolution of the line drum are applied to a hang-up timer enabling gate 92. When subscribers either called or calling hang up the HUI output of the dial control matrix 54 is combined with these voltages in the gate 92 to produce hang-up enablement pulses HUE which also pass through the OR gate 91 to provide enabling pulses for the timing circuit.

The presence of a mark in the CT2 cell after the timing period, as further explained in the above-mentioned Malthaner application, indicates that the coarse timing period has elapsed with the condition still present. Thus an output from the CT2 cell with an HUI signal indicates the completion of the timing of the hang-up period and with a PSI signal indicates permanent signal timing complete. A permanent signal timing condition causes the trouble mark to be written in the TRB cell of drum 40 which will in turn operate alarm circuits. The completion of timing of a hang-up condition starts the action required to erase the call information on the line drum and any originating call information accumulated on the trunk drum 42. If there is any originating call information recorded on the trunk drum, an NOC mark will be present on the line drum 40. This NOC mark, together with the hang-up timing completed pulse CT2, causes SO to be written as previously described. The Dialed Information Dispatcher in responding to this SO mark erases it and the NOC mark. With SO and NOC both erased, the hang-up timing completed condition produces an output pulse on the EC1 and EC2 leads of the ETC matrix 85. The pulse EC1 causes the erasure of the mark in CT1 and the pulse EC2 causes the erasure of any marks in the A, B, D, DC1, DC2, BSY and CT2 cells.

The EC1 pulse is also generated by the ETC matrix if the coarse timing cycle has not been completed, i. e., CT2 has not been written, when the output of the Dial Control matrix 54 changes from HUI to DC2 or from OHC to CP. The EC1 and EC2 operations clear the line drum slot associated with the particular subscriber so that he may originate or receive a new call.

*Selection and assignment of outgoing trunk*

As discussed above under Accumulation of Office Code, a Spill-Out call progress mark is written on completion of the dialing of the office code. The Spill-Out mark when read on a subsequent revolution of the line drum 40 causes the dialed digits accumulated in the A-, B- and latest digit or D-channels to be registered on vacuum tube toggles circuits in the Dialed Information Dispatcher circuit 70, described in detail below with reference to the detailed schematic representation in Figs. 11–15 of one specific illustrative embodiment. At the same time other information permanently recorded in certain slots on the line drum 40 giving the line equipment number, LEN, and the class of service, CS, to which this calling subscriber is entitled is read from the line drum 40 and registered in the Dispatcher circuit 70. Each of these information items is advantageously recorded and registered in a checkable code, e. g., an *x*-out-of-*n* code, and a check is advantageously made of each item of information before it is registered in the Dispatcher circuit 70. The checking circuits may advantageously be of the types described in Patent 2,675,538, issued April 13, 1954, to W. A. Malthaner and D. H. Ring and in Patent No. 2,675,539, issued April 13, 1954, to J. H. McGuigan. As a result of an indication from the check circuit that the checked information is in possible and proper form, the information is held in the dispatcher circuit 70 and a select out-trunk toggle order register is operated which indicates to the Out-Trunk Selector circuit 95 that a trunk is to be selected and assigned. As one out-trunk 42 and switching network 49 may advantageously be utilized by a number of line drums 40 and subscriber lines 43 assigned thereto, a lock-out connecting circuit 96 is advantageously placed between the Dialed Information Dispatcher circuit 70 and the Out-Trunk Selector circuit 75. Lock-out circuit 96 advantageously includes gates through which the information in the various Dialed Information Dispatcher circuits 70 must pass to the Out-Trunk Selector circuit 95 or the Called Number Assembler circuit 98, a group of such gates being assigned each Dialed Information Dispatcher circuit 70. Which group of gates is enabled will depend on the action of the lock-out circuit in response to the control signals applied thereto.

When the digits accumulated in the A-, B- and D-channels had been registered in the Dialed Information Dispatcher circuit 70, the A-, B- and D-channels and the Spill-Out call progress mark are erased from the line drum 40 and a Not Office Code, NOC, call progress mark is recorded. This call progress mark, as its name indicates, informs the Dialing Assembler circuit 51 that subsequent digits dialed on this line are part of a called line directory number, LDN, and not part of an office code. Advantageously during the interval that the Dispatcher circuit 70 is busy with one call, its input leads from the associated line drum 40 are blocked to prevent changes or mutilation of the registered information by other waiting calls. This busy interval per call, in one specific illustrative embodiment, averaged about eight milliseconds.

In each slot of the trunk drum, the office code, class of service, trunk equipment number, and other classifying and identifying information regarding the trunk 47 assigned to the slot are permanently recorded. The information concerning the office code and the class of service as read from successive slots on the trunk drum 42 are compared with the static office code and class of service information registered in the Dialed Information Dispatcher circuit by match circuits which may advantageously be of the types described below with reference to Fig. 71. These match circuits are enabled by the Select Out-Trunk order registered in the Dialed Iinformation Dispatcher 70. When an idle out-trunk having the office code and class of service desired passed under the reading heads of the trunk drum 42, an output pulse from the match circuit causes a busy mark to be recorded on this trunk slot along with the line equipment number of the calling line. The Dialed Information Dispatcher circuit 70 is then reset.

If all the trunks of the desired code are busy or if there is no code corresponding to the one registered in the Dialed Information Dispatcher, the line is assigned to a trunk slot corresponding to an idle overflow trunk and a call progress mark, Dialing Complete, is written at the same time. These trunks when connected through the switching network to the subscriber inform him, by means of a characteristic tone as is known in the art, that the desired connection is not at present available. If the trunk selected corresponds to the dialed code but is a special trunk, such as a trunk to the zero operator, which does not require the dialing of directory number digits the Dialing Complete mark is written at the same time that the trunk is selected at the trunk drum 42.

*Accumulation of dialed line number*

Meanwhile the Dialing Assembler circuit 51 may be proceeding with the accumulation of the first digit of the called line director number for this subscriber as well as attending to dialing registration for all the other lines 43 assigned to its line drum 40. When the first digit of the called line directory number has been accumulated in the D-channels, as described above for the office code digits, and the subsequent interdigital interval has been detected, the presence of the Not Office Code call progress mark on the line drum 40 causes the Spill-Out call progress mark to be written again and the digit is held in the D-register channels. The presence of the Spill-Out mark at the output of its reading amplifier again enables the Dialed Information Dispatcher circuit 70, but since the Not Office Code call progress mark is also present only this latest digit and the calling line equipment number are registered. This information is also checked and an output from the check circuit results in the operation of a toggle order register, Line Number, which indicates that a called directory number is to be stored on an assigned slot of the trunk drum 42 and the Spill-Out mark and D-channels of the line drum 40 are erased. This process is repeated for each digit of the called subscriber's directory number.

As is apparent from the above description of the operation of one specific embodiment of this invention, call progress marks are utilized in accordance with this invention so that the equipment knows and can keep track at all times of the rapid progress of the system in setting up the desired connections. Thus the Spill-Out call progress mark, the Not Office Code call progress mark, and others to be described below illustrate applications of one advantageous feature of this invention.

*Illustrative embodiment of dialed information dispatcher*

Turning now to Figs. 11–15, there is depicted one specific illustrative embodiment of a Dialed Information Dispatcher circuit 70 employable in a system in accordance with this invention. This circuit, which has been described briefly above and will now be described in considerably greater detail with reference to Figs. 11–15, reads and registers from a line drum 40 information and orders which must be transmitted to a trunk drum 42 on originating calls. It supplies these information items and orders through the lock-out circuit 96 to one of two circuits, the out-trunk selector circuit 95 and the called number assembler circuit 98, associated with the trunk drum as determined by the order. The three functions with which it is concerned are the selection of an outgoing trunk circuit when a calling subscriber has finished dialing an office code, the transmittal of called line director number digits, one-digit-at-a-time, as the subscriber finishes dialing each one to the previously selected outgoing trunk, and the transmittal of a trunk clearing order to the selected trunk when the calling subscriber hangs up.

Each usage of this circuit 70 is initiated by the Spill-Out call progress mark SO which the Dialing Assembler circuit has written for this purpose in the cell assigned to this subscriber in the SO channel on the line drum 40. In the description of the Dialed Information Dispatcher 70 below and in the drawing certain elements common to this circuit and to the dialing assembler circuit 51 are described, such as the spill-out channel on the line drum 40. It is to be understood that these elements have been included in this circuit for purposes of clarity and so that this circuit can be described as an entity without innumerable cross-references to other circuits, and thus these elements are identical with those described above. Such elements include particularly certain channels on the line drum 40 and the reading amplifiers therefor, both the channels and the amplifiers being those described above with reference to the digit assembler circuit 51; thus only one read-write head and reading amplifier is employed, though they are separately shown in both circuits.

Figure 14:
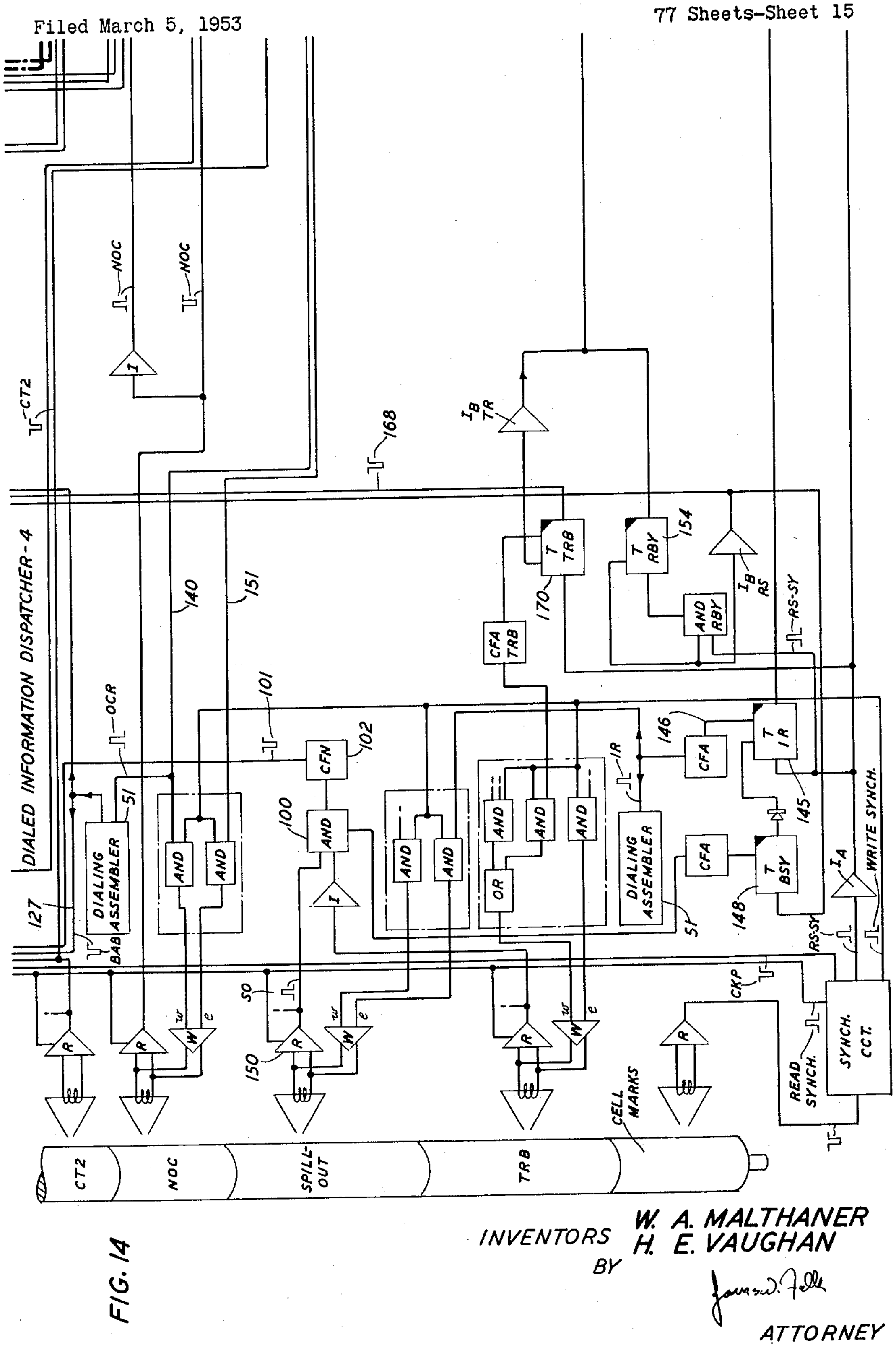
Figure 15:
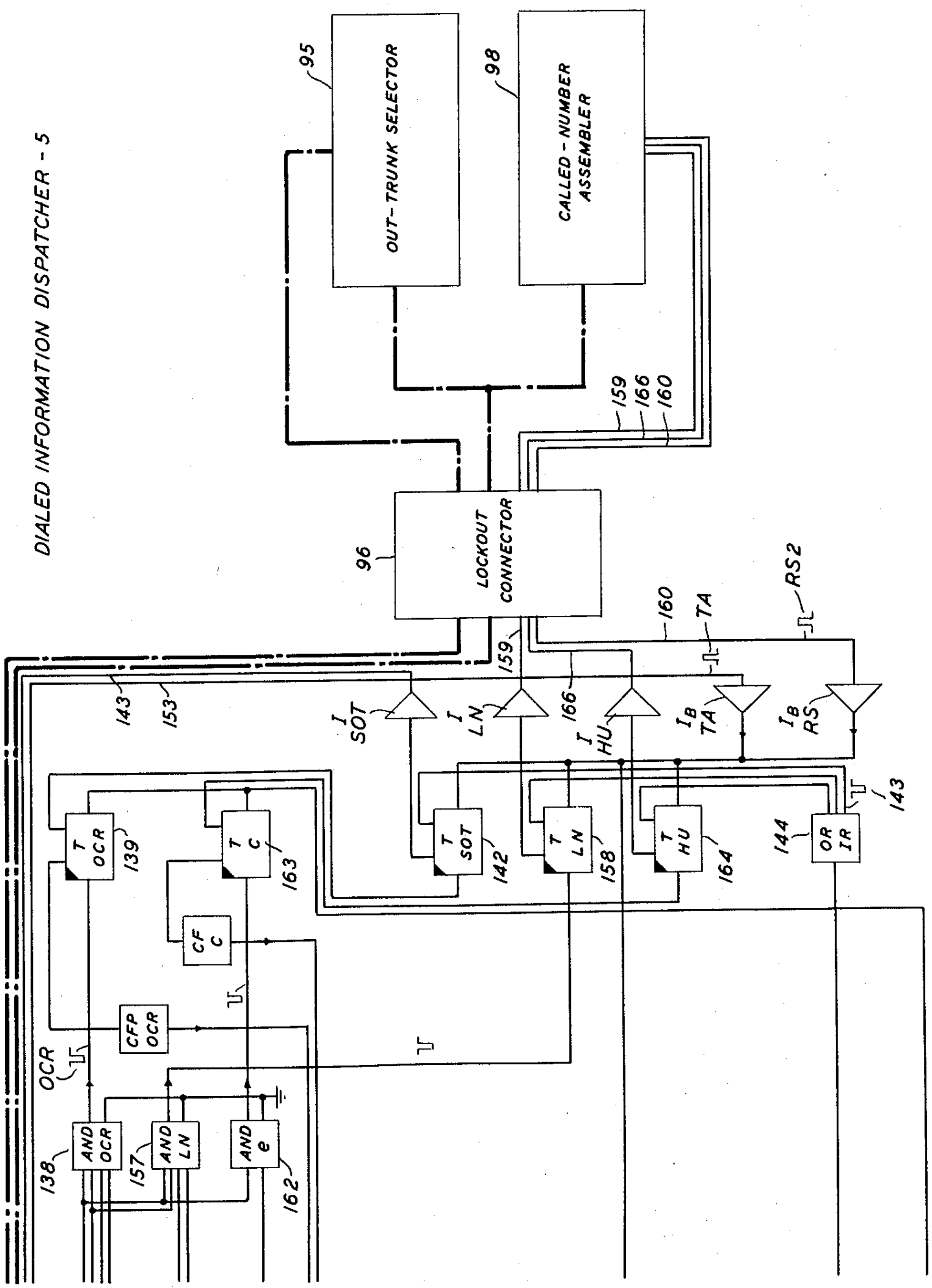
Figure 16:
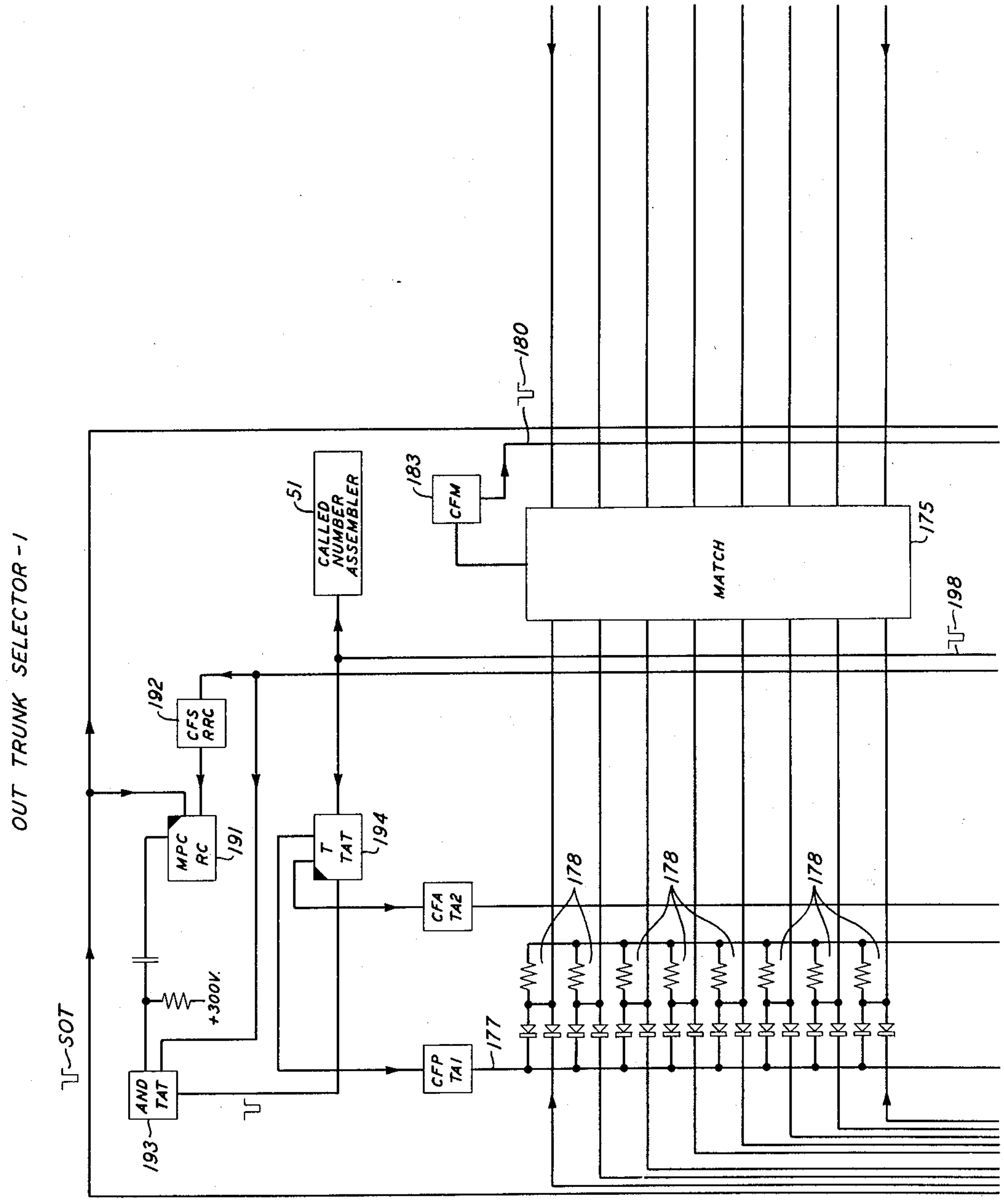
Figure 17:
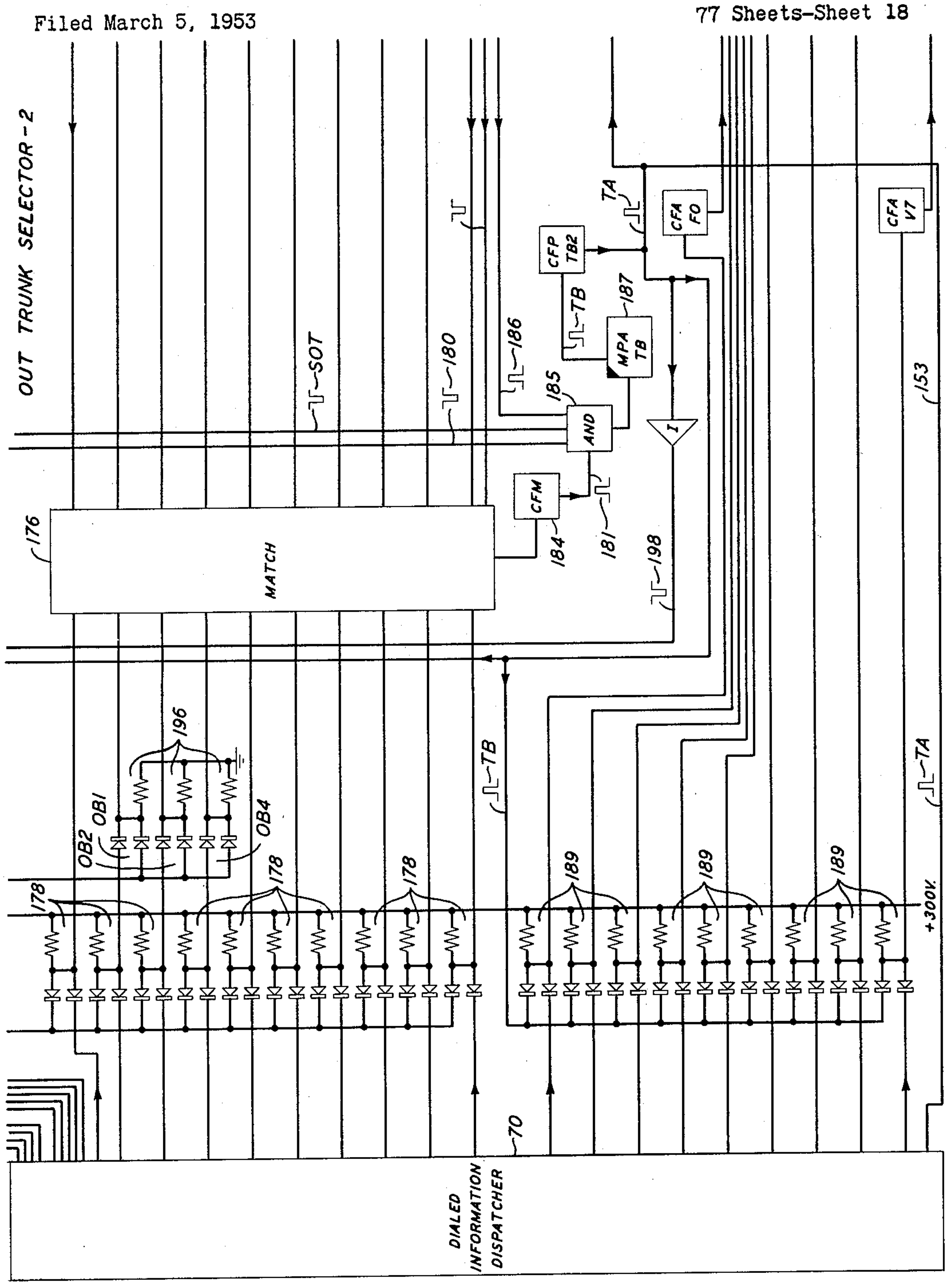
Figure 18:
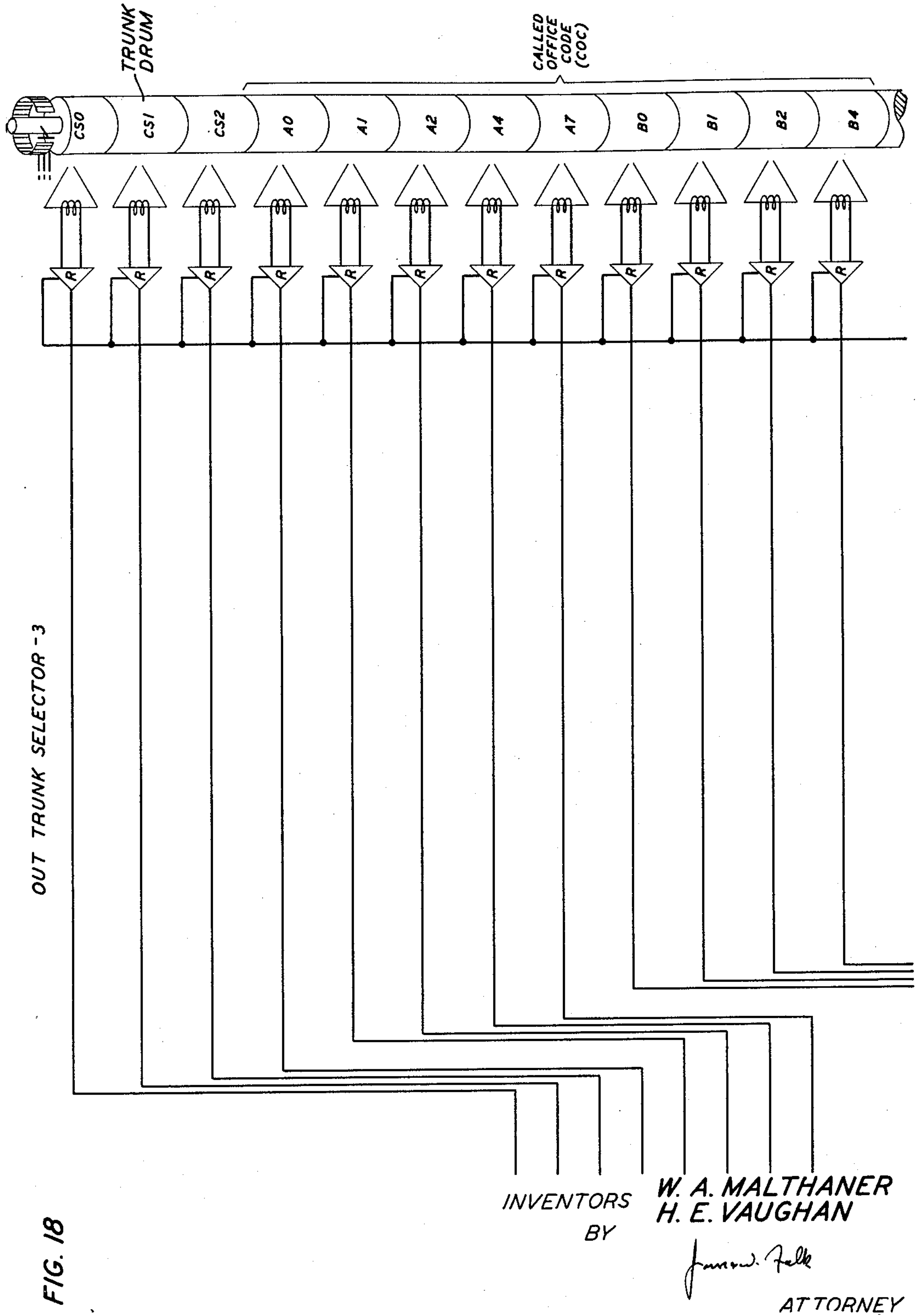
Figure 19:
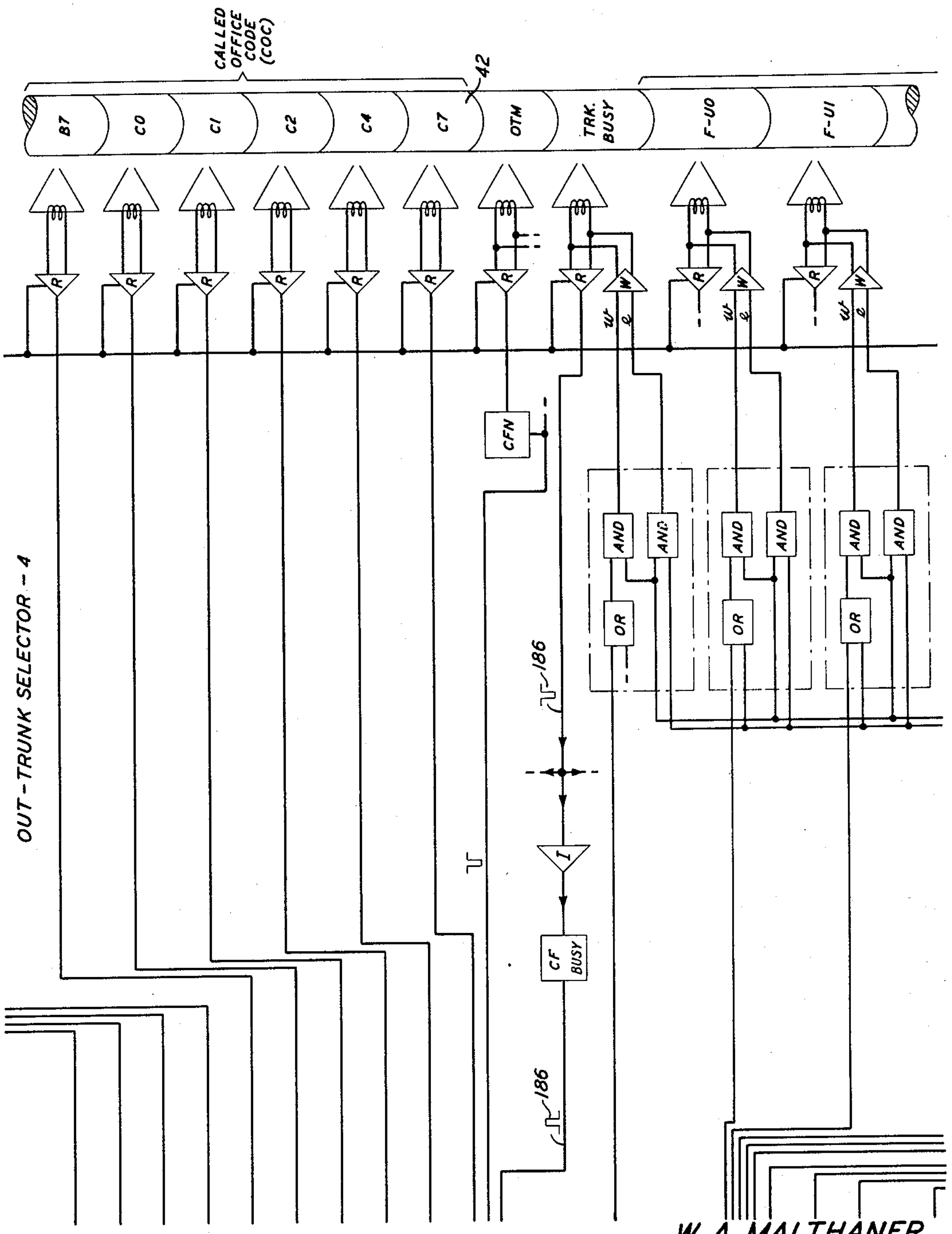
Figure 20:
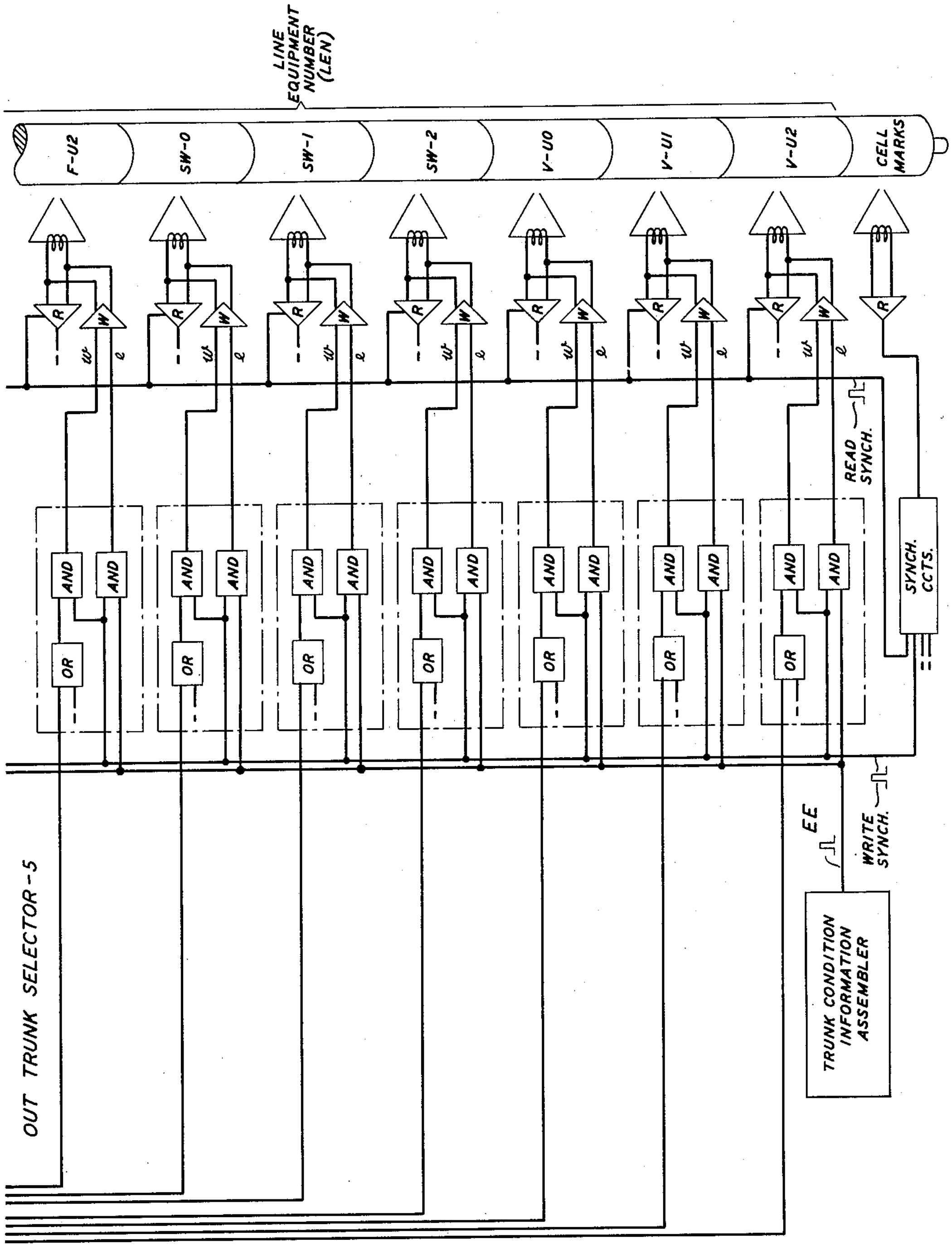
Figure 21:
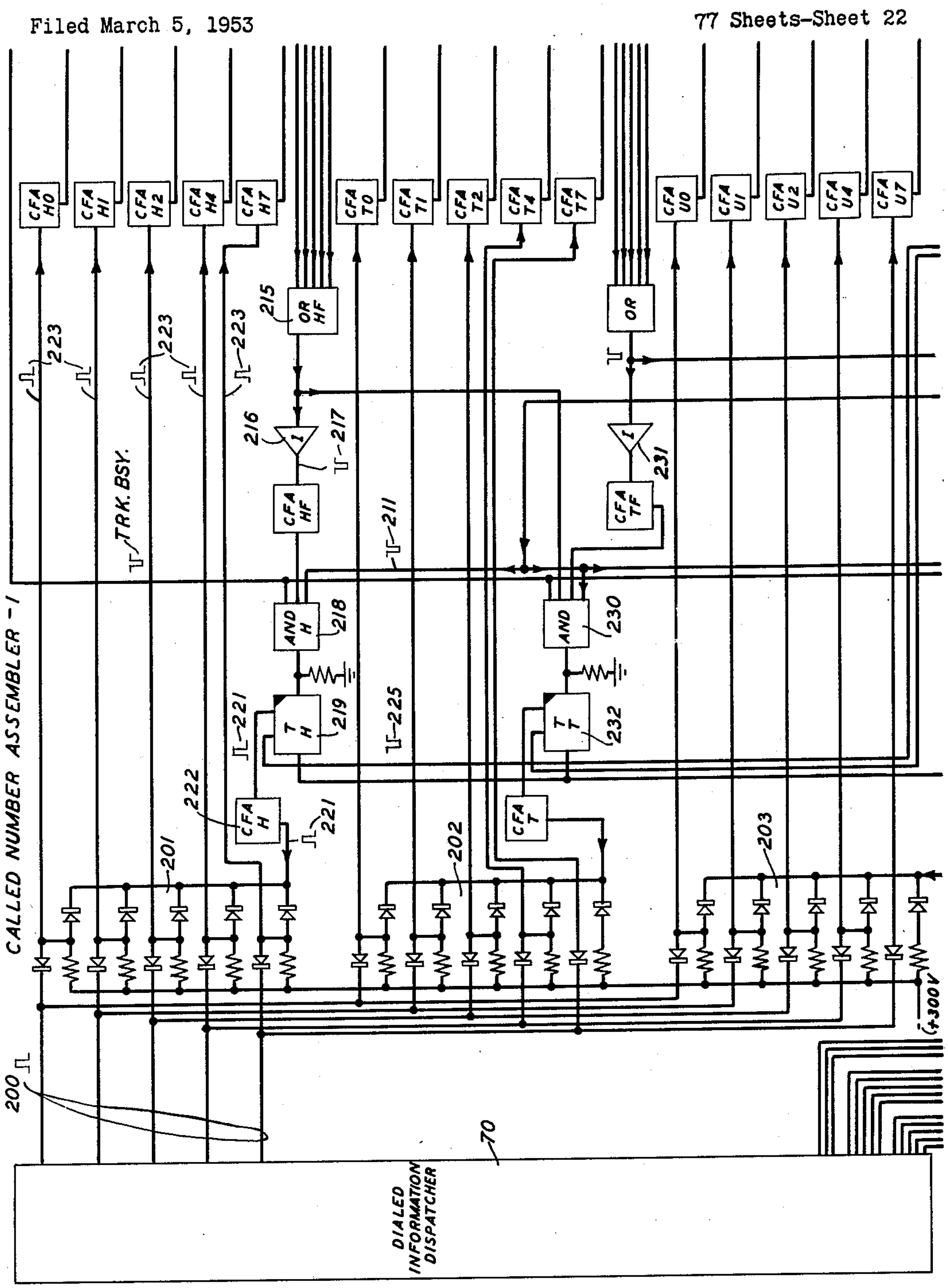
Figure 22:
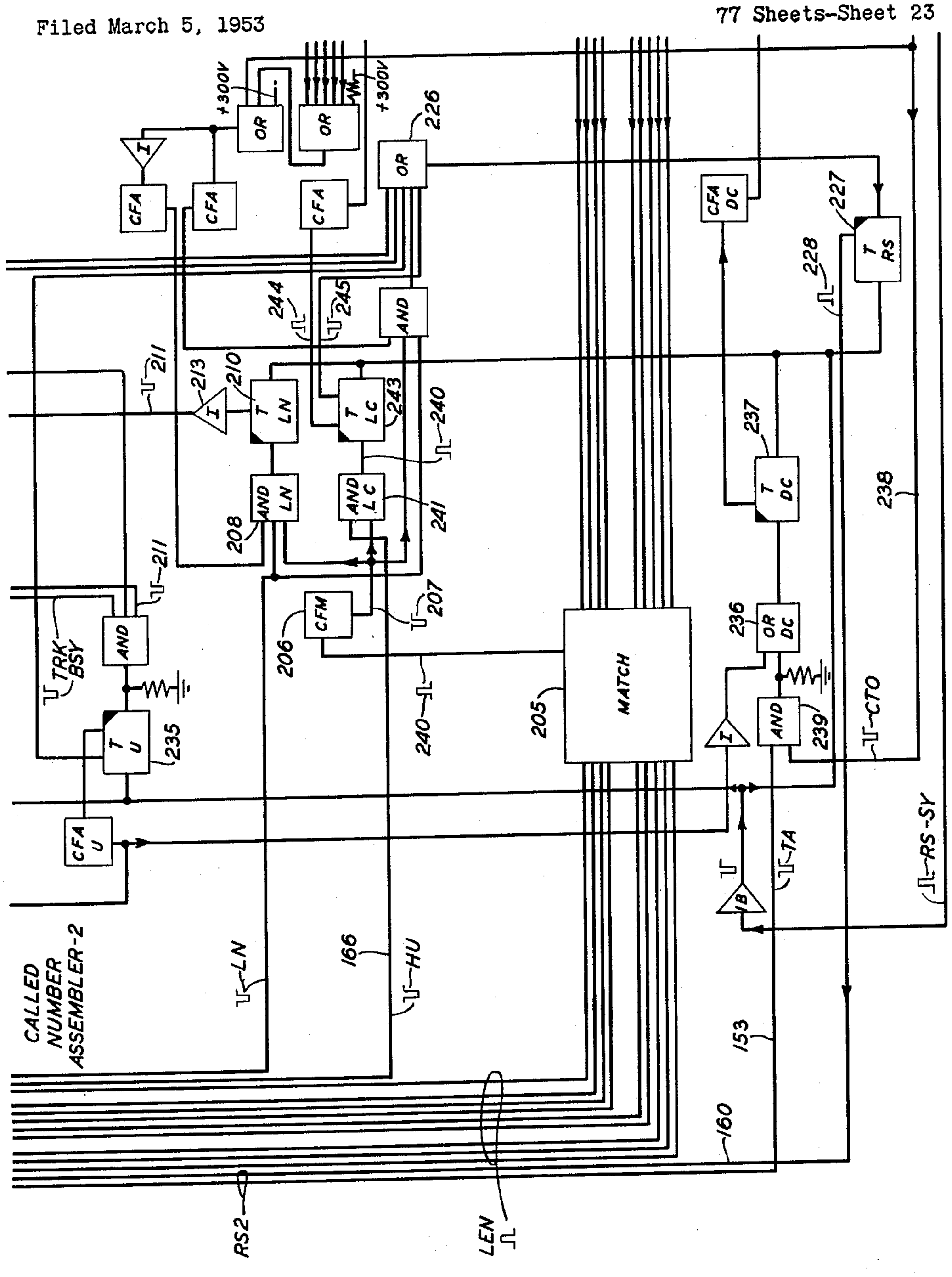
Figure 23:
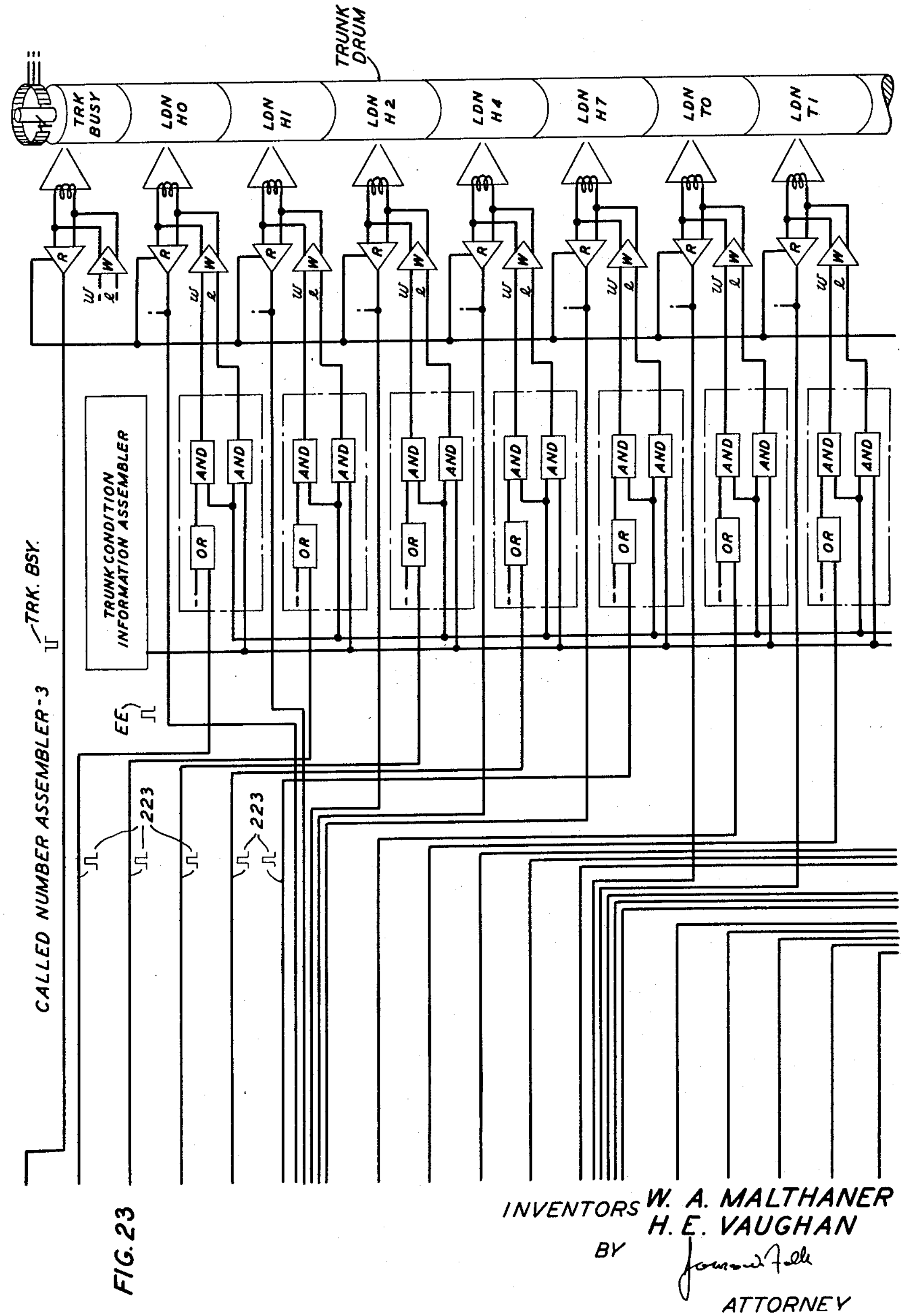
Figure 24:
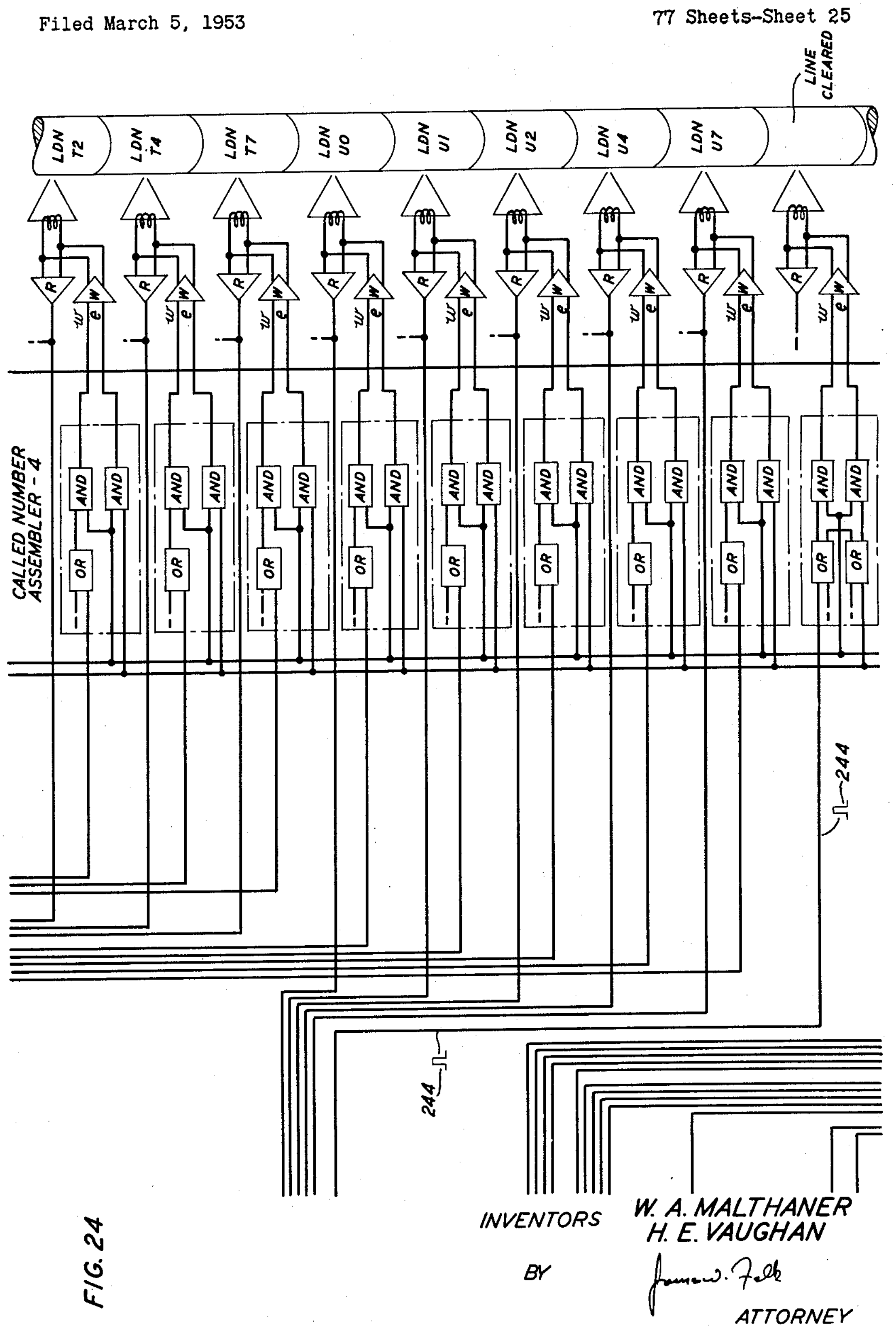

When a subscriber has finished dialing a three-digit office code, the SO pulse read from the spill-out channel in the absence of a trouble mark in the trouble or TRB channel on the drum 40 produces an output pulse 101 at the AND circuit 100, seen in Fig. 14, if the dialed information dispatcher circuit is idle. Pulse 101, after passing through a cathode-follower circuit of the CFN type which may advantageously be of the type described in application Serial No. 322,991, filed November 28, 1952, of W. A. Malthaner, is applied to several other gate circuits in this circuit. Pulse 101 enables the line equipment number gates 105, seen in Figs. 11 and 12, so that the line equipment number of the calling line as transmitted from the corresponding line drum reading amplifiers is registered on vacuum tube toggles 106 of this circuit. The line equipment number, as described above, advantageously designates the frame number, a switch number, and a vertical number and is permanently assigned to a subscriber, i. e., to a line directory number, when the office is set up or that subscriber connected to it. This number is therefore advantageously permanently placed in the line equipment number channels on the line drum 40; no writing amplifiers are required as the number is not erased or written as long as that subscriber is connected to this office. On the occasion of the writing of the line equipment number in the slot of the subscriber when he first is connected into the office, and similarly on the occasion of the erasure of this permanent information, the reading head may be employed.

Pulse 101 is also combined in the equipment check gate 108 with the train of synchronized check pulses CKP from the synchronizing circuit seen in Fig. 14 and which appear on the check pulse lead 109 to produce a check pulse EK. The line equipment number toggles 106 are connected to a check circuit 111, which may advantageously be of the types described in Patent 2,675,538, issued to W. A. Malthaner and D. H. Ring and in Patent 2,675,539, issued April 13, 1954, to J. H. McGuigan. The check pulse EK when applied to this check circuit 111 produces an OK output pulse 113 if the registered items of the Line Equipment Number conform to their checkable code or produces an NG output pulse 114 if the items do not conform to their checkable code. Pulse 101 connects to the D AND gate 116, Fig. 12, and an output pulse D is produced if there is no read output pulse in the CT2 channel, shown on Fig. 14. The D pulse enables gates 117 so that the third digit of the called office code is received from the line drum 40 and registered on vacuum tube toggles 118. The D pulse is also combined in the check D gate 120 with the check pulses CKP to produce a check D pulse DK. The check D pulse DK when applied to the D-digit check circuit 122, which is advantageously of the types of the above-mentioned applications, also produces an OK or NG output, 123 or 124, respectively, indicating whether or not this digit as registered conforms to the checkable code.

Figure 12:
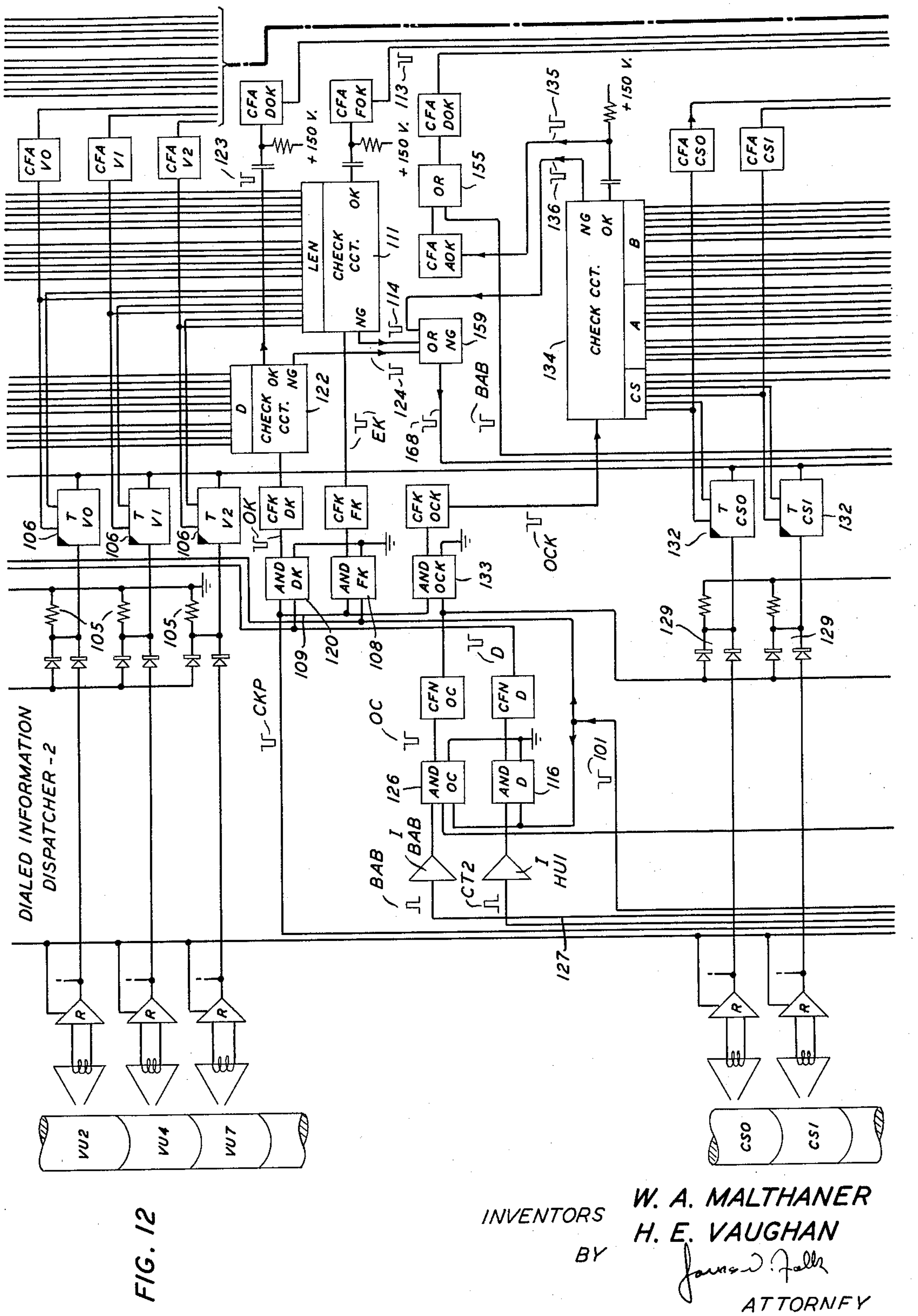
Figure 13:
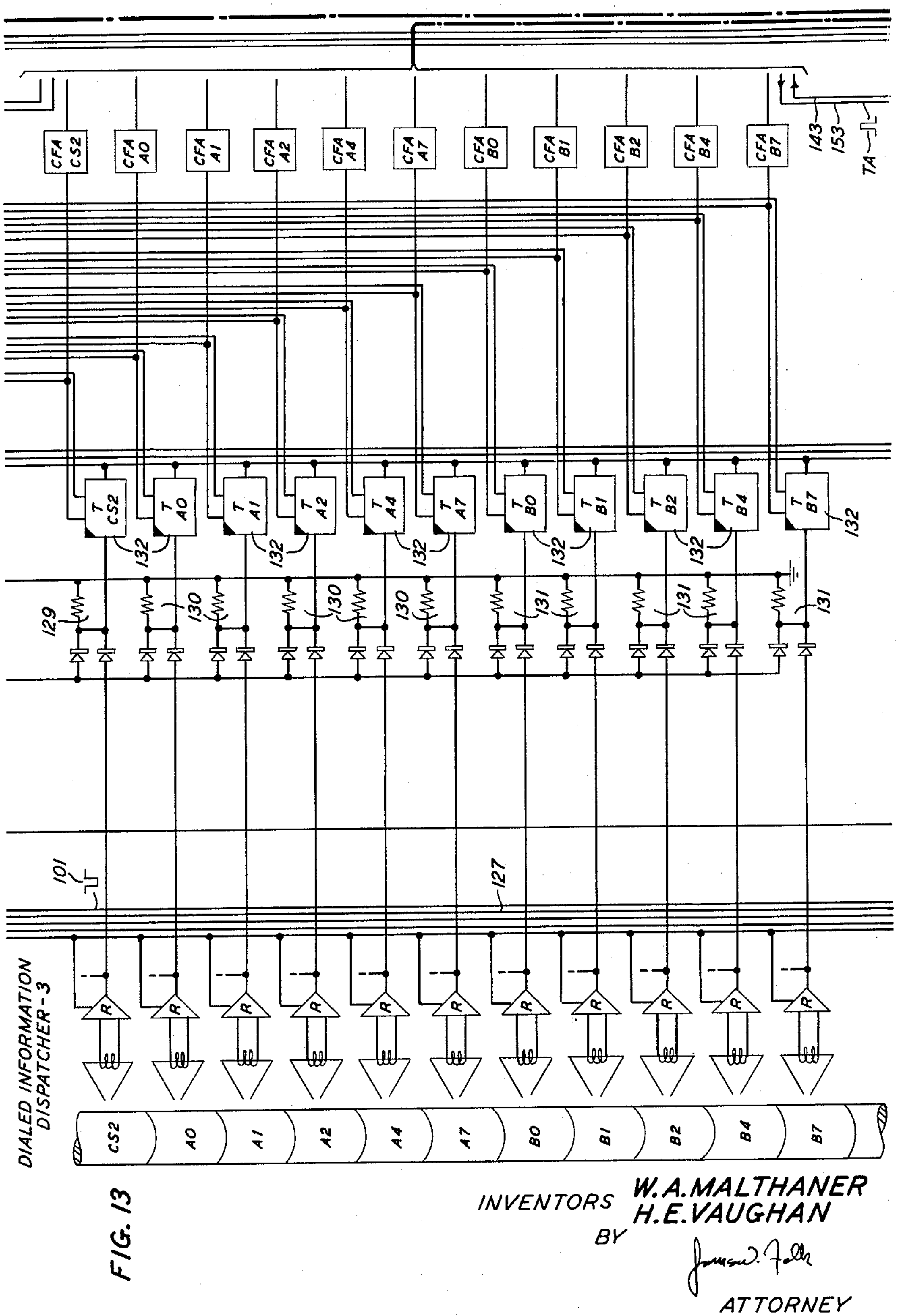

Pulse 101 also connects to the office code gate 126, Fig. 12, and an OC output pulse is produced if there is no output pulse in the CT2 channel and no pulse BAB on the block A and B lead 127. Pulse OC enables the class of service gates 129, the A gates 130 and the B gates 131 so that the class of service of the calling line and the first two digits of the called office code are received from the line drum and registered on vacuum tube toggles 132. The OC pulse is also combined in the check DC gate 133 with the check pulses CKP to produce an office code check pulse OCK. The office code check pulse OCK when applied to a third check circuit 134, of the type described above, produces another OK output 135 or NG output 136, indicating whether or not the information from the class of service, A- and B-channels, as registered, conforms to the checkable code.

If an OK output pulse is produced by each of the check circuits 111, 122, 134 and there is no mark in the Not Office Code cell of the calling line, an output pulse OCR is produced by the office code received gate 138, seen on Fig. 14, which operates the office code received toggle 139. The operated toggle 139 energizes the office code received lead 140 to the Dialing Assembler circuit 51 to cause the erasure of the information stored in the A- and B-channels among others as described above, and also energizes the *w*(NOC) lead to write this call progress mark. The operation of the OCR toggle 139 also operates the select out trunk toggle 142. The operation of the SOT toggle 142 transmits a pulse 143 through an OR gate 144 to operate the information received toggle 145. The IR toggle 145 energizes the IR lead 146 to the Dialing Assembler circuit 51 to cause the erasure of the information stored in the D-cells, as described above. It also erases the mark in the spill-out cells and operates the busy toggle 148. The busy toggle 148 supplies a disablement voltage to gate 100 thereby preventing the recognition of any subsequent pulses from the spill-out reading amplifier 150. The OCR and IR toggles 139 and 145, respectively, are reset by the next pulse in the synchronized train of reset pulses RS—SY on the reset synchronous lead to insure that the office code received, write not office code, and IR output leads 140, 151 and 146, respectively, are energized only during the write-interval of the particular line drum slot being served. All the operations of this circuit so far described take place within a single read-write interval of the line drum 40.

Voltage is transmitted from the select out-trunk toggle 142 over the SOT lead 143 to the Out-Trunk Selector circuit 98 associated with the trunk drum. This SOT voltage causes the Out-Trunk Selector circuit 98 to assign an idle trunk 47 to the calling subscriber. The Out-Trunk Selector 98 writes the line equipment number of the calling subscriber in the assigned trunk slot for subsequent identification and returns a pulse TA to this circuit on the trunk assigned lead 153. This pulse TA on the lead 153 resets the SOT toggle 142 and operates the reset busy toggle 154. The next reset sync pulse RS—SY resets the reset busy toggle 154 which in turn resets all of the operated A-, B- and D-digit, class of service, the line equipment number toggles 106, 118 and 132 and the busy toggle 148, thereby restoring this circuit to its normal idle condition. The reset sync pulse RS—SY is employed in this latter reset to insure that there will be small interval of time for all the toggles to stabilize before inputs from reading amplifiers are readmitted to reoperate the toggles in a new data pattern.

If the first digit dialed by a subscriber is "zero" requiring immediate assignment of a trunk to an operator, the operation of this circuit is substantially as described above. However, in this case, there is a BAB pulse so that the operation of the office code gate 126 is inhibited. Data is stored only in the LEN toggles 106 and the D4 and D7 toggles 118. No output is produced by check circuit 134 which would check the class assigned, the A-digit and the B-digit data. The BAB pulse replaces the missing OK output pulse from check circuit 134 through an OR circuit 155 at the office code received gate 138 so that an OCR pulse is produced. The OCR pulse results in the momentary operation of the OCR and IR toggles 139 and 145, respectively, and the lengthier operation of the SOT and BSY toggles 142 and 148, respectively, as before. The subsequent reception of a TA pulse on the trunk assigned lead 153 when operator's trunk has been assigned results in the same resetting operations as before.

When a subscriber has finished dialing any digit of a called line directory number, the read output of Spill-Out is accompanied by a read output from the Not Office Code cell. The operations of gating the data into registrations on the toggles in this circuit and of checking these registrations are then almost the same as described above for the "zero" operator call except that the presence of an inverted pulse NOC applied to the office code received gate 138 from the Dialing Assembled circuit 51 inhibits its action. In this case the read output from the NOC cell completes the enablement of the Line Number gate 157. The output pulse from gate 157 operates the LN toggle 158. The LN toggle 158 operates the IR toggle 145 through the IR gate 144 and the IR toggle 145 in turn operates the busy toggle 148. The IR toggle 145, as before, remains operated only for the remainder of this line time-slot to cause the erasure of the spill-out mark and of the D-digit marks in the line slot while the busy toggle 148 prevents recognition of further input signals from the line drum until the data just received has been disposed of. The voltage is transmitted from the line number toggle 158 over the LN lead 159 to the called Number Assembler circuit 98 associated with the trunk drum. This LN voltage causes the Called Number Assembler circuit 98 to find the trunk previously assigned to the registered line equipment number, as described further below. The dialed digit registered in the D toggles 118 is then recorded in that slot of the trunk drum 42 and a reset pulse RS2 is returned to this circuit on lead 160. This RS2 pulse functions in the same manner as described above for the reset pulse TA to restore the circuit to its idle condition.

If a calling subscriber hangs up his phone any time after a trunk has been assigned to his line, the subsequent read output of spill-out is accompanied not only by a read output from the not office code cell but also by one from the CT2 cell. In this case both the office code gate 126 and D gates 117 are disabled by the presence of the CT2 input so that only the line equipment number data toggles 106 are operated. Also only the LEN check circuit 111 produces an output pulse. An OK output pulse 113 from this check circuit passes through gate 162, seen in Fig. 15, by virtue of the presence of the CT2 input pulse. The output of gate 162 operates toggle 163 which in turn operates the hang-up toggle 164. Hang-up toggle 164 operates the IR toggle 145 through the IR OR gate 144 and the IR toggle 145 in turn operates the busy toggle 148 as before. Also as before, the IR toggle 145 remains operated only long enough to cause the erasure of the spill-out mark in this line slot. Toggle 162, which is also reset from pulses RS—SY also remains operated only long enough to erase the associated not office code mark. With the not office code mark erased from the line drum 40, the Dialing Assembler 51 can then proceed to clear the line slot of all other remaining information pertaining only to this call.

Voltage is transmitted from the hang-up toggle 164 over lead 166 to the Called Number Assembler. The hang-up causes the Called Number Assembler 98 to find the trunk previously assigned to the registered line equipment number. The fact that a hang-up condition has been recognized by the line drum 40 for this call is then recorded in that slot of the trunk drum 42 and a reset pulse RS2 is returned to this circuit on lead 160. The same actions to restore this circuit to its idle condition result from this RS2 pulse as described above in the functions for a dialed digit of a called line directory number.

In any of the above-operations of the circuit to select a trunk to route a directory number to this trunk or to order the clearing of this trunk, an error in the registration of necessary data on the toggle circuits results in an NG output pulse from the associated check circuit. An NG output pulse from any of the check circuits 111, 122 or 134 produces a pulse 168 at the output of the check NG OR gate 159, seen in Fig. 12, which operates the trouble toggle 170, seen in Fig. 14. The trouble toggle 170, reset by RS—SY pulses, remains operated only long enough to write a mark in the TRB cell of this line. The presence of this TRB mark on the line drum may be employed to operate an alarm circuit and prevents the reseizure of this circuit by this particular line although the call progress marks which would ordinarily cause its seizure and which define the stage of the call are still present on the line drum.

The lock-out circuit 96 allows the Out-Trunk Selector 95 and the Called Number Assembler 98, as well as all subsequent circuitry, to be utilized by more than one line drum and Dialed Information Dispatcher 70. The lock-out function may be accomplished in any of several ways known in the art. One circuit that may be employed utilizes a group of gates for the information that is to be sent from each Dialed Information Dispatcher, i. e., a group of gates for the line equipment number, the class of service, and the three digits of the dialed office code. The control signals applied to the lock-out circuit to cause it to enable the gates associated with a particular Information Dispatcher are the select out-trunk pulse SOT, if the information is to be transmitted to the Out-Trunk Selector 95, and the line number signal LN or hang-up signal HU if the information is to be sent to the Called Number Assembler 98. The gates associated with only one Information Dispatcher will be enabled regardless of the number of control signals applied, as is known in lock-out circuits.

*Illustrative embodiment of out-trunk selector*

As described above an Out-Trunk Selector circuit 95 selects an outgoing trunk 47 by detecting a match between a called office code read from the trunk drum 42, where it is permanently recorded in appropriate channels of the drum and assigned to the particular trunk which has been marked as an out-trunk by an out-trunk mark OTM, and the called office code registered on the toggles in the Dialed Information Dispatcher 70, as described above. The Out-Trunk Selector 95 having found such a match, then marks the trunk slot busy and writes the line equipment number of calling line, LEN, in that slot. If no such trunk is available a busy tone trunk code is substituted for the registered office code, after which a match is made with the busy tone trunk; as a result of this match the line equipment number, LEN, written in the busy tone trunk slot. One specific embodiment of an Out-Trunk Selector circuit 95 to accomplish these functions is depicted in Figs. 16 through 20 and described below.

Successive office codes are read from the trunk drum, being marked in channels A0, A1, A2, A4, A7, B0, B1, B2, B4, B7, C0, C1, C2, C4 and C7, as well as the class of service marks, and are applied to the right-hand side of match circuits 175 and 176, as shown in detail in Fig. 71. Similarly, an office code and a class of service code, from the Dialed Information Dispatcher 70, are applied to the left-hand side of these match circuits. The normal voltage applied on lead 177 to each of the AND gates 178 associated with each of the office code leads from the Dialed Information Dispatcher 70 is such as to allow the codes to be applied to the match circuits. When an out-trunk code from the trunk drum 42 matches the code supplied from the Dialed Information Dispatcher 70, pulses 180 and 181 appear at the outputs of match cathode followers 183 and 184. A select out-trunk pulse SOT is applied together with match pulses 180 and 181 to AND circuit 185, and, in the absence of a trunk busy pulse 186 from the trunk busy channel of the trunk drum 42, these enable the AND circuit and thus cause operation of a trunk busy monopulser 187. Monopulser 187 applies a pulse TB to open the line equipment number gates 189 so that the line equipment number is written in the appropriate trunk slot and causes TRK BSY to be written in the same slot. At the same time a pulse TA is applied to the trunk assigned lead 153 which causes the Dialed Information Dispatcher 70 to be reset and resets a monopulser 191, seen in Fig. 16 via the cathode follower 192, described further below. The trunk assigned pulse TA also disables the trunk assignment time elapsed or TAT gate 193, to prevent a pulse on the lead from the monopulser 191 from operating the TAT or trunk assignment time elapsed toggle 194.

With the trunk to the completing office now marked busy and with a line equipment number registered in its slot, the trunk 47 has been assigned to a calling subscriber. The line equipment number will be used later as an address to this slot for recording the called line directory number, LDN.

The RC monopulser 191 was also triggered when the SOT pulse occurred. If an idle trunk corresponding to the applied called office code does not exist this monopulser 191 advantageously returns to normal in the time for slightly more than a single revolution of the drum. In this case, a pulse from monopulser 191, as it returns to normal, passes through the trunk assignment time elapsed gate 193 which is normally enabled and operates the TAT toggle 194. The TAT toggle 194 in turn disables all the incoming called office code 178 gates and substitutes at the left side of the match circuits 176 a fixed code through OB1, OB2 and OB4 gates 196, corresponding to a group of overflow tone trunks. A match is then sought for this code and when it occurs the trunk busy monopulser 187 is operated and the action of writing TRK BY and LEN is as described above. In addition an inverted TA pulse 198 causes the TAT toggle 194 to be reset, and this circuit is ready for the next order.

*Steering of dialed line number to trunk drum storage*

Referring back now to the simplified system diagram of Fig. 2, once the out-trunk has been selected and marked, a Called Number Assembler circuit 98 receives each digit of the called number that is held in the Dialed Information Dispatcher circuit 70 and causes it to be written in the appropriate directory number storage channels of the trunk drum 42 and resets the Dialed Information Dispatcher 70 so that it can accept the next digit of the number. A separate group of channels is provided on the trunk drum 42 for each digit place of a line directory number. Each line directory number is thus received by the Called Number Assembler 98 immediately after it has been accumulated on the line drum 40 so that digits are stored one at a time on the trunk drum 42. A diode steering circuit in the Called Number Assembler 98 may advantageously route each digit, as it is received, to the proper group of storage channels, i. e., to the group for the hundreds, tens or units digits. The proper slot on the trunk drum is found by matching the static line equipment number registered in the Dialed Information Dispatcher 70 with the line equipment numbers read from out-trunk slots on the trunk drum 42. When the busy out-trunk slot previously assigned to this calling line, as described above, passes under the reading heads the match is noted and the digit written in that slot. At the time that a digit is written in the last or units group of digit register channels of the trunk drum 42, a dialing complete call progress mark is also written. When the subscriber hangs up, a progress mark indicating that the line is now cleared is also written on the trunk drum.

*Illustrative embodiment of called number assembler*

One specific embodiment of the Called Number Assembler circuit 98 is depicted in Figs. 21 through 25 and described in detail below. On an originating call, after an out-trunk has been selected, marked busy and the calling line equipment number recorded in the trunk slot, the first digit of the called line number is accumulated and then registered in the Dialed Information Dispatcher 70 along with the line equipment number LEN and the line number order LN. This information is then applied in the form of voltage steps to the input to this circuit. The digital information is applied via the D leads 200 to the hundreds, tens and units gates, 201, 202 and 203, respectively. The LEN is applied to one side of a match circuit 205, of the type shown in Fig. 71. When a match occurs between this static LEN and that read from the assigned slot of the trunk drum 42, a pulse 207 appears in the output of the cathode follower 206; the cathode-follower circuit is advantageously of the type described in application Serial No. 322,991, filed November 28, 1952, of W. A. Malthaner. This match pulse 207 is combined with the negative step on the LN lead in the LN gate 208 to deliver a pulse which operates the LN toggle 210. Operation of the LN toggle 210 produces a negative pulse 211 in the output of the LN inverter 213 which partially enables gates 201, 202 and 203. The Trunk Busy mark TRK BY also causes a partial enablement. If there is no registration in any of the hundreds channels, H0, H1, H2, H4 or H7, the output of the H-filled OR gate 215 remains positive and the output 217 of the H-filled inverter 216 remains negative. When all the inputs to the H gate 218 are negative the H toggle 219 is operated. The pulse 221 out of the H toggle 219 passes through the H cathode follower 222 and causes positive pulses 223 to appear on the output of any hundreds gate 201 which has a positive mark on its D lead 200. These pulses 221 on the *w*(H) leads cause the digit to be registered in the corresponding H cells on the trunk drum slot. Operation of the H toggle 219 applies a negative pulse 225 to an OR gate 226, seen in Fig. 22, and operates the reset toggle 227. Operation of the reset or RS toggle 227 produces a positive pulse 228 on the lead 160 which resets the Dialed Information Dispatcher so that it will be ready to serve some other call or the next digit of this call.

When the second digit has been accumulated and registered in the Dialed Information Dispatcher, voltage steps again appear on the LEN, LN and D leads. When an LEN match occurs the LN toggle 210 operates and it along with the TRK BY mark partially enables the hundreds, tens and units gates 201, 202 and 203. Now, however, since there is a registration in the hundreds cells a pulse appears in the out-put of the H-filled inverter 217 which disables the H-AND gate 218. The pulse out of the H-filled gate 215 further enables the tens gate and these enablements along with the absence of a pulse out of the T-filled inverter 231 cause the operation of the tens or T toggle 232 which causes the T gates 202 to be enabled and the digital information to be written in the T cells on the drum. A positive pulse from the T toggle passes through the OR gate 226, the RS toggle 227 operates and the Dialed Information Dispatcher is reset as in the previously described case.

The operation for the unit digit is similar and requires that something is registered in the T cells, LN and TRK BSY are present, and a match exists for LEN. When the units or U toggle 235, seen in Fig. 22, operates and enables the U gates 203 to cause the unit digits to be written, a pulse is applied through the dialing complete or DC OR gate 236 to the toggle 237 which causes the call progress mark dialing complete DC to be written in the dialing complete channel of the trunk drum, seen in Fig. 25. The RS toggle is also operated by units toggle 235 causing reset as before.

Figure 25:
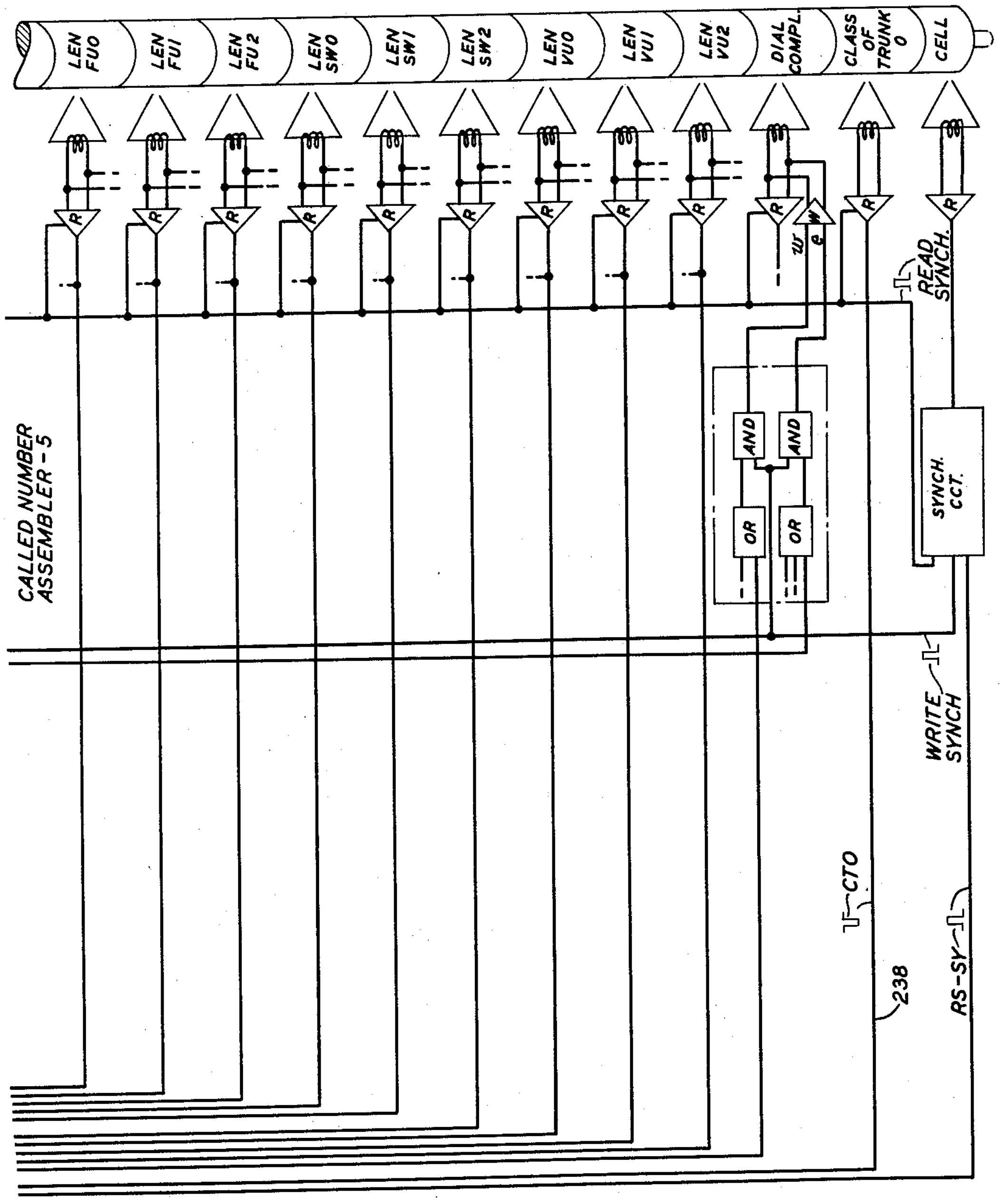
Figure 26:
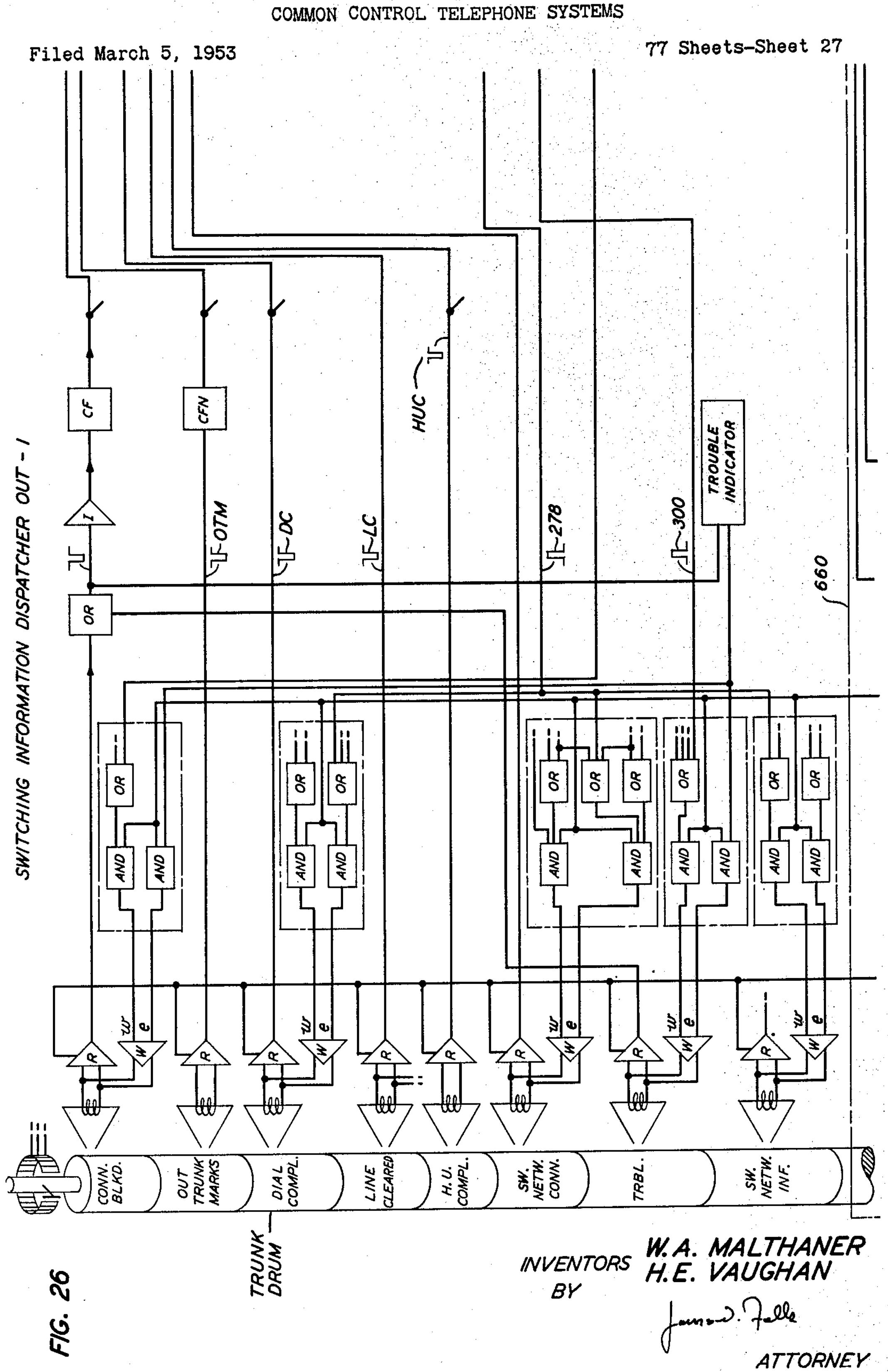
Figure 27:
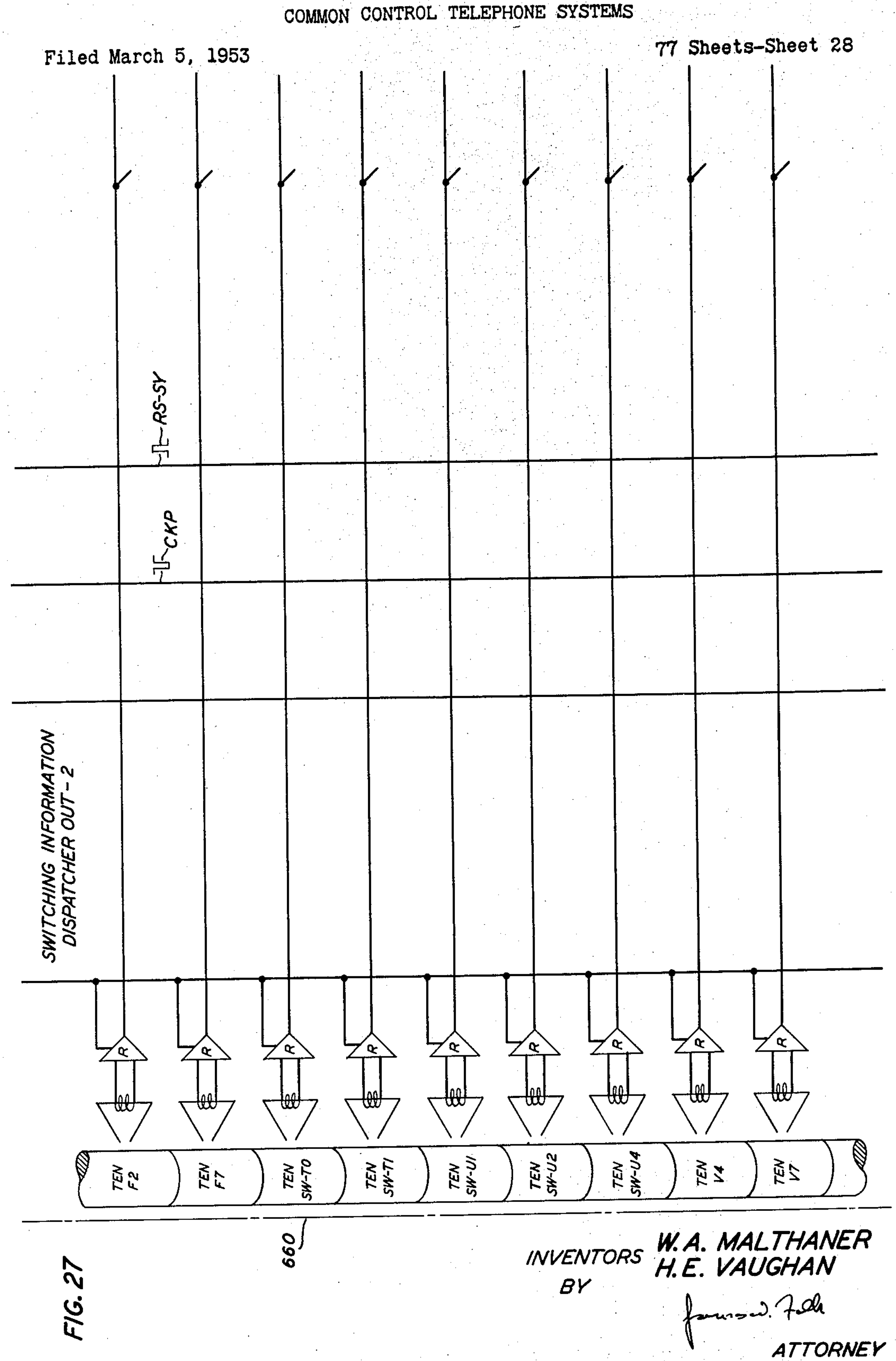
Figure 28:
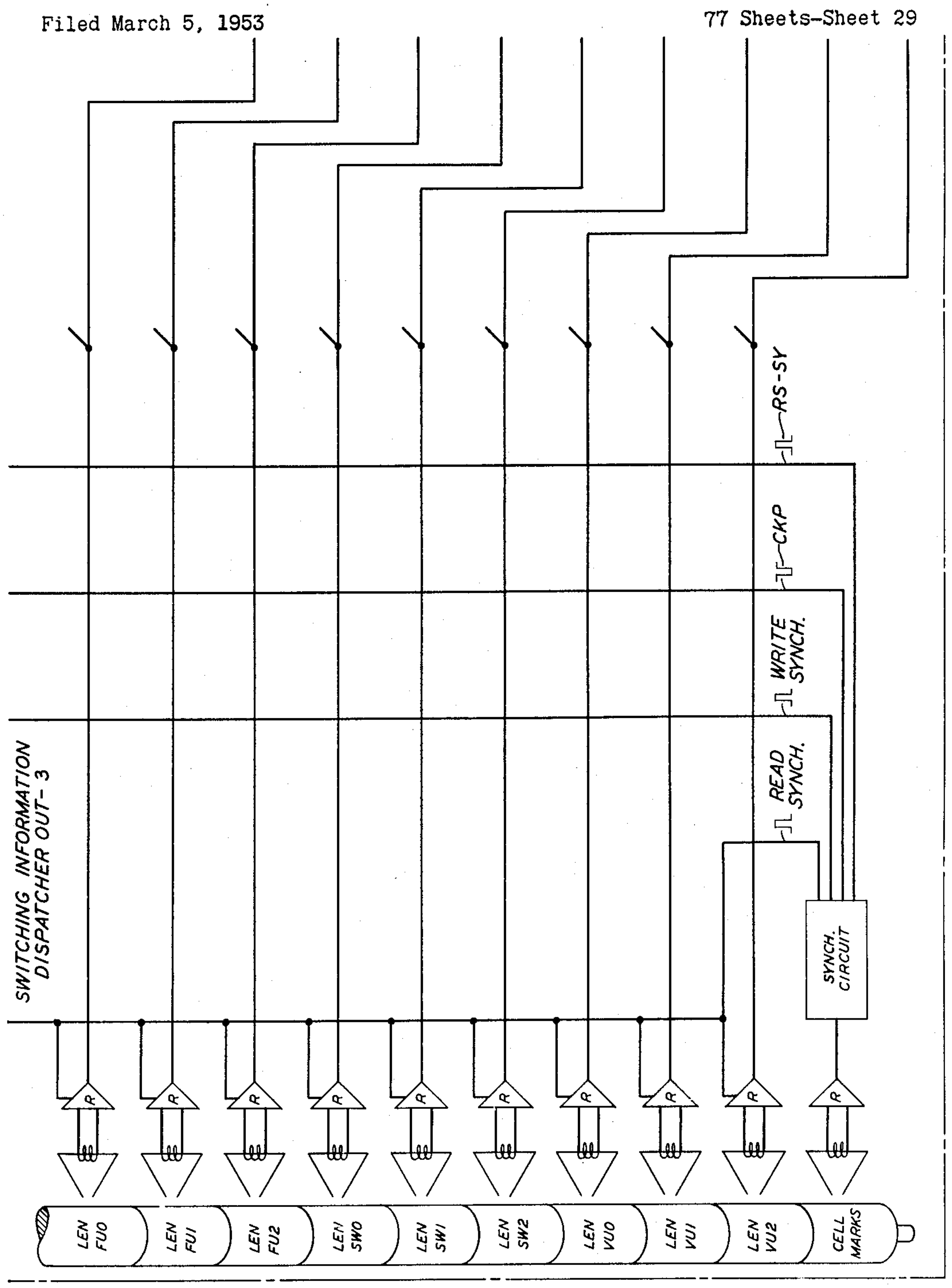

In the case of a call to Operator where only an "O" is dialed, a pulse TA on the trunk assigned lead 153 is combined with a read pulse CTO on lead 238 from the reading amplifier of the class of trunk O channel seen in Fig. 25, in an AND gate 239 to operate toggle 237 and cause the dialing complete call progress mark to be written as soon as this special kind of trunk is assigned. While only one class of trunk hannel has been illustrated in this circuit, it is to be understood that, just as any number of class of service channels may be employed with the line drum circuits, so any number of class of trunk channels may be employed. These additional channels would provide special channels for additional circuitry which may be needed to identify particular parties on multiparty lines, for coin lines, etc., as is known in the art.

When the calling subscriber hangs up, the line equipment number and a hang-up order are registered in the Dialed Information Dispatcher and voltage steps appear on the LEN input leads to this circuit and hang-up lead 166. When a match occurs for the LEN, the match pulse output 240 of the match circuit 205 passes through the AND gate 241 which is enabled by the hang-up pulse HU. The pulse 241 operates the line cleared or LC toggle 243. A positive pulse 244 from toggle 243 causes the line cleared call progress mark to be written on the trunk drum. A negative pulse 245 from the LC toggle 243 passes through OR gate 226 to cause operation of the RS toggle 227 which generates the reset signal as in the cases above.

*Establishment of originating talking path*

When the dialing complete mark is subsequently read from the trunk drum, it causes the registration of information in the Outward Switching Information Dispatcher circuit 248, as seen in the simplified schematic of Fig. 2, for setting up the first section of the conversational path. The line equipment number, LEN, of the line which has just completed dialing, and the equipment number of the trunk, TEN, to which his call was assigned, are registered and checked in the Switching Information Dispatcher circuit 248. If the registration is plausible, the dialing complete progress mark is erased, a switching network informed progress mark written on the trunk drum 42, and the Switching Network Connector and Controller circuit 250 advised to establish a connection between these two points in the switching network. Access to the network controller circuit 250 is advantageously through a lock-out arrangement designed to prevent simultaneous action on originating and terminating calls; this arrangement is contained in the Preference and Connector circuit 251.

The Switching Network 49 may itself be of numerous types wherein a single connection is established between two points or terminals in response to an applied order or signal. Advantageously such networks should operate at a high rate of speed in order to realize fully the advantages of applicants' switching control system. Networks of the type which may be employed with this invention include, among others, those described in Patent 2,686,837, issued August 17, 1954, to S. T. Brewer and E. Bruce and in Patent 2,668,195, issued February 2, 1954, to S. T. Brewer.

In the operation of the switching network, control circuits associated therewith apply voltage marks to appropriate points in the network corresponding to the desired line and trunk, as determined by the line and trunk equipment numbers, and the network operates to select one of the possible interconnecting paths between these points. Upon the successful selection of such a path, the switching control and number group circuits 250 transmit an OK release pulse to the Switching Information Dispatcher 248 which causes release of that circuit. As previously described, a path established through the switching network 49 is advantageously locked up and can be released only on receipt of control orders originating at the trunk drum 42.

*Illustrative embodiment of switching information dispatcher*

Turning now to Figs. 26 through 30, there is shown one specific illustrative embodiment of a Switching Information Dispatcher circuit 248. This circuit, as described above, is furnished the equipment numbers of the line and trunk to control the establishment of a path through the switching network and also the trunk equipment number alone to control the disconnection of this path. The circuits for originating and completing calls are substantially the same except for the order signals employed to control the main logic circuits, as described further below and with reference to the Switching Information Dispatcher circuit 655 in the receiving office.

This circuit furnishes the line equipment numbers, LEN, and trunk equipment number, TEN, to control the establishment of a path through the Switching Network between these designated terminals and the TEN alone to control of the disconnection of a path. The circuits for originating and completing calls are the same except for the order signals used to control the main logic circuit.

After dialing of the called number is completed in originating a call, the line equipment number, trunk equipment number and dialing complete marks are recorded in an out-trunk slot of the trunk drum. If the Dispatcher circuit is idle the presence of an out-trunk mark, OTM, and no signals in the connection blocked channel, seen in Fig. 26, or the trouble channel, produces a pulse on the output of AND gate 253 which combines with the pulse DC on the dialing complete lead in an AND gate 254 to produce a pulse 255 in the output of the cathode follower 256. Pulse 255 enables the LEN gates 258, seen in Fig. 31, so that read pulses in the LEN cells cause the LEN toggles 259 to operate. Pulse 255 also enables the Establish Switching Network or ES gate 261 and pulse 255 passes through a trunk equipment number OR gate 262 and a cathode follower 263 to enable the TEN gates 264, seen in Fig. 30. Pulses from the TEN cells then cause operation of the TEN toggles 265. The pulse out of the cathode follower 263 enables the disestablish switching network or DS AND gate 268. A very short time after the LEN and TEN toggles operate, a check pulse CKP from the synchronized train of pulses on the CKP lead passes through both the ES and DS gates 261 and 268 to the check circuits 270 and 271, advantageously of the types referred to above. If the registration is plausible, an OK pulse occurs on the output of each check circuit. These pulses combine in an AND gate 273 to produce a pulse 274 which passes through an OR circuit 275 to cause operation of the OK monopulser 276. The pulse 278 from this monopulser, which may be a six-microsecond pulse, causes DC to be erased and SNI, Switching Network Informed, to be written in the trunk slot.

Pulse 255 out of the cathode follower 256 caused operation of the ES toggle 280 which disabled the gate 253 so no other trunk data could enter the circuit. The positive pulse ES on lead 281 and positive steps resulting from the operation of register toggles 259 and 265 are applied to the Switching Network Control circuit. When a connection is established in the Network, an OK signal 282 is returned on lead 283 which causes operation of the reset or RST monopulser 285. When reset monopulser 285 returns to normal after about six cell intervals all register toggles 259 and 265 and ES toggle 280 are reset and the circuit is ready to serve another call.

If the call could not find an idle path in the network a block signal BLK is returned on lead 287 which causes operation of the BLK toggle 288. In the meantime a match is sought between the TEN in the toggle register 259 and a TEN from the drum 42, by match circuit 290, seen in Fig. 31. When a match occurs, the resulting match pulse 291 passes through an AND gate 292 which is enabled by the operation of the BLK toggles 289 and operates the call blocked toggle 293, seen in Fig. 29, which in turn causes a mark to be written in the call blocked cell of the trunk slot. The pulse from the gate 292 also passes through an OR gate 295 and causes operation of the RST monopulser 285 and delayed reset of all toggles 259 and 265 and ES toggle 280.

If the data as initially registered in the LEN and TEN toggles 259 and 265 is implausible, an NG signal out of either check circuit through OR gate 297 will operate a monopulser 296. A positive pulse 300 from monopulser 296 causes a mark to be written in the Trouble cell and a negative pulse 301 from monopulser 296 also resets all the toggles 259 and 265 and ES toggle 280.

Figure 31:
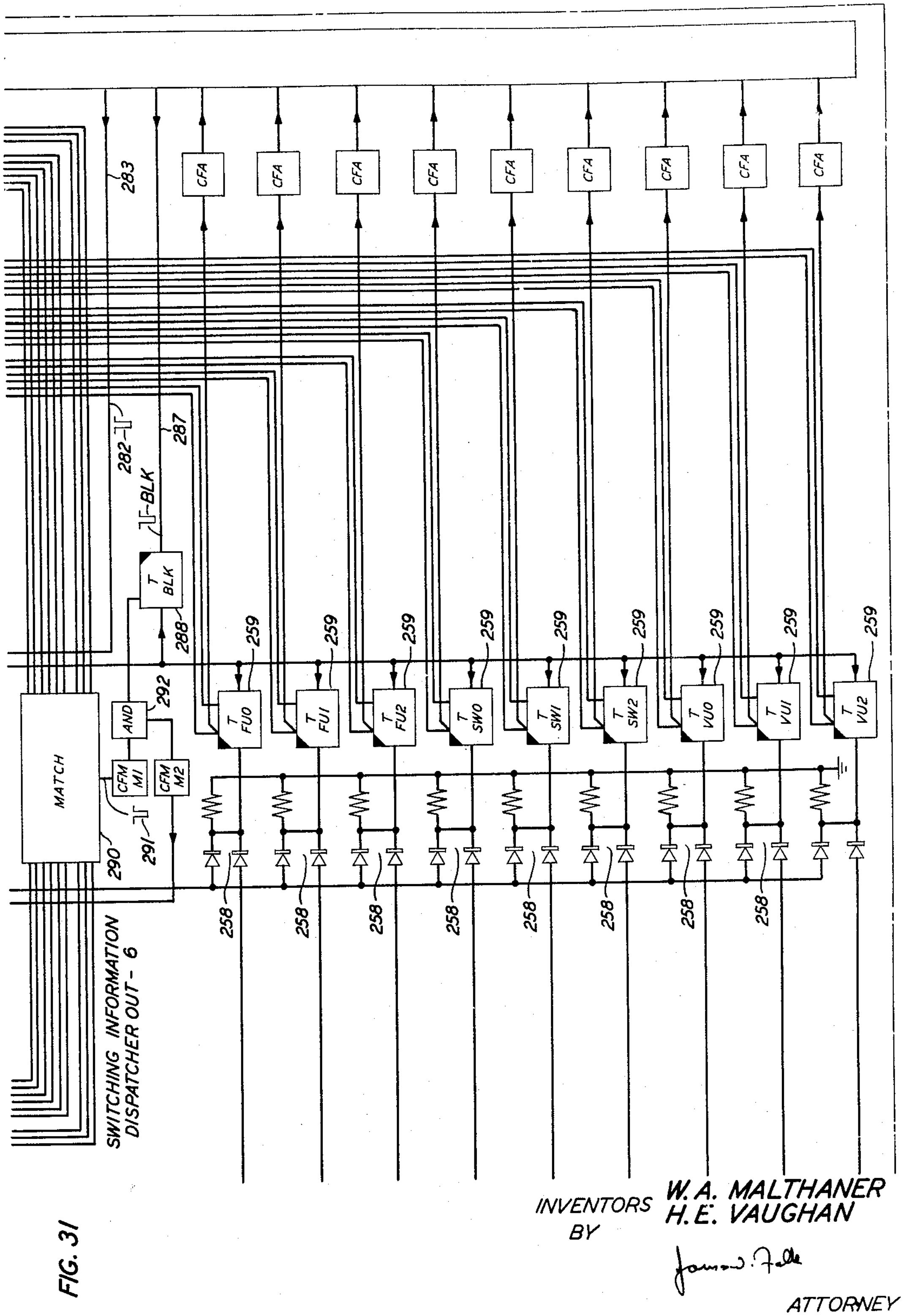

When an HUC, Hang-Up Complete, mark and an LC, Line Drum Cleared, mark are written in an out-trunk slot and the "out" Switching Information Dispatcher is idle, the OTM pulse out of the gate 253 combines with the HUC pulse in an AND gate 298 to produce a pulse 299 which operates the disconnect switching network or DS toggle 300. Pulse 299 also passes through OR gate 262 and cathode follower 263 to enable the TEN gates 264. Operation of the DS toggle 300 causes gate 253 to be disabled against further operation and applies a positive pulse DS to the lead 306 to the Switching Number Group Connector, Figs. 32 and 33. When the TEN gates 264 are enabled pulses representing the TEN digit cause operation of the corresponding register toggles 265. If the registration is plausible, an OK pulse out of the TEN check circuit 270 passes through an AND gate 303, which is enabled by operation of DS toggle 300, and causes operation of the OK toggle 276. Operation of the OK toggle 276 causes a mark to be written in the switching network inform channel and erases the mark priorly written in the switching network connected channel by the Trunk Condition Information assembler circuit 383, as fully described below. The TEN data and DS order signal cause the release of the connection involving the corresponding trunk, as described further below. When the connection is released pulse 282 is returned to this circuit on lead 283, as seen in Fig. 31, which pulse causes operation of the reset monopulser 285, in Fig. 29, and reset of the complete circuit as explained further above.

*Illustrative embodiments of switching number group connector, switching control circuit, line and trunk number group circuits, and switching network*

Both the In Switching Information Dispatcher circuit 248 and the Out Switching Information Dispatcher circuit 655, seen on Fig. 70, are connected to common control equipment for the switching network 49 by the switching number group connector 251, one specific embodiment of which is illustrated in Figs. 32 and 33. As readily seen in these figures, the trunk equipment number and line equipment number leads, leads 281 and 306 for the establish switching network and disconnect switching network pulses ES and DS, respectively, and lead 281 for the OK signal 282, and lead 306 for the block signal BLK of the Out dispatcher 248 are all connected to this circuit in Fig. 32 and the corresponding leads of the In dispatcher 655 are connected in Fig. 33.

When the trunk equipment number TEN and the line equipment number LEN are registered in a dispatcher, the voltage step ES is applied to the lead 281, passes through the OR circuit 310, and raises the voltage on the grid of the right half of the special toggle 311, Fig. 32, which is in lockout with the similar toggle 312, Fig. 33. This causes the voltage on the left plate to increase, thereby causing an increased voltage on the grid of amplifier tube 313 and the operation of relays 314. The voltage step on the plate of the left triode of toggle 311 passes through a cathode follower 315 and enables AND gates 317 and 318, and passes through OR circuit 320 to cause monopulser 321 to operate to momentarily disable gates 317 and 318, described further below, through a cathode follower 322. When monopulser 321 returns to normal signal ES passes through gate 317 and an OR circuit 326 to the Switching Control Circuit, shown in Fig. 34. The disablement by monopulser 321 for about two milliseconds is to permit the relays 314 in the Number Group connector to return to normal if they have just been released. Subsequently, when the signal ES is removed, the connector is released.

Operation on a signal DS is similar except that signal pulse DS passes through the AND gate 318 and the OR gate 328, seen in Fig. 33. Signals ES or DS applied for the In Switching Information Dispatcher 655 to the other half of the circuit, shown in Fig. 33, control the lockout toggle 312, amplifier 330 and the relays 331. Operation of toggle 312 also causes a pulse to be passed through a cathode follower 332 to enable the AND gates 323 and 324 and through the OR gate 320 to enable the monopulser 321, as described above.

If signals are applied by both Dispatchers at the same time, the lockout will permit only one Dispatcher to reach the control circuits, while delaying the other Dispatcher until the first has been served. Operation of lockout circuits of this type are more fully described in an application Serial No. 289,268, filed May 22, 1952, of B. G. Bjornson.

Figure 35:
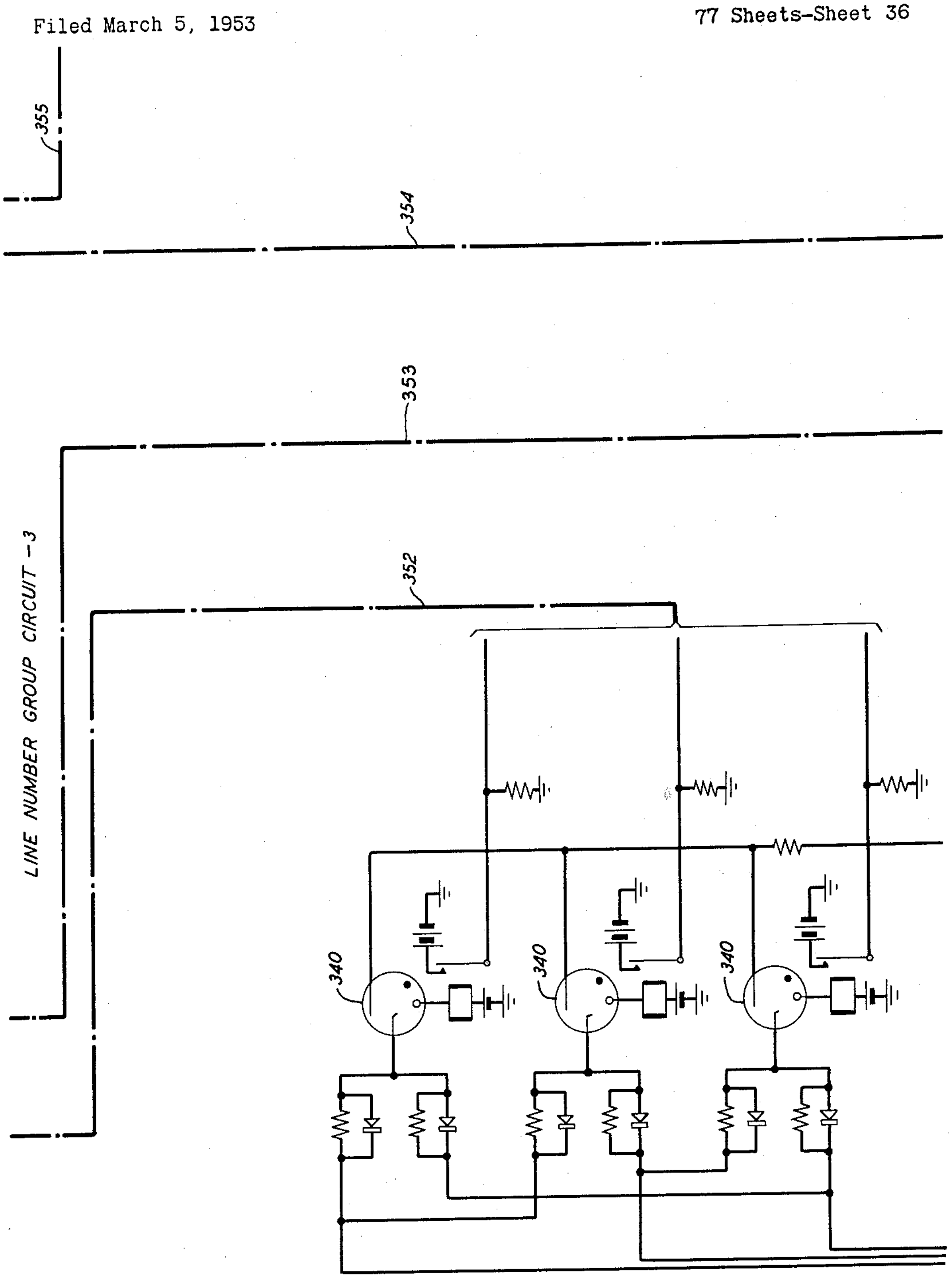
Figure 36:
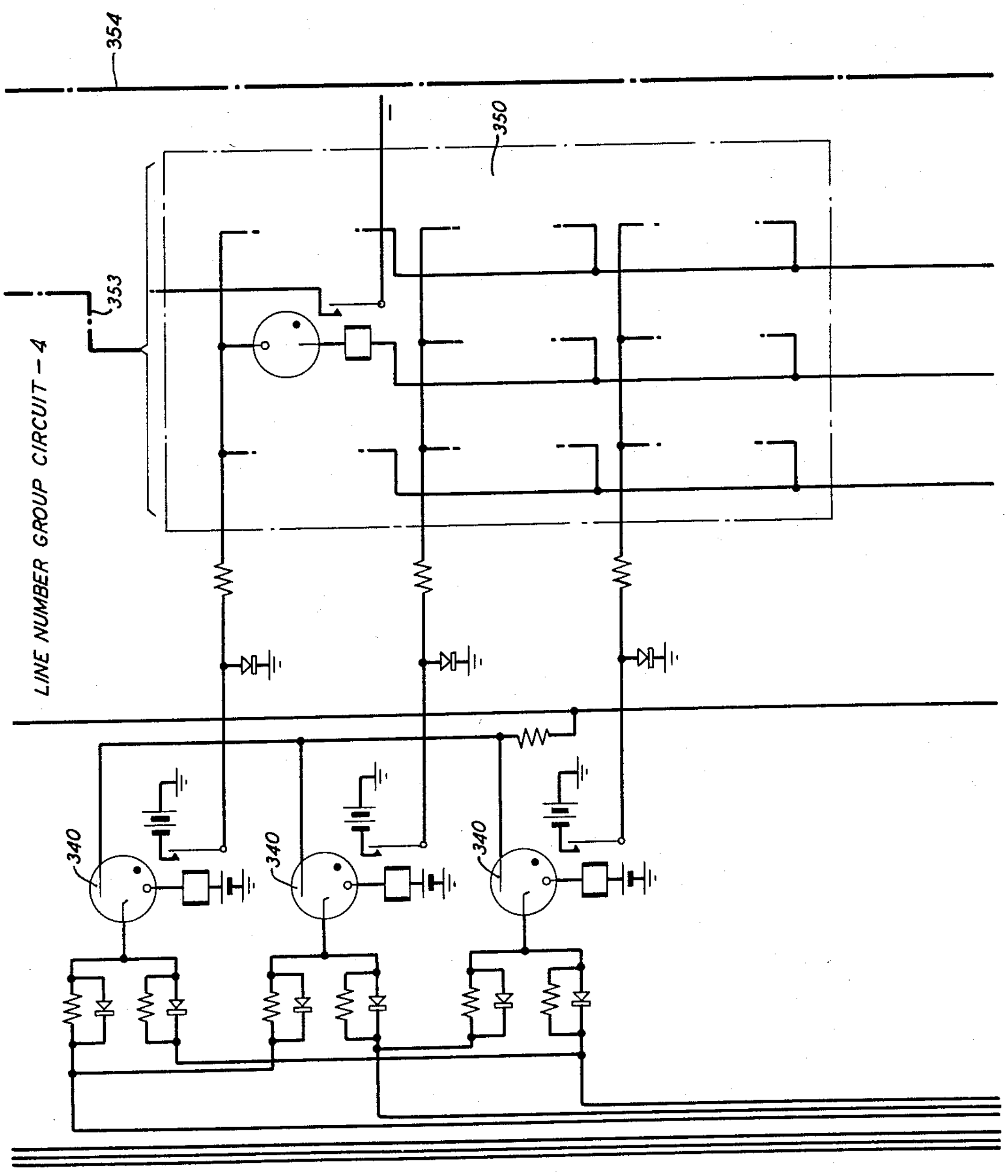
Figure 37:
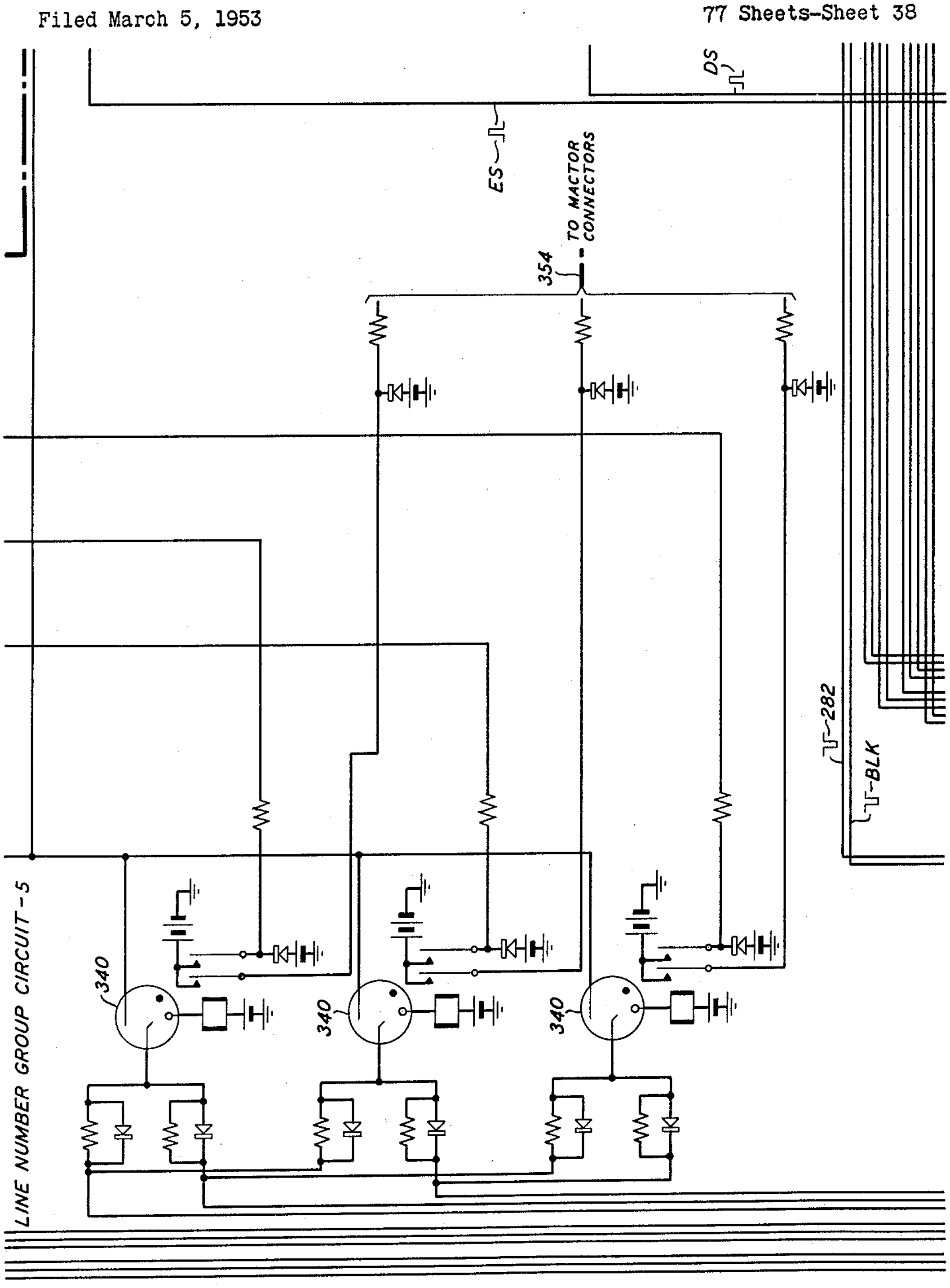

When either relays 314 or 331 have operated, the line equipment number LEN and the trunk equipment number TEN are applied respectively to the Line Number Group Circuit, shown in Figs. 35, 36 and 37, and the Trunk Number Group Circuit, shown in Figs. 38 and 39, while the establish or disconnect order, in the form of pulses ES or DS, is applied to the switching control circuit shown in Fig. 34. The switching control circuit is the common control circuit which functions whenever a connection is to be set up through the Switching Network and whenever a connection through the Switching Network is to be released.

In the first case, when the Switching Control Circuit receives an establish signal ES from the Switching Number Group Connector, it prepares the Line Number Group Circuit and Trunk Number Group Circuit to handle the coded signals on the line and trunk information leads, which signals correspond to the line and trunk to be connected together, it enables the Mactors in the switching network 49 and it applies the connect trunk marking voltage to all the Trunk Frames of the Switching Network. After one of the idle paths between the line and trunk in question has been selected and the path established, the Switching Control Circuit restores the Number Group Circuits, Mactors and Mactor Connectors to normal and removes the connect voltage mark from the Switching Network. Finally, it puts out an OK signal 282 on lead 283 to indicate to the switching information dispatchers that the required conection has been made and at the same time restores itself to normal.

In the second case, when the Switching Control Circuit receives a disconnect signal DS from the Switching Number Group Connector, the control circuit enables the Trunk Number Group to handle the signals on the trunk information leads and applies a release ground to the control terminal of the trunk in question via the trunk number group element. Advantageously, a connection is released from the trunk side only of the Switching Network. Sufficient time is allowed for the crosspoint relays in the path to release, which may be about 10 milliseconds. Subsequently, the release ground is removed from the trunk control terminal and the Trunk Number Group Circuit is restored to normal. Finally, an OK pulse 282 is sent out on the lead 283 which signifies to the switching information dispatchers that the path in question has been released and at the same time the Switching Control Circuit restores itself to normal.

Turning now to Fig. 34 of the drawing, in this specific embodiment of a Switching Control Circuit when an establish switching network pulse ES is transmitted from the Switching Number Group Connector, it is applied to the control electrode of a gas tube 335, causing that tube to fire and operate relays 336 and 337. Operation of relay 336 enables all the primary trunk switches in the switching network by applying a voltage to lead 338 which is connected advantageously to trunk frame interstage control leads, if the network is of the type described in the above-mentioned Brewer and Brewer-Bruce patents. Operation of relay 336 also enables the line and trunk number group decoding tubes 340 and 341 of the switching number group circuits. Relay 337 applies various voltages to the Mactors, which are match and connect circuits, in the switching network 49; relay 337 also applies enabling voltages to a time-out tube 342 and to a match tube 343 and a marking voltage to the trunk connect lead TC.

If there is at least one idle path available, the Mactor or Mactors so indicate, in a switching network of the types referred to above, by applying a voltage to lead 345, seen on Fig. 34, which causes the match tube 343 to fire and operate relay 346. Operation of relay 346 removes the sustaining voltage from the main anode of tube 335 and at the same time, starts charging of condenser 347 through resistance 348. Relays 336 and 337 are thus released. During the time required to operate relay 346 and release relays 336 and 337, which may be of the order of seven milliseconds, the reed-contact crosspoint relays of the talking paths of the switching network, if of the type referred to in the above-mentioned applications, are being operated.

The choice of the particular line and trunk to be connected together by the switching network is dictated, of course, by the equipment numbers LEN and TEN applied from the information dispatcher circuit. This information is present in the form of a plurality of signals on an $x$-out-of-$n$ basis indicating line and trunk frames, verticals, etc., and must be decoded to designate the single particular terminal of the network desired. This is attained by the decoding tubes 340 and 341 and the translating matrices 350 and 351, seen in Figs. 36 and 38, respectively. In this manner a signal is applied over leads 352, 353, and 354, on the line side, to the lines, line frames, and mactor connectors, and, on the trunk side, over leads 355 and 357, to the trunks and mactor connectors. As a connection is disconnected from the trunk side in this embodiment, lead 355 to the trunks, as indicated in the drawing, actually represents two leads, one connected by the translating matrix 351 to the trunk connect lead TC and the other to a trunk release lead TR.

When the connection has been set up by the switching network, the number group circuits and Mactors are disabled and all connect order voltages removed from the switching network, the connection being advantageously held up by a sleeve lead connection. After relay 337 releases, relay 346 releases, thereby restoring the main anode voltage to tube 335. At the same time condenser 347 which has charged up, is discharged through tube 359. This discharge current develops a voltage across resistor 360, which is transmitted, as the OK pulse 282 back to the dispatcher circuits over lead 283, indicating to those circuits that the connection called for has been made and that the switching Control Circuit is back to normal and ready to handle another connect or release.

If no complete idle path is available between the line and trunk in question, none of the Mactors will be fully operated, and no match signal will be sent back. During this time, as relay 337 has operated, a condenser 361 is charging. When it has charged up to the breakdown potential of the control gap of tube 342, that tube fires. Advantageously, this may occur about 25 milliseconds after the appearance of the establish connection signal ES. When tube 342 fires, a relay 362 operates to perform in the same manner as relay 346 the functions of restoring the number group circuits, Mactors and switching network to normal. Relay 362 also initiates the charging of a condenser 363 through resistance 364. Relay 337 in releasing removes the voltage from tube 342 allowing it to deionize and relay 362 to release. When relay 362 releases, condenser 363 discharges through a gas diode 365 and a negative BLK pulse, similar to the OK pulse 382, appears on the Block lead to indicate to the dispatcher circuits that the connection called for was not made. At the same time voltage is restored to the main anode of tube 335 and the switching Control Circuit is thus ready to accept another connect or release signal.

When a connection that has been made is to be released, a disconnect switching network connection signal or pulse DS is applied from the information dispatcher circuits to the switching Control Circuit and applied to the starter anode of a gas tube 368, causing that tube to fire and a relay 369 to operate. Relay 369, in operating, applies a marking voltage, through normally closed contacts of relay 336, to the decoding tubes 341 and also operates a relay 370. Before the contacts of relay 370 close, the Trunk Number Group Circuit functions and the number group element in the matrix 351, corresponding to the particular trunk in question, is operated. Then relay 370 applies a release signal over lead TR, the signal advantageously being a ground applied to the trunk sleeve terminal. This reduces the holding voltage on the control path of the connection through the switching network to zero, causing the crosspoint relays to release.

The operation of relay 370 also starts the charging of condenser 371 through resistor 372 and interrupts the operating current to tube 368 and relay 369. When relay 369 releases, it de-energizes relay 370, which in turn, when it releases, removes release ground from the trunk control lead TR, restores the main voltage to tube 368, which in the meantime has been deionized, removes the enabling voltage from the trunk number group decoding tubes 341, and allows condenser 371 to discharge through a gas diode 374, producing an OK pulse 282. About a millisecond later the trunk number group releases. However, the switching Control Circuit is ready to handle another connect or release just as soon as pulse 282 is transmitted back to the information dispatchers since the trunk number group is restored to normal before any of the relays of the circuit could be reoperated on a subsequent establish or disconnect signal ES or DS.

*Trunk scanning and check of continuity*

Completion of a path from the calling subscriber's line 43 through the switching network 49 to an out-trunk 47, as best seen in Fig. 2, causes operation of a relay 381 in the out-trunk circuit 380, seen in Fig. 41. The operation of this relay provides a low negative voltage to be detected by the trunk scanner. The scanned voltage is detected and interpreted by the Trunk Condition Information assembler 383 and two call progress marks are written in the associated slot on the trunk drum 42; one progress mark signifies that the trunk continuity has been checked and the other that the switching network has been connected.

One of the interoffice conductors of each trunk 47 is scanned on each revolution of the trunk drum 42 as the slot of the associated trunk is passing the reading and writing heads. The voltage detected on a scanned plate is interpreted with reference to the call progress marks present on the drum to determine the current status of the call using the trunk, in accordance with one general aspect of this invention. In addition to the normal idle scanning condition of no voltage on the trunk, four other voltage levels may be present; these are voltage levels of low or high, negative or positive voltages. These voltage levels are determined by the condition of the calling subscriber's loop and the called subscriber's loop as well as by the action of the interoffice signalling equipment attached to the trunk. In combination with the call progress marks, these voltages are interpreted by the Trunk Condition Information Assembler 383 as indicating continuity checked, connect, answer or various hang-up conditions, as further described below.

*Specific illustrative embodiments of trunk condition information assembler and trunk circuits*

Turning now to Figs. 42, 43 and 44 there is depicted a specific illustrative embodiment of a trunk condition information assembler circuit 383 that may be employed in the combination of this invention. This circuit, in conjunction with a capacitive scanner 382 of the type heretofore described, monitors the condition of all trunks in the office, the voltage on the trunks being in any one of five groups, high positive, low positive, ground, low negative, or high negative. The particular condition of a trunk is determined by the pulse discriminator circuit 385 which receives from the scanner amplifier 386 the pulses appearing on the trunks, the direct current level of the pulses having been clamped by a clamping circuit 387; the scanner amplifier 386, clamping circuit 387, and pulse discriminator circuit 385 may advantageously be of the type further described in Patent 2,691,729, issued October 12, 1954, to W. A. Cornell.

When the originating half of a call has been set up in the switching network 49 and the out-trunk supervisory relay 381, seen in Fig. 41, has operated, low negative voltage is applied from a source 388 to a conductor 389 of the trunk 47 and applied to the scanner; at the same time the switching network informed call progress mark has been written on the out-trunk 42 by the Switching Information Dispatcher 248, as described above. The low negative voltage detected by the scanner and pulse discriminator circuit 385 appears on an output lead 390 of the discriminator circuit 385 as pulse LNO. Pulse LNO is inverted and applied, together with pulse SNI from the switching network informed cell and pulse OTM from the out-trunk cell to a continuity checked or CCK AND gate 391 to cause operation of a CCK toggle 392. Operation of the CCK toggle 392 causes the call progress mark continuity checked to be written, in a channel seen on Fig. 43, the switching network connected mark to be written in a channel seen in Fig. 42, and the switching network informed mark to be erased.

Advantageously, out-trunk marks OTM are provided for each outgoing trunk when both outgoing and incoming trunks are arranged physically on the same magnetic drum. While the particular representation of this invention illustrated in Fig. 2 depicts the out- and in-trunk drums as being physically separate, and such may advantageously be the case, certain economies and increased operating safeguards are attained by providing both types of trunks on the same drum, in which case a mark identifying the trunk as an out-trunk is placed in the out-trunk mark channel. These out-trunk marks are permanent marks which may be written on the drum when the out-trunk is assigned, as are the trunk equipment numbers. These permanent marks may advantageously be written and erased by temporarily connecting a writing amplifier and its controls to each such magnetic head for this purpose, rather than by fully providing writing means where so infrequently used.

Figure 50:
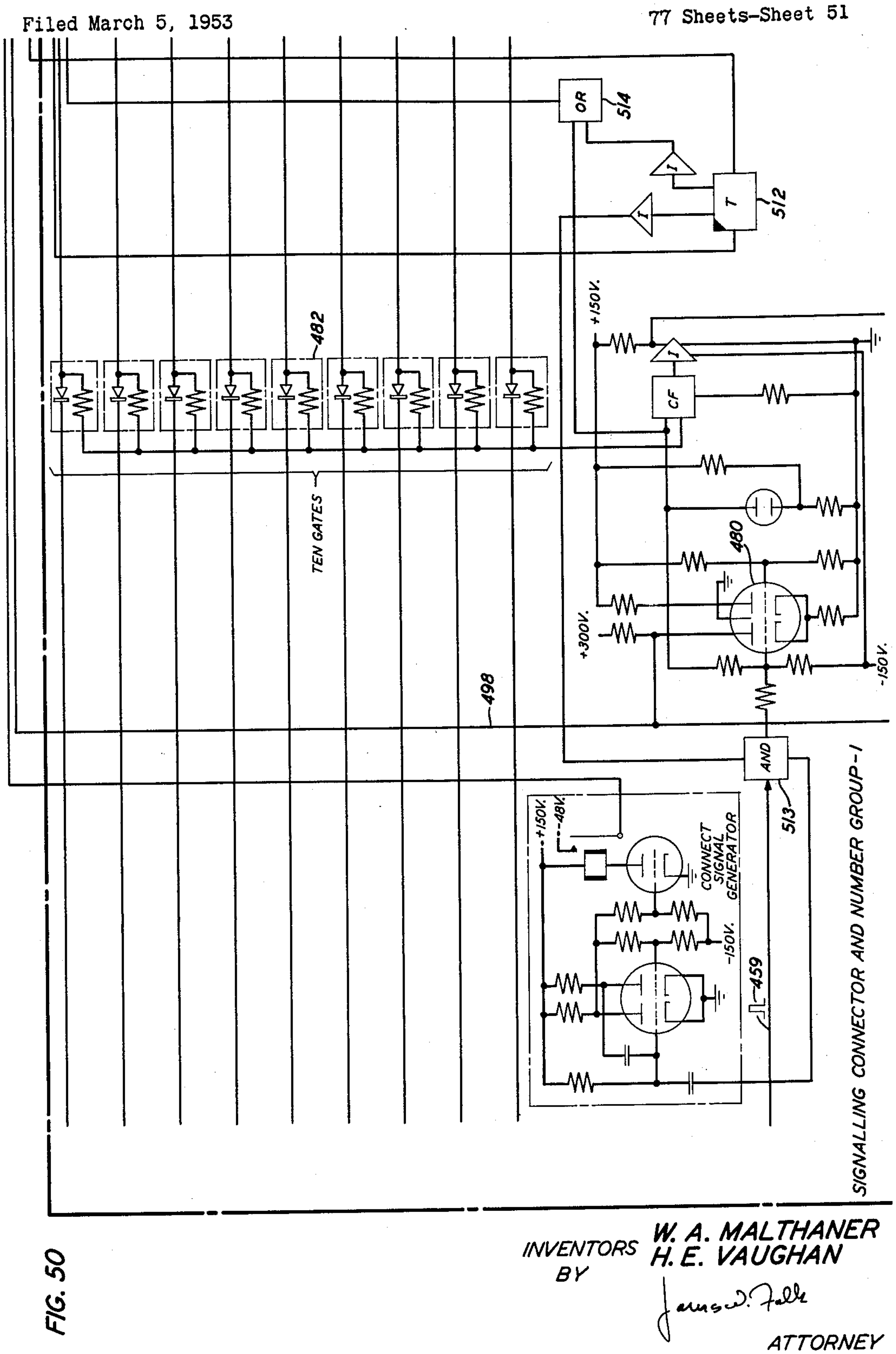

When the Signalling Connector and Number Group of the signal transmitter 394, seen in Fig. 2 and described below, has been connected to the particular out-trunk over which the call is to be carried, a Connect Signal Generator 395, seen in Fig. 50, applies a high negative signal to the interoffice trunk conductors as a connect signal. This signal is to be recognized only by incoming trunks. The Trunk Condition Information Assembler 383 depicted in Figs. 42, 43 and 44 comprises all the elements required for employment with a drum utilized for both outgoing and incoming trunks, though it is to be understood that in such embodiments wherein the outgoing and incoming trunks are segregated on separate magnetic drums, those elements of the trunk condition information assembler circuit which only function with one type of trunk would similarly be segregated. Thus, a high negative signal need only be recognized by the called office. This signal appears as a pulse HNO on an output lead 397 from the discriminator circuit 385 and, after being inverted, it is applied to a connect received or CNR AND gate 399. In the called office, considering now that the trunk condition information assembler circuit 383 depicted on the drawing is located in Office B, no mark has been placed in the Switching Network Connected cell as the terminating half of the switching network has not been connected and, since this is an incoming trunk in that office, no mark is present in the Out-Trunk cell. The presence of an inverted HNO pulse and no signal from either the Out-Trunk channel or the Switching Network Connected channel at the AND gate 399 cause the CNR toggle 400 to operate, a CNR mark to be written in the Connect Received channel and a TRK BY mark in the Trunk Busy channel. As can be seen on the drawing at Fig. 42, the Connect Received channel is only utilized for incoming calls, i. e., functionally it is only employed in a called office. The same channel may be utilized for a line cleared mark in the calling office, as described further below, in those embodiments in which both outgoing and incoming trunks are located on the same drum. If this is not the case, these functions can be separated and the appropriate elements only utilized in the one or the other office, as discussed above.

When a complete call has been set up and the called subscriber answers, the voltage on the scanner lead 401, seen in Fig. 41, changed to low positive. This voltage is determined by a high positive voltage applied through contacts 402 of a relay 403 operated when the called subscriber comes on the line, as seen in Fig. 41, and the low negative voltage applied through the closed contacts of the relay 381. A pulse LPO then appears on the output lead 404 from the discriminator circuit 385, seen in Fig. 44. This pulse, after being inverted, is applied to an answer or ANS AND circuit 405 and together with a TRK BY pulse, since this trunk is busy, and no pulse from the answer channel causes operation of the ANS toggle 406 to produce a pulse to write an answer mark in the answer channel and erase the call registered mark, CR, through an erase call registered or ECR OR circuit 407. The requirement that there be no mark already present in the answer channel for the answer AND circuit 405 to be enabled is advantageously utilized so that once ANS has been written no further attempt will be made at rewriting.

This condition of the trunk is detected in both the calling and called offices. In the calling office, the call registered progress mark is written when the Signalling Dispatcher, described below, has checked that the information it will transmit is in an acceptable form, and in the called office the call registered progress mark is written when the information has been received and is being written on the incoming trunk drum, as also described further below.

Turning now to the fourth output of the discriminator circuit 385, a high positive pulse HPO appears on lead 409 when the calling subscriber alone hangs up after the called subscriber has answered the call. Turning again to Fig. 41, when this occurs the relay 381 is released but relay 403 is still operated. An inverted HPO pulse is applied to an originating hang-up or OHU AND circuit 410 together with a pulse 411 read from the answer channel to enable the AND circuit 410, a hang-up indicated or HUI OR gate 412, and to operate the HUI toggle 413. The pulse from the HUI toggle 413 causes a mark to be written in the hang-up indicated channel. This is done in the trunk condition information assembler circuits in both the calling and called office.

If the terminating or called party alone hangs up, the voltage on the scanner returns to low negative so that a pulse LNO and the answer pulse 411 are combined in a terminating hang-up AND circuit 415 to produce a pulse which passes through the HUI OR circuit 412 to operate the HUI toggle 413 and cause hang-up indicated to be written.

The third hang-up possibility is when both parties hang up, which results in the original ground condition being again present on the trunk conductor 389, seen in Fig. 41, and applied to the scanners. This is also the condition for hang-up by the calling subscriber before an answer. When an output is present on any of leads 390, 397, 404 or 409 from the discriminator circuit 385, a negative pulse is applied through OR circuit 414 to inverter 416 and a positive pulse 419 received from the inverter 416. However, in the absence of any pulse from the discriminator circuit 385, the output of inverter 416 is a constant voltage G which is applied to a both hang-up or BHU AND gate 417, also enabled by the presence of a trunk busy pulse TRK BY. The pulse from the BHU AND gate 417 passes through the HUI OR gate 412 and operates the HUI toggle 413, causing hang-up indicated to be written. An enabling lead to the BHU gate 417 also comes from OR gate 418; in the calling office the gate 418 is enabled if a mark is present in the switching network connected cell of that trunk so that a hang-up indication is not received in the interval between the selection of a trunk and the setting up of the connection, since during this interval there is no output from the discriminator circuit 385. In the called office any disappearance of an output from the discriminator circuit is an indication of a hang-up condition. Therefore the presence of an inverted out-trunk pulse, identified on the drawing as IOTM and indicating that the trunk is an in-trunk, will also enable the OR circuit 418.

Many times a hang-up condition is indicated momentarily and then disappears, as when a subscriber flashes his switch hook; when this happens a hang-up indicated mark is written and it is necessary to erase this mark when this condition has disappeared and before hang-up action is taken by the circuit in response to it. Another instance is in the transition in the trunk circuit from low negative to low positive upon the answer of a subscriber, as the trunk will then slowly pass through the ground condition thereby causing hang-up indicated to be written. Therefore if a pulse LPO occurs after hang-up indicated has been written, the LPO and HUI pulses will cause a pulse at the output of an erase hang-up after answer or EHA AND gate 420. This pulse passes through the erase hang-up or EHU OR gate 421 and causes operation of the EHU toggle 422 which in turn causes erasure of the hang-up indicated mark.

If the subscriber flashes his switch hook, hang-up indicated will be written, as mentioned above. If an answer mark has not been written, then upon the return of the LPO condition at the output of pulse discriminator 385, a pulse appears at the output of a switch hook flash or SHF AND gate 423 which is also applied to the EHU OR gate 421.

All call progress marks and temporary data pertinent to a particular call are erased by an enable erase circuit, seen in Fig. 43, when a call is either ended or abandoned. There are two AND circuits 425 and 426 which serve as inputs to the enable erase circuit, AND circuit 425 being enabled by the conditions when the information pertinent to an out-trunk is to be erased and AND circuit 426 when the information pertinent to an in-trunk is to be erased. When the connection between an originating or calling subscriber and an out-trunk is to be released, the line cleared call progress mark LC is written, as described above with reference to the Called Number Assembler circuit, and the switching network connected mark, SNC, is erased upon writing of switching network informed by OK pulse 278, as fully described above with reference to the Switching Information Dispatcher circuit. An out-trunk pulse, OTM, line cleared pulse, LC, and an inverted SNC pulse, ISNC, indicating an absence of a mark in the Switching Network Connected cell, are combined in AND gate 425 and pass through an OR gate 428 to the enable erase monopulser 429. Monopulser 429 delivers a positive pulse to the enable erase cathode follower 430 which controls erasure of cell marks in all channels to which it is connected, namely, those channels of the trunk drum having temporary information therein pertaining only to this call.

In the called or terminating office, in case of the release of the call, a hang-up completed mark is written, the hang-up started and hang-up completed channels shown on Fig. 43 being timing channels of a timing circuit as disclosed in application Serial No. 340,472, filed March 5, 1953, of W. A. Malthaner. A hang-up completed pulse, HUC, and the pulse ISNC indicating the absence of a switching network connected mark, together enable the AND gate 426 and cause a pulse to pass through the OR gate 428 and operate the EE monopulser 429, as above.

*Interoffice signalling*

As soon as the fact that a connection exists between the calling subscriber's line 43 and an out-trunk 47, as seen in Fig. 2, has been confirmed through the writing of the continuity checked call progress mark on the trunk drum 42 by the Trunk Condition Information and Assembler 383, as described above, the transmitter circuit 394 is seized from the trunk drum. The transmitter circuit includes a Signalling Dispatcher circuit in which are registered and checked and trunk equipment number, TEN, and the directory number of the called line, LDN. If the check is satisfied the continuity checked call progress mark is erased from the drum, a call registered mark is written, and a start order is given to another component part of the transmitter circuit 394 to establish a path for the transmission of the line directory number of the called party to the called office. This path is established by a Signalling Connector and Number Group circuit, which is this other component part of the transmitter circuit 394.

In response to the start order the trunk equipment number is used by the number group circuit to establish this path through the connector between the out-trunk and a Signal transmitter, which may advantageously be of the type described in application Serial No. 158,218, filed April 26, 1950, of W. A. Malthaner and H. E. Vaughan and in Patent 2,678,435, issued May 11, 1954, to H. E. Vaughan, wherein signalling is done on a pulse code modulation basis. When closure of this path is recognized by the connector in the transmitter 394, a connect signal generator circuit alters the direct current voltage on the interoffice trunk conductors for slightly more than one revolution of the drum, and the transmitter sends over the trunk the signalling pulse code modulated signals representing the called line directory number repetitively with a short silent interval of no transmission between repetitions. The altered direct current voltage is detected by the trunk scanner in the distant office and recognized by the Trunk Condition Information Assembler circuit 383 in that office as a connect signal, as described fully above. Detection of the connect signal causes a trunk busy and a connect received call progress mark to be written in the trunk drum slot of that drum in the called office.

The connect received call progress mark thus written is read on the next revolution of the in-trunk drum in the called office and enables the Signalling Information Assembler circuit in the receiver 433 of that office, which circuit registers the trunk equipment number of the incoming trunk and checks it. When the incoming trunk equipment number has been checked, a start order is transmitted to the Signalling Connector and Number Group circuit of the receiver circuit 433 in the called office to establish a path through the connector of that circuit between the incoming trunk and a signal receiver circuit. Advantageously, a single Signalling Connector and Number Group circuit is used for establishing connections both from the signalling transmitter to the out-trunk and from the in-trunk to the signalling receiver. A lock-out circuit insures that only one start order will be acted upon at a time. Further a single Signalling Connector and Number Group circuit may be utilized by several signalling transmiter and receiver circuits, the circuit lock-out prevents simultaneous operation on several calls. It is, therefore, to be understood that while the transmitter circuit 394 and the receiver circuit 433 depicted in the embodiment of this invention illustrated in Fig. 2 of the drawing are shown as distinct, they may advantageously utilize common components.

As soon as the signal receiver is attached to the in-trunk, it proceeds to recognize and decode the pulse code modulated signals sent over the trunk from the transmitter 394 in the originating office. As mentioned above, the transmitter advantageously converts the directory number to a train of pulse code modulated carrier signals preceded by code synchronizing pulses, as described in the above-mentioned Malthaner-Vaughan and Vaughan application and patent. The signal receiver circuit 433 decodes the interoffice pulse code modulated signals and registers the corresponding digits in the receiver circuit. A check is made of the plausibility of the registered signals; if the registration is not plausible the register is reset, and the receiver decodes the next repetition of the signals from the transmitter. After the transmitter 394 has sent the complete train of interoffice signals, it waits a short interval for the possible reception of a stop-dialing tone from the receiver. When the tone is received, it gives a release signal to the Signalling Information Dispatcher within the transmitter 394, which in turn resets and releases the signalling connector and the signal transmitter.

When the signal receiver circuit has a satisfactory set of digits registered, it gives a registration complete order to the Signalling Information Assembler circuit of the receiver 433 in the called office and causes transmission of a stop-dialing tone for a short interval.

*Illustrative embodiment of signalling dispatcher and signalling connector and number group of the transmitter*

Turning now to Figs. 45 through 57 there are depicted specific illustrative embodiments of signalling dispatcher and signalling connector and number group circuits that may be employed in the general combination of this invention. The signalling dispatcher circuit, depicted on Figs. 45 through 49, accepts information from the trunk drum into its registers, after the originating half of the call path has been established, checks the registration, then controls the connection of the signalling transmitter to an out-trunk, and directs the called line directory number coding of the signal transmitter.

When the continuity checked call progress mark, which was written by the Trunk Condition Information Assembler circuit 383, is read from a drum slot which is also characterized by an out-trunk mark, a pulse 440 passes through gate 441 and enables all the trunk equipment number and line directory number AND gates 442 and 443. Pulses read from cells in the slot assigned to the particular out-trunk being utilized cause operation of the corresponding trunk equipment number and line directory number toggles 445 and 446, in the manner similar to that heretofore described. The presence of either a pulse TR read from a trouble mark in that trunk slot or an omit signalling pulse OS will block the gate 441 and prevent such registration. If there are two or more signalling transmitter circuits, an enablement is provided from the sequence circuit 439 to the gate 441 in only one signalling dispatcher. The omit signalling mark is a permanent information mark placed in those slots assigned to trunks that are not interoffice trunks, such as trunks to operators in the calling office. Therefore, the presence of an omit signalling pulse OS indicates that the trunk that has been seized does not go to the called office and signalling should not be transmitted over it.

The registration in the register toggles 445 and 446 is checked by check circuits 448 and 449, which may advantageously be of the types described in Patent 2,675,538, issued April 13, 1954, to W. A. Malthaner and D. H. Ring, and Patent 2,675,539, issued April 13, 1954 to J. H. McGuigan. If the registration, as checked by these circuits, is feasible, OK pulses 451 and 452 appear at the outputs of these circuits. If both OK pulses 451 and 452 are present a pulse 454 from an AND gate 453 operates the OK monopulser 455 which generates a pulse 456 to erase the continuity checked call progress mark and writes a call registered call progress mark in this particular slot. Operation of monopulser 455 also operates the busy or BY toggle 457 which disables gate 441 so that pulses in following slots cannot alter the data in the register. When the BY toggle 457 operates a positive step 459 is also applied to the Signalling Connector and Number Group which pulse, along with the trunk equipment number registration, controls the signalling connector. When the BY toggle 457 operates a negative step is also applied to the sequence circuit 439 which causes the sequence circuit to remove the enablement from the gate 441 of the signalling dispatcher just taken into service and supplies an enablement to the corresponding gate, in the signalling dispatcher to be used for the next call.

If the registration is not feasible an NG signal 460 or 461 out of either check circuit 448 or 449 causes a mark to be written in the trouble cell of the slot under consideration and all toggles to be reset, the trouble mark being written under direction of a pulse 465 generated by a monopulser 464 upon receipt of a pulse from an NG OR circuit 462. Monopulser 464 also applies a pulse 468, through an inverter 470, to a reset lead 469 to reset all the register toggles 445 and 446. In this case, the signalling dispatcher will be ready to function on orders in the next slot, if such orders exist.

Figure 49:
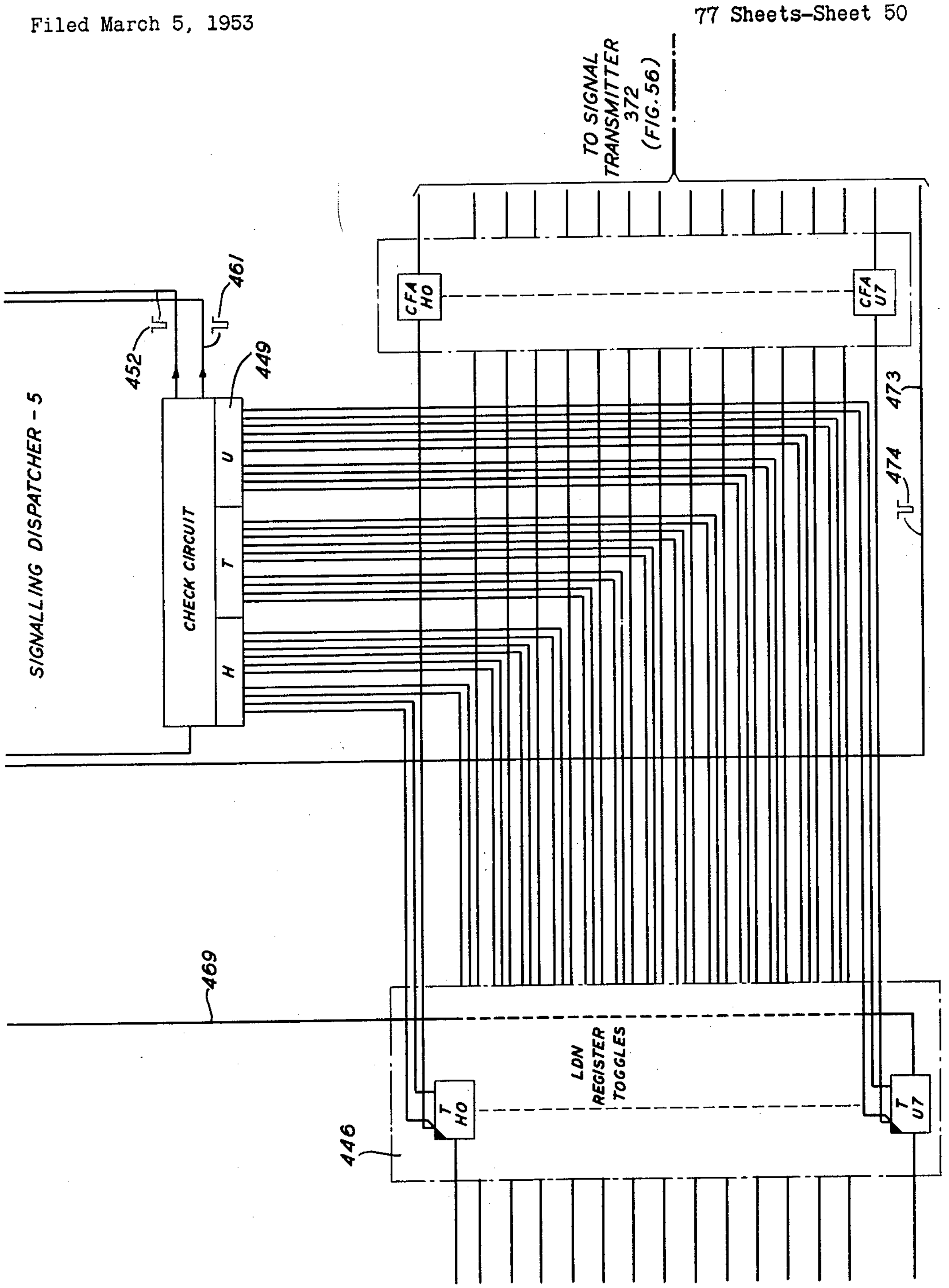
Figure 56:
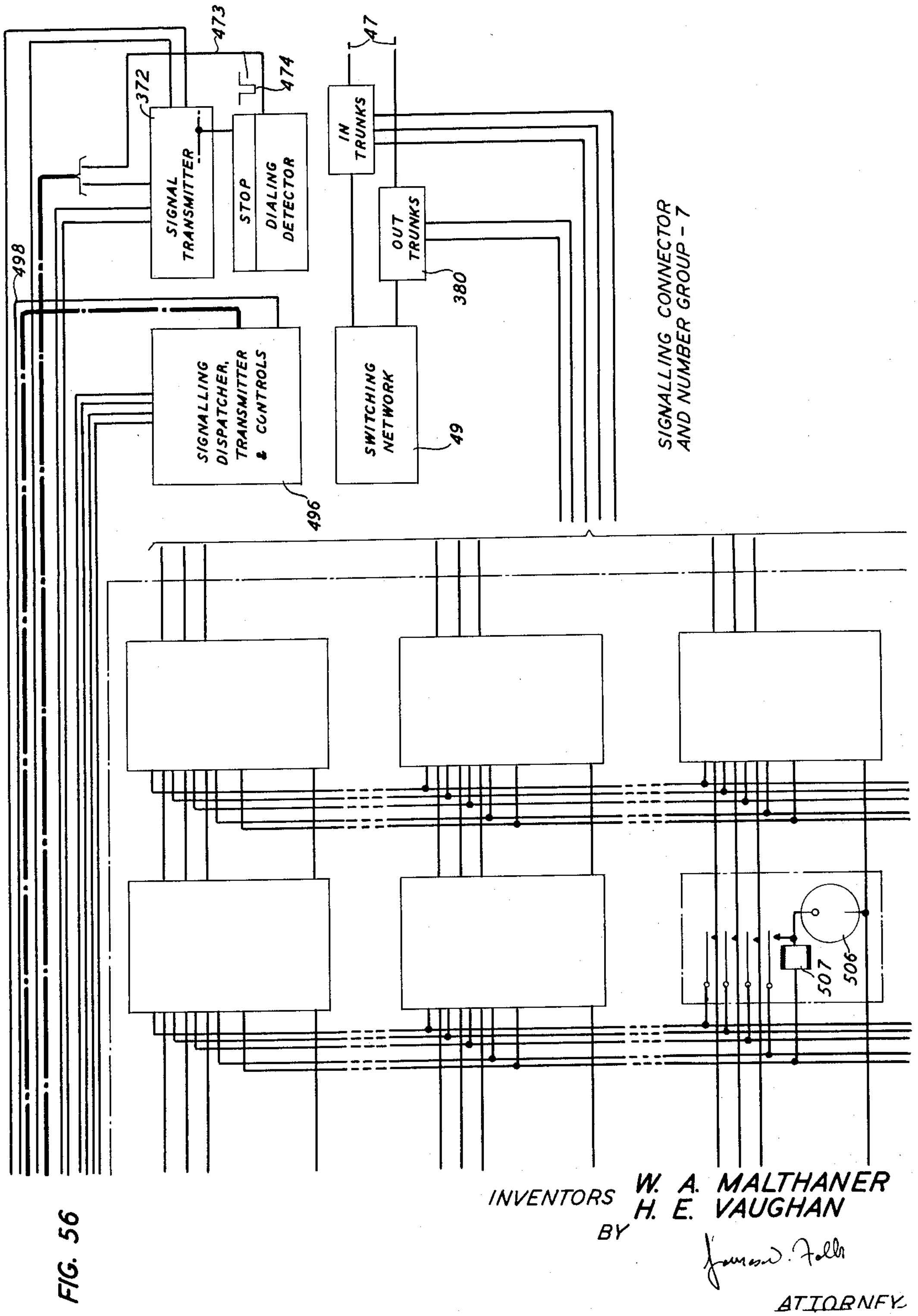

When the signal transmitter circuit, seen in Fig. 56, has accomplished its functions, a reset pulse 474 is returned by a stop-dialing detector circuit 471, seen in Fig. 56, to the signalling dispatcher over a reset lead 473, seen in Fig. 49, and applied to a reset monopulser 475 which advantageously remains operated for only a short period, such as 6 or 7 cell periods during a rotation of the drum, to produce a reset pulse 475 applied to the reset lead 469 to reset all the register toggles 445 and 446, and the circuit is then ready for the next order when enabled by sequence circuit 439.

Turning now to the signalling connector and number group circuit, seen in Figs. 50 through 57, this circuit consists of a lock-out connector to a number group, a full access connector controlled on a one-at-a-time basis by the number group, and a circuit to detect when a connection is established through the full access connector so that the lock-out circuit may be released.

Two types of circuits control this unit, which is common to both outgoing and incoming trunks. If the circuit is to be utilized on an outgoing trunk, it is controlled by a signalling dispatcher circuit described above; if it is to be utilized on an incoming trunk, it is controlled by a signalling assembler circuit, described below. Let us consider first the utilization of the signalling connector and number group in the calling office under control of the signalling dispatcher circuit. A trunk equipment number TEN and a line directory number LDN have been registered in the signalling dispatcher and a positive voltage step 459 by the BY toggle 457, as described above. The voltage step 459 operates a dispatcher toggle 480 seen on Fig. 50 which is in lock-out with an assembler toggle 481, seen on Fig. 51. Operation of toggle 480 causes the trunk equipment number gates 482 associated with the signalling dispatcher to be opened and the TEN code is applied through OR gates 483 to the number group hot cathode gas tubes 485. This group of tubes is used as diodes to produce a decimal digit output representing frame, switch, and vertical of a trunk equipment number, the particular tubes 485 utilized for each part of the TEN being identified as 485F, 485S and 485V. Resistive summing networks 486 convert the switch signals of the TEN from their n-out-of-m code to ordinary single lead decimal coding. Hot cathode gas tubes 485 repeat these voltages at a new voltage and impedance level to cold cathode gas triodes 487 in which combinations of frame-vertical and switch signals are produced, the particular tubes being identified as 487FV and 487S. These combinations are repeated by relays 488 to a set of cold cathode diodes 489 for further combining so that for each possible TEN a unique diode 489 is fired. A relay 490 in the cathode circuit of the fired diode 489 then energizes a lead, designated by the incoming trunk equipment number TEN to a full access connector 492, which may be of the reed-diode cross-point type.

Figure 57:
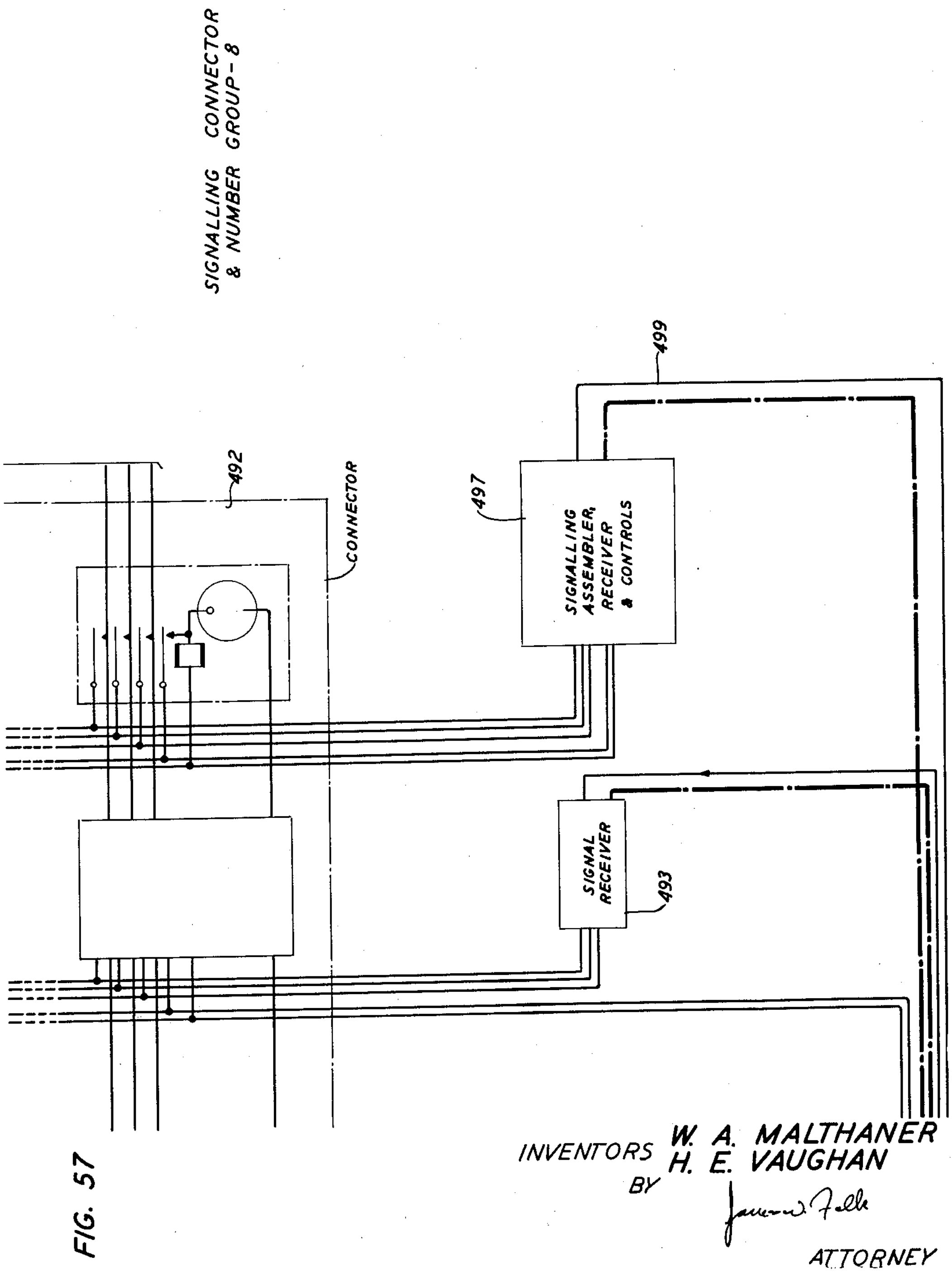
Figure 58:
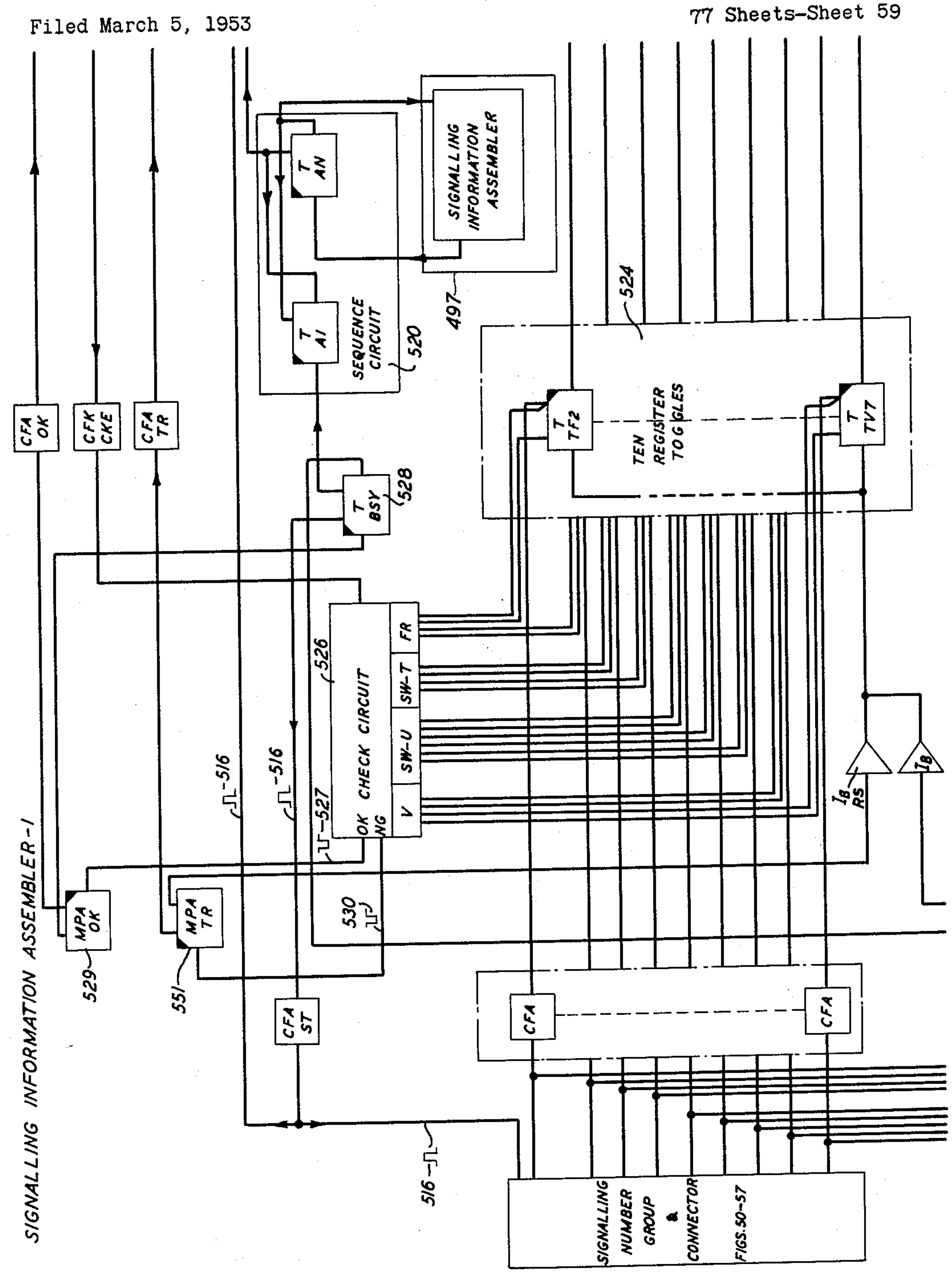
Figure 59:
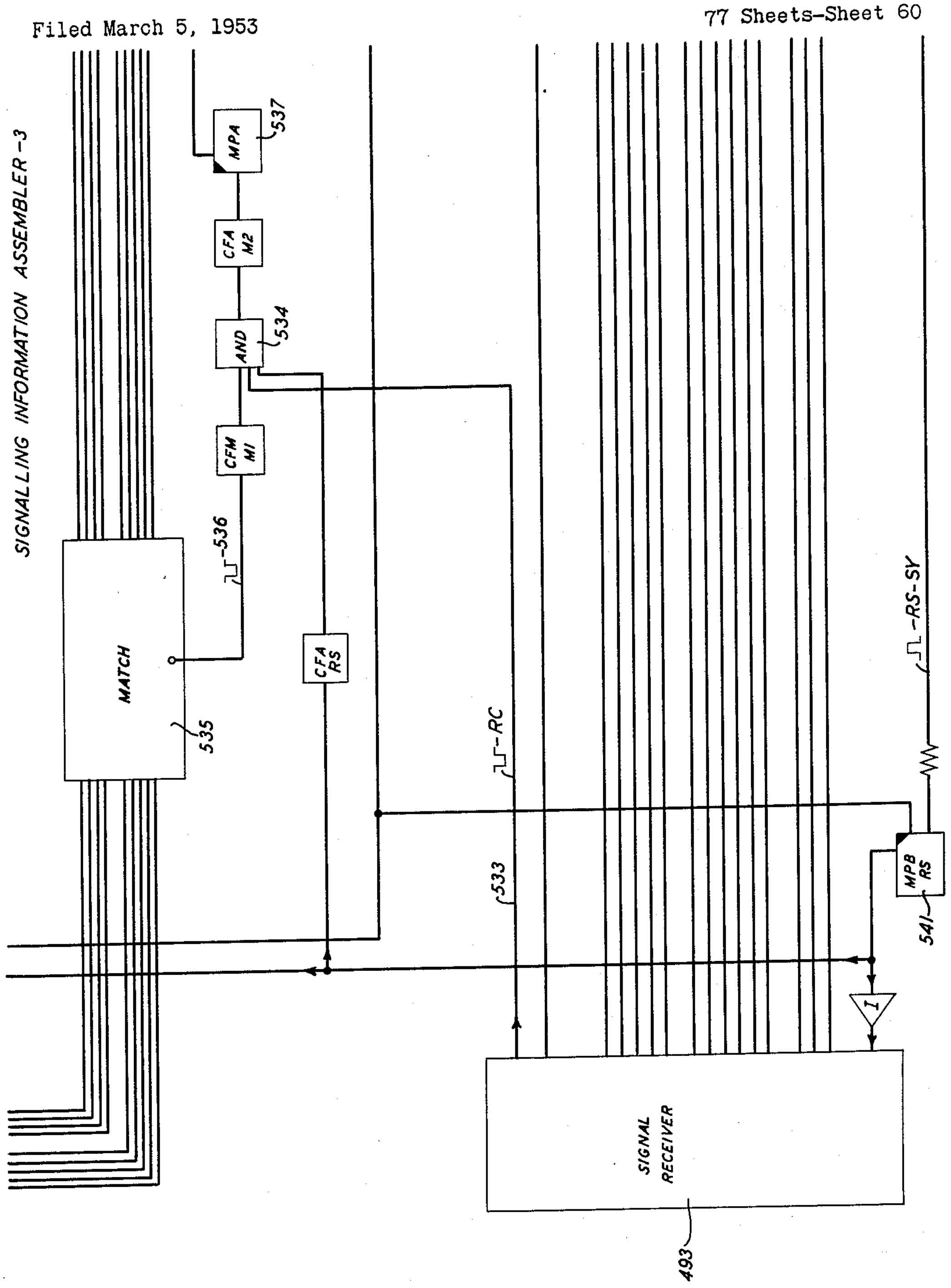
Figure 60:
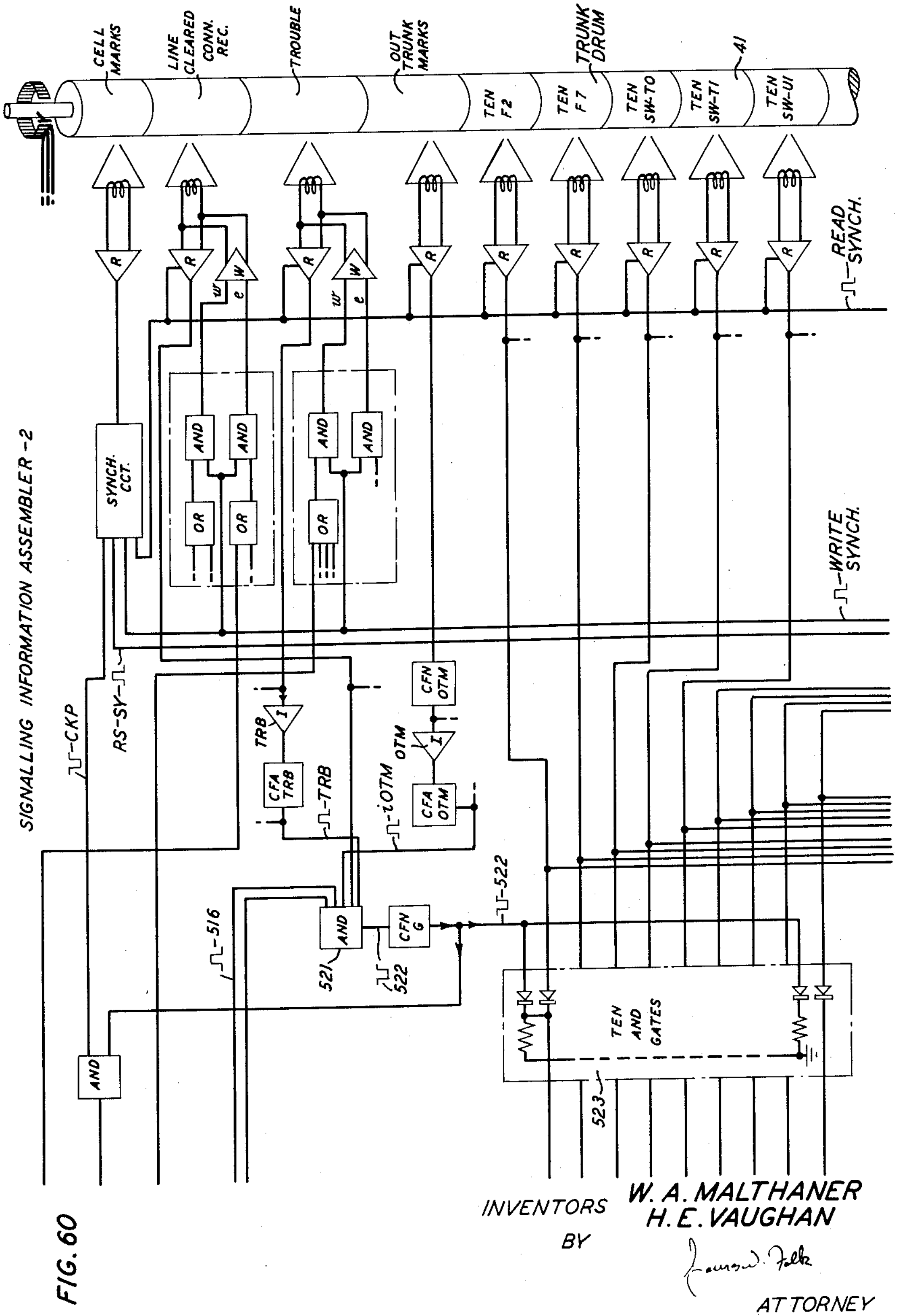
Figure 61:
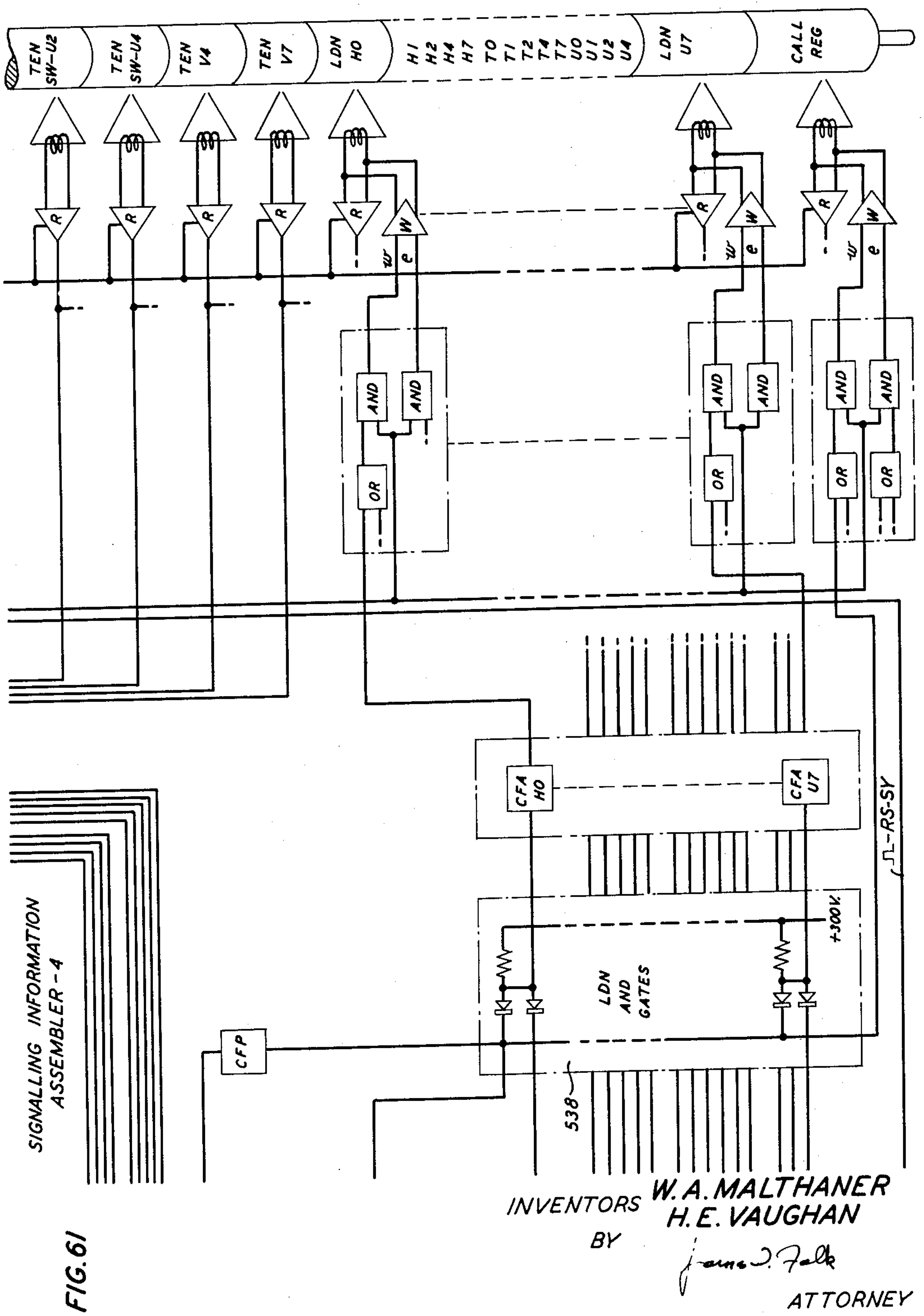
Figure 62:
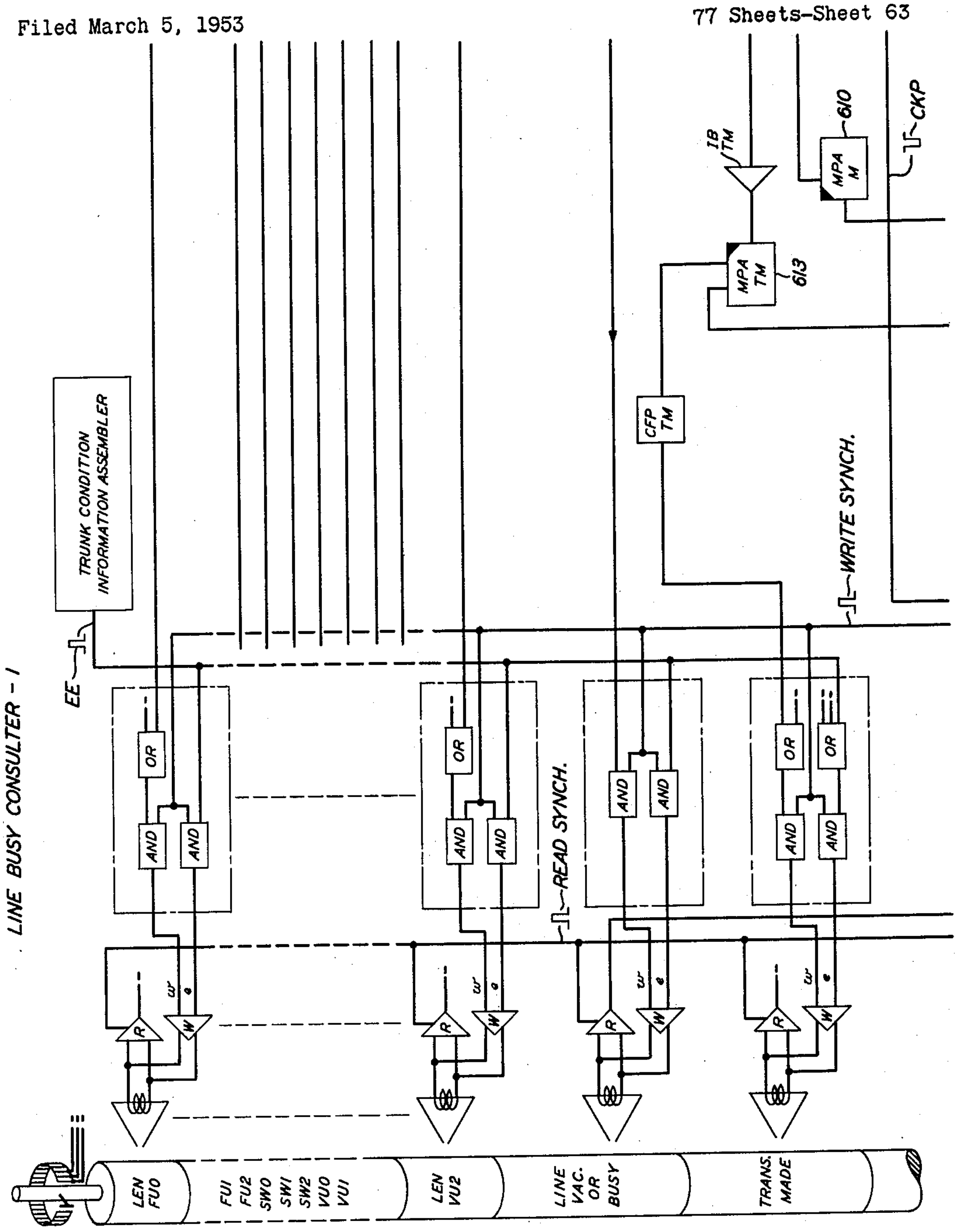
Figure 63:
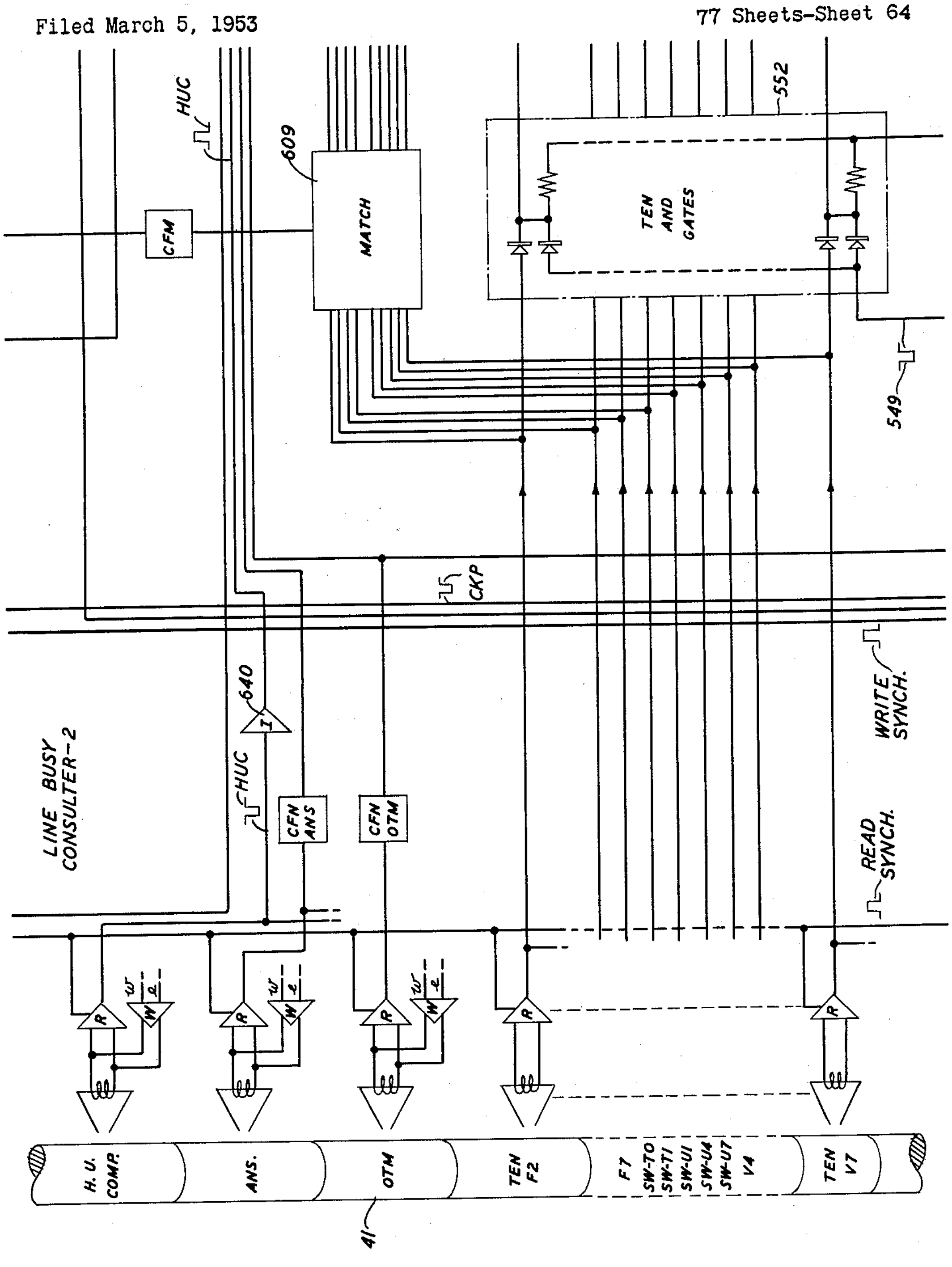

The connector 492 provides full access connections between as many trunks as there may be in the office, each being assigned an individual diode 489 and relay 490 to energize a lead to the connector 492, and as many signal transmitters 372 seen in Fig. 56, and signal receivers 493, seen in Fig. 57, as there may be in the office. In the particular embodiment depicted in the drawing only two signal transmitters and two signal receivers are assumed to use the one full access connector 492. The other signal transmitters and receivers would be parts of a signalling dispatcher, transmitter, and controls circuit 496 shown on Fig. 56, and a signalling assembler, receiver and controls circuit 497, shown on Fig. 57, which include a signalling dispatcher circuit, as described above, and a signalling assembler circuit, as described below. The trunk equipment numbers from these circuits are applied to the OR circuits 483, seen in Figs. 52 and 53, in the same manner as above described, and the signal dispatcher and assembler of circuits 496 and 497 are in common lock-out with the other dispatcher and assembler circuits, being connected to the lock-out toggles 480 and 481 over leads 498 and 499, respectively.

Figure 52:
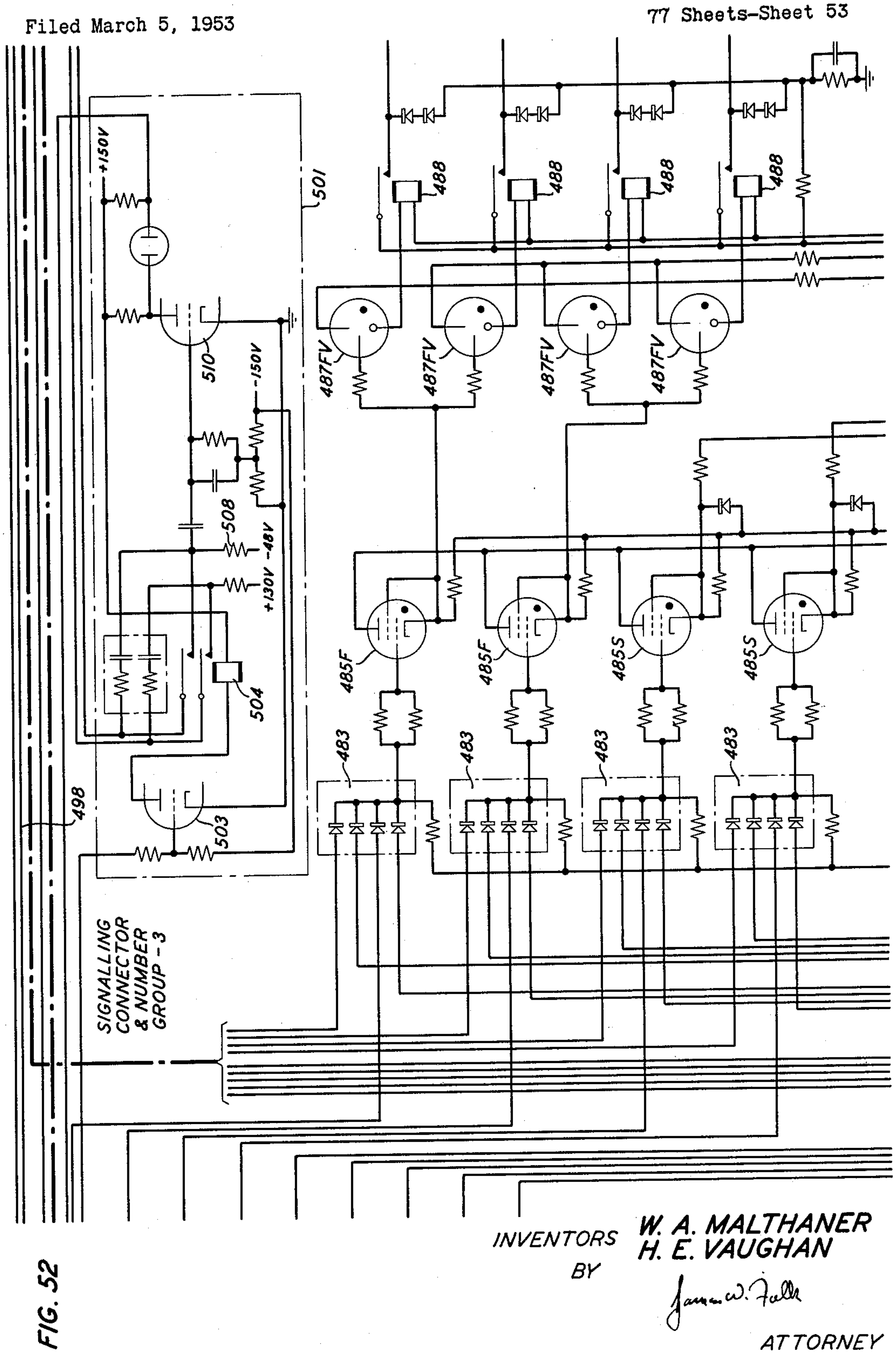
Figure 55:
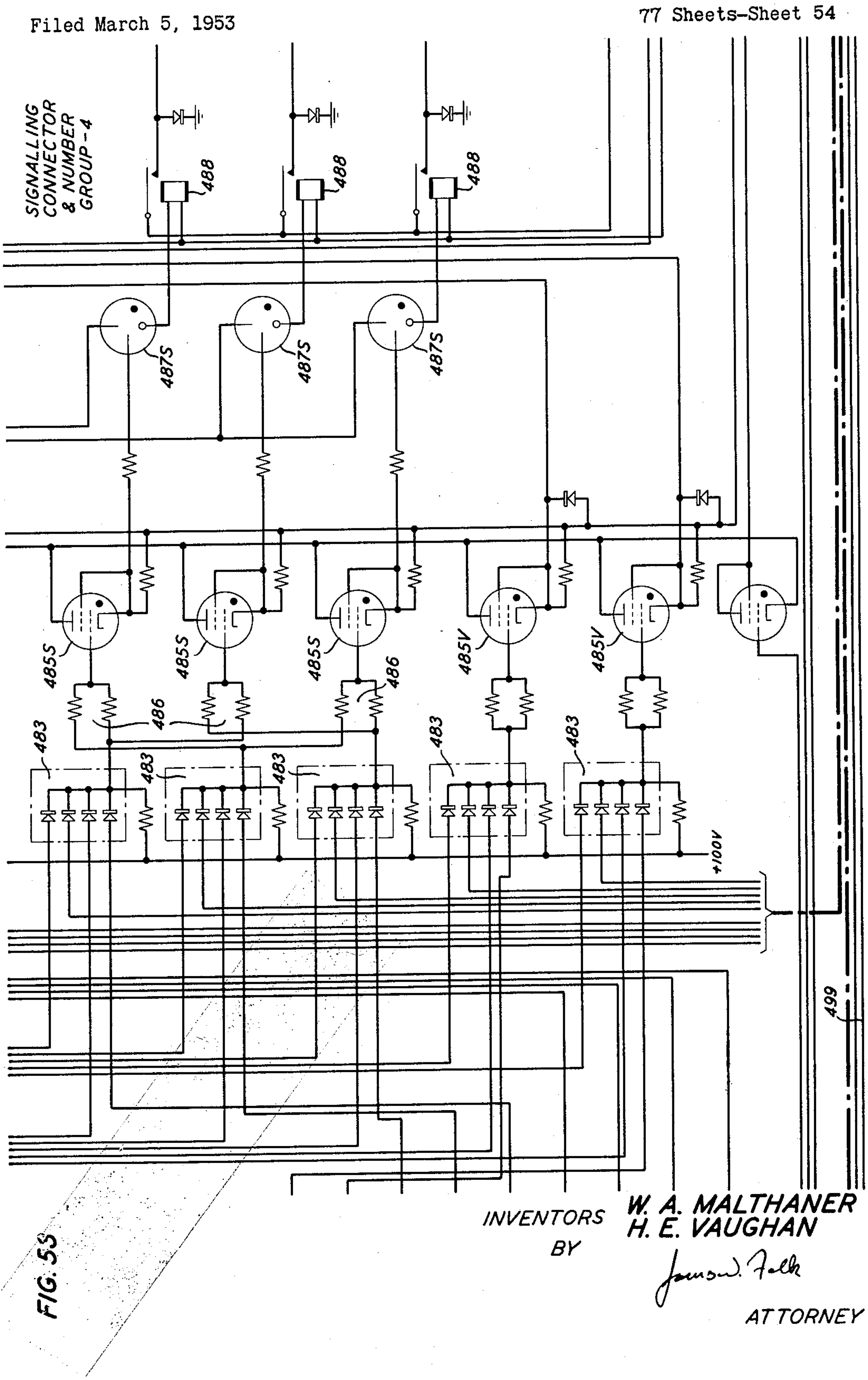
Figure 54:
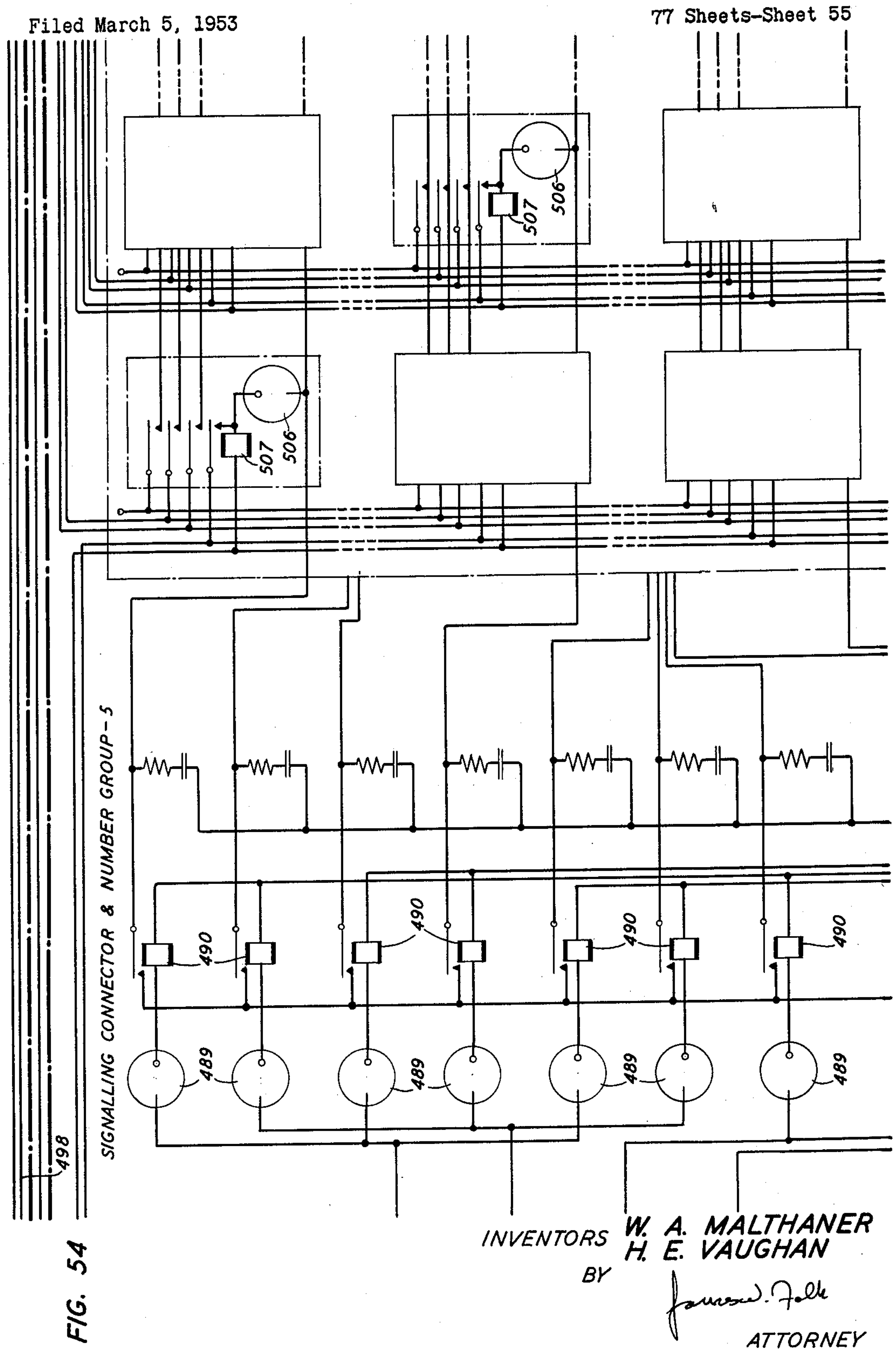
Figure 55:
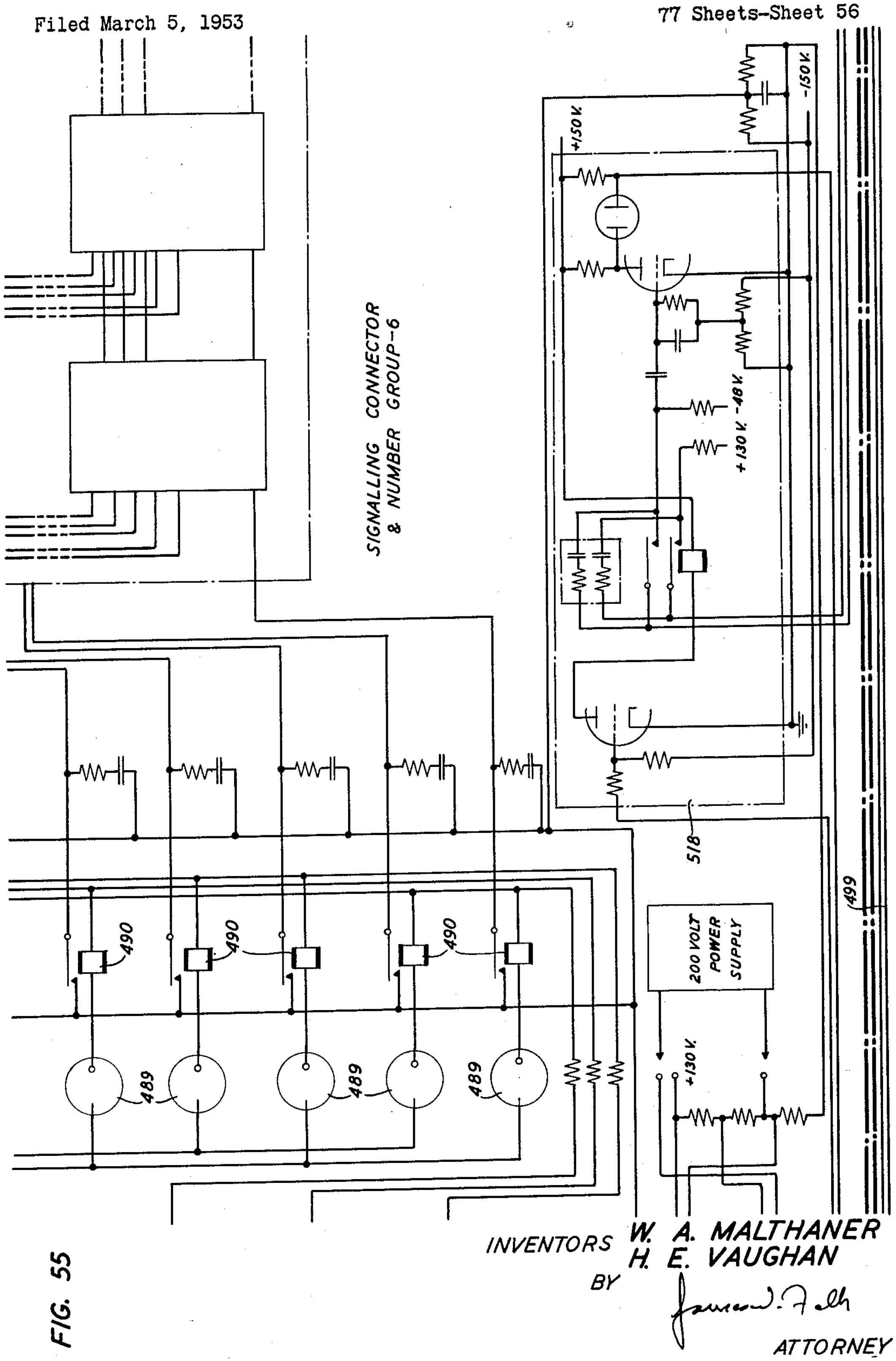

The control or breakdown potentials and the holding potentials are applied to the connector 492 from a circuit 501 shown on Fig. 52. Operation of toggle 480 causes the bias to be decreased on a triode 503 in this circuit 501 so that it conducts current and causes operation of relay 504. Relay 504 applies +130 v. and −48 v. to the one side of the horizontal multiple crosspoint in the connector which has access to the signal transmitter. The +130 v. from this source on one side of the crosspoint and −90 v. applied by the operated relay 490 on the other side cause the crosspoint tube 506 at the particular marked intersection to fire. When the crosspoint relay 507 operates on firing of tube 506 one of its contacts, advantageously of the reed type, shorts out the crosspoint diode 506 and current flows through closed contacts of relay 504 and resistor 508 in circuit 501. This raises the voltage across this resistor and thus increases the voltage applied to the grid of triode 510 which in turn causes a pulse to be applied to toggle 512, seen on Fig. 50, causing it to operate. A pulse from toggle 512 causes AND gate 513 to be disabled and toggle 480 released. Relay 504, which was operated under control of toggle 480, is now held by toggle 512 through an OR circuit 514. At this time, which may be about 8 milliseconds after applications of voltage step 459 to the signalling connector and number group, toggle 471 or a similar toggle in circuits 496 and 497 may take control if so ordered by their signalling assembler or dispatcher.

Figure 51:
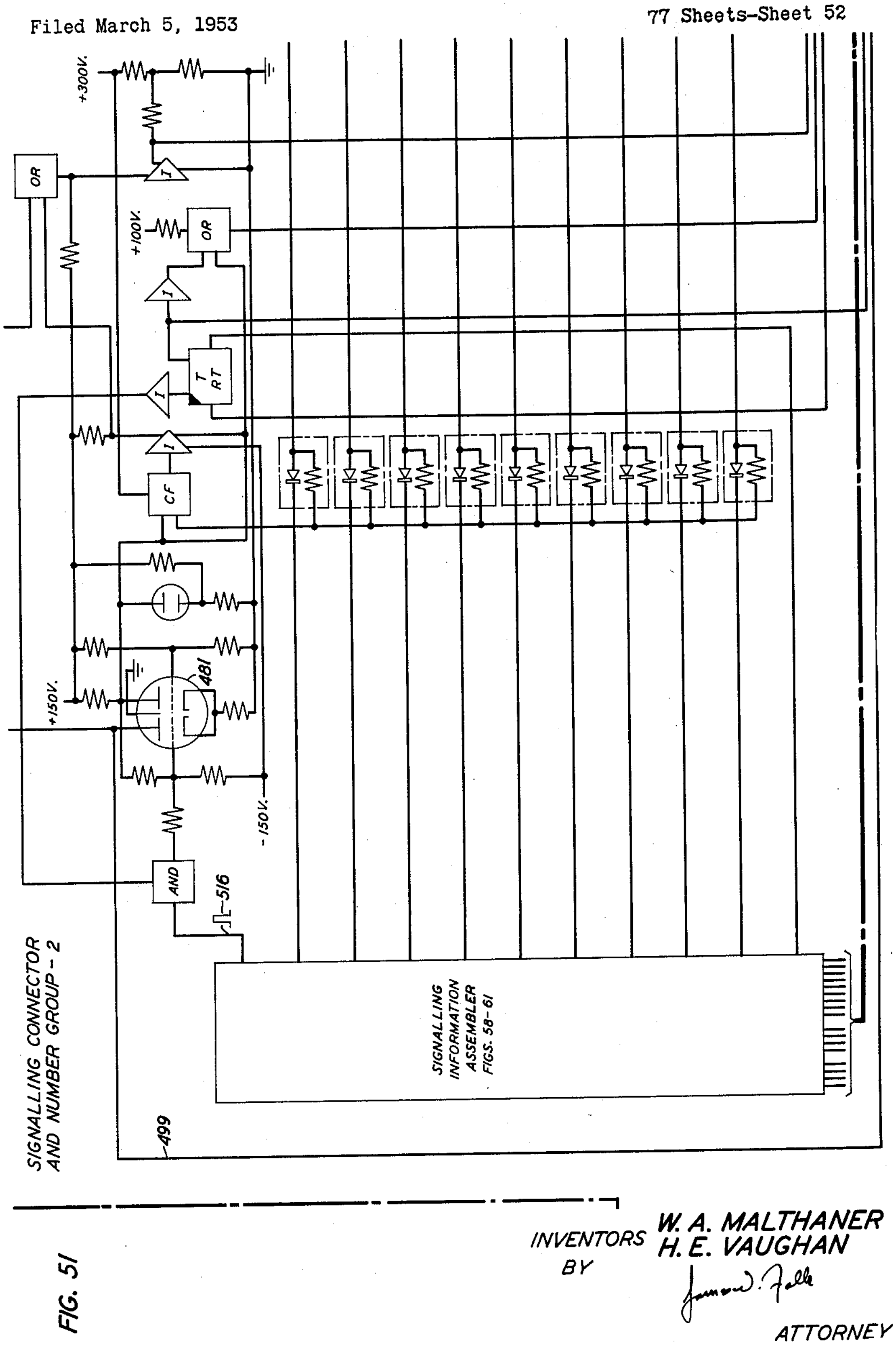

The operation of the signalling connector and number group circuit when the trunk equipment number and start signal are provided by the signalling assembler in the called office is quite similar to that described above for the signalling dispatcher, the start voltage 516, seen on Fig. 51, being applied to the lock-out toggle 481. Circuit 518, seen on Fig. 55, functions in the same way as circuit 501 to apply the marking and holding potentials to the connector 492.

*Storage of called line number on in-trunk drum in called office*

The registration complete order from the signal receiver circuit 433 enables a matching circuit in the signalling Information Assembler of the Receiver Circuit 433. This matching circuit compares the static trunk equipment number which it has previously registered from the drum with the trunk equipment numbers continuously read from successive slots of the trunk drum. The match circuit emits a pulse when the drum slot corresponding to the incoming trunk for which it has information is passing under the magnetic heads. When this slot is found, the called line directory number is written in it together with a Call Registered progress mark. As soon as this information has been written on the drum, the Signalling Information Assembler restores to normal, releases the connection between the trunk and the Signalling Receiver and resets the Receiver circuit 433.

*Illustrative embodiment of signalling information assembler circuit of receiver in called office*

After a connect received call progress mark has been registered on the in-trunk drum by the Trunk Condition Information Assembler 383, as described above, this circuit accepts information from the drum into its registers, checks the registration, controls the connection of the signal receiver 433 to the incoming trunk and when the line directory number is registered, it seeks a match to gate the registration in the proper slot on the drum.

When the connect received call progress mark is read out of a particular slot, it is applied to an AND gate 521. A pulse 522 appears at the output of gate 521, if there is not an out-trunk mark written on the drum, that is, an inverted OTM pulse, shown on the drawing as *i*OTM, is present signifying that this is an in-trunk, if there is no trouble pulse TRB present, and if the start voltage step 516 is not being applied to the Signalling Number Group and Connector circuit. If there are two or more signalling information assembler circuits, an enablement is provided from a sequence circuit 520 to the gate 521 in only one signalling information assembler. Pulse 522 enables the trunk equipment number AND gates 523 so that pulses in the trunk equipment number cells of this particular slot on the drum can operate the corresponding trunk equipment number register toggles 524. If the registration is a feasible one, as checked by a check circuit 526, the OK output pulse 527 of the check circuit 526 operates the OK monopulser 529 which causes the erasure of the connect received call progress mark in the slot and operates the busy or BSY toggle 528, which causes the positive step 516 to be applied to Signalling Number Group and Connector, as described above. When the BSY toggle 528 operates, the voltage step 516 also disables the AND gate 522 so that the TEN registration cannot be altered by data in the following cells, and a negative voltage step from the BSY toggle is also applied to sequence circuit 520 which causes it to advance to the next sequence stage removing the enablement provided to gate 521 of this signalling assembler and applying enablement to the corresponding gate in the signalling assembler to be used for the next call. If the registration is not feasible, the NG output pulse 530 of check circuit 526 operates the trouble or TR monopulser 531 which causes a mark to be written in the trouble call progress mark cell and the reset of the TEN toggles 524.

When the signalling receiver has been connected to the in-trunk and the line directory number reposes in the register in the signal receiver circuit 433, a registration complete signal RC appears on lead 533 from the signal receiver, which itself is seen on Fig. 53. Signal RC enables an RC AND gate 534, seen on Fig. 59. In the meantime the match circuit 535 is continuously matching the data in the TEN register toggles 524 with successive sets of data read from the TEN channels on the trunk drum. At the time a match is found, the pulse 536 from the match circuit together with signal RC operates a monopulser 537 which enables all the line directory number gates 538 so that the line directory number in the register in the signal receiver circuit 433 can be written onto the trunk drum. Operation of monopulser 537 also causes a call registered mark to be written, in the call registered channel seen at the bottom of Fig. 61; operation of monopulser 537 further causes operation of a reset or RS monopulser 541 which in turn blocks the AND gate 534 to prevent pseudomatches and monopulser 537 also resets the TEN register toggles 524. A reset pulse is also applied from the reset monopulser 541 to the signal receiver circuit 433 to reset that circuit. After about six cell periods have passed the RS monopulser 541 returns to normal and resets the BSY toggle 528. The circuit is then ready to handle the next call.

*Translation of line directory number to equipment number*

Before a connection can be established to the called line designated by the directory number now stored on the in-trunk slot, the idle or busy condition of the line must be ascertained and a corresponding line equipment number obtained. To perform this function the Line Busy Consulter circuit 544 is energized when a call registered call progress mark has been written. The called line directory number and the trunk equipment number are registered and checked. If the check is satisfied, the call registered mark is erased from the drum and a Line Translation order toggle is operated. The Line Translation order enables a matching circuit in the Line Busy Information Dispatcher circuit which is associated with the line drum. This matching circuit seeks a match between the static line directory number in the Line Busy Consulter register and the various line directory numbers read into it from the line drum. Three results are possible: The line is found and idle; the line is found but busy; no such line can be found. If the line is found and idle, a pulse from the match circuit causes the associated line equipment number to be transmitted to and registered in the Line Busy Consulter circuit, and a terminating busy mark is written in the line drum slot.

If the line is found but is busy, a pulse from the match circuit causes the Line Busy Information Dispatcher to substitute a special directing code for the called line directory number. The matching circuit then continues to operate seeking now a match on this special code. The special code, which need not be a number from the possible directory number series, identifies line terminals in the switching network on which busy tone occur and there may be many of these. When a match occurs on one of these busy tone locations which is not itself busy, the corresponding line equipment number is registered in the Line Busy Consulter circuit. The Line Busy Consulter waits about two drum revolutions for an equipment number from the line drum, one revolution to permit finding the desired line and an additional revolution to permit finding a busy tone appearance in case the line was busy. If no equipment number is received within this period, the Line Busy Consulter assumes that no such directory number is in use in the office and it substitutes a special directing code for the called line directory number. This special directing code, the vacant-line tone code which may be the same or different than the busy tone code, enables the matching circuit in the Line Busy Information Dispatcher to examine the line drum once more with this new address. As in the other cases when a match is found on an idle slot, the corresponding line equipment number is registered in the Line Busy Consulter and the slot is marked busy.

As soon as a line equipment number is registered in the Line Busy Consulter and has been checked, a match circuit is used to find the proper slot on the trunk drum for recording this line equipment number. The match circuit uses the trunk equipment number as an address. When the line equipment number is recorded in the in-trunk slot of the drum, a translation made call progress mark is written and, if the equipment number is that of a busy or vacant tone appearance, a line vacant or busy mark is also written. After this writing operation the Line Busy Consulter resets to its idle condition.

*Illustrative embodiments of line busy consulter and line busy information dispatcher circuits*

These circuits receive information from the in-trunk drum 41, register it, and test whether the called line is idle, busy, or vacant. If the line is idle, the called line equipment number is registered. If the line is busy or vacant, the line equipment number of a busy-tone line is registered. These circuits are also used to control erasure of the line busy call progress marks on the line when a hang-up before answer condition occurs.

Figure 64:
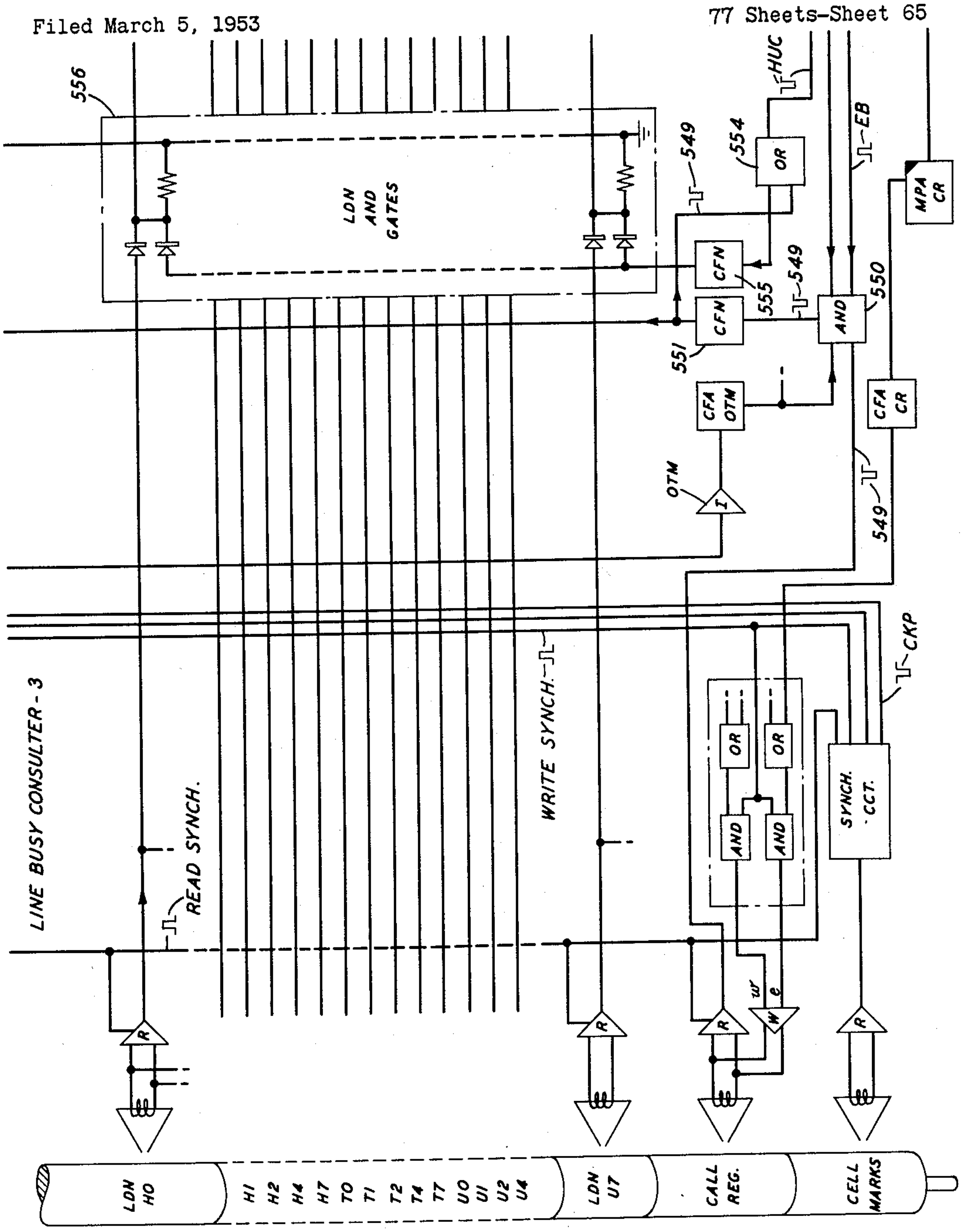

In the progress of the call through the specific illustrative embodiment of a system in accordance with our invention, the called line directory number, LDN, and a call registered call progress mark have been recorded on the in-trunk drum, as described above with reference to the signalling information assembler circuit and as seen on the drum on Fig. 64. If the line busy consulter circuit is idle when a call registered call progress mark is read, a pulse 549 passes through the AND gate 550 and a cathode-follower circuit 551 to enable the trunk equipment number AND gates 552; pulse 549 also passes through an OR circuit 554 and a cathode follower 555 to enable the line directory number AND gates 556. As a result the trunk equipment number toggles 558 and the line directory number toggles 559 operate in accordance with the registrations of these numbers on the trunk drum and apply voltage steps through a second set of line directory number AND gates 561 and, in some instances, OR gates 562 described further below, to the line busy information dispatcher. Additionally, operation of any of the toggles 558 causes a voltage step to be passed through OR circuit 563 and cathode follower 564 to operate monopulser CR which causes the erasure of the call registered mark in this trunk drum slot. The voltage step from the cathode follower 564 is also used to block the AND gate 550, through inverter 566, and also to apply a line translation voltage step LT through the normally enabled LT AND gate 567 and inverter 568 to the lead 569.

The voltage steps on the line directory number leads 570 and the line translation lead 569 from the line busy consulter cause the operation of the line busy information dispatcher circuit to commence. There will be as many line information dispatcher circuits as there are line drums in the office and each is utilized by the single line busy consulter circuit. No lock-out between the various dispatcher circuits is needed as the line directory number stored in the line busy consulter circuit will only appear on one line drum. A match is sought, by match circuits 571 and 572 between the line directory number permanently written onto the line drum in the slot assigned the particular called line 43 and the line directory number data on leads 570. When a match occurs in both circuits a pulse at the output of the match AND circuit 574, seen on Fig. 68, causes the match monopulser 575 to operate. Operation of monopulser 575 causes a six microsecond pulse to be applied to the line translation or LT AND gate 571, which has been enabled by a line translation voltage step LT from the line busy consulter circuit. The pulse out of the LT AND gate 576 passes through a cathode follower 577 and is applied to both the line busy or LB AND gate 578 and the line idle or LI AND gate 579.

If the called line is not busy with another terminating call, as determined by the absence of a call progress mark in the line busy cell, has nothing in its DC1 cell and there is no pulse from the scanner in its time slot, indicating that it is not busy on an originating call or requesting service, then the output of OR gate 583, seen on Fig. 68, is positive and the output of inverter 584 is negative. This condition, plus step LT from the line busy consulter will give a pulse on the output of the line idle AND gate 579 which passes through the LI cathode follower 586 and enables the line equipment number gates 587 so that pulses on the line equipment number leads 588 from the channel amplifiers 589 will be sent to the line busy consulter as the translation for the line directory number used to initiate the action. At the same time that the LEN gates 587 are enabled, the write line busy or WLB monopulser 591 is operated. The positive pulse on its output passes through a WLB cathode follower 592 and causes the line busy call progress mark to be written in the line busy cell of the slot assigned to the called line.

If the called line had been busy, as indicated by a call progress mark already present in the line busy cell, a mark in the dial pulse control cell DC1, or a pulse on the scanner lead, then a pulse would be present at the output of OR circuit 583. This condition would cause the line idle AND gate 579 to be disabled and the line busy of LB AND gate 578 to be enabled so that a pulse would pass through it and an OR circuit 594 to operate the line busy toggle 596, as seen on Fig. 69. The voltage step 598 resulting from operation of LB toggle 596 causes the line directory number gates 561, seen on Fig. 67, to be blocked and voltages applied through OR circuit 562, to the U0, U4, and U7 leads which, in this embodiment, define the line directory number code of the busy-tone lines. When a match is found for this code, a negative pulse at the output of the match AND gate 574, seen on Fig. 68, operates the match toggle 575 which then causes the line busy call progress mark to be written and the line equipment number to be sent to the line busy consulter as described above. A pulse out of the line idle cathode follower 586 resets the line busy toggle 596.

Figure 65:
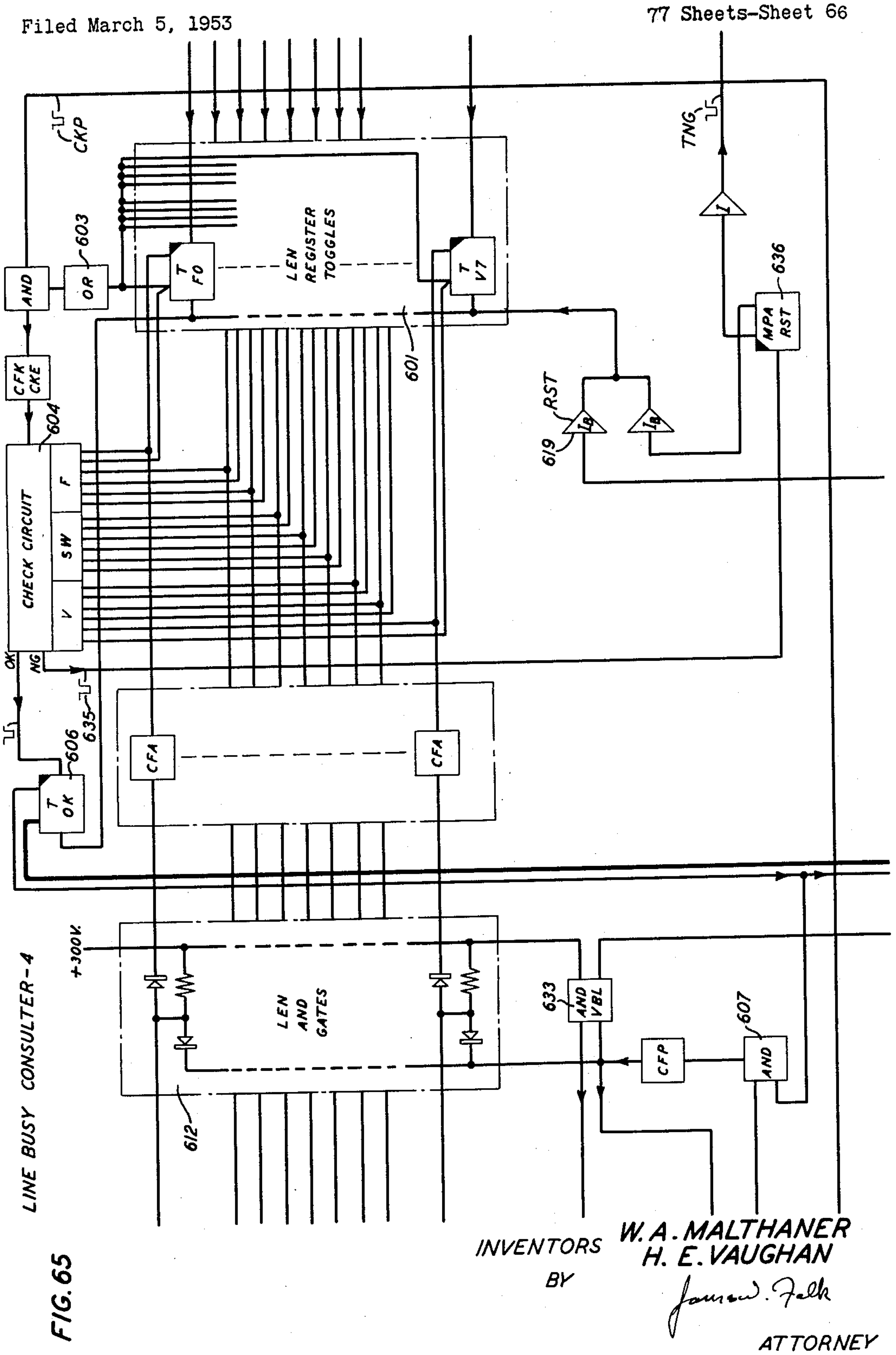

When a translation has been made and a line equipment number returned to the line busy consulter, it is registered in the line equipment number register toggles 601. When any one of these toggles 601 operates a check pulse 602 is applied through an OR circuit 603 to a check circuit 604. If the registration is plausible, the OK toggle 606 operates, enabling an AND gate 607 and disabling the line translation AND gate 567, seen on Fig. 67. In order to position the line equipment number thus found and checked in the correct slot on the in-trunk drum, a match is sought between the trunk equipment number previously registered in toggles 558 when the called line directory number was registered in the line busy consulter circuit and the same trunk equipment number on the trunk drum. When the match is found by a match circuit 609, seen on Fig. 63, a match monopulser 610 operates for about six microseconds and the line equipment number AND gates 612, seen on Fig. 65, are enabled through the AND gate 607. Pulses from the LEN register toggles 601 pass through the LEN AND gates 612 and cause the line equipment number to be written on the drum in the slot defined by that particular trunk equipment number. At the same time a translation made or TM monopulser 613, seen in Fig. 62, operates and causes a translation made call progress mark to be written in that slot on the trunk drum. When the TM monopulser 613 operates, the reset or RS monopulser 615 is operated through an RS OR gate 616. At the time RS monopulser 615 returns to normal, a pulse through the RS inverter 618 and the RST inverter 619 causes all the toggles to be reset. A REV monopulser 621 described further below, is also reset at this time.

Figure 66:
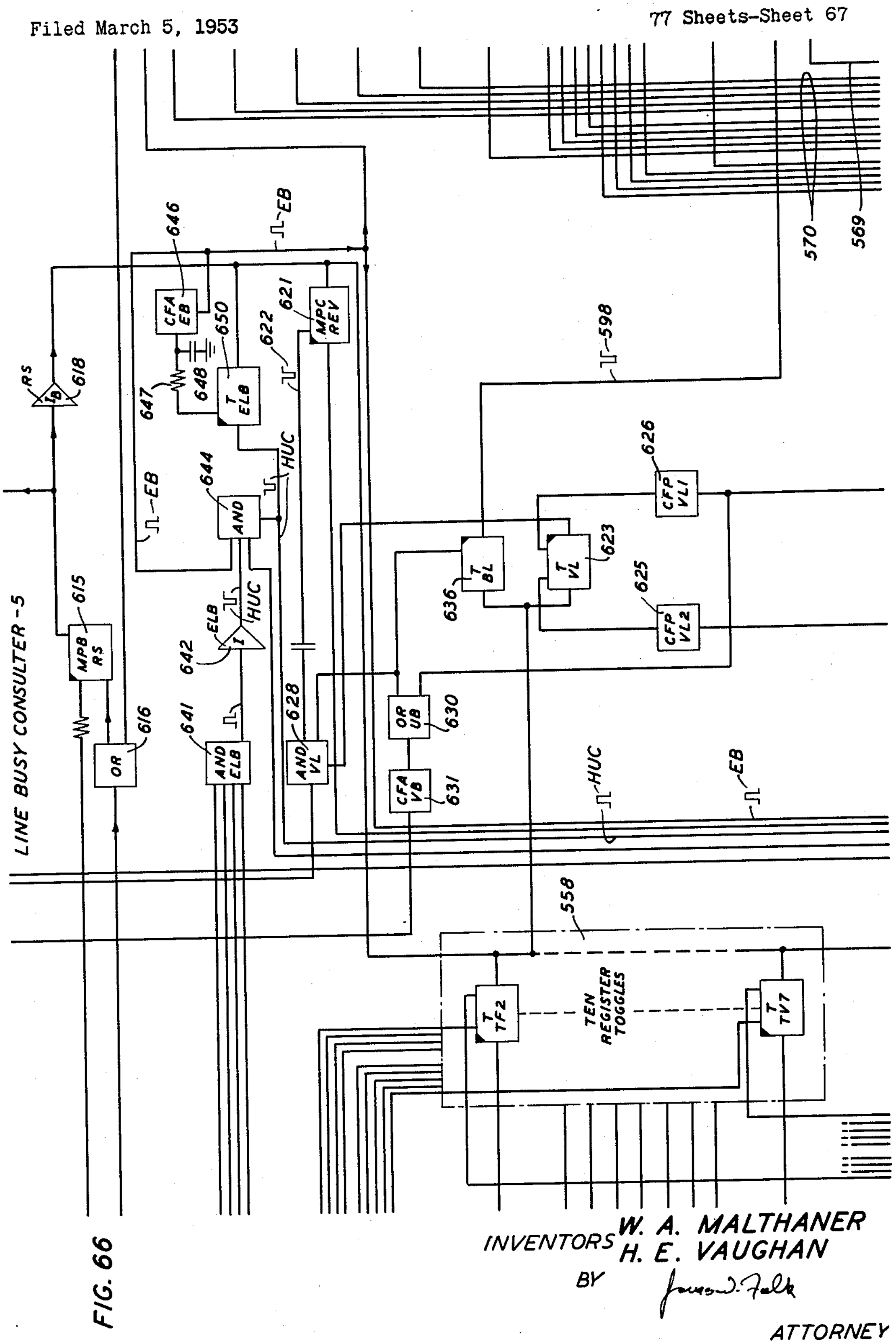
Figure 67:
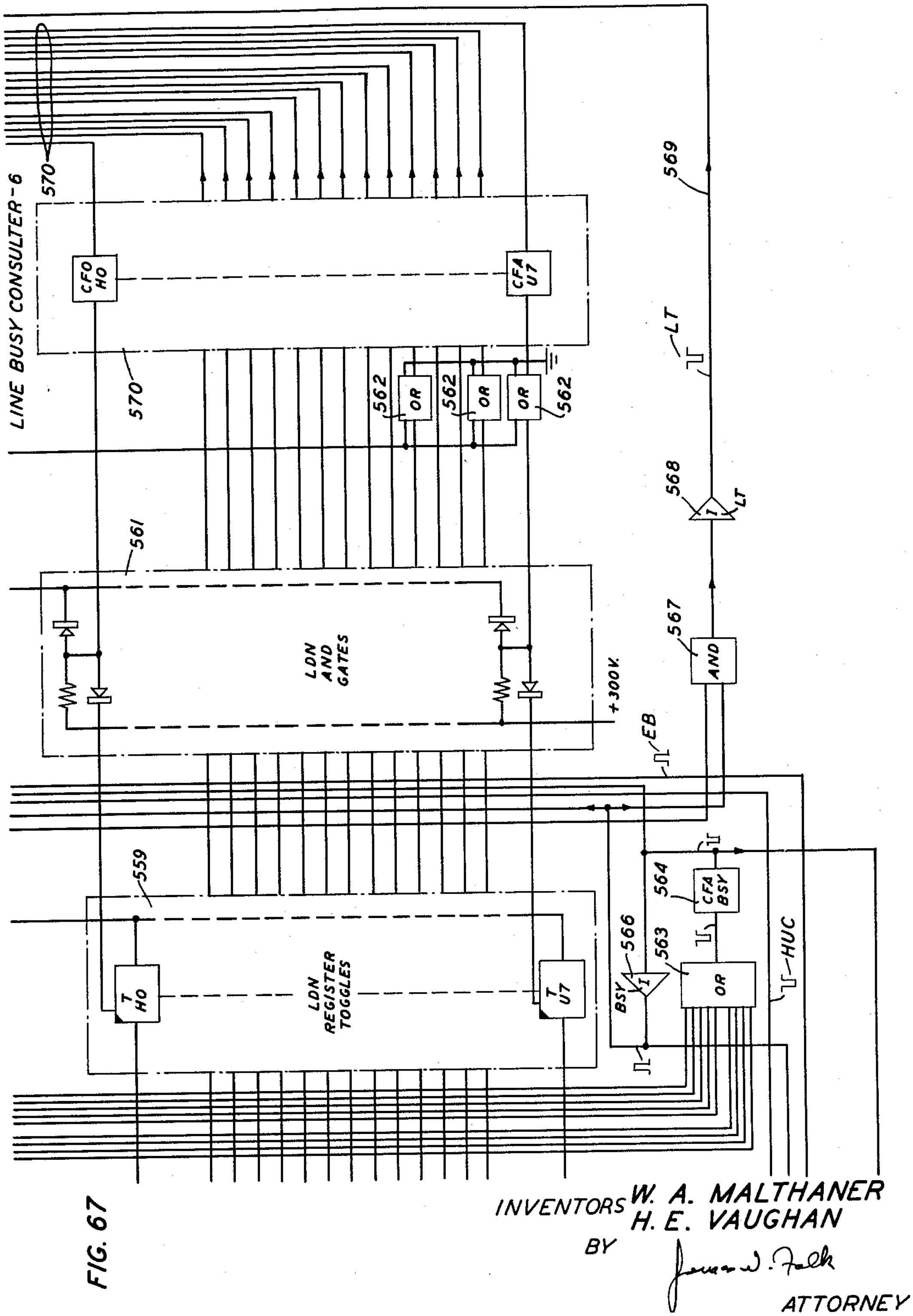

If a translation is to be made between the LDN and a LEN number of a subscriber's line 43, the translation will be made in one revolution of the line drum. If, however, the translation is not made because the subscriber's line was busy, then a second revolution of the drum is needed in order to find a translation to the LEN of a busy-tone line. However, at the end of two revolutions if a translation can be made, it will have been. Thus, if no translation is made at the end of the second revolution, it is an indication that there is no such called line directory number in this office, or that the called line is vacant. The REV monopulser 621 seen on Fig. 66 is, therefore, employed to time the translation; it is operated upon operation of the cathode follower 564, seen in Fig. 67. If a line directory number match is not found within these two line drum revolutions by the line busy information dispatcher, then the REV monopulser 621 returns to normal and a negative pulse 622 passes through the vacant line or VL toggle 623 which causes the LDN AND gates 561 to be disabled by a voltage step through cathode follower 625 and the vacant code OR gates 562 to be enabled by a voltage step through cathode follower 626 so that a vacant-line code is sent to the dispatcher. Voltage from the OK toggle 606, seen on Fig. 65, to a VL AND gate 628 through which the pulse 622 passes disables this gate and blocks pulse 622 if the time out occurs after correct registration of a line equipment number. With the vacant-line code as an address, a translation is then made and a corresponding line equipment number registered and checked as before. When the trunk equipment number match occurs, the line equipment number and a call progress mark indicating that this is a vacant or busy line are written on the drum; the circuit is then reset. The pulse from cathode follower 626 passes through an OR circuit 630 and cathode follower 631 to enable an AND gate 633 so that when a match is found, as indicated by a pulse from match monopulser 610, the call progress mark line vacant or busy is written.

If the check of a line directory number given to the line busy consulter by the line busy information dispatcher results in an NG signal 635 indicating that the code is not feasible, the signal 635 operates monopulser 636 momentarily. Monopulser 636 resets the line directory number register toggles and sends a signal TNG indicating that the translation was no good or improper. Signal TNG is applied to OR gate 594 and operates toggle 596, seen on Fig. 69, to cause the line busy information dispatcher to switch to a different line equipment number associated with busy-tones, as described above. A new translation for the line directory number of one of these busy-tones is then obtained.

If the called line is busy, a busy pulse 598, described above, is applied to the line busy consulter along with the LEN of a busy-tone line from the dispatcher circuit. Pulse 598 causes operation of a busy line toggle 636 seen on Fig. 66, which in turn blocks the AND gate 628 and enables AND gate 633 through OR gate 630 and cathode follower 631 so that the line vacant or busy call progress mark is written when a match of trunk equipment numbers occurs, as described above.

When the connection to a busy-tone line is released, the erasure of the line busy mark on the line drum is under control of the line scanner, as described further below with reference to the busy-tone line circuit, seen in Fig. 74, and the Dialing Assembler Circuit 51 in the same manner as if the call had been completed.

In many cases after a translation has been made for the called line directory number, the calling party hangs up before receiving an answer. Since the called line is marked busy, it is necessary to erase this mark. When a connection to a line is unanswered and disconnection occurs, the hang-up interval is timed and a mark written in the hang-up completed cell of the slot of this particular trunk, as described above. The hang-up completed mark is read, the read pulse HUC is inverted by inverter 640, and applied to an AND circuit 641, seen in Fig. 66. This AND circuit is enabled if the hang-up condition has been timed on an in-trunk, the call has not been answered, and the called line was not busy or vacant, in which last case erasure of the line busy mark on the line drum would be under control of the scanner, as mentioned above. These conditions are applied to the AND circuit 641 so that if a mark is read in the out-trunk channel, indicating that this is not an in-trunk, in the answer channel, indicating that the call has been answered, or in the line vacant or busy channel, indicating the called line was vacant or busy, the AND circuit 641 is disabled. Assuming the AND circuit 641 to be enabled and a hang-up completed pulse HUC to be present, this pulse is reinverted by inverter 642 and applied to AND circuit 644. AND circuit 644 is enabled when pulse HUC is present, the line busy consulter circuit is not busy with a translation, as indicated by operation of the busy cathode follower 564, seen on Fig. 67, and the circuit is not already busy with the function of erasing line busy. This last disablement is provided by cathode follower 646 which is operated after a delay, provided by resistance 647 and capacitance 648, upon operation of toggle 650 in turn operated upon operation of AND circuit 642.

When the hang-up completed pulse HUC passes through AND gate 642 besides operating toggle 650, the pulse is also applied to OR circuit 554, seen on Fig. 64, to open the line directory number gates 556 through operation of cathode follower 555. This allows the line directory number to be applied to match circuits 571 and 572, as described above, so that the line directory number can be used as an address for the finding of the slot in which it is desired to erase the line busy mark. The pulse generated on operation of toggle 650 and cathode follower 646 also disables AND circuit 550, seen in Fig. 64, to prevent a translation while the line busy mark on the line drum is being erased and enables an AND circuit 647, seen in Fig. 68, so that when the match is found, as indicated by operation of match toggle 575, the erase busy pulse EB is passed through a cathode follower 639 to the erase lead of the writing amplifier 651 of the line busy channel.

Operation of AND circuit 647 also causes a pulse to be applied, through inverter 652, to OR circuit 616, seen in Fig. 66, to operate reset monopulser 615 to reset the line directory number toggles 556, as described above.

*Establishment of terminating talking path*

After the translation has been made from the called line directory number to the line equipment number of that line in the called or terminating office, a call progress mark is placed in the translation made cell of the trunk slot containing these numbers, as described above. This mark is read out on the next revolution of the trunk drum and is utilized to gate the line and trunk equipment numbers into storage registers in the switching information dispatcher in circuit 655 in the terminating office. After a satisfactory check of these numbers has been made, the translation made call progress mark is erased from the drum, switching network informed and switching network connected call progress marks are written and an establish order is sent to the switching number group connector circuit. In the same manner as described above for the originating portion of the call, a path is selected and locked up through the switching network between the incoming trunk and the called subscriber, and, as before, a release signal from the switching control and number group circuits 250 is sent back to the switching information dispatcher in circuit 655.

*Illustrative embodiment of switching information dispatcher in*

The Switching Information Dispatcher In 655, an illustrative embodiment of which is depicted in Fig. 70, is essentially the same as the Switching Information Dispatcher Out 248, described above with reference to Figs. 26 through 31, and those elements in the In Dispatcher identical with those in the Out Dispatcher have not been repeated in the drawing. Further, to simplify the understanding of the operation of this circuit by reference to the earlier circuits, elements having similar functions are identified in this circuit by the same number as in the earlier circuit, but marked with a prime.

Figure 29:
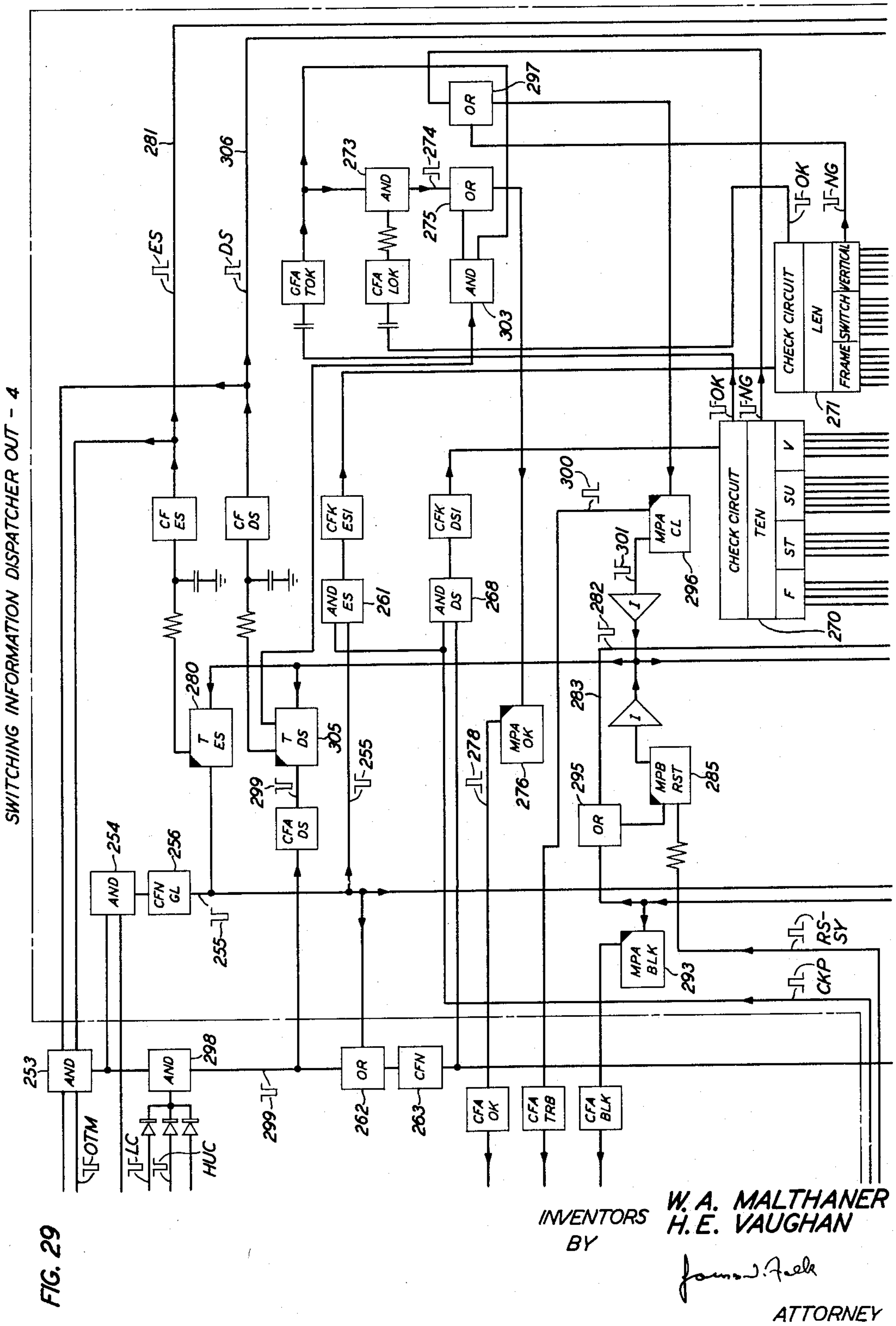
Figure 30:
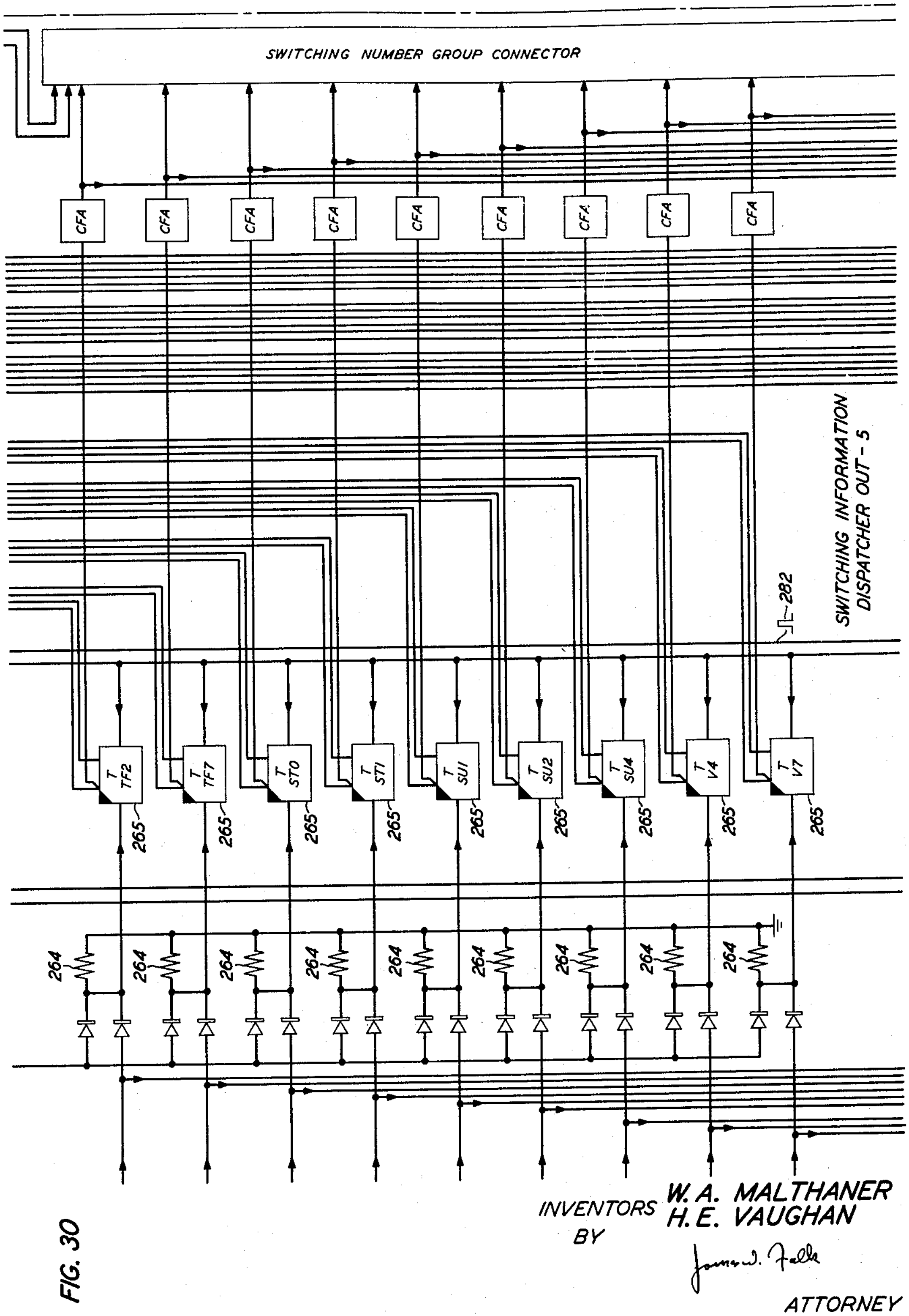

In the out dispatcher AND gate 253 initiated operation of the circuit if there were no signals present in the connection blocked or trouble channels and a mark indicating that this was an out-trunk; in the in dispatcher AND gate 253′ initiates operation of the circuit if there are no signals present in the connection blocked or trouble channels and no mark in the out-trunk channel, thereby indicating that this is in in-trunk. Further, the call progress mark that advised the out dispatcher that it could alert the switching circuitry was dialing complete; in the in dispatcher the functions of the dialing complete pulse DC are achieved by a translation made pulse TM read from the translation made channel on the trunk drum and applied to the AND circuit 254, seen in Fig. 29, in lieu of the pulse DC. The disconnect switching network or DS toggle, seen on Fig. 29, is operated by AND gate 298′ which is enabled only by a pulse HUC, indicating that a hang-up condition has occurred.

*Ringing and tone operations*

When the switching network 49 has established the connection between the incoming trunk and the called subscriber line, ringing present on the incoming trunk from a ringing generator circuit in the incoming trunk circuit, seen on Fig. 41, rings the called subscriber's telephone bell and gives an audible ringing tone to the calling subscriber if the desired connection was established. If the called line was busy or vacant, ringing is immediately tripped and the busy or vacant tone at the line appearance to which the call was terminated is heard by the calling subscriber.

*Recording of answer condition and call accounting*

When the calling subscriber answers the call, the ringing is tripped and a relay in the incoming trunk is operated which alters the voltage on the interoffice conductors. This voltage picked up by the trunk scanners in both the originating and terminating office is interpreted by the Trunk Condition Information Assemblers and an Answer, ANS, progress mark is written in the trunk slot on the drums in both offices, as described above.

For the purpose of charging the calling subscriber for completed calls complete information as to the identity of both the calling and called subscriber together with a record of the answer and hang-up occurrences are often necessary. In this invention all of this information is conveniently assembled on the trunk drum in the slot concerned with a call, and this information may be transferred to automatic message accounting equipment by the use of dispatching circuits similar to those described herein for the control of the switching network and interoffice signalling equipment.

*Hang-up detection and timing*

There is no further change in the condition of the trunk and switching network circuits concerned with this connection or in the drum records for the duration of the conversation. When either subscriber hangs up at the end of the conversation, a relay in the trunk circuit in his office releases and again alters the voltage on the interoffice conductors. The voltage shifts to one of three new values reflecting the three conditions of calling party, called party, and both hung-up. This voltage is picked up by the scanners in both offices and detected by their Trunk Condition Information Assemblers 383 and a Hang-Up Indicated call progress mark is written on the drums in both offices as described above with reference to the Trunk Condition Information Assembler Circuit.

Timing of the hang-up condition, through employment of hang-up started and hang-up completed channels, may be as disclosed in application Serial No. 340,472, filed March 5, 1953, of W. A. Malthaner.

When the calling subscriber hangs up and a hang-up condition has been detected by the line scanner and dialing assembler circuit and has been timed by the timing circuit, the Dialed Information Dispatcher circuit 51 is again enabled. In this case, however, only the line equipment number is registered in the dispatcher; if the check on this number is satisfied, all of the information stored on the line drum 40 pertinent to this call only is erased and a hang-up order is set up in the dispatcher which enables a matching circuit in the Called Number Assembler circuit 98 to permit finding the slot of the out-trunk drum 42 assigned to this call. When the proper slot is found, a line cleared mark is written on the trunk drum, and the Dialed Information Dispatcher and the Called Number Assembler are reset.

When the called subscriber hangs up after answering, a similar timing circuit on his line drum 40 results in the erasure of the terminating line busy call progress mark on his line slot; these and other hang-up operations have been fully described above.

*Release of talking path and clearing of drums*

When a Switching Information Dispatcher is seized for a releasing function, only the trunk equipment number is stored in its registers. A satisfactory check of this number causes a Switching Network Informed mark to be written and the Switching Network Connected mark to be erased from the drum and results in the establishment of a Disconnect Switches order to the Switching Number Group and Connector circuit. The Switching Network Control circuit uses the trunk equipment number transmitted through the Number Group and Connector circuit to find the trunk terminal of the Switching Network. It applies the voltage required to release the network path locked to this trunk and sends an OK pulse to the Information Dispatcher. The Switching Information Dispatcher thereupon resets and releases the Number Group, Connector, and Switching Network Control circuits.

The erasure of the Switching Network Connected mark permits the next reading of the Hang-Up Completed mark to cause the erasure of all marks and information data pertinent only to the particular call from the trunk drums.

*Match, synchronizing, line, and over-flow tone circuits*

In accordance with one aspect of this invention, as described above, information is placed in the proper slot on a drum by using information already present on the drum as an address and matching that information with the same information present in register toggles. One match circuit that may be employed is shown on Fig. 71. The information designating the particular slot on drum 662 which it is desired to write in is located in register toggles 663. Between each toggle 663 and the reading amplifier 666 of a channel on the drum 662 is a negative OR circuit, comprising diodes 664 and resistance 665. The outputs of these negative OR circuits are combined in a negative AND circuit, comprising diodes 667 and resistance 668. The match circuit functions by comprising the static information, which may be, for example, a line equipment number or a trunk equipment number, located in the toggles 663 with the information read from the drum 662, the latter information, of course, being different for different slots of the drum. Let us consider that the information stored in the toggles 663 is such that at time $t_0$ the first two toggles have been triggered, so that positive voltage steps 670, which may be of the order of 145 volts, are present at their outputs, while a steady voltage level 671, which may be of the order of 90 volts, is present at the outputs of the other toggles. At time $t_1$ the first slot comes under the heads 672 and the information on the drum is such that negative pulses 673 are read out in the first and third channels. No match will occur at this time since the negative OR circuit in the second channel is not enabled having steady positive voltage on both its inputs. A match will, however, occur at time $t_2$, at which time each negative OR circuit will be enabled so that a negative pulse 674 will be passed by the negative AND circuit through the cathode-follower circuit CFM which advantageously comprises a clipper circuit and a negative cathode-follower circuit. The clipper circuit prevents small variations in the output of the negative AND circuit from reaching the grid of the cathode follower. Such small variations may occur in the no-match interval as the AND circuit is held positive sometimes by one channel and sometimes by others.

In accordance with another aspect of our invention, as described above, the reading, writing, checking, and resetting of information are synchronized so that all marks present in a slot of the drum are read simultaneously in spite of minor variations among the reading amplifiers, so that all marks to be written in a slot are written at an exact point within the slot after previous enablement by a functional circuit, so that the registration of information read from a drum slot may be checked at a fixed time after being read, and so that a reset of registers occurs only during the interval when information is being neither read nor written. This is attained by employing synchronizing circuits, an illustrative example of which is depicted in Fig. 72. As there seen, a negative start pulse 678 is read from the cell mark channel of the drum in each slot and amplified by a two-stage amplifier circuit

679, which advantageously includes a clipper circuit. The cell marks in each slot are advantageously positioned slightly ahead of the other marks in the slot to allow an interval for the generation of the Read Sync pulse before the marks in the other channels arrive directly under their respective reading and writing heads. The output of the amplifier 679 is a negative pulse 681 which is applied to a Read Sync monopulser 682, which in turn generates a positive pulse which is applied through a low power cathode follower 684 to a power cathode-follower circuit 685, which generates the Read Sync pulse. Pulse 681 is also applied through a delay monopulser 687 to a check monopulser 688 which generates a negative check pulse through a cathode follower 689.

The trailing edge of the positive pulse generated by Read Sync monopulser 682 and applied to cathode follower 684 is applied to a Write Sync monopulser 691 which in turn generates a positive pulse which is applied through a low power cathode follower 692 to a power cathode-follower circuit 693, which generates the Write Sync pulse. The trailing edge of the positive pulse from monopulser 691 is applied to a reset Sync monopulser 695 to cause cathode follower 696 to generate the Reset Sync pulse RS—SY.

The time relationship between the various pulses generated by the synchronizing circuit is depicted by the time chart shown in Fig. 73.

Turning now to Fig. 74, there is shown one specific illustrative embodiment of a line 43 and a busy-tone line that may be employed in the combination of this invention, as described above. The telephone subscriber is connected to the switching network 49 by a line 43, comprising tip and ring conductors as is known in the art, the tip conductor being connected to the scanner 45. Equal resistances are connected to the tip and ring conductors, the one to a −48 volt source and the other to ground, to provide the low negative and ground potentials on the line 43 for the purposes described above with reference to the Trunk Condition Information Assembler circuit. Busy-Tone lines are also connected to the switching network 49. In this instance, the sleeve or switching network locking lead is connected through a relay 702, and a front contact of this relay is connected to the scanner 45 so that, on energization of relay 702, a signal of −24 volts can be scanned to simulate to the line drum only the answer and subsequent hang up of a called subscriber even though no subscriber is present on the line. A busy-tone source 704 is advantageously connected to the busy-tone line across a varistor circuit 705 which causes the removal of ringing in the trunk circuit without causing operation of the called supervisory relay in the incoming trunk circuit, seen on Fig. 41.

An overflow tone trunk is depicted in Fig. 75. As with a busy-tone line, a front contact of the trunk battery supply and supervisory relay 706 is connected to the scanner so that the continuity of the call to this trunk may be checked and hang up of the calling subscriber detected. An overflow tone source 707 is advantageously connected to the trunk.

*Handling of intraoffice calls*

In the embodiment of our invention described above it was assumed that the calling and called parties would be in different offices. Such will not always be the case as a certain percentage of calls in any office will be intraoffice calls. These may be handled in the same manner as for interoffice calls, i. e., outgoing and incoming trunks are provided and the called line directory number sent over the intertrunk circuit loop by the signal transmitter even though the two ends of the trunk circuit loop are in the same office. However considerable savings can be effected by providing circuitry to handle intraoffice calls without the necessity of utilizing both out and in trunks and the signaling equipment.

Turning now to Fig. 76 one specific illustrative circuit for handling intraoffice calls is there depicted in simplified form, in which reading and writing amplifiers and certain other circuitry, mentioned below and of types already described in detail, have been omitted from the drawing. When the called office code has been dialed the out-trunk selector will locate, in the same manner as for an interoffice call, an intraoffice trunk having that code registered in the office code channels 710 on the out trunk drum 42. As this is an intraoffice code an omit signaling mark will be present in this trunk, preventing operation of the signaling dispatcher circuit. Further an identifying trunk number will be present in a trunk number channel 711.

When the dialing of the called line directory number has been completed and this number registered on the out-trunk drum in the line directory number channels, the dialing complete call progress mark is written. The presence of the dialing complete call progress mark, a class of trunk mark identifying this as an intraoffice trunk, the absence of a trouble mark, and if the transfer of the LDN from the out-trunk to the in-trunk has not taken place, enables the AND gate 713 if the transfer circuit is idle. Operation of AND gate 713 opens the called office code AND gates, the trunk number AND gate, and the LDN AND gates permitting registration on toggle registers, of the type above described, of the called office code, the trunk number, and the line directory number. These data will be checked immediately by a check circuit 716 and an OK pulse 717 from the check circuit will result in partial enablement of an AND gate 719, erasure of the dialing complete call progress mark and writing of a call registered call progress mark in the out-trunk drum. If the check results in an NG pulse 720, a trouble mark will be written and the registers reset.

Office codes together with the trunk numbers of the intraoffice trunks are read from the in-trunk drum 41 and matched, by a match circuit 722, against these items as stored in the registers. When the match is found and the enablement of AND gate 719 is completed by the presence of a class of trunk mark identifying this as an intraoffice trunk and the absence of a call registered call progress mark, indicating that the transfer of the LDN information has not taken place, AND gate 725 is enabled and causes enablement of the line directory number gates 727 and writing of the called line directory number on the in-trunk drum 41. Enablement of AND gate 725 also causes the call registered call progress mark to be written on the in-trunk, and the registers to be reset.

A trunk number is used with these intraoffice trunks along with the called office code to facilitate the process of locating the particular slot on the in-trunk drum associated with the trunk selected on the out-trunk drum, whereas in an interoffice call the particular in-trunk slot is automatically identified by the connect signal voltage detected at the in-trunk scanner as previously described.

If out- and in-trunk slots are both located on the same trunk drum, as discussed above, only one slot need be utilized for an intraoffice trunk and the line directory number of the calling line can be written directly in it.

*Conclusion*

While certain concentrating and translating functions have been particular to certain magnetic drums in the above-described embodiment it is to be understood that this invention is not to be considered as limited to the particular embodiment described. Thus the particular magnetic drums depicted in the above-described arrangements may be combined into a fewer number of drums or certain channels and functions on the drums may be positioned on additional drums within the scope of our invention; also other dispatching and assembling circuits similar to those described may be used to control the flow of information from drum to drum within the office.

Thus it is to be understood that the above-described arrangements are illustrative of the application of the principles of the invention. Numerous other arrangements may be devised by those skilled in the art without departing from the spirit and scope of the invention.

Further while the above description has been concerned with the establishment of a single call through a telephone system in accordance with our invention it is to be understood that different functions from a single drum are carried out in parallel times by separate control units, permitting several calls that are at different stages of progress to be served simultaneously without mutual interference.

What is claimed is:

1. A switching system comprising in combination with a plurality of lines and a plurality of transmission paths, means for storing information comprising magnetic registering means comprising a continuously rotating magnetizable surface, each of said lines and said paths being assigned a slot on said magnetic registering means, means for registering and erasing information in said slots in response to signals from said lines and paths, and means for controlling the establishment of a transmission connection from a line to a transmission path in accordance with the information written on said magnetic registering means.

2. A switching system comprising a plurality of lines, a plurality of trunks, switching network means for connecting said lines and said trunks, magnetic registering means comprising a continuously rotating magnetizable surface, each of said lines and said trunks being assigned a slot on said magnetic registering means, means for registering and erasing information in said slots in response to signals from said lines and trunks, and means for establishing a transmission connection through said switching network means between a line and a trunk under control of said information registered on said magnetic registering means.

3. A switching system comprising a plurality of lines, a plurality of transmission paths, switching network means for connecting said lines to said transmission paths, magnetic registering means comprising at least one continuously rotating magnetizable surface, means for registering signals from a line on said magnetic registering means in a slot assigned to said line, means for registering said signals on said magnetic registering means in a slot assigned to an idle one of said transmission paths, and means for establishing a transmission connection through said switching network between said line and said idle transmission path under control of said signals registered on said magnetic registering means.

4. A telephone switching system comprising a plurality of calling lines, a plurality of transmission paths switching network means for connecting said lines and said paths, magnetic drum means comprising a continuously rotating surface of magnetic material, means for registering call signals from a calling line on said magnetic drum means in a slot assigned to said calling line, means for registering said call signals on said magnetic drum means in a slot assigned to an idle one of said transmission paths, and means for establishing a transmission connection through said switching network between said calling line and said idle transmission path under control of said signals registered on said magnetic drum means.

5. A telephone switching system comprising a plurality of calling lines, a plurality of transmission paths, switching network means for connecting said lines and said paths, magnetic drum means comprising a continuously rotating surface of magnetizable material, means for registering dialing signals from one of said lines in a slot on said magnetic drum means assigned to said one line, said dialing signals identifying the called office, means for registering information identifying said one line in a slot on said magnetic drum means assigned to an idle one of said transmission paths to said called office, and means for establishing a transmission connection through said switching network between said one calling line and said idle transmission path under control of said signals registered on said magnetic drum means.

6. A telephone switching system in accordance with claim 5 and further comprising means for registering subsequent dialing signals from said one line in said slot assigned to said one transmission path, said subsequent signals identifying the called subscriber in said called office, and means for transmitting signals identifying said called subscriber to said called office under control of said signals registered on said magnetic drum means.

7. A telephone switching system comprising a plurality of calling lines, a plurality of transmission paths extending to a remote office, a switching network for connecting said calling lines to said transmission paths, magnetic drum means, each of said calling lines and said transmission paths having an assigned slot on said magnetic drum means, means for registering calling signals from a calling line in a slot on said magnetic drum means assigned to said calling line, means for reading information on said drum means to find an idle transmission path to the remote office designated by said calling signals, means for registering said calling signals in said slot assigned to said idle transmission path, and means controlled by the information registered in said slot assigned to said idle transmission path for marking said switching network to establish a transmission connection between said calling line and said transmission path.

8. In combination in a switching system, a plurality of lines, a plurality of trunks, switching network means for connecting said lines and said trunks, magnetic drum means comprising a continuously rotating surface of magnetizable material, each of said lines and said trunks being assigned an individual slot on said magnetic drum means, and means for temporarily storing information to be written in a particular slot on said drum means and data identifying said particular slot, means for comparing said identifying data and data present in said slots on said drum means, and means for registering said information in a particular slot when a match is found by said comparing means between said identifying data and said data present in said particular slot.

9. A telephone switching system comprising a plurality of lines, a plurality of trunks, switching network means for connecting said lines and said trunks, means for receiving signals over said trunks from a remote office, said signals identifying a particular one of said lines, magnetic drum means, each of said lines and said trunks being assigned an individual slot on said drum means and each of said individual slots having marks therein identifying said lines and said trunks, means for registering in said slot on said drum means assigned to said one trunk data identifying said one line in the switching system, and means for establishing a connection through said switching network between said one trunk and said one line under control of information and data registered in said slot on said trunk drum assigned to said one trunk.

10. A switching system comprising a plurality of called lines, a plurality of trunks extending from a remote office, switching network means for connecting said trunks to said lines, magnetic registering means comprising at least one continuously rotating magnetizable surface, each of said lines and trunks being assigned an individual slot on said magnetic registering means and information identifying said lines and trunks being registered in said slots, means for receiving signals over one of said trunks from a distant office identifying one of said called lines, means for determining the condition of said one called line by checking information written in the slot on said magnetic registering means assigned to said one called line, means for registering in the slot on said magnetic registering means assigned to said one trunk data identifying said one called line in said switching system if said called line is found to be idle by said last-mentioned means, and means for establishing a transmission connection through said switching network means between said one trunk and said one called line under control of said information and data registered in said slot on said magnetic registering means assigned to said one trunk.

11. A telephone switching system comprising a plurality of called lines, a plurality of trunks extending from a distant office, switching network means for connecting said trunks to said called lines, magnetic drum means comprising a continuously rotating magnetizable surface, each of said lines being assigned a slot on said magnetic drum means and the line directory and equipment numbers of said lines being registered therein and each of said trunks being assigned a slot on said magnetic drum means and the trunk equipment numbers of said trunks being registered therein, means for receiving over one of said trunks signals from said distant office indicating the line directory number of a called line, means for comparing said line directory number with the line directory numbers in said slots on said magnetic drum means, means for reading the line equipment number of the called line when a match is found between said called line directory number and a line directory number in said magnetic drum means, means for reading the trunk equipment number of said one trunk from said magnetic drum means, and means for establishing a transmission path through said switching network between said one trunk and said called line under control of said information read from said magnetic drum means.

12. In combination in a telephone switching system, a plurality of transmission paths, means for scanning each of said paths in succession, memory means including a group of memory elements assigned to each of said paths and information being present in certain of said elements of said groups identifying the directory and equipment numbers of said transmission paths in the system, means for reading and altering information in each of said groups of memory elements in succession, and means for translating information from a directory number of one of said transmission paths to an equipment number, said last-mentioned means comprising means for temporarily storing said directory number, means for comparing said directory number in said temporary storage means with said directory numbers in said groups of memory elements, and means including said reading and altering means for reading out said equipment number from a group of memory elements when a match has been found by said comparing means between said directory number in said storage means and one of said directory numbers in said groups of memory elements.

13. In combination in a telephone switching system a plurality of transmission paths, magnetic drum means comprising a continuously rotating surface of magnetizable material, each of said transmission paths being assigned an individual slot on said magnetic drum means and marks being present in each of said slots identifying the directory and equipment numbers of said transmission path in the system, and means for translating information from a directory number of said transmission path to an equipment number, said last-mentioned means comprising means for temporarily storing said directory number, means for comparing said directory number in said temporary storage means with said directory numbers in said slots, and means for reading out said equipment number from a particular slot when a match has been found by said comparing means between said directory number in said storage means and said directory number in said particular slot.

14. In combination in a telephone system a plurality of lines, a plurality of trunks, means for receiving signals over one of said lines identifying the directory office code of one of said trunks, a magnetic drum, each of said trunks being assigned a slot on said magnetic drum and the directory office code and the equipment number of each of said trunks being registered in the slot assigned thereto, means for temporarily storing said signals, means for comparing said signals in said storage means with said directory numbers registered in said slots, and means for reading out said equipment number from a particular slot when a match has been found by said comparing means between said directory office code in said storage means and said directory office code in said particular slot.

15. In combination in a telephone switching system, a plurality of lines, a plurality of trunks, switching network means for connecting said lines and said trunks, means for receiving information requesting that a connection be established between a particular one of said trunks and a particular one of said lines, magnetic drum means comprising a continuously rotating surface of a magnetizable material, each of said trunks and said lines being assigned a slot on said magnetic drum means, means for registering information on said drum means pertaining to the establishment of said connection, said means including a plurality of control circuits, means for registering call progress marks in said slots assigned to said one line and one trunk in response to the operation of said last-mentioned means, and means for reading said call progress marks to control the operation of certain of said control circuits so that said control circuits are only enabled after a particular sequence of information assembly in said slots on said drum means.

16. In combination in a telephone switching system, a plurality of lines, a plurality of trunks, switching network means for connecting said lines and said trunks, means for scanning each of said lines and said trunks, memory means including a distinct group of memory elements assigned to each of said lines and trunks by said scanning means, means for reading and altering information in each of said groups of memory elements in succession, means for receiving information requesting that a connection be established between a particular one of said trunks and a particular one of said lines, means for registering information in the groups of memory elements assigned to said one line and said one trunk pertaining to the establishment of said connection, said registering means including said reading and altering means and a plurality of control circuits, means for registering call progress marks in the groups of memory elements assigned to said one line and said one trunk in response to the operation of said priorly mentioned writing means, and means for reading said call progress marks to control the operation of certain of said control circuits so that said control circuits are only enabled after a particular sequence of information assembly in said groups of memory elements.

17. In combination in a telephone switching system, a plurality of transmission paths, means for scanning each of said transmission paths in succession, memory means including a distinct group of memory elements assigned to each of said transmission paths by said scanning means, means for reading and altering information in each of said groups of memory elements in succession, means for registering a call progress mark in the group of memory elements assigned to a particular transmission path, means for applying information read from said group of memory elements to a first circuit if said call progress mark is present, and means for applying information read from said group of memory elements to a second circuit if said call progress mark is not present.

18. In combination in a telephone switching system, a plurality of transmission paths, means for scanning each of said transmission paths in succession, magnetic memory means including a distinct group of memory elements assigned to each of said paths by said scanning means, means for registering a call progress mark in a particular one of said groups of memory elements, means for registering information in said particular group of memory elements pertaining to the establishment of a transmission connection through the switching system utilizing the transmission path to which said particular group of memory elements is assigned, means for reading said information, means for utilizing said information in a first manner if said call progress mark is present, and means for utilizing said information in a second manner if said call progress mark is not present.

19. The method of establishing a connection through a switching network between a line and a trunk comprising the steps of recording information on a magnetic drum pertaining to the connection to be established, recording call progress marks on the magnetic drum in the slots assigned to the line and the trunk after the recording of a particular sequence of information assembly in those slots on the drum, and enabling control circuits which control further recording of information in those slots on the magnetic drum and control the switching network only on the reading of particular ones of those call progress marks.

20. The method of establishing a transmission connection through a switching network in a telephone switching system comprising the steps of registering call progress marks in cells on magnetic drums, said cells being in slots assigned to the particular transmission connection to be established and said call progress marks each being registered after operation of particular control circuits in the switching system, reading said call progress marks, enabling subsequent control circuits in the switching system only on the reading of said call progress marks, whereby said control circuits operate in the proper sequence for the establishment of the transmission connection through the switching network.

21. The method of establishing a transmission connection through a switching network in a telephone switching system comprising the steps of registering information pertaining to the establishment of a transmission connection employing a particular transmission path in a group of memory elements, each group of memory elements being assigned to a particular transmission path and said groups of memory elements being serially available for the registering and reading of information, registering call progress marks in certain memory elements, reading said information and said call progress marks in a group of memory elements, and interpreting the information read from the group of memory elements by the call progress marks also read from the group of memory elements.

22. A telephone switching system comprising a plurality of calling lines, a plurality of trunks extending to a remote office, a switching network for connecting said calling lines to said trunks, magnetic registering means comprising at least one continuously rotating magnetizable surface, each of said lines being assigned a slot on said surface and the line equipment number of said lines being registered therein and each of said trunks being assigned a slot on said surface and the trunk equipment number of said trunks being registered therein, means for registering calling signals from a calling line in the slot assigned thereto, means for reading the information registered in each of said slots assigned to said trunks to locate an idle trunk to a remote office identified by said calling signals, means for writing call progress marks in said slots as said calling signals proceed through the switching system, and means controlled by the information and progress marks registered in said slots for marking said switching network to establish a transmission connection between said calling line and said idle trunk.

23. A telephone switching system in accordance with claim 22 further comprising means for registering the line equipment number of said calling line in the slot assigned to said idle trunk.

24. A telephone switching system comprising a plurality of calling lines, a plurality of trunks extending to remote offices, a switching network for connecting said calling lines to said trunks, magnetic drum means, each of said calling lines and said trunks having an assigned slot on said magnetic drum means, means for detecting dial pulses appearing on one of said calling lines, means for registering the ones of said dial pulses identifying the called office in the slot assigned to said one line, means for reading the information present in said trunk slots to locate an idle trunk extending to said called office, means for registering in the slot assigned to said idle trunk an identification of said one calling line, and means controlled by the information registered in said one trunk slot for marking said switching network to establish a connection between said calling line and said idle trunk to said called office.

25. A telephone switching system in accordance with claim 24 further comprising means for registering in the slot of said idle trunk the directory number of the called line, and means for transmitting to the called office over said idle trunk said called directory number.

26. A telephone switching system comprising a plurality of calling lines, a plurality of trunks extending to remote offices, a switching network for connecting said calling lines to said trunks, magnetic drum means, each of said calling lines and said trunks having an assigned slot on said magnetic drum means and information designating said lines and trunks being registered in said slots, means for detecting dial pulses appearing on one of said calling lines, means for registering the ones of said dial pulses identifying the called office in the slot on said drum means assigned to said line, means for reading the information in said trunk slots to select an idle trunk extending to said called office means for registering in the slot assigned to said idle trunk an identification of said one calling line, means for assembling the ones of said pulses identifying the called line in said called office, means for registering said called line identification in said trunk slot, means controlled by the information registered in said idle trunk slot for marking said switching network to establish a transmission connection between said calling line and said idle trunk, and means for transmitting to said called office over said trunk said identification of said called line in said called office.

27. In combination in a switching system comprising a plurality of lines, a plurality of trunks, switching network means for connecting said lines and said trunks, magnetic drum means comprising at least one continuously rotating surface of magnetic material, means for registering on said drum information pertaining to a switching connection to be set up by said switching network means, means for registering progress marks on said drum when certain information has been written on said drum, means for reading said information and said progress marks, means for checking said information, said last-mentioned means being controlled by said means reading and said progress marks, and means for registering a trouble mark on said drum without disturbing said progress marks on indication by said checking means of the reading of incorrect information.

28. In combination in a telephone switching system, a plurality of lines, a plurality of trunks, means for receiving signals over said trunks from a remote office, said signals comprising the line directory number of a called line, a magnetic drum, each line being assigned a slot on said drum, means for reading call progress marks in the slot on said drum assigned to said called line for ascertaining that that line is idle, means for reading out the line equipment number of said called line from said slot if said line is idle, and means for substituting for said line directory number the code of a busy-tone line if said line is busy.

29. In combination in a telephone switching system, a plurality of lines, a plurality of trunks, means for receiving signals over said trunks from a remote office, said signals comprising the line directory number of a called line, magnetic memory means including groups of memory elements, means for scanning each of said trunks in succession, each of said trunks being assigned a particular group of said memory elements by said scanning means, means for reading call progress marks in the memory elements of the group assigned to said called line for ascertaining that said line is idle, means for reading out the line equipment number of said called line if said line is idle, and means for substituting for said line directory number the code of a busy-tone line if said called line is busy.

30. A telephone switching system comprising a plurality of lines, a plurality of trunks, a switching network for connecting said lines and said trunks, means for scanning each of said lines in succession, a line magnetic drum, each of said lines being assigned a slot on said line magnetic drum and the line equipment number of said lines being registered in said slots, means for detecting dial pulses on said lines, means for accumulating said dial pulses designating the office code of the called line in the slot on said line drum assigned to said calling line, a trunk magnetic drum, each of said trunks being assigned a slot on said trunk magnetic drum and the trunk equipment number and office codes of said trunks being registered in said slots, means for reading out from the slot of said calling line on said line drum the called office code and the line equipment number of said calling line on accumulation in said slot of all of said dial pulses designating said called office code, means for selecting an idle out-trunk to said called office including means for comparing said office code read from said slot on said line drum with said office codes registered in slots on said trunk drum, means for registering said line equipment number in a particular slot on said trunk when an idle trunk to said called office has been found by said out-trunk selecting means, means for accumulating subsequent dial pulses on said calling line slot designating the directory number of the called line and registering said called line directory number in said particular slot on said trunk drum, means for registering a dialing complete call progress mark in said particular trunk slot after accumulation of said subsequent dial pulses, and means for establishing a transmission connection through said switching network between said calling line and said idle out-trunk under control of said line and trunk equipment numbers and said dialing complete call progress mark in said slot on said trunk drum assigned to said idle trunk.

31. A telephone switching system comprising a plurality of lines, a plurality of trunks extending from a remote office, a switching network for connecting said lines and said trunks, means for scanning each of said trunks in succession, means for receiving signals over one of said trunks, said signals designating a line being called by a subscriber in said remote office, a trunk magnetic drum, each of said trunks being assigned a slot on said trunk magnetic drum and the trunk equipment number of said trunks being registered in said slots, means for registering the directory number of the called line as designated by said signals in the slot assigned to said one trunk, a line magnetic drum, each of said lines being assigned a slot on said line magnetic drum and the line equipment and directory numbers of said lines being registered in said slots, means for reading out said line directory number from said slot on said trunk drum and storing it in temporary registers, means for consulting the information in said slots on said line drum to ascertain the line equipment number of said called line, said last-mentioned means comprising means for comparing the line directory number in said storage means with said line directory numbers registered in said slots on said line drum and means for reading out the line equipment number in a particular slot on said line drum when a match has been found by said comparing means, means for registering said line equipment number in said one trunk's slot on said trunk drum, means for registering a translation made progress mark in said one trunk's slot after a match has been found by said comparing means, and means for establishing a connection through said switching network between said one trunk and said called line under control of said line and trunk equipment numbers and said translation made progress mark in said one trunk's slot on said trunk drum.

32. A telephone switching system comprising a plurality of calling lines, a plurality of called lines, a plurality of trunks, a first switching network for connecting said calling lines and said trunks, a second switching network for connecting said trunks and said coded lines, means for scanning each of said lines in succession, a first line magnetic drum, each of said calling lines being assigned as slot on said first line magnetic drum and the line equipment number of said lines being registered in said slots, means for detecting dial pulses on one of said calling lines, means for accumulating said dial pulses designating the office code of the called line in the slot on said first line drum assigned to said one calling line, a first trunk magnetic drum, each of said trunks being assigned a slot on said first trunk magnet drum and the trunk equipment numbers and office codes of said trunks being registered in said slots, means for reading out from the slot of said one calling line on said first line drum the called office code and the line equipment number of said one calling line on accumulation in said slot of all of said dial pulses designating said called office code, means for selecting an idle trunk including means for comparing said office code read from said slot on said line drum with said office codes registered in slots on said first trunk drum, means for registering said one calling line equipment number in a particular slot on said first trunk drum when an idle trunk has been found by said trunk selecting means, means for accumulating subsequent dial pulses on said one calling line slot designating the directory number of one of said called lines and registering said one called line directory number in said particular slot on said first trunk drum, means for registering a dialing complete call progress mark in said particular trunk slot after accumulation of said subsequent dial pulse, means for establishing a transmission connection through said first switching network between said calling line and said idle trunk under control of said line and trunk equipment numbers and said dialing complete call progress mark in said slot on said first trunk drum assigned to said idle trunk, means for transmitting signals representing said subsequent dial pulses over said idle trunk, means for scanning each of said trunks in succession, means for receiving said signals over said idle trunk, a second trunk magnetic drum, each of said trunks being assigned a slot on said second trunk magnetic drum and the trunk equipment numbers of said trunks being registered in said slots, means for registering the directory number of said one called line as designated by said signals in the slot assigned to said idle trunk on said second trunk drum, a second line magnetic drum, each of said called lines being assigned a slot on said second line magnetic drum and the line equipment and directory numbers of said called lines being registered in said slots, means for reading out said line directory number of said one called line from said slot on said second trunk drum and storing it in temporary registers, means for consulting the information in said slots on said second line drum to ascertain the line equipment number of said called line, said last-mentioned means comprising means for comparing the line directory number in said storage means with said line directory numbers registered in said slots on said second line drum and means for reading out the line equipment number in a particular slot on said second line drum when a match has been found by said comparing means, means for registering said line equipment number in said idle trunk slot on said second trunk drum, means for registering a translation made call progress mark in said idle trunk slot after registering of said line equipment number, and means for establishing a connection through said second switching network between said idle trunk and said one called line under control of said line and trunk equipment numbers and said translation made call progress mark in said idle trunk slot on said second trunk drum whereby a transmission path is established between said one calling line and said one called line.

33. In a switching system, a plurality of lines, a plurality of trunks, a switching network for establishing a connection between said lines and said trunks, and means for controlling said switching network to establish a connection between a particular one of said lines and a particular one of said trunks, said means including a magnetic drum, each of said lines and trunks being assigned a slot on said magnetic drum, means for registering information pertaining to said lines and said trunks in the form of marks in said slots on said drum, means for reading said information from said drum, means for checking said information when read from said drums, each of said registering, reading and checking means including control circuits, means for resetting said control circuits after operation thereof, and means for synchronizing the reading, registering and checking of said information and the resetting of said control circuits, said synchronizing means comprising cell marks in a channel on said drum, said marks being in each of said slots but advanced in the direction of the rotation of said drum from said other marks in said slots, means for reading out each cell mark and generating a start pulse in response thereto, means actuated by said start pulse for generating a reading synchronizing pulse and applying said reading synchronizing pulse to said reading means, means actuated by said start pulse for generating a registering synchronizing pulse delayed in time from said reading synchronizing pulse and applying said registering synchronizing pulse to said registering means, means actuated by said start pulse for generating a reset synchronizing pulse after said registering synchronizing pulse and applying said reset synchronizing pulse to said reset means, and means actuated by said start pulse for generating a check synchronizing pulse and applying said check synchronizing pulse to said checking means.

34. In combination in a telephone switching system, a plurality of lines, a plurality of trunks to a distant office, means for scanning each of said lines in succession, a line magnetic drum, each of said lines being assigned a slot on said line magnetic drum, a trunk magnetic drum, each of said trunks being assigned a slot on said trunk magnetic drum and the directory office code of each trunk being registered in its slot, means for receiving dial pulses over one of said lines, said receiving means including said scanning means, means for accumulating those of said dial pulses designating the called office code on said line magnetic drum in the slot assigned to said one line, means for reading out said called office code from said slot on accumulation thereof by said accumulating means, and means for selecting an idle trunk designated by said called office code, said selecting means comprising means for temporarily storing said office code read by said reading means, means for comparing said office code in said storage means with said office codes registered in said slots on said trunk drum, means for reading call progress marks registered on said trunk drum indicating the condition of each of said trunks, and means for registering a designation of said calling line in a particular slot on said trunk drum when a match is found by said comparing means between the office code registered in said storage means and the office code registered in said particular slot and the reading of said call progress marks registered in said particular slot indicates that said trunk is idle.

35. In the combination in a telephone system in accordance with claim 34 wherein the line equipment number of each of said lines is registered in the slot on said line drum assigned thereto, means for reading out said line equipment number when said called office code is read out and means for temporarily storing said line equipment number whereby said registering means can register the line equipment number of said calling line in said particular slot on said trunk drum.

36. In a telephone switching system, a plurality of lines, a magnetic drum, each of said lines being assigned a slot on said drum, means for scanning each of said lines in succession, means for receiving dial pulses from one of said lines, said receiving means including said scanning means, means for accumulating those of said dial pulses designating the called office code of the called line in the slot assigned to said call line on said line drum, means for writing a spill-out call progress mark in said calling line slot on said drum after accumulation of said called office code dial pulses, means for reading said called office code from said line drum and dispatching said called office code to subsequent apparatus under control of said spill-out call progress mark, means for registering a not-office-code call progress mark in said calling line slot, means for registering subsequent dial pulses designating individual digits of the called line directory number in said calling line slot on said line drum, means for registering a spill-out call progress mark on registering said individual subsequent dial pulses when said not-office-code call progress mark is present in said calling line slot, and means under control of said spill-out call progress mark for dispatching each of said digits of said called line directory number individually to said subsequent apparatus.

37. In a telephone system in accordance with claim 36, the combination further comprising logic circuit means for recognizing digits comprising special codes and means for registering a spill-out call progress mark on recognition of said digits comprising special codes.

38. In a telephone switching system, a plurality of lines, a plurality of trunks, switching network means for connecting said lines and said trunks, magnetic drum means, each of said lines and said trunks being assigned a slot on said magnetic drum means, means for registering information pertaining to a transmission connection through said switching network means in slots on said drum assigned to the line and trunk between which said connection is made, means for controlling the writing of said information, said controlling means including control circuits, means for registering call progress marks in said slots indicating when any of said lines and trunks are busy, means for reading said call progress marks, and means applying said call progress marks to said control circuits to prevent the registering of information in particular slots on said drum means when said lines and trunks assigned said particular slots are being utilized for prior connections through said switching network means.

39. In a telephone switching system, a plurality of lines, a plurality of trunks, switching network means for connecting said lines and said trunks, means for scanning each of said lines in succession and each of said trunks in succession, memory means including an individual group of memory elements assigned to each of said lines and said trunks by said scanning means, means for registering in each of said groups of memory elements in succession information pertaining to transmission connections through said switching network means, said information being registered in the particular groups assigned to the line and trunk between which the connection is to be made, means for controlling the registering of said information, said controlling means including control circuits, means for registering call progress marks in certain of said memory elements of said groups indicating when any of said lines and trunks are busy, means for reading said call progress marks, and means applying said call progress marks to said control circuits to prevent the registering of information in particular groups of memory elements when said lines and trunks assigned said particular groups of memory elements are being utilized for prior connections through said switching network means.

40. A telephone switching system comprising a plurality of lines, a plurality of trunks extending to remote offices, a switching network for establishing transmission connections between said lines and said trunks, a line magnetic drum, each of said lines being assigned a slot on said line magnetic drum, means for accumulating dial pulses from one of said lines, said dial pulses designating the office code of the called line, said means including means for registering marks in the slot on said line drum of said one line, a trunk magnetic drum, each of said trunks being assigned a slot on said trunk magnetic drum, means for selecting an idle trunk corresponding to said called office code, said selecting means including means for reading out said called office code from said line drum slot and comparing said called office code with information present in said trunk drum slots, means for accumulating subsequent dial pulses on said one line, said subsequent dial pulses designating the line directory number of said called line, said selecting means selecting said idle trunk before the accumulation of all of said subsequent dial pulses, and means for applying voltages to said switching network on selection of said idle out-trunk under control of said information on said magnetic drums whereby said transmission connection is established through said switching network on accumulation of all of said subsequent dial pulses.

41. A telephone switching system in accordance with claim 40 further comprising means for checking the continuity of the transmission path from said calling line to said remote office, means for registering a call progress mark continuity checked in said one trunk slot on said trunk drum on checking of said continuity, means for transmitting said line directory number to said remote office over said one trunk, and means controlled by the presence of said call progress mark continuity checked for operating said transmitting means.

42. A telephone system comprising a plurality of calling lines, a plurality of called lines, a plurality of trunks, first and second switching network means for establishing transmission connections between said calling lines, said trunks, and said called lines, a trunk magnetic drum, each of said trunks being assigned a slot on said magnetic drum, means for registering in a slot assigned to an idle trunk the line directory number of a called line being requested by one calling line, means for establishing a connection through said first switching network between said one calling line and said idle trunk under control of information present in said idle trunk slot, means for transmitting said line directory number over said idle trunk, means for checking the continuity of said transmission path from said calling line to said second switching network, means for registering a continuity checked call progress mark in said idle trunk slot on checking of said continuity, and means controlled by the presence of said call progress mark continuity checked for operating said transmitting means.

43. A telephone switching system comprising a plurality of lines, a plurality of trunks to a remote office, switching network means for connecting said lines and said trunks, magnetic drum means comprising a continuously rotating magnetizable surface, each of said lines and said paths being assigned a slot on said magnetic drum means, means for registering and erasing information in said slots in response to signals from said lines and trunks, means for establishing a transmission connection through said switching network means between a line and a trunk under control of signals registered on the slots on said magnetic drum means assigned to said line and trunk, means for registering a trouble call progress mark in a particular slot on the incorrect operation of said registering and erasing means with respect to information pertinent to said particular slot, and means for preventing subsequent operation of said registering and erasing means with respect to said particular slot after writing of said trouble call progress mark in said particular slot.

44. A telephone switching system comprising a plurality of calling lines, a plurality of trunks, a switching network for connecting said lines and said trunks, magnetic drum means, each of said lines and trunks being assigned a slot on said magnetic drum means, means for registering signals from a calling line in the slot on said drum means assigned to said calling line, means for registering said signals in a slot on said drum means assigned to an idle one of said trunks, means for establishing a transmission connection through said switching network between said line and said idle trunk under control of said signals registered in said slots on said drum means, and means for registering a switching network connected call progress mark in said idle trunk slot on said drum means on establishment of said transmission connection through said switching connection.

45. In a telephone switching system, a plurality of lines, a plurality of trunks, a switching network for connecting said lines and said trunks, means for scanning each of said lines in succession and each of said trunks in succession, memory means including a distinct group of memory elements assigned to each of said lines and trunks by said scanning means, means for registering information in said groups of memory elements in succession pertinent to said lines and trunks assigned thereto, a dispatcher circuit comprising means for reading said information and means for temporarily storing said information so that it can be transmitted to other apparatus when the appropriate location in said other apparatus is found, means for registering a call progress mark in a particular group of memory elements when said dispatcher circuit is to be utilized by information present in said particular slot, means for enabling said dispatcher circuit on the reading out of said call progress mark, means for erasing said call progress mark after operation of said dispatcher circuit, and means for registering a second call progress mark on operation of said dispatcher circuit to enable other circuitry in the system.

46. In a switching system, a plurality of transmission paths, means for scanning each of said paths in succession, memory means including a distinct group of memory elements assigned to each of said paths by said scanning means, means for registering information in particular groups of memory elements pertinent to the paths assigned to said particular groups of memory elements, a dispatcher circuit for transmitting said information to other apparatus in the system, said dispatcher circuit comprising means for reading said information and means for temporaritly storing said information so that it can be transmitted to other apparatus when the appropriate location on said other apparatus is found, means for registering call progress marks in said particular groups of memory elements when said dispatcher circuit is to be utilized, means for enabling said dispatcher circuit on the reading out of said call progress marks, and means for erasing the call progress mark present in a group of memory elements after operation of said dispatcher circuit with respect to the information registered in that group of memory elements.

47. In a telephone switching system, a plurality of transmission paths, a magnetic drum, each of said transmission paths being assigned a slot on said magnetic drum, means for registering information in a particular slot on said drum pertinent to the path assigned to said particular slot, a dispatcher circuit for transmitting said information to other apparatus in the system, said dispatcher circuit comprising means for reading said information and means for temporarily storing said information so that it can be transmitted to said other apparatus when the appropriate location in said other apparatus is found, means for registering a call progress mark in said particular slot on said drum when said dispatcher circuit is to be utilized, means for enabling said dispatcher circuit on the reading out of said call progress mark, and means for erasing said call progress mark after operation of said dispatcher circuit.

48. In a telephone switching system in accordance with claim 47 means for registering a second call progress mark in said particular slot on said drum on operation of said dispatcher circuit.

49. In a switching system, a plurality of transmission paths, means for scanning each of said paths in succession, memory means including a distinct group of memory elements assigned to each of said paths by said scanning means, an assembler circuit for receiving information from other apparatus in the system, said assembler circuit comprising means for temporarily storing said information, means for locating a particular group of memory elements said information pertains to, and means for registering said information in said particular group of memory elements, means for registering a call progress mark in said particular group of memory elements when said assembler circuit is to be utilized, means for enabling said assembler circuit on the reading out of said call progress mark, and means for erasing said call progress mark after operation of said assembler circuit.

50. In a telephone switching system, a plurality of lines, a plurality of trunks, a switching network for connecting said lines and said trunks, means for scanning each of said lines in succession and each of said trunks in succession, memory means including a distinct group of memory elements assigned to each of said lines and said trunks by said scanning means, means for registering information in said groups of memory elements in succession pertinent to said lines and trunks assigned thereto, an assembler circuit comprising means for receiving information from other apparatus in the system, means for temporarily storing said information, means for locating the particular group of said memory elements said information pertains to, and means for registering said information in said particular group of memory elements, means for registering a call progress mark in said particular groups of memory elements when said assembler circuit is to be utilized, means for enabling said assembler circuit on the reading out of said call progress mark, and means for erasing said call progress mark after operation of said assembler circuit.

51. In a telephone switching system, a plurality of transmission paths, a magnetic drum, each of said transmission paths being assigned a slot on said magnetic drum, an assembler circuit for receiving information from other apparatus in the system, said assembler circuit comprising means for temporarily storing said information, means for locating the particular slot on said drum said information pertains to, and means for registering said information in said particular slot, means for registering a call progress mark in said particular slot on said drum when said assembler circuit is to be utilized, means for enabling said assembler circuit on the reading out of said call progress mark, and means for erasing said call progress mark after operation of said assembler circuit.

52. In a telephone system in accordance with claim 51 means for registering a second call progress mark in said particular slot on said drum on operation of said assembler circuit.

53. In a telephone switching system, a plurality of intraoffice trunks, an out-trunk magnetic drum, each of said intraoffice trunks being assigned a slot on said out-trunk magnetic drum, an in-trunk magnetic drum, each of said intraoffice trunks being assigned a slot on said in-trunk magnetic drum, a trunk number individual to each intraoffice trunk registered in each of said slots on said in- and out-trunk drums, and means for transferring information pertaining to a call to be set up over one of said intraoffice trunks from said out- to said in-trunk, said transferring means comprising means for reading out said information and said trunk number from said out-trunk drum, means for temporarily storing said information and said trunk number when said information has been read out from said slot of said one intraoffice trunk on said out-trunk drum, means for comparing said trunk number in said storage means and said trunk numbers in said slots on said in-trunk, and means for registering said information in a particular slot on said in-trunk when a match has been found between said trunk number stored in said storage means and said trunk number in said particular in-trunk slot.

54. In a telephone switching system, a magnetic drum, means for reading out information from said drum, means for receiving said information and storing it, said last-mentioned means comprising toggle registers, and means for resetting said toggle registers after utilization of said information without interference with the reading of said information, said last-mentioned means including marks in each slot on said drum in a single channel, means for reading said marks in said channel, means operated by the read output of said reading means for generating a reset synchronizing pulse for each slot on said drum, and means enabled by said synchronizing pulse for resetting said toggles.

55. In a telephone switching system, a plurality of lines, a plurality of trunks, a switching network for establishing connections between said lines and said trunks, means for scanning each of said lines in succession, means for scanning each of said trunks in succession, line memory means including groups of memory elements each assigned by said line scanning means to an individual one of said lines, trunk memory means including groups of memory elements each assigned by said trunk scanning means to an individual one of said trunks, means for registering and reading information from groups of memory elements of said line memory means in succession for registering dial pulses received over any of said lines and translating between line directory and line equipment numbers, and means for registering and reading information from groups of said memory elements of said trunk memory means in succession for translating between called office codes and trunk equipment number.

56. A telephone switching system, a plurality of lines, a plurality of trunks, a switching network for establishing connections between said lines and said trunks, a line magnetic drum, each of said lines being assigned a slot on said line magnetic drum, a trunk magnetic drum, each of said trunks being assigned a slot on said trunk magnetic drum, means for registering and reading information from slots on said line drum for registering dial pulses received over any of said lines, and translating between line directory and line equipment numbers, and means for registering and reading information from slots on said trunk drum for translating between called office codes and trunk equipment numbers and for marking said switching network to establish a desired connection between a line and a trunk.

57. In a telephone switching system a plurality of trunks, a trunk magnetic drum, each of said trunks being assigned a slot on said trunk magnetic drum, means for scanning each of said trunks in succession, means for applying a plurality of signals to each of said trunks, each of said signals being indicative of a different condition, means for detecting said signals, said means including said scanning means, and means writing call progress marks on said trunk drum to identify the particular condition of said trunk detected by said detecting means.

58. In a telephone system in accordance with claim 57 wherein said signals are amplitude modulated, the combination further comprising means for erasing call progress marks present on said trunk drum and identifying a prior condition of said trunk.

59. A telephone switching system comprising a plurality of lines, a plurality of trunks, switching network means for establishing transmission connections between said lines and said trunks, means for scanning each of said lines in succession, means for scanning each of said trunks in succession, line memory means comprising groups of memory elements each assigned to an individual one of said lines by said line scanning means, trunk memory means comprising groups of memory elements each assigned to an individual one of said trunks by said trunk scanning means, means for receiving and storing information in said line and trunk memory means pertaining to a particular transmission connection to be set up by said switching network means, and means applying voltages to said switching network means to establish said particular transmission connection in accordance with said information stored in said line and trunk memory means only after all information necessary for the establishment of said particular transmission connection has been stored in said line and trunk memory means.

60. In a telephone switching system the combination comprising a plurality of transmission paths, means for scanning each of said paths in succession, memory means comprising a plurality of groups of memory elements, each of said groups being assigned to one of said paths by said scanning means, means for reading and registering information in each of said groups in succession, data being registered in certain of said groups of memory elements indicating special action to be taken on transmission connections utilizing the paths assigned to said groups of memory elements, means including said reading means for applying information from a particular group of memory elements to one group of circuits in the system in the absence of said data in said particular group of memory elements, and means including said reading means for applying information from another group of memory elements to a second group of circuits in the system on the presence of said data in said other group of memory elements.

61. A telephone switching system comprising a plurality of lines, a plurality of trunks, a switching network for establishing transmission connections between said lines and said trunks, magnetic drum means, each of said lines and said trunks being assigned a slot on said magnetic drum means, means for receiving information over said lines and said trunks pertaining to a switching connection to be established by said switching network, means for registering said information on said magnetic drum means, means under control of said information on said magnetic drum means for establishing a transmission connection through said switching network between a particular one of said lines and a particular one of said trunks, means for detecting the termination of the call utilizing said particular line and said particular trunk, and means for disestablishing the transmission connection through said switching network under control of the information on said magnetic drums.

62. A telephone switching system in accordance with claim 61 further comprising means for erasing the information in said slots on said magnetic drum means pertaining to the transmission connection established between said particular line and said particular trunk on operation of said means for disestablishing said transmission connection.

No references cited.